United States Patent
Rae et al.

(10) Patent No.: US 6,594,094 B2
(45) Date of Patent: Jul. 15, 2003

(54) READ/WRITE CHANNEL

(75) Inventors: James W. Rae, Rochester, MN (US);
William Bliss, Thornton, CO (US);
Jonathan Ashley, Los Gatos, CA (US);
Razmik Karabed, San Jose, CA (US);
Stephen J. Franck, Felton, CA (US);
Fritz Mistlberger, Bavaria (DE);
Matthias Driller, Santa Cruz, CA (US);
Heinrich Stockmanns, Santa Cruz, CA (US); Dominik Margraf, Santa Cruz, CA (US)

(73) Assignee: Infineon Technologies North America Corp., San Jose, CA (US)

( * ) Notice: Subject to any disclaimer, the term of this patent is extended or adjusted under 35 U.S.C. 154(b) by 0 days.

(21) Appl. No.: 10/025,001

(22) Filed: Dec. 18, 2001

(65) Prior Publication Data

US 2002/0154430 A1 Oct. 24, 2002

Related U.S. Application Data

(63) Continuation of application No. 09/826,633, filed on Apr. 5, 2001.
(60) Provisional application No. 60/194,954, filed on Apr. 5, 2000.

(51) Int. Cl.$^7$ ................................................. G11B 5/02
(52) U.S. Cl. ............................. 360/25; 360/46; 360/53; 360/51; 360/78.14; 360/77.08; 360/65
(58) Field of Search .................... 360/25, 46, 53, 360/51, 78.14, 77.08, 65, 68, 67, 61, 62, 49

(56) References Cited

U.S. PATENT DOCUMENTS

| | | | |
|---|---|---|---|
| 5,696,639 A | | 12/1997 | Spurbeck et al. |
| 6,031,672 A | * | 2/2000 | Bergquist et al. ........ 360/77.08 |
| 6,038,091 A | | 3/2000 | Reed et al. |
| 6,108,152 A | * | 8/2000 | Du et al. ...................... 360/53 |
| 6,219,192 B1 | * | 4/2001 | Gopalaswamy et al. ...... 360/67 |

FOREIGN PATENT DOCUMENTS

WO     WO 00/63889     10/2000

OTHER PUBLICATIONS

Altekar et al., "A 700Mb/s BiCMOS Read Channel Integrated Circuit," *2001 IEEE International Solid–State Circuits Conference*, XP–002177065, 3 pgs.
Bloodworth et al., "A 450–Mb/s Analog Front End for PRML Read Channels," *IEEE Journal of Solid–State Circuits*, XP–000931893, 1999, 34(11):1661–1675.
Chern et al., "SA 19.4: An EPRML Digital Read/Write Channel IC," *IEEE International Solid–State Circuits Conference*, XP–002177066, 1997, 8 pgs.
Chern et al., "SA 19.4: An EPRML Digital Read/Write Channel IC," *IEEE International Solid–State Circuits Conference*, XP–000753116, 1997, pp. 320–321, 479.
Fields et al., "SA 19.1: A 200Mb/s CMOS EPRML Channel with Integrated Servo Demodulator for Magnetic Hard Disks," *IEEE International Solid–State Circuits Conference*, XP–000999335, 1997, pp. 314–315, 477.

* cited by examiner

Primary Examiner—Alan T. Faber
(74) *Attorney, Agent, or Firm*—Fish & Richardson P.C.

(57) ABSTRACT

An improved sampled amplitude read/write channel is provided. The system is an integrated Generalized Partial Response Maximum Likelihood (GPRML) read channel incorporating Read, Write, and Servo modes of operation. One implementation includes a 32/34 rate parity code and matched Viterbi detector, a 32 state Viterbi detector optimal parity processor, robust frame synchronization, self-adaptive equalization, thermal asperity detection and compensation, adaptive magneto-resistive asymmetry compensation, low latency interpolated timing recovery and programmable write precompensation.

17 Claims, 23 Drawing Sheets

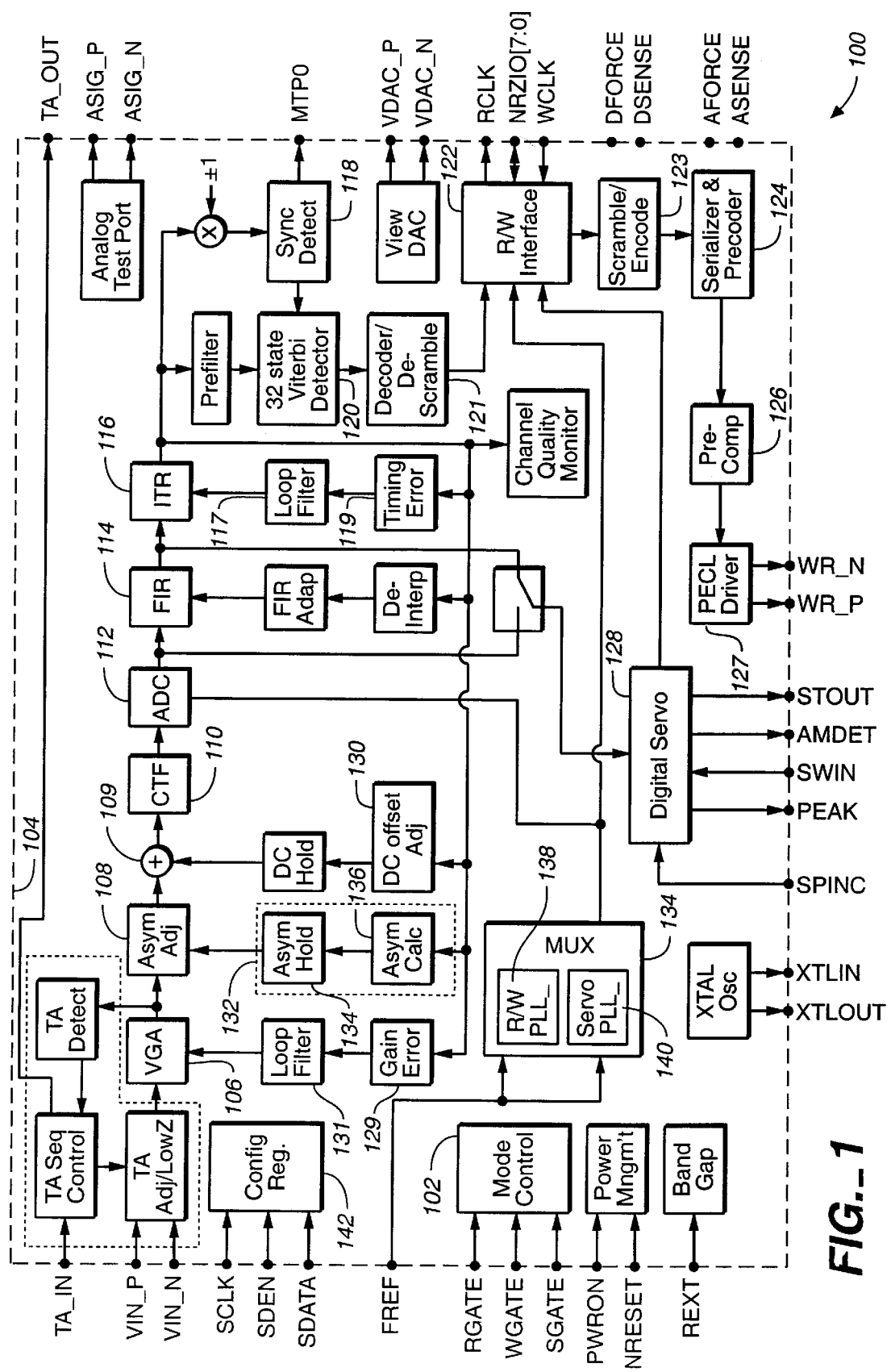
FIG._1

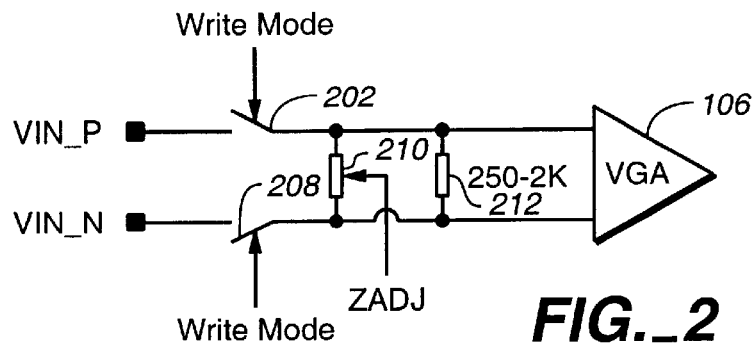
FIG._2
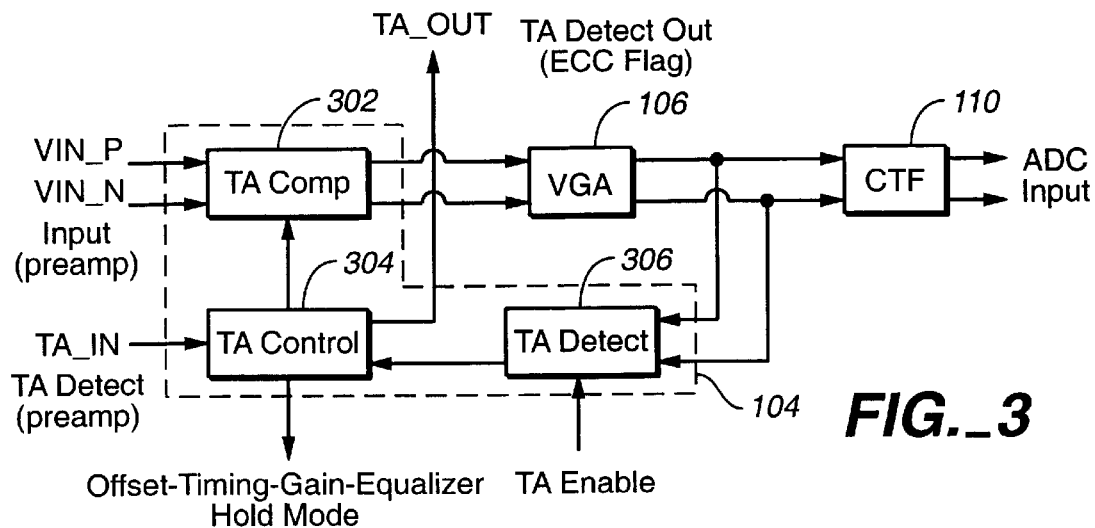
FIG._3
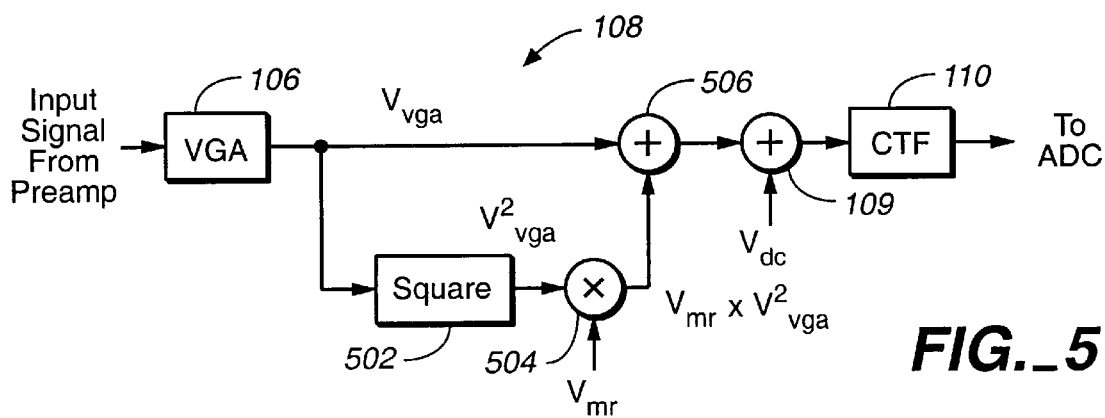
FIG._5

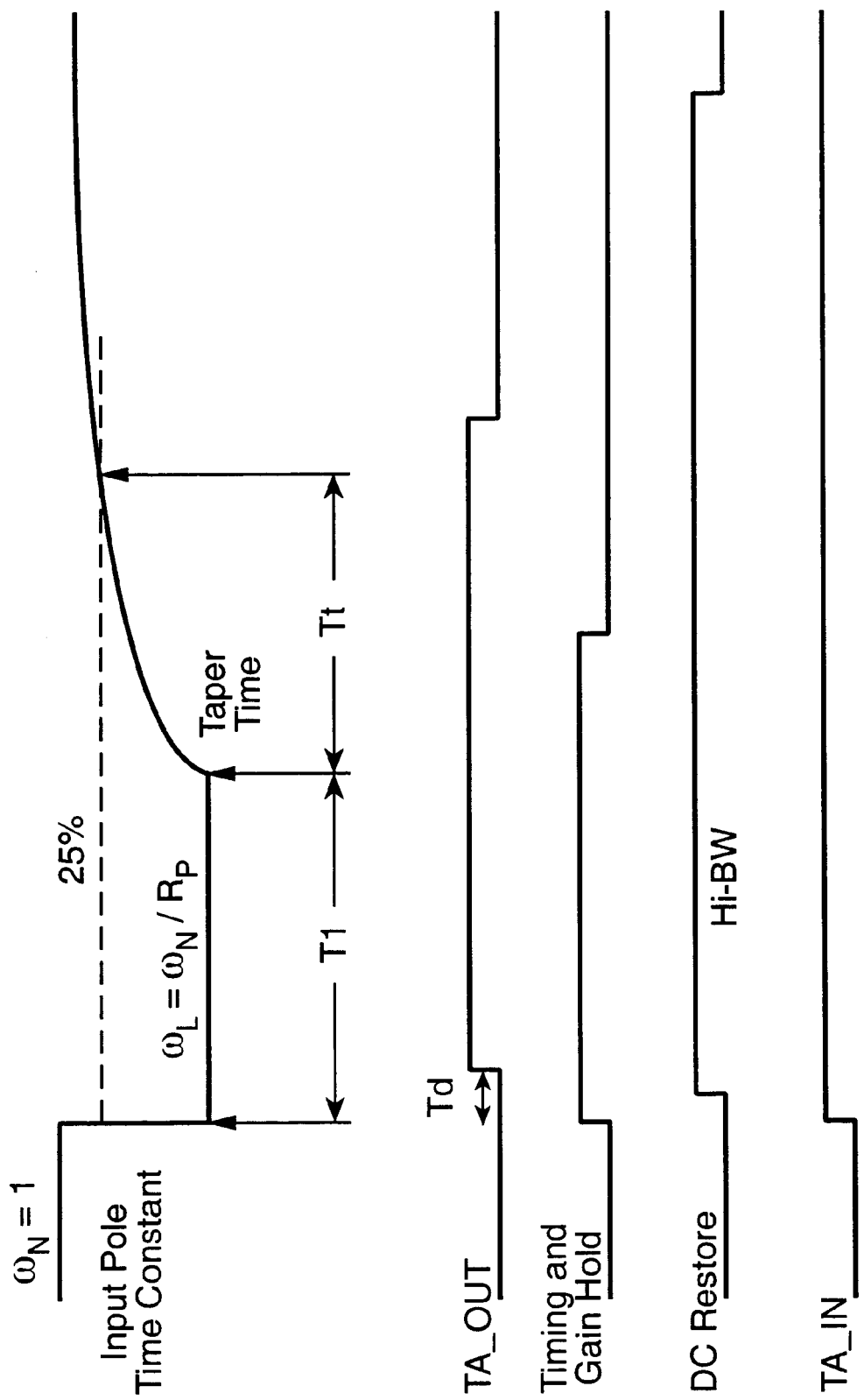
FIG._4

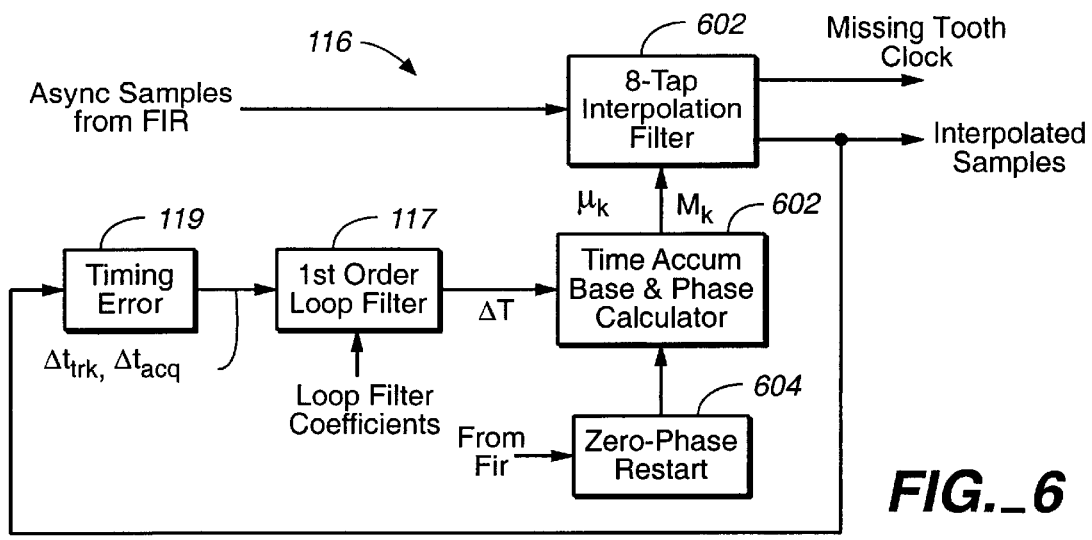
FIG._6
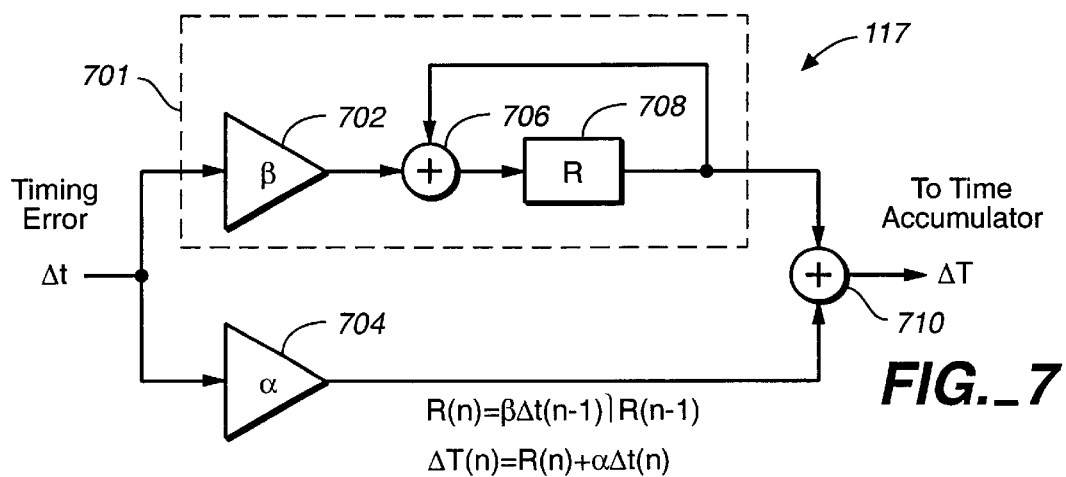
$R(n) = \beta \Delta t(n-1) + R(n-1)$
$\Delta T(n) = R(n) + \alpha \Delta t(n)$
FIG._7
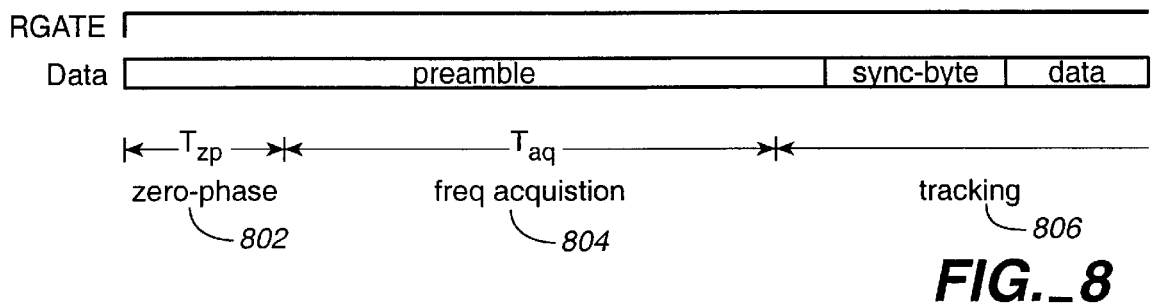
FIG._8

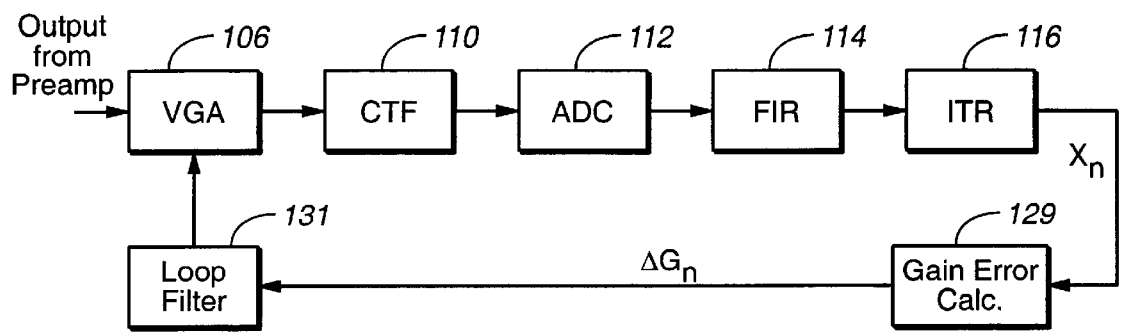
FIG._9
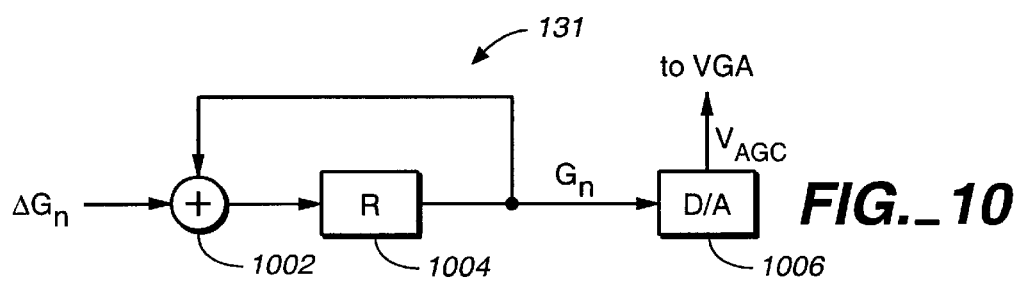
FIG._10
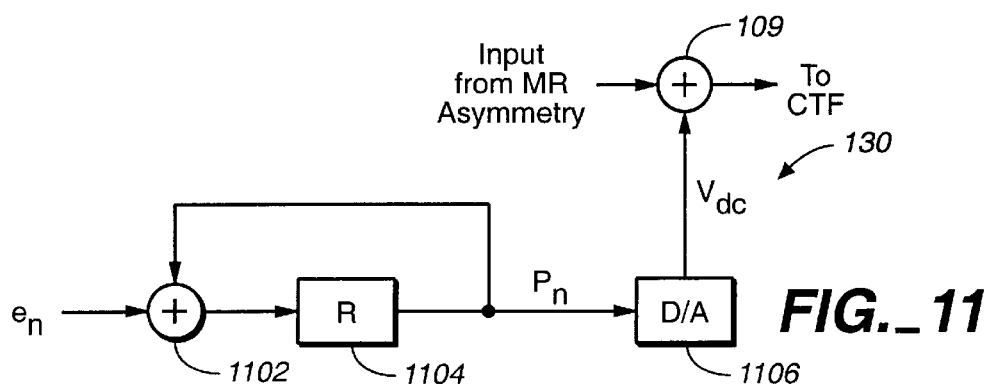
FIG._11

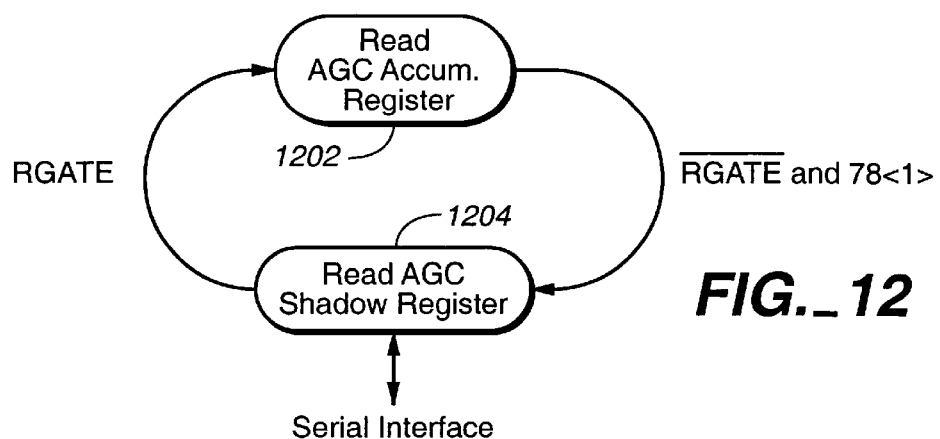
FIG._12
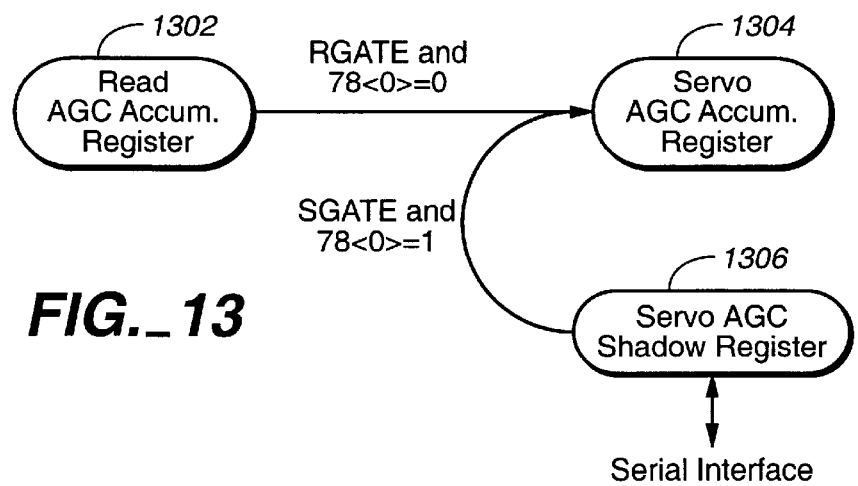
FIG._13
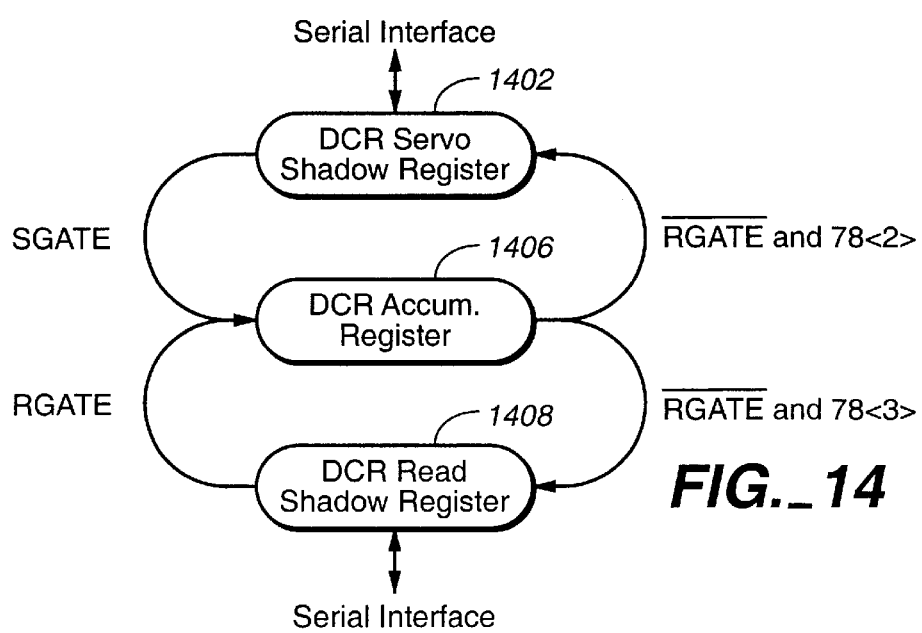
FIG._14

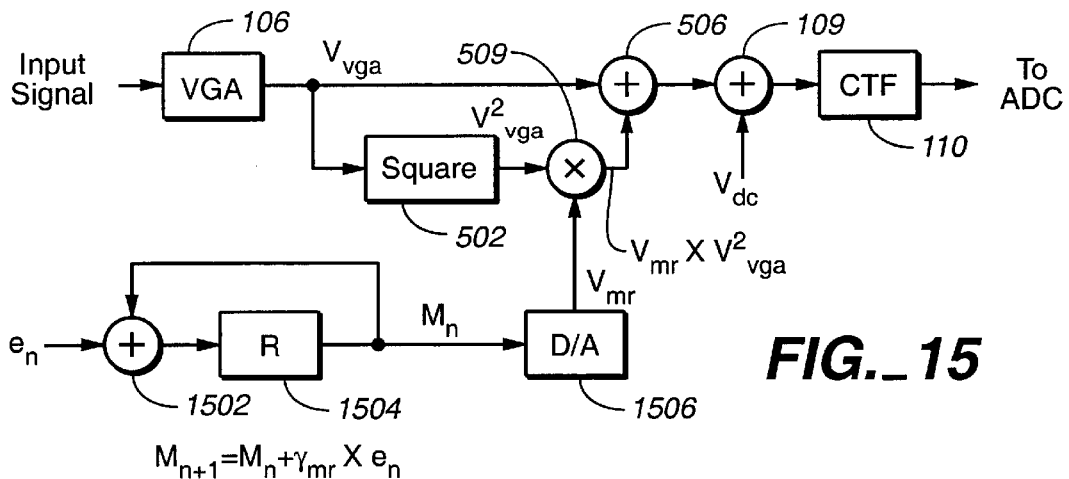
FIG._15
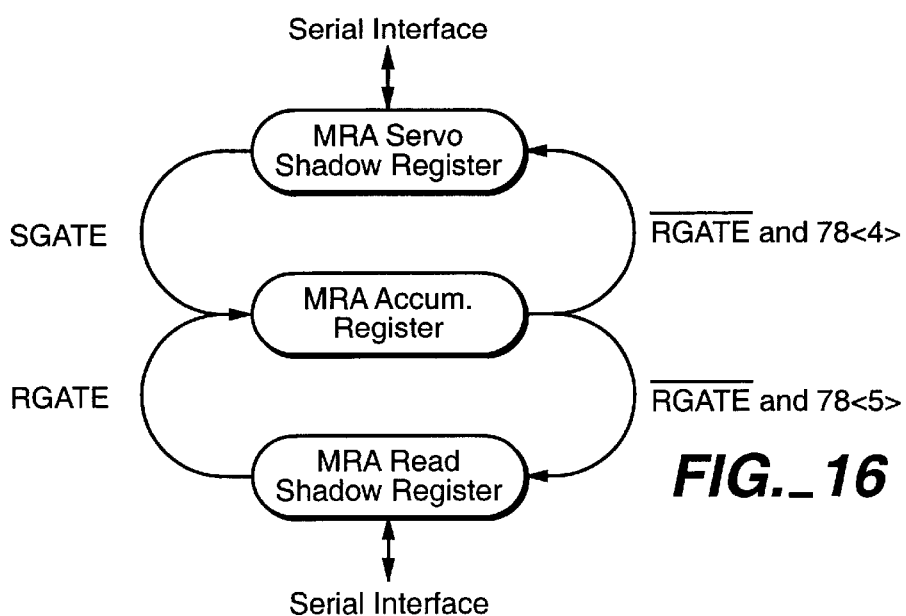
FIG._16
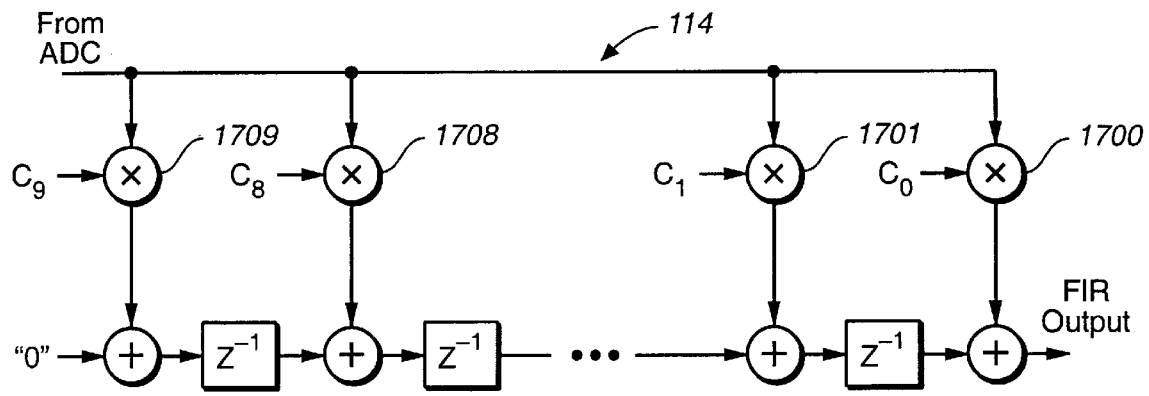
FIG._17

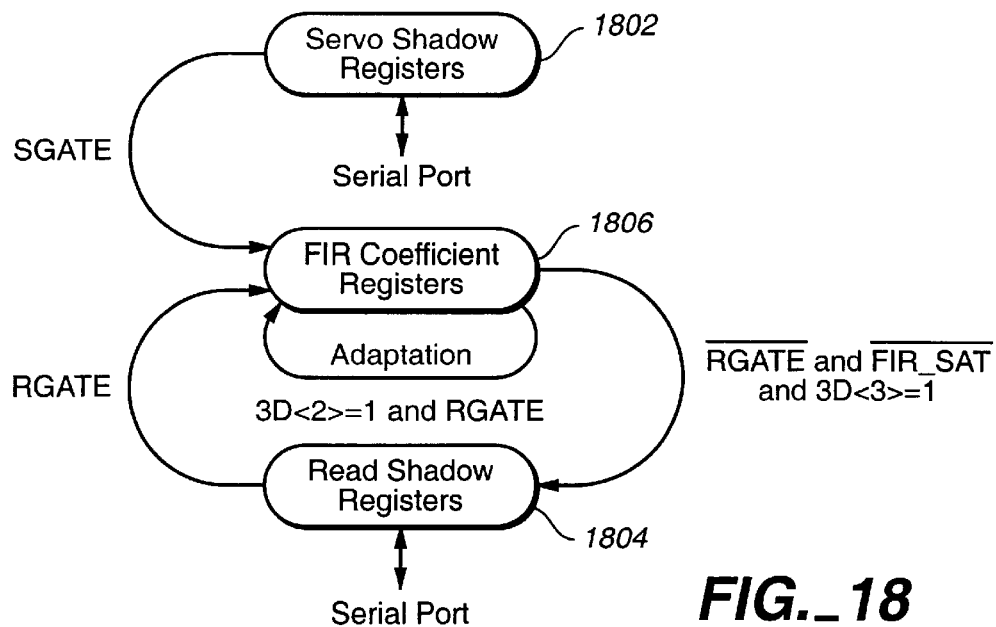
FIG._18
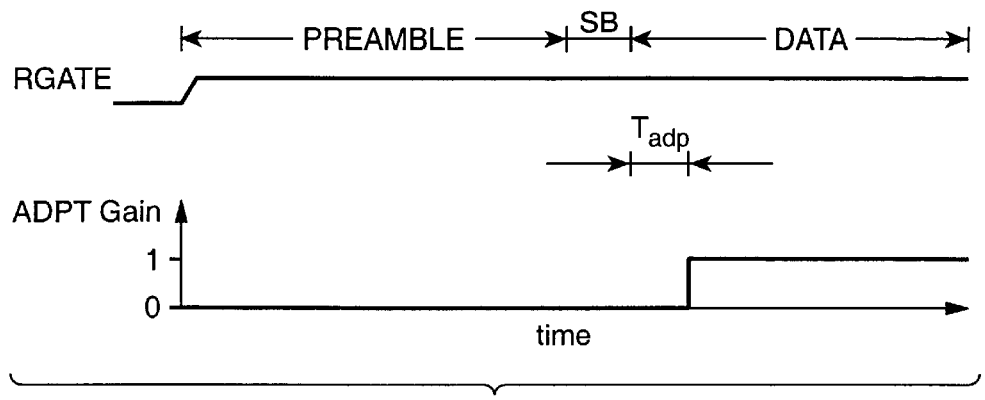
FIG._19
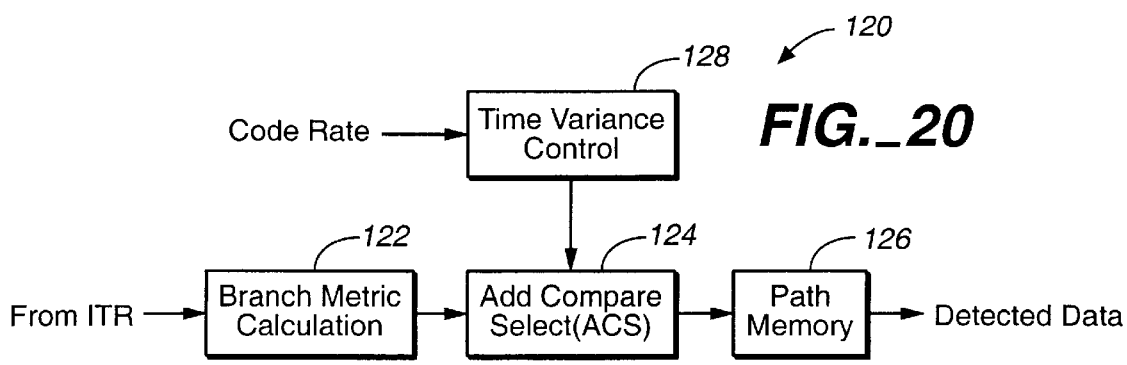
FIG._20

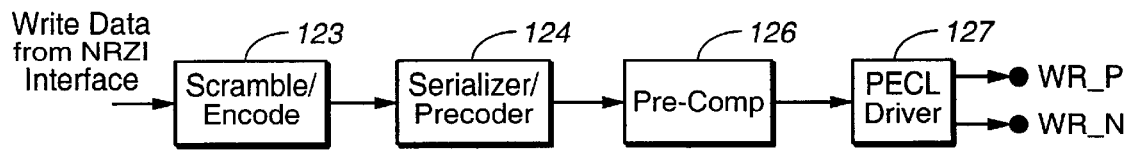
*FIG._21*
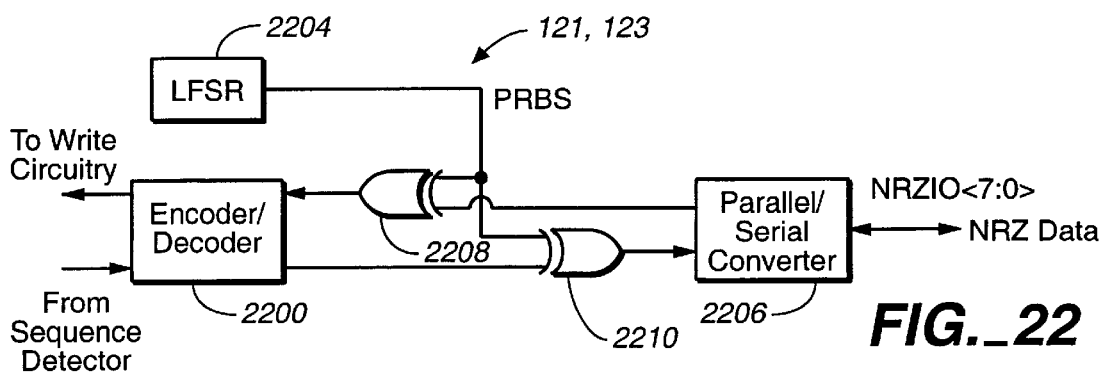
*FIG._22*
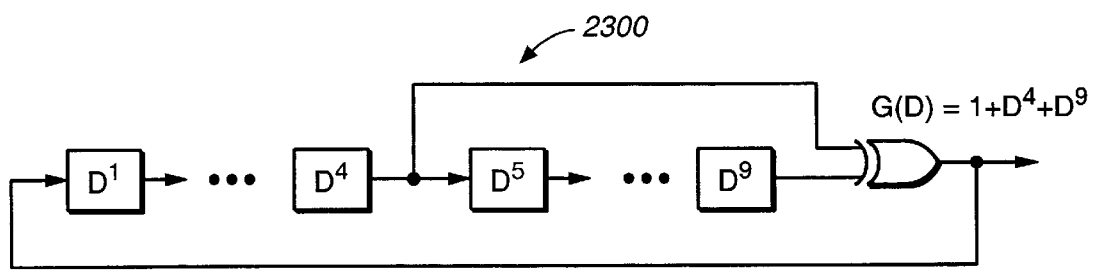
*FIG._23*
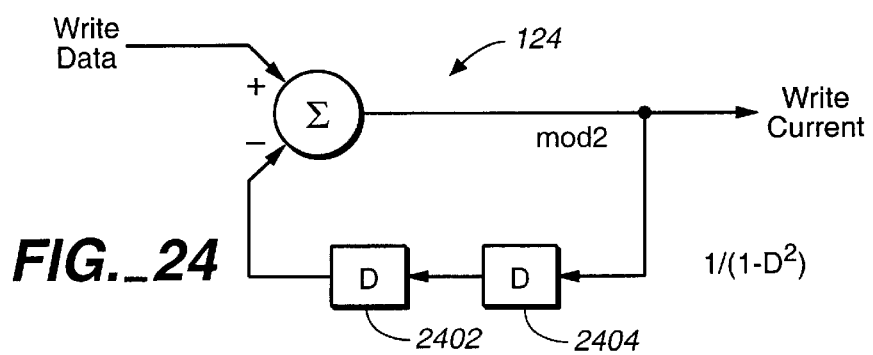
*FIG._24*

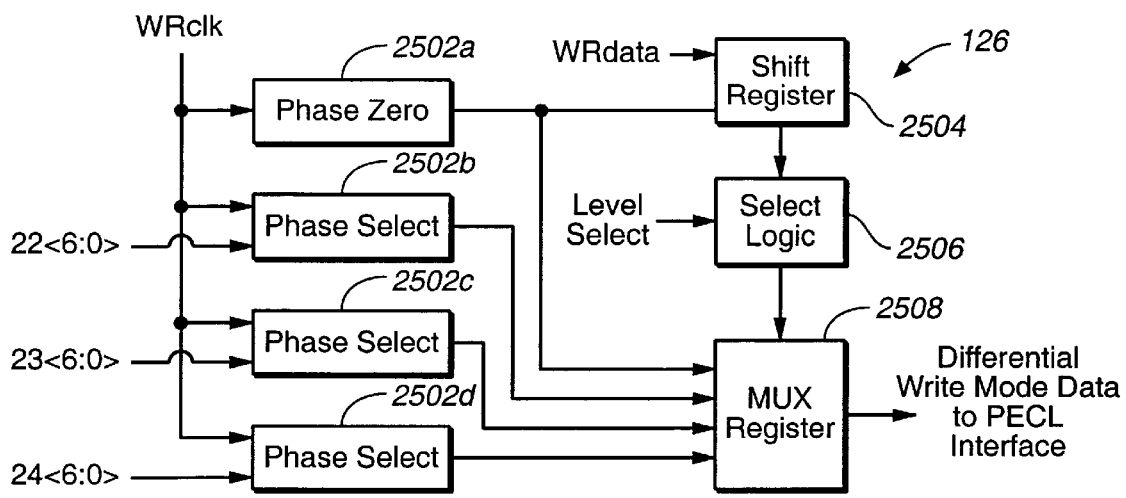
FIG._25
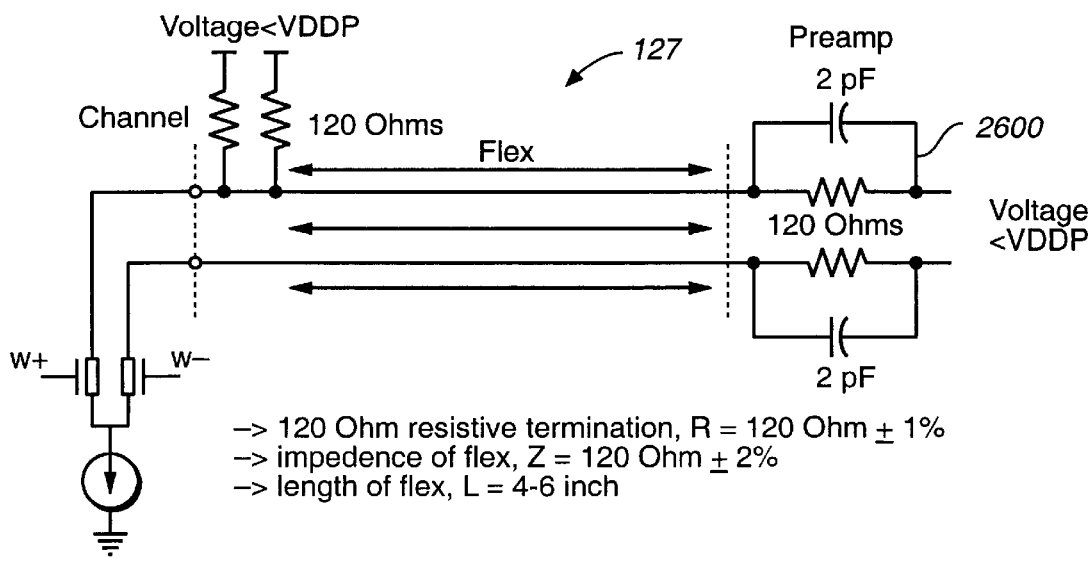
FIG._26
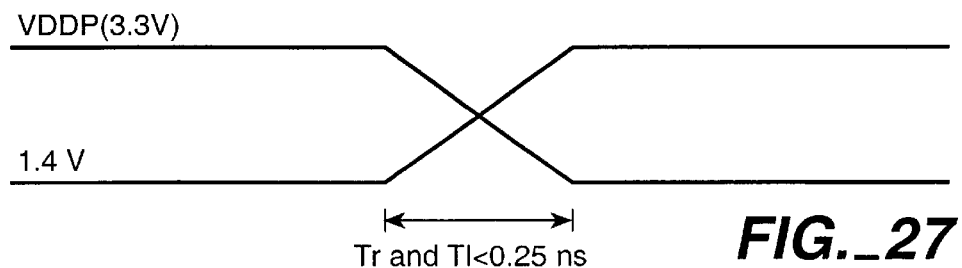
FIG._27

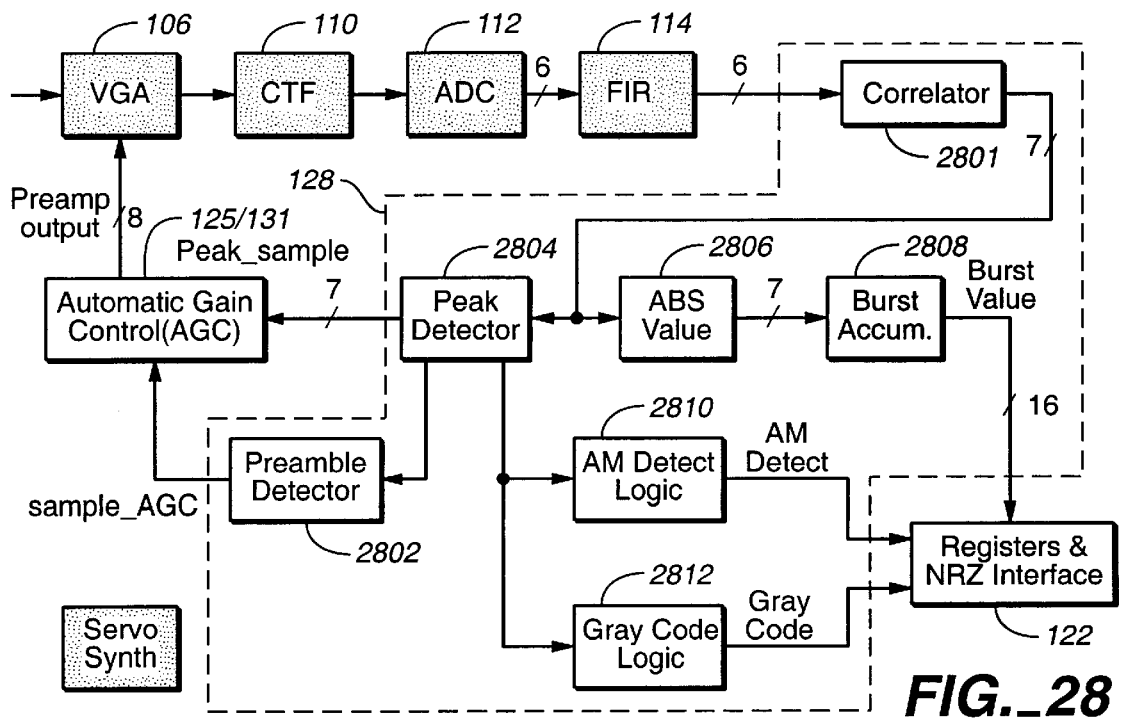
FIG._28
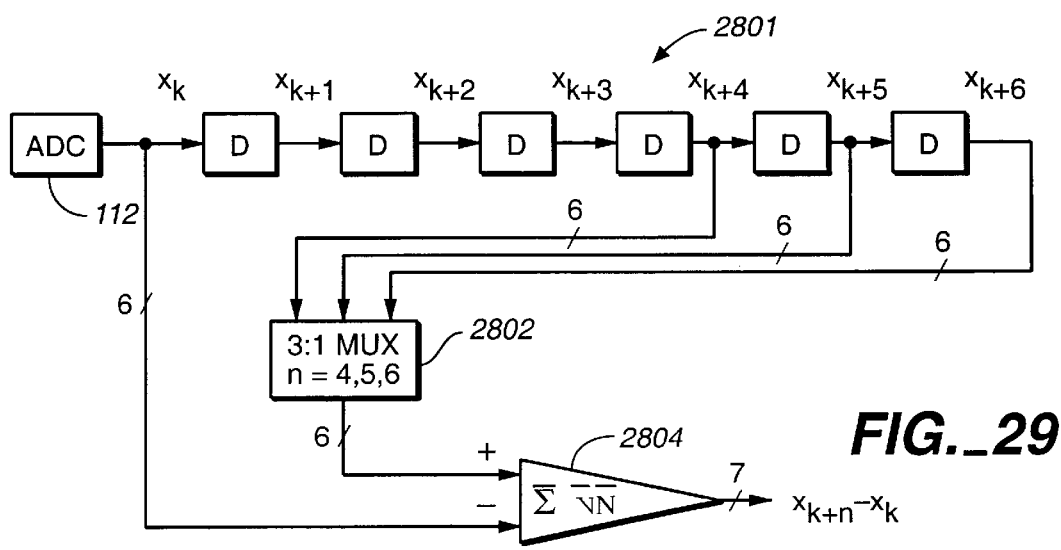
FIG._29

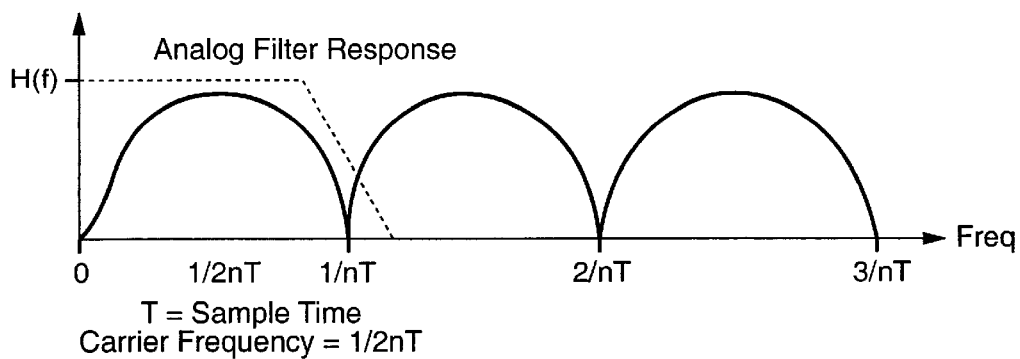
FIG._30
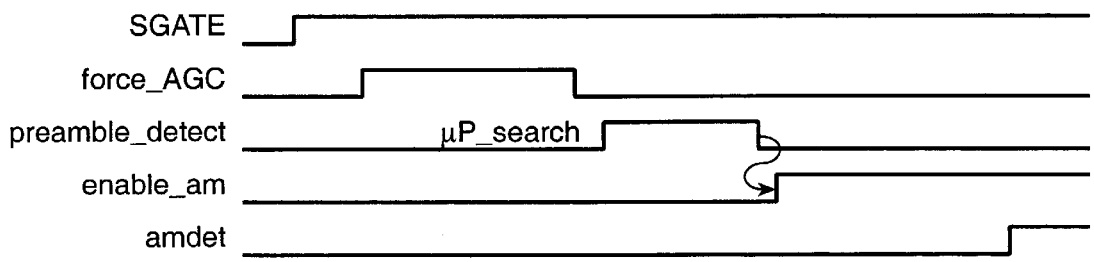
FIG._31
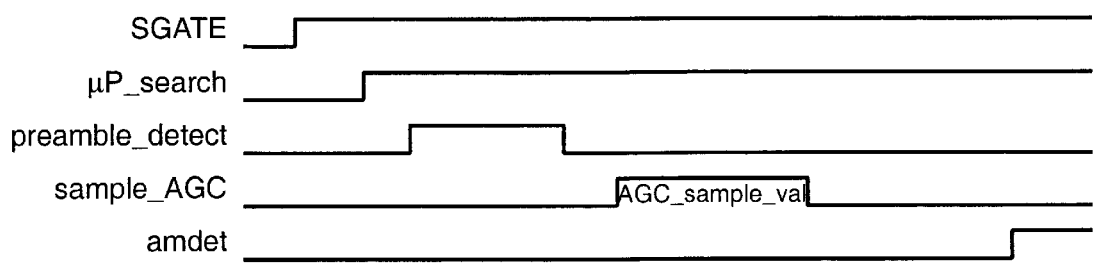
FIG._32

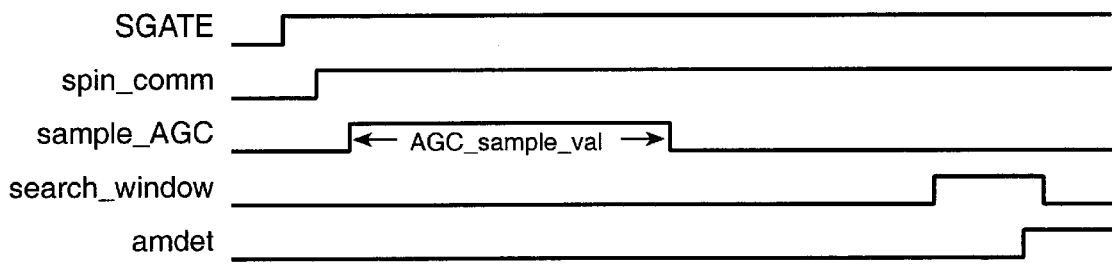
FIG._33
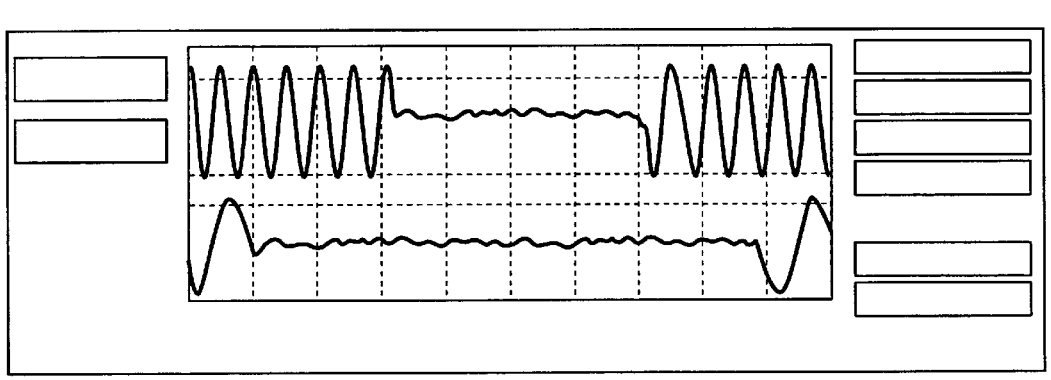
FIG._34
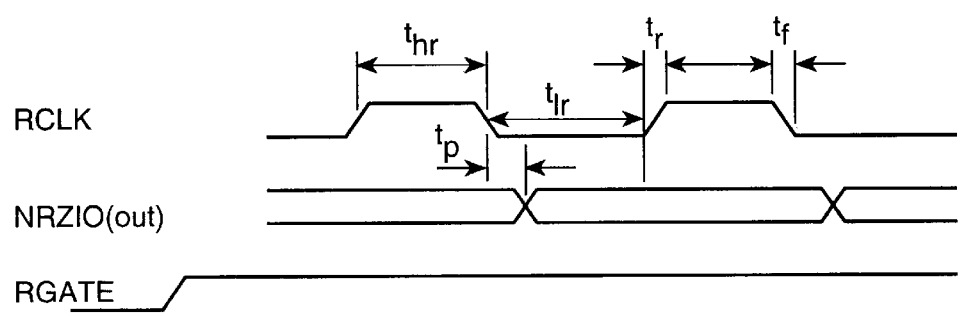
FIG._35

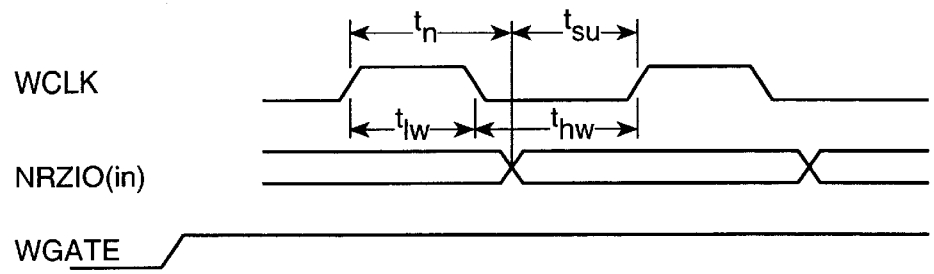
FIG._36
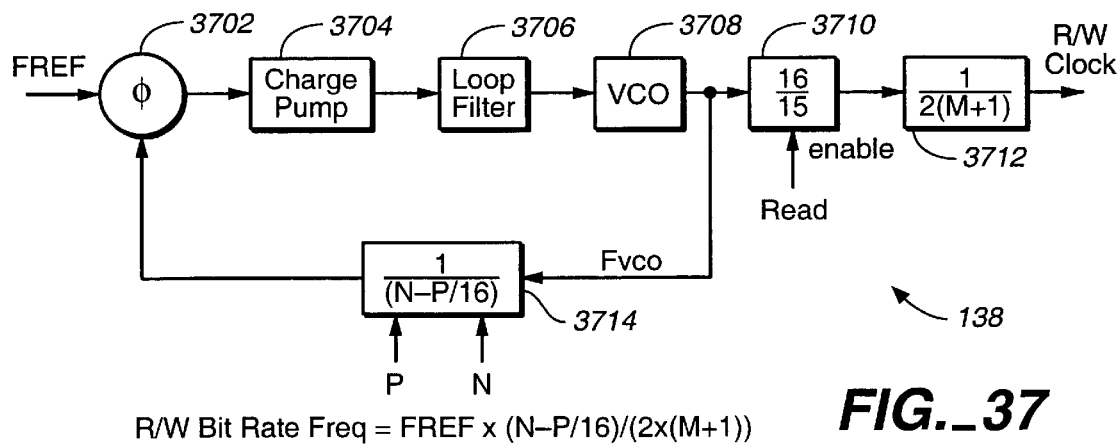
R/W Bit Rate Freq = FREF x (N–P/16)/(2x(M+1))
FIG._37
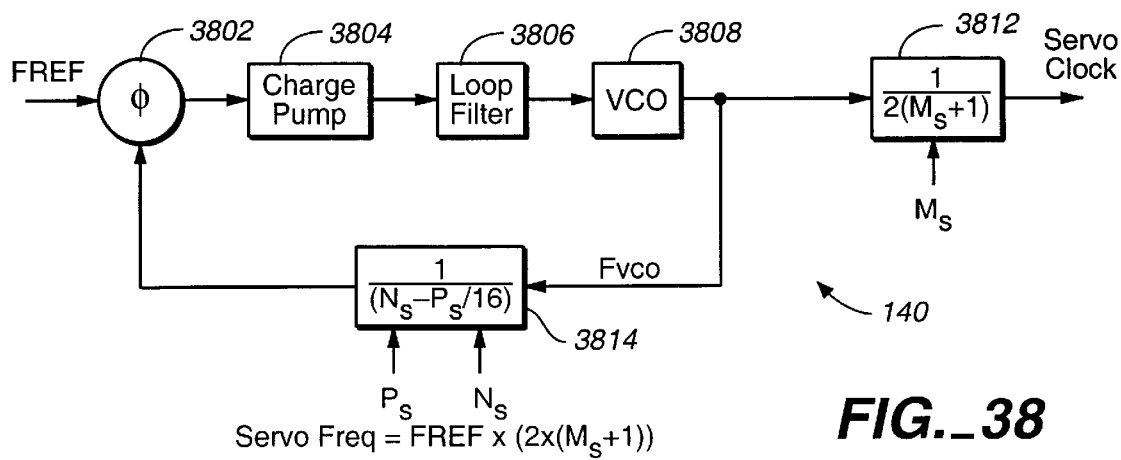
Servo Freq = FREF x (2x($M_s$+1))
FIG._38

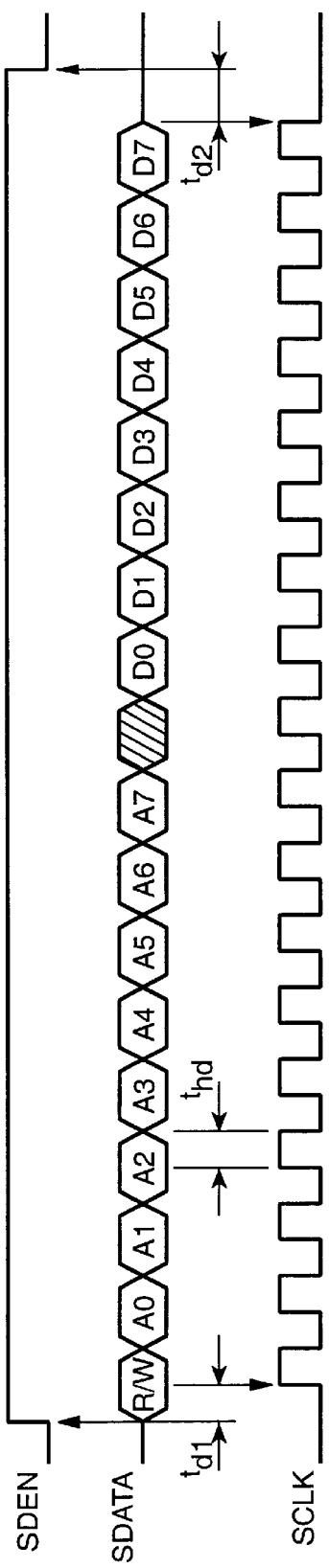
FIG._39
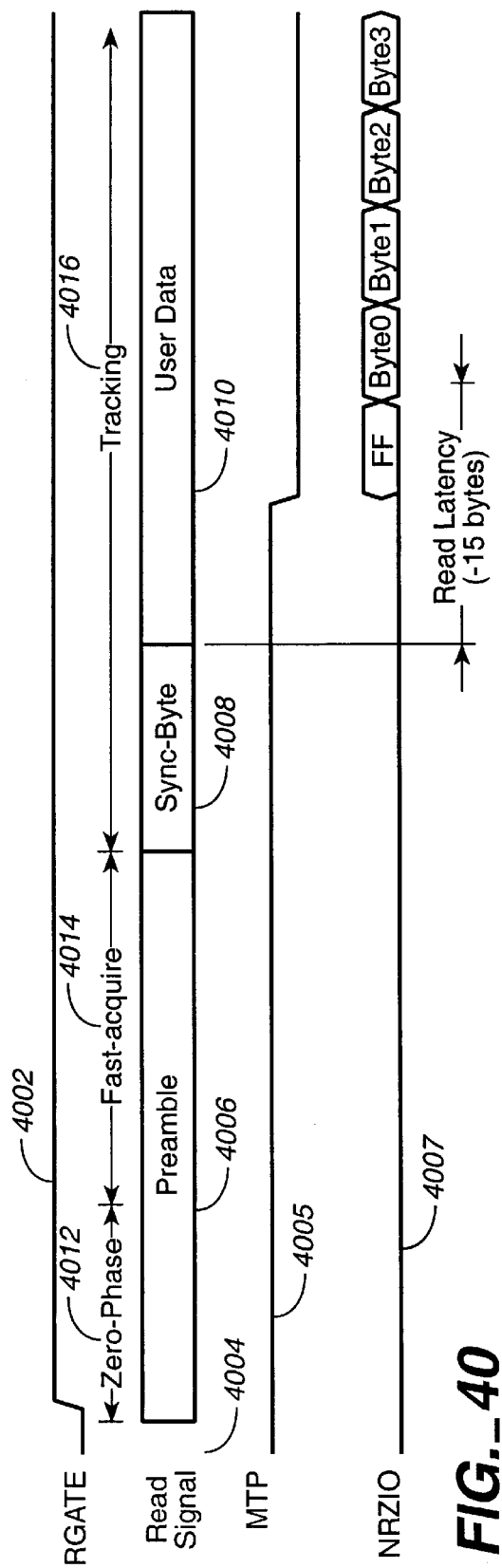
FIG._40

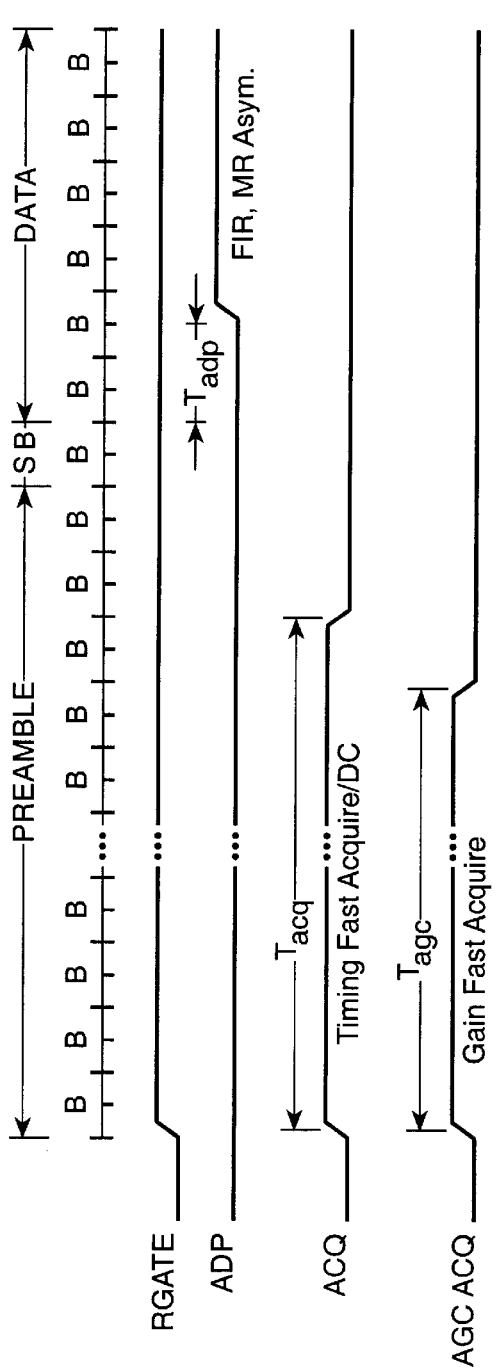
FIG._41
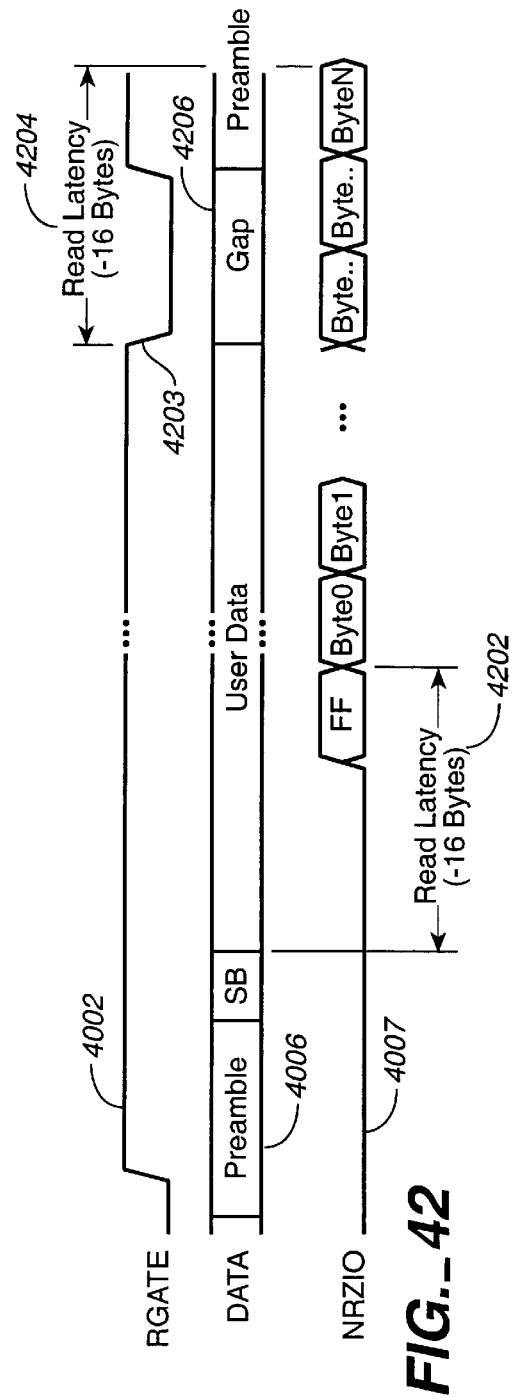
FIG._42

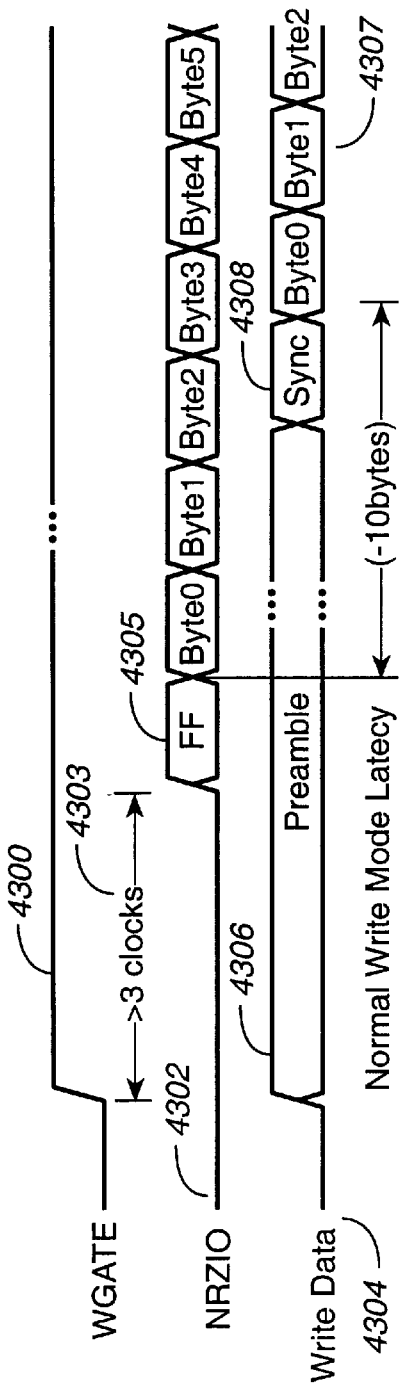
FIG._43
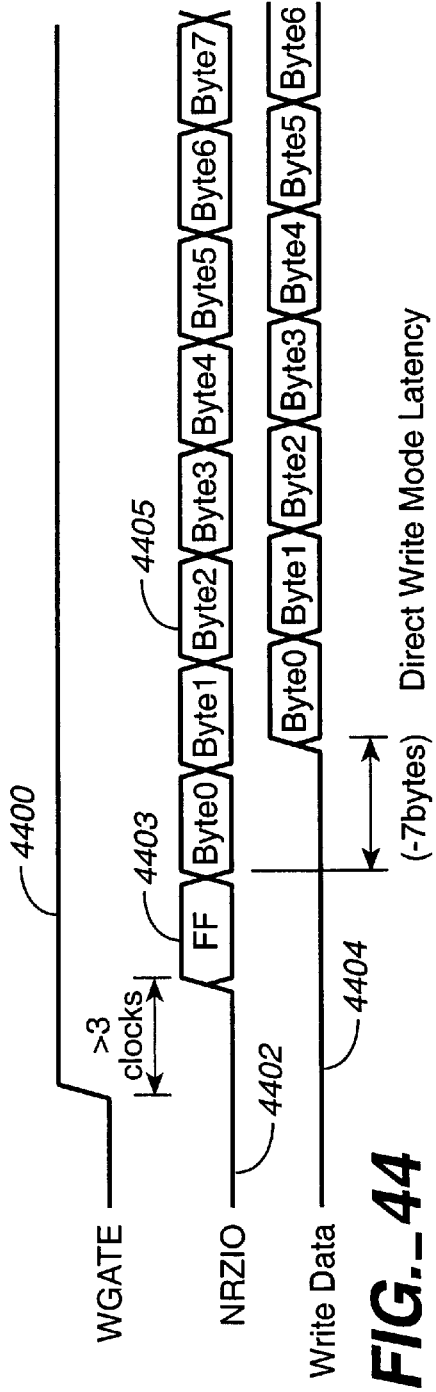
FIG._44

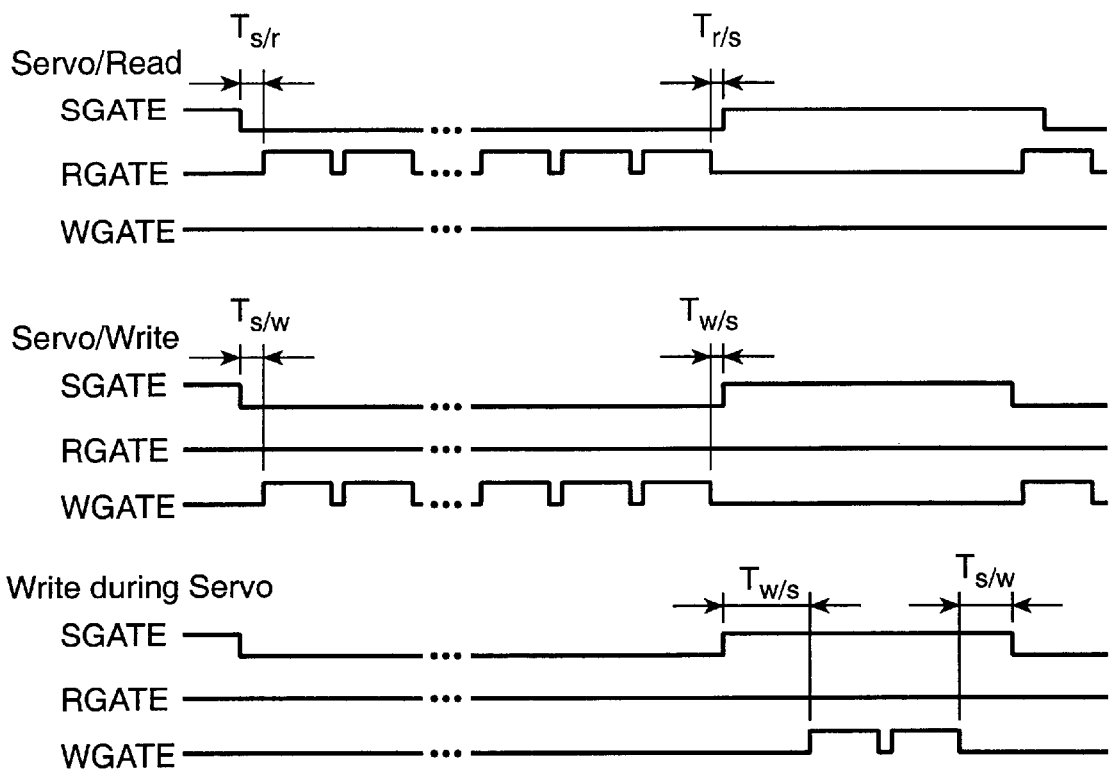
FIG._45
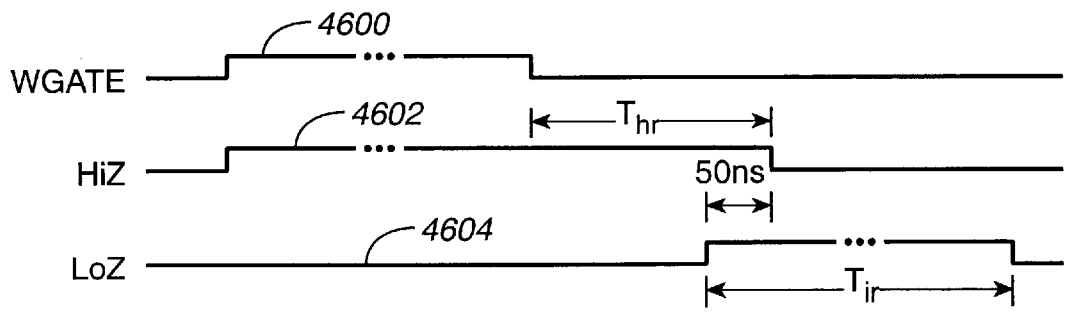
FIG._46

(000) $\hat{e}^2 = \sum_n [y_n - \hat{x}_n]^2$     MSE1 referenced to estimated sample value (001) $e^2 = \sum_n [y_n - x_n]^2$     MSE2 referenced to known sample value (010) $e_o^2 = \sum_n [y_n]^2$     MSE3 - error signals (011) $N(T_L, T_H) = \sum_n I(T_L < y_n < T_H)$     Surface analysis (100) $N(e^2) = \sum_n I\{[y_n - \hat{x}_n]^2 > T_{e-2}\}$     Histogram 1 referenced to estimate (100) $N(e^2) = \sum_n I\{[y_n - x_n]^2 > T_{e-2}\}$     Histogram 2 referenced to known sample value Where:

$y_n$ is the parameter being measured $x_n$ is the estimated noise free sample value $\hat{x}_n$ is the known noise free sample value $a_n$ is the known data $I(-)$ is the index function, = 1 if I is true else 0

$T_n$ are programmable thresholds $Z_n$ = 1 if decoder output byte n in error, else 0

*FIG._47a*

(101) $N(e^2) = \sum_n I\,[y_n^2 > T_{e\text{-}2}]$     Histogram 3

(110) $N(E) = \sum_n I\,(z_n > 0)$     Error Rate (111) $D(y) = \sum_{n=1} (y_n \times a_n) - (y_n \times (a_n - 1))$     DiBit Extraction Where:
$y_n$ is the parameter being measured
$\hat{x}_n$ is the estimated noise free sample value
$x_n$ is the known noise free sample value
$a_n$ is the known data
$I(I)$ is the index function, = 1 if I is true else 0
$T_n$ are programmable thresholds
$Z_n$ = 1 if byte/bit n in error, else 0

FIG._47b

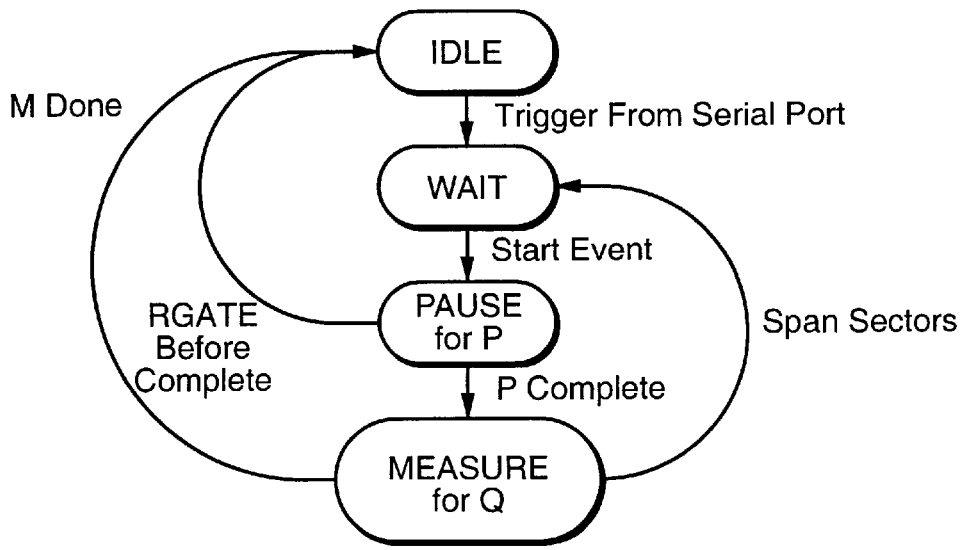

FIG._48

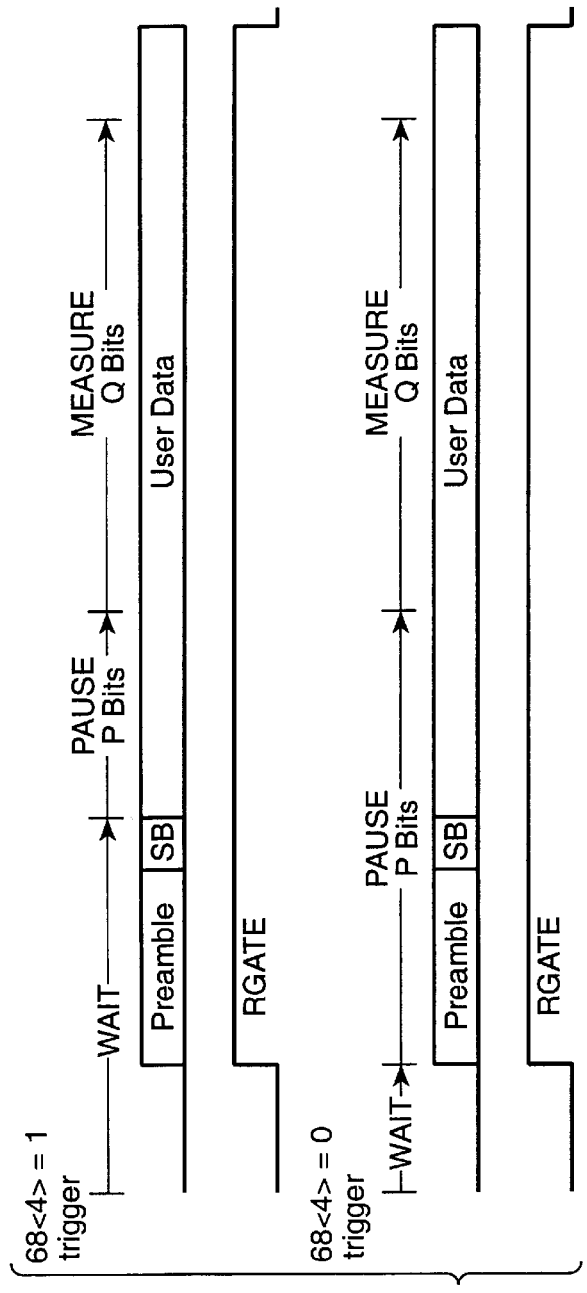
FIG._49
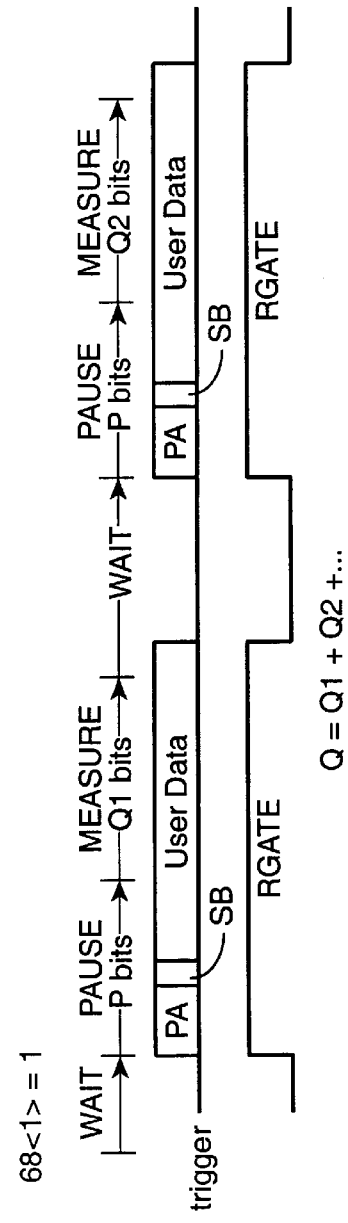
FIG._50

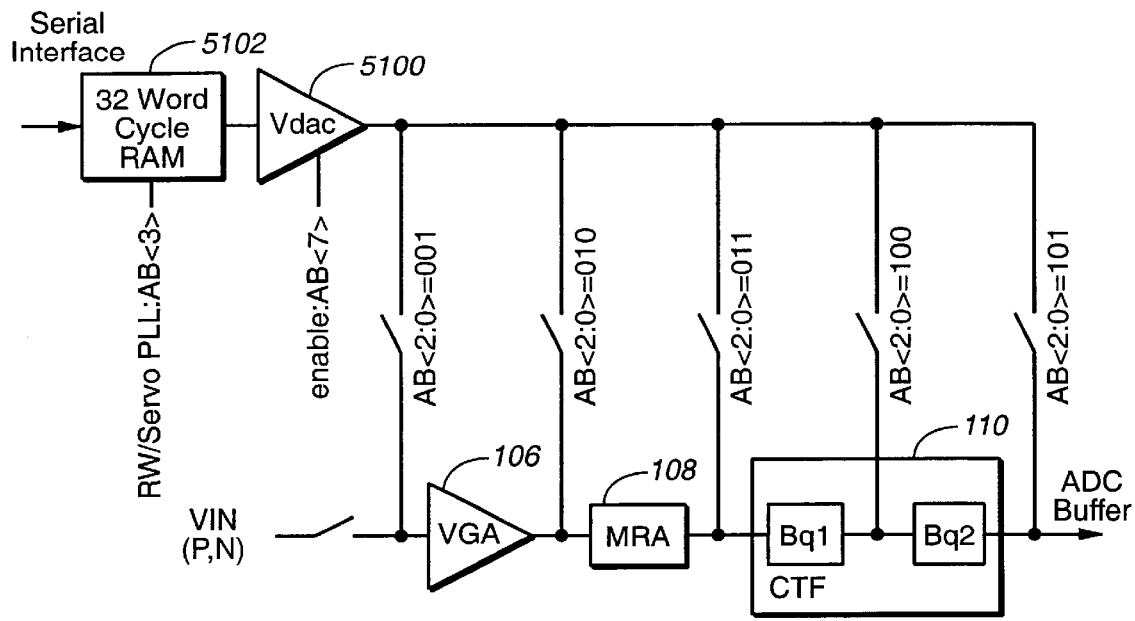
FIG._51
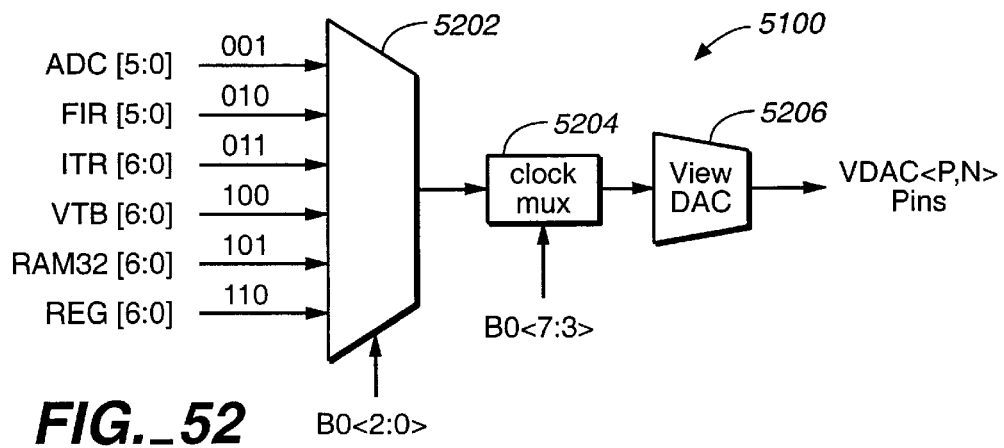
FIG._52

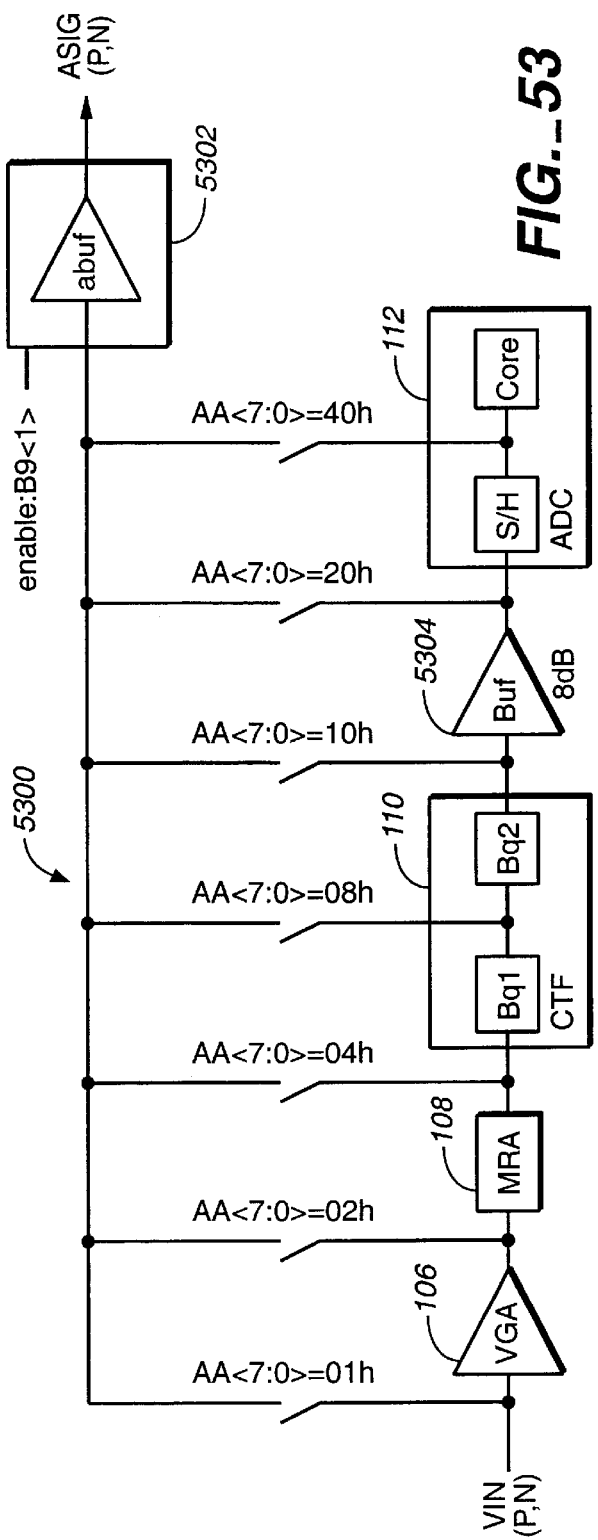
FIG._53
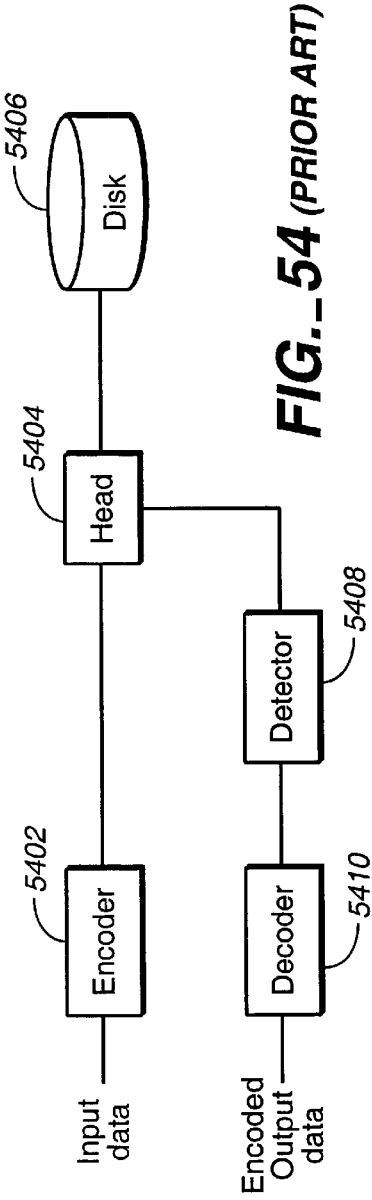
FIG._54 (PRIOR ART)

READ/WRITE CHANNEL

CROSS-REFERENCE TO RELATED APPLICATIONS

This application is a continuation of U.S. patent application Ser. No. 09/826,633, filed Apr. 5, 2001, which claims priority from Provisional U.S. Provisional Patent Application Ser. No. 60/194,954, filed Apr. 5, 2000, each which is hereby incorporated in reference in its entirety as if fully set forth herein. A copy of the provisional patent application is attached as the appendix.

BACKGROUND OF THE INVENTION

1. Field of the Invention

The present invention relates to disk drives and, particularly, to an improved read/write channel.

2. Description of the Related Art

In a magnetic recording system, data are encoded and written onto a disk in regions of differing magnetization. To read the data out, they are first detected and then decoded. The writing and reading occurs using a magnetic head, such as inductive heads or magneto-resistive heads.

FIG. 54 illustrates an exemplary read-write channel system according to the prior art. As shown, the system includes an encoder 5402, read/write head 5404, disk 5406, detector 5408, and decoder 5410. User data are provided to the encoder 5402. Once encoded, the input data may be subject to further channel or modulation coding, as well as error correction coding, and are then written onto the disk 5406 by the head 5404.

To write the channel data onto the disk, the bits are converted into a write current waveform. When the write current waveform takes a positive value, it magnetizes the disk in a first direction; when negative, it magnetizes the disk in a second direction. These states of magnetization are typically described using NRZ or NRZI data. In the NRZ scheme, a one (1) represents one direction of magnetization, and a zero (0) represents another. In the NRZI scheme, a one (1) identifies a transition, and a zero (0) represents no transition.

As noted above, prior to converting the data to the magnetization pattern, it is typically encoded (e.g., using encoder 5402). The encoding typically minimizes the number of adjacent transitions (to reduce intersymbol interference) and to avoid long strings of zeroes (which can cause problems with channel synchronization and detection.). Coding types include run length limited codes and other known types.

To read the disk 5406, the head reads an analog signal and provides it to the detector 5408. A variety of detectors are commonly used. These include peak detectors or sampled data detection techniques. The detector 5408 recovers the data and provides it to the decoder 5410, which decodes the channel data.

In sampled data detection systems, the readback signal is filtered and sampled at a channel rate of 1/T, where T is the duration of a channel symbol. One such technique is referred to as "partial response with maximum likelihood" (PRML). In PRML systems, the output of the noisy partial response channel is sampled at the channel rate and detected using a maximum likelihood Viterbi detector.

The partial response channel has a transfer function of the form $(1-D)(1+D)$ or $1-D^2$, where D represents a unit time delay operator with unit-time T. Thus, the noiseless output of the partial response channel is equal to the input signal minus a version of the input delayed in time by period 2T.

To further increase recording density and decrease the need for equalization, higher order PRML systems have been developed. The extended partial response with maximum likelihood (EPRML) channel has a transfer function of the form $(1-D)(1+D)^2$ or $(1+D-D^2-D^3)$. Thus, the noiseless output of the extended partial response channel is equal to the input signal minus a version of the input signal delayed in time by 2T, minus a version of the input signal delayed in time by 3T and plus a version of the input signal delayed in time by T. Similarly, the $E^2$PRML channel has a transfer function of the form $(1-D)(1+D)^3$.

As noted above, Viterbi decoders are typically employed in sampled amplitude channels. Viterbi decoders are specific implementation of the Viterbi algorithm. A Viterbi detector unit is based on periodic examination of metrics associated with alternate sequences of recorded bits, wherein each sequence is typically labeled as a "path" and the associated metric is designated a "path metric." The most probable correct path is then determined by choosing a minimum path metric based on an iterative process involving successive comparison of associated path metrics.

In particular, two paths within a constrained, predetermined path length are examined. Since the recorded bit only depends on the constraint length corresponding to a finite number of neighbor bits, it becomes possible to abandon the path associated with the larger of the two path metrics corresponding to each path pair. Consequently, the number of possible paths can be restricted to a finite value by abandoning all but one of the total number of paths each time a new bit is added and examined during the data detection procedure. This process of path abandonment in order to compute the best path to each node of the trellis is executed by a sequence of operations commonly referred to as add-compare-select or ACS.

SUMMARY OF THE INVENTION

According to one embodiment of the present, an improved sampled amplitude read/write channel is provided. The system is an integrated Generalized Partial Response Maximum Likelihood (GPRML) read channel incorporating Read, Write, and Servo modes of operation. One implementation includes a 32/34 rate parity code and matched Viterbi detector, a 32 state Viterbi detector optimal parity processor, robust frame synchronization, self-adaptive equalization, thermal asperity detection and compensation, adaptive magneto-resistive asymmetry compensation, low latency interpolated timing recovery and programmable write precompensation.

BRIEF DESCRIPTION OF THE DRAWINGS

A better understanding of the invention is obtained when the following detailed description is considered in conjunction with the following drawings in which:

FIG. 1 is a block diagram of a read/write channel according to a specific embodiment of the invention;

FIG. 2 is a diagram input impedance switches according to an embodiment of the invention;

FIG. 3 is a diagram of thermal asperity detection and correction according to an embodiment of the invention;

FIG. 4 is a diagram of thermal asperity correction waveforms according to an embodiment of the invention;

FIG. 5 is a diagram of MR Asymmetry compensation according to an embodiment of the invention;

FIG. 6 is a diagram of a timing control subsystem according to an embodiment of the invention;

FIG. 7 is a diagram of a timing loop filter according to an embodiment of the invention;

FIG. 8 is a diagram of timing acquisition according to an embodiment of the invention;

FIG. 9 is a diagram of an AGC loop according to an embodiment of the invention;

FIG. 10 is a diagram of an AGC loop filter according to an embodiment of the invention;

FIG. 11 is a diagram of a DC restore loop according to an embodiment of the invention;

FIG. 12 is a diagram of AGC shadow register operation in read mode according to an embodiment of the invention;

FIG. 13 is a diagram of AGC shadow register operation in servo mode according to an embodiment of the invention;

FIG. 14 is a diagram of DC restore shadow register operation according to an embodiment of the invention;

FIG. 15 is a diagram of an MR Asymmetry compensation loop according to an embodiment of the invention;

FIG. 16 is a diagram of MR Asymmetry shadow register operation according to an embodiment of the invention;

FIG. 17 is a diagram of FIR filter structure according to an embodiment of the invention;

FIG. 18 is a diagram of FIR adaptation according to an embodiment of the invention;

FIG. 19 is a diagram of FIR Adaptation Read Mode Timing according to an embodiment of the invention;

FIG. 20 is a diagram of a Viterbi detector according to an embodiment of the invention;

FIG. 21 is a write path block diagram according to an embodiment of the invention;

FIG. 22 is a scrambler/descrambler block diagram according to an embodiment of the invention;

FIG. 23 is a diagram of a PRBS generator according to an embodiment of the invention;

FIG. 24 is a block diagram of a precoder according to an embodiment of the invention;

FIG. 25 is a diagram of write precomp according to an embodiment of the invention;

FIG. 26 is a write PECL interface according to an embodiment of the invention;

FIG. 27 is a diagram of PECL logic levels according to an embodiment of the invention;

FIG. 28 is a block diagram of a digital servo according to an embodiment of the invention;

FIG. 29 is a block diagram of a correlator according to an embodiment of the invention;

FIG. 30 is a diagram of a correlator frequency response according to an embodiment of the invention;

FIG. 31 is a timing diagram of unoriented search (manual AGC) according to an embodiment of the invention;

FIG. 32 is a timing diagram of unoriented search (auto sample AGC) according to an embodiment of the invention;

FIG. 33 is a timing diagram of oriented search (normal AGC) according to an embodiment of the invention;

FIG. 34 is a diagram of servo address mark polarity according to an embodiment of the invention;

FIG. 35 is a diagram of NRZI read interface timing according to an embodiment of the invention;

FIG. 36 is a diagram of NRZI write interface timing according to an embodiment of the invention;

FIG. 37 is a diagram of a read mode/write mode PLL according to an embodiment of the invention;

FIG. 38 is a diagram of a servo mode PLL according to an embodiment of the invention;

FIG. 39 is a diagram of serial port timing according to an embodiment of the invention;

FIG. 40 is a diagram of read mode sector architecture according to an embodiment of the invention;

FIG. 41 is a diagram of read mode operation acquire timing according to an embodiment of the invention;

FIG. 42 is a diagram of read mode gate extension according to an embodiment of the invention;

FIG. 43 is a diagram of normal write operation according to an embodiment of the invention;

FIG. 44 is a diagram of direct write operation according to an embodiment of the invention;

FIG. 45 is a diagram of system operation according to an embodiment of the invention;

FIG. 46 is a diagram of write mode to idle mode recovery according to an embodiment of the invention;

FIG. 47a and FIG. 47b illustrate channel quality measurements according to an embodiment of the invention;

FIG. 48 illustrates a measurement interval timer state machine according to an embodiment of the invention;

FIG. 49 illustrates CQM data collection—single sector according to an embodiment of the invention;

FIG. 50 illustrates CQM data collection—multiple sectors according to an embodiment of the invention;

FIG. 51 illustrates analog signal injection according to an embodiment of the invention;

FIG. 52 illustrates a view ADC function according to an embodiment of the invention;

FIG. 53 illustrates an analog test port according to an embodiment of the invention; and FIG. 54 is a diagram of a read-write channel system according to the prior art.

DETAILED DESCRIPTION OF AN EMBODIMENT OF THE INVENTION

System Overview

Modulation Code

The modulation code used in one embodiment of the invention is a rate 32/34 block code. All 34-bit codewords satisfy a 'Charge module 2' (Qmod2) parity constraint. The code achieves about 1 dB net coding gain by forcing the charge in each codeword to be even. As a consequence of this parity constraint, all error sequences with odd parity are eliminated. This includes; di-bit drop-in and drop-outs (0,+1 0), tri-bit related errors (+1, −1, +1), pentabit related errors (+1, −1, +1 , −1 , +1), etc. The (Qmod2) constraint offers more immunity to errors than uncoded or maximum transition run (MTR) codes under normal operating environments.

The modulation code is also designed to achieve good worst-case timing information, maximizing the minimum timing information content in any codeword. Each 34 bit codeword has at least a minimum of 7 timing units of information. For ECC compatibility, minimum-distance error events on the coded trellis are limited to cause errors in no more than 4 decoded user bytes. Thus, best system performance is achieved using an outer error correcting code with 8-bit symbols, GF(256), and with greater than or equal to 4-way interleave. The code properties are summarized in Table 1: Code Properties

TABLE 1

Code Properties

| Rate | Parity | Minimum # timing counts per code word | Max # consecutive 0's | Max Burst Length |
|---|---|---|---|---|
| 32/34 | Even | 7 | 17 | 4 bytes |

Viterbi Sequence Detector

The sequence detector is implemented using a 32-state Viterbi detector that is the product of a 16-state Noise-Predictive Inter-Symbol Interference (NP ISI) Viterbi algorithm and a 2-state time-varying charge parity trellis. The 32-state product trellis is pruned back to 16-states at every 34th bit-cycle to enforce the charge parity constraint at the block boundary. This implementation of the parity code is an optimal maximum likelihood solution, and has none of the sub-optimal characteristics of prior solutions, e.g., failure at block boundaries, sensitivity to changing error event structure, etc.

In order to provide good performance across a wide range of user operating conditions, the system allows the user to choose from four different noise-predictive Viterbi algorithms.

Noise Predictive (3,2,1} is best suited for applications with low to moderate user densities. It performs well in these areas even with high media noise.

Noise Predictive (2,2, 1} is best suited for applications with moderate media noise and moderate to high user densities.

Noise Predictive (3,1, 1} is best suited for applications with low to moderate user density and very high media noise.

EPR4 is included as a legacy mode, and performs close to Noise Predictive {3,2,1} in most environments.

Exemplary Viterbi detection is described in commonly assigned U.S. patent application Ser. No. 09/347,598, filed Jul. 1, 1999, titled "Trellis Code for EPRML", U.S. patent application Ser. No. 09/465,521, filed Dec. 16, 1999, titled "Survival Selection Rule," and U.S. patent application Ser. No. 09/503,534, filed Feb. 14, 2000, titled "Supporting ME2PRML and M2EPRML with the Same Trellis Structure," which are hereby incorporated by reference in their entireties as if fully set forth herein.

Channel Architecture

Turning now to the drawings and, with particular attention to FIG. 1, a block diagram of a read/write channel according to a specific embodiment of the invention is shown therein and designated generally by the reference numeral 100.

As will be discussed in greater detail below, the system 100 is operable in a plurality of modes, selectable with the inputs RGATE, WGATE, SGATE, and the mode control unit 102. The modes are Read Mode, Write Mode, Normal Write Mode, Known Data Write Mode, Write Mode During Servo Mode, Servo Mode, Idle Mode, Doze Mode, and Suspend Mode.

The operating modes of the read/write channel are determined by the state of five pins: RGATE, WGATE, SGATE, PWRDN, NRESET, and two registers: 04<2>, and 04<1>. The operating modes are shown in Table 2:

TABLE 2

Mode Control

| | Pins | | | | | Reg Bits | |
|---|---|---|---|---|---|---|---|
| Mode | RAGTE | WGATE | SGATE | PWRDN | NRESET | 04<2 | 04<1> |
| Read mode | 1 | X | 0 | 0 | 1 | X | 0 |
| Write mode | 0 | 1 | 0 | 0 | 1 | X | 0 |
| Servo mode | X | X | 1 | 0 | 1 | 0 | 0 |
| Write/Servo mode | 0 | 1 | 1 | 0 | 1 | 1 | 0 |
| Idle mode | 0 | 0 | 0 | 0 | 1 | X | 0 |
| Doze mode | 0 | 0 | 0 | 1 | 1 | X | 0 |
| Suspend | X | X | X | X | 1 | X | 1 |
| | X | X | X | X | 0 | X | X |

In the read mode, RGATE is asserted, and the read channel is activated. In the read channel, a bit sequence is provided via thermal asperity compensation 104 to a variable gain amplifier 106 to adjust the amplitude of the signal. DC offset control 130 and loop filter/gain error correction 131 also may be provided. Further, an asymmetry control unit 132 including an asymmetry adjustment unit 134 and asymmetry control 136 may be provided to compensate for magneto-resistive asymmetry effects. An exemplary system for magneto-resistive asymmetry control is described in co-pending U.S. patent application Ser. No. 09/546,796, filed Apr. 11, 2000, titled "Magneto-Resistive Asymmetry Control Loop", which is hereby incorporated by reference in its entirety as if fully set forth herein.

The signal is provided to a continuous time filter 110, such as a four pole Butterworth filter, for example, to attenuate high frequency noise and minimize aliasing into baseband after sampling. The signal is then provided to an analog to digital converter (ADC) 112 to sample the output of the continuous time filter (CTF) 110.

A finite impulse response (FIR) filter 114 provides additional equalization of the signal to the desired response. The output of the FIR 114 is provided to an interpolated timing recovery unit 116, which is used to recover the discrete time sequence. Exemplary timing recovery is described in commonly assigned U.S. patent application Ser. No. 09/497,301, filed Feb. 2, 2000, titled "Asynchronous Timing for Interpolated Timing Recovery," and U.S. patent application Ser. No. 09/496,617, filed Feb. 2, 2000, titled "Synchronous Timing for Interpolated Timing Recovery," which are hereby incorporated by reference in their entireties as if fully set forth herein.

The output of the interpolated timing recovery unit 116 is used to provide a feedback control to the DC offset control 130, the gain error 131, the asymmetry control 132 and the FIR 114. The output of the interpolated timing recovery 116 is further provided to a Viterbi detector 120 and a sync detector 118. Sync mark information is then provided to the Viterbi detector 120 for use in sequence detection. The Viterbi detector output is then provided to the decoder 121 which decodes the encoding provided by the encoder (not shown). Exemplary sync mark detection is described in U.S. patent application Ser. No. 09/435,333, filed Nov. 5, 1999, titled "Phase Assisted Synchronization Detector", which is hereby incorporated by reference in its entirety as if fully set forth herein. As described therein, relatively short sync byte detection may be performed, thereby saving overhead. Further, the sync byte detector 118 is programmably polarity sensitive such that the polarity of the data stream entering the sync detector and the Viterbi detector may be flipped. Exemplary acquisition signal estimation is described in U.S. patent Ser. No. 09/653,235, filed Aug. 31, 2000, titled "An Acquisition Signal Error Estimator," which is hereby incorporated by reference in its entirety as if fully set forth herein. Once the sync byte is detected, data are placed on the R/W interface 122.

In the Write Mode, circuitry in the write path is enabled. In particular, write data are provided to as NRZIO data to the interface 122, then are scrambled and encoded in unit 123, then serialized and precoded using serializer/precoder 124, and precompensated using precomepnsator 126. The write data are then provided to a PECL driver 127.

In the Normal Write Mode, WGATE is asserted and the disk drive controller (not shown) clocks a 00h (hex) byte to the NRZIO interface 122. The device output is a 2T preamble pattern until the data marker, a FFh byte, is received from the controller. At that point, the device inserts a unique sync byte into the output data stream, which replaces the received FFh byte. Subsequent data transferred from the controller is scrambled, encoded (123) and then transferred to the PECL interface 127 as encoded user data.

The Known Data Write mode is a variation of a normal Write. When 20<3> is set to 1, the device write output is a sector of internally generated data. The operation begins when WGATE is asserted and the controller clocks a 00h (hex) byte to the NRZIO interface 122. The device writes a 2T preamble pattern until the data marker, a FFh byte, is received from the controller. At this point, the device inserts a unique sync-byte into the output data stream, which replaces the received FFh byte, followed by write data consisting of an internally generated repeating pseudo-random binary sequence (PRBS), the output of a linear feedback shift register (LFSR) circuit. Subsequent user data transferred from the controller to the NRZIO interface 122 is ignored for the duration of the write cycle.

The activation of Read Mode, Write Mode, and Servo Modes are governed by a set of precedence rules as outlined in Table 2. Write Mode usually has the lowest precedence and can be overridden by Read Mode or Servo Modes. However, when register 04<1>=1, Write Mode may also occur during Servo Mode. Both Servo and Write Mode may take place simultaneously. Servo Mode must be active before the device will enter Write Servo Mode.

During Servo mode, the VGA and AGC loops, as well as the CTF, 110 ADC 112, and FIR filter 114 sections of the read path are active, and are programmed to a unique set of servo register values. The equalized and conditioned sample values are sent to a servo synchronizer that functions to determine time intervals needed for digital based asynchronous peak detection. Asynchronous peak detection is used to determine the peak position required to demodulate the Gray code. A and B servo bursts are digitally integrated to produce burst area estimates that are transferred to the disk controller via the NRZIO interface 122.

Idle Mode is defined as the absence of Read mode, Write mode and Servo mode activity. All analog circuitry and frequency synthesizers are enabled, and the analog to digital converter (ADC) and DC Restore are active.

In Doze Mode all nonessential circuitry is disabled. Register bits 98<1:0> and 98<1:0> determine if the synthesizers are enabled. Upon transition from Doze Mode to Idle Mode, a start-up time is required to allow the frequency synthesizers and analog circuitry to stabilize. The timing rules are defined in Table 3.

TABLE 3

Mode Timing Rules

| Parameter | Time | Description |
| --- | --- | --- |
| $T_{r/r}$ | 24 PLL clocks | Contiguous Read mode to Read mode |
| $T_{s/d}$ | 500 ms | Suspend to doze mode |
| $T_{d/i}$ | 100 us | Doze mode to idle mode |
| $T_{i/s}$ | 24 PLL clocks | Idle mode to servo mode |
| $T_{s/i}$ | 24 PLL clocks | Servo mode to idle mode |
| $T_{r/i}$ | 24 PLL clocks | Read mode to Idle mode |

Table 3: Mode Timing Rules

Suspend Mode turns off all channel read/write activity. The configuration registers retain their settings and determine the initial state after N RESET=0.

The system device may be divided into functional partitions that may be powered on or off depending on which mode is active. In the following table, 1 is powered-on, and 0 is powered-off.

TABLE 4

Power Modes

| Modes | Band Gap | Synth | Analog FE | Servo | ADC | FIR | ITR/Viterbi | Read I/F | Write I/F |
| --- | --- | --- | --- | --- | --- | --- | --- | --- | --- |
| Read | 1 | 1 | 1 | 0 | 1 | 1 | 1 | 1 | 0 |
| Write | 1 | 1 | 0 | 0 | 0 | 0 | 0 | 0 | 1 |
| Servo | 1 | 1 | 1 | 1 | 1 | 1 | 0 | 0 | 0 |
| Idle | 1 | 1 | 1 | 0 | 1 | 0 | 0 | 0 | 0 |
| Doze | 1 | 0 | 0 | 0 | 0 | 0 | 0 | 0 | 0 |
| Suspend | 0 | 0 | 0 | 0 | 0 | 0 | 0 | 0 | 0 |

Read Mode

In the embodiment illustrated, the read path includes differential input pins VIN_P, VIN_N, thermal asperity and compensation unit 104, VGA 106, MR asymmetry compensation 108, continuous time filter (CTF) 110, analog-to-digital converter (ADC) 112, finite impulse response filter (FIR) 114, interpolated timing recovery unit (ITR) 116, Viterbi detector 120, decoder 121, and interface 122, as well as associated feedback and control circuitry.

A differential signal from a preamplifier (not shown) is transferred to the VGA 106 through the VIN_P and VIN_N pins. External capacitors (not shown) couple the preamplifier signal to the VGA 106. In one implementation, the VGA inputs are internally biased so that external DC biasing components are not required. The normal operating signal input level at pins VIN_P and V1N_N is 40–400 mV peak-to-peak differential.

An internal 8-bit DAC that is adjusted by the Automatic Gain Control (AGC) loop (described below) controls the gain of the VGA 106. The initial gain for read and servo operations are programmed as 2s-complement numbers in registers 7A<7:0> and 7B<7:0>, respectively. The VGA control range is from 0 dB to 20 dB.

Impedance switches 202, 208, in series and in parallel with the inputs of the VGA 106, are shown in FIG. 2. These switches allow reduced recovery time from transients that occur during write sequences and thermal asperity events. During a normal Read mode operation, the series switches 202, 208 are closed and the shunt switch 210 is opened, setting the input impedance to 250–2000 Ohms.

When the impedance switches 202, 208 are used to compensate a thermal asperity event, the AC coupling pole frequency is increased by adjusting the shunt impedance ZADJ 210 to reduce the input impedance. The input impedance is varied dynamically over time.

During Write mode, the switches 202, 208 in series with the VGA inputs are opened, providing a high input impedance. Simultaneously, the shunt input resistance 210 is reduced. A more detailed explanation of the use of the impedance switching used for Write mode to Idle mode recovery is found below.

Prior to being input to the VGA 106, in certain embodiments, thermal asperity (TA) detection and correction is provided. FIG. 3 illustrates an exemplary thermal asperity detection and correction unit or circuit 104. In particular, a TA Detection and Correction Unit 104 includes a TA Detect Unit 306, a TA Control Unit 304, and a TA Compensation Unit 302. The TA detection and correction circuitry 104 acts to reduce the effects of distortion caused when the magneto-resistive (MR) head encounters a TA on the disk.

The overall objective of the TA compensation circuit 104 is to reduce overload and decrease recovery time during a TA event. Ideally, the bit length of the compensated error burst will be reduced so that ECC correction is possible.

The TA detect block 306 includes a lowpass filter (not shown) coupled to a threshold detector (not shown). The amplitude-normalized signal from the output of the VGA 106 is sent through the TA detect low-pass filter and then applied to the threshold detector. The threshold level is independently programmable for Read mode and Servo modes by using registers 89<3:0> and 39<7:4> respectively. A TA event is defined to have occurred when the low-pass filter output exceeds the threshold value for the time set by register 88<5:4>.

When a TA event is detected, the TA_OUT pin is asserted by the TA Control unit 304. In addition, an internal compensation sequence is initiated in the TA Compensation Unit 302 that changes the input high-pass pole frequency at the VGA input as described in FIG. 4. The input time-constant decays exponentially over a time period, set by $T_T$, to the initial nominal value. The gain of the DC restore loop 130 is also increased to allow for faster baseline recovery. Timing, gain and FIR adaptation loops are put in hold mode for the duration of the TA event. In addition, the MR asymmetry loop is put in hold mode until the end of the RGATE. External or internal TA detection may be selected by register 88<7>. Relevant user programmable parameters are shown in Table 5:

TABLE 5

TA Compensation Registers

| Parameter | Range | Default | Register |
|---|---|---|---|
| Detection enable | N/A | Disabled = 1 | 88<1> |
| TA detection threshold (Read mode) | 0–15 | 0 | 89<3:0> |
| TA detection threshold (Servo mode) | 0–15 | 0 | 89<7:4> |
| TA low-pass bandwidth | 5.5–10 MHz | 10 MHz | 88<3:2> |
| Duration of timing and gain loop hold | 6 bytes | | Fixed |
| Rp values | 12, 5 | 12 | 8A<2> |
| TL | 1–4 bytes | | 8A<4:3> |
| TT | 100–1600 ns | 400 ns | 8A<6:5> |

As shown in FIG. 5, the output of the VGA 106 is provided to a Magneto-resistive Asymmetry Compensation Unit (MRACU) 108. As shown, the MRACU 108 includes a squaring function 502, a scaling multiplier function 504, and an adder 506. The output of the VGA 106 is squared by the squaring function 502 and multiplied by the scaling factor Vmr in scaling multiplier 504, and then added to itself using adder 506. This combination provides a nonlinear transfer function from the VGA 106 to the input of the continuous time filter (CTF) 110 in a form that may be adjusted to compensate for second harmonic distortion created by the MR head. The term Vmr adjusts the magnitude of compensation. The value of Vmr is automatically determined by an MR asymmetry compensation loop as will be described below with reference to FIG. 15.

An adder function 109 following the compensation circuit 108 is used to nullify the accumulated DC offset in the analog signal path. A voltage, Vdc derived from a DC restore control loop (described in greater detail below, with reference to FIG. 11), is added to the signal to cancel the DC value of the signal into the CTF 110 and ADC 112. The DC restore control loop is implemented in the digital domain.

The CTF 110 in one implementation is a 4-pole continuous time low pass analog filter and is used to truncate the noise bandwidth input to the analog to digital converter (ADC) 112. The low pass characteristic also prevents aliased frequency components beyond the Nyquist frequency from falling in the pass band.

The frequency response of the filter does not correspond to a standard polynomial. The filter itself is a cascade of two second order s-domain transfer functions, given below:

$$H(s) = \frac{1}{(s^2 + (\omega_{01}/Q1)s + 1)(s^2 + (\omega_{02}/Q2)s + 1)}$$

The $\omega_0$ (pole-pair frequency) and Q (pole-pair quality factor) of each biquad are independently adjustable. In one implementation, to is programmable from $2\pi \times 87.5$ Mrad/s to $2\pi \times 350$ Mrad/s (4:1 ratio).

In one implementation, the ADC 112 is a 6-bit, background calibrated, flash ADC. The use of an interpolated timing recovery architecture allows more channel latency. The latency may be exploited to optimize speed, power and performance in the design of the ADC.

In one implementation, the system uses a digital interpolated timing recovery (ITR) method to resample readback waveform samples at the proper time instances required for sequence detection. FIG. 6 shows the phase-locked loop structure that is used to synchronize to the phase and frequency of the incoming readback bit stream.

In particular, asynchronous samples from the FIR 114 are provided to an 8-tap interpolation filter 602. The interpolated samples are then provided in a loop including a timing error unit 119, a first order loop filter 117, and a timing accumulator base and phase calculator 602. The timing accumulator 602 also receives an input from a zero phase restart unit 604.

The equalized and oversampled data values from the ADC are interpolated using a 8-tap digital FIR interpolation filter. With this technique, the sample phase is represented as a binary number which is the input to the interpolation filter.

The Timing Error block 119 processes interpolated samples to produce the timing corrections that are used for tracking and acquisition modes respectively. The errors are filtered by a digital pole-zero filter 117 combination to produce the estimated error in interpolation sample time. The "Time Accum" block 602 translates its input into two signals: the resample phase within a clock cycle, and uk, which acts as a not-strobe to indicate when a clock period does not contain a resample. When mk is asserted, the ITR output for the corresponding clock cycle is ignored for all downstream processing. The 8-tap filter 602 estimates the sample value between the asynchronous samples to produce time-normalized interpolated sample values. Since the device uses a 6.67% oversampling ratio, approximately every 16th clock cycle is not used.

The timing loop filter 117 is synthesized in the digital domain. A block diagram of the 1st order digital loop filter 117 is described in FIG. 7. The timing loop filter output is the sum of a digital integrator 701, representing a pole, and a roportional term α 704, representing a zero. The integrator 701 includes a caling factor β, accumulator register R 708 and feedback adder 706.

The contributions of the pole and zero are dynamically changed during the ock-on sequence by varying α and β to minimize phase and frequency capture time. The upper path 701, containing integrating register R 708, stores the resampled frequency setting while the lower path 704 causes phase adjustments that are required for loop stability and for reduction of peak phase errors.

The timing algorithm proceeds through three distinct modes. The three timing mode intervals are shown pictorially in FIG. 8: a "zero-phase" mode 802, where the resampling phase is set to a predetermined value with respect to the average phase of the preamble, a second "fast-acquire" mode 806, where the frequency of the loop is adjusted, and a third and final "data-tracking" mode 808, where the timing loop is phase and frequency locked and the timing corrections are derived by averaging over many bits. This is sometimes called the three gear system.

The AGC loop, shown in FIG. 9, sets the overall voltage gain of the read path so that the output amplitude of the ADC 112 is independent of channel input voltage variations. The function of the AGC loop is to provide a normalized signal amplitude input for the Viterbi detector 120. The AGC loop also functions to constrain the signal voltage to be within the dynamic range of the ADC 113.

Shown in FIG. 9 are VGA 106, CTF 110, ADC 112, FIR 114, ITR 116, Gain error Calculation 129, and Loop Filter 131. Gain corrections, Gn are derived from interpolator output samples, x. During fast-acquire mode, the AGC loop gain is increased, and only non-zero sample estimates are used. Gain errors are integrated using the digital loop filter 131 as shown in FIG. 10. The loop filter 131 includes integrator having an adder 1002, register 1004 and D/A 1006. The gain register 1004, R, accumulates gain error terms until the control voltage to the VGA stage VAGC, is set to the value that makes the amplitude input to the Viterbi detector 120 equal to the target number.

Accumulated DC offset in the analog signal path is cancelled using the DC restore control loop shown in FIG. 11. DC offset is measured only during the data field. The loopfilter includes an integrator having an adder 1102, register 1104 and D/A 1106. At each bit clock cycle, an error term, e, is calculated and added to the accumulator value R 1104 which is coupled to a DAC 1106. In turn, the DAC output adds a correcting voltage to the analog signal path before the CTF 110 using adder 109. In this manner, the control loop functions to nullify DC offset as measured at the ITR output.

The initialization of the register R 1004 used in the AGC (FIG. 10) is accomplished using a corresponding shadow register, as illustrated in FIG. 12. Shown are states 1202 and 1204. Shadow register operation is as follows: The AGC accumulator R 1004 is always loaded with the contents of the AGC shadow register when RGATE is asserted (1202). The shadow register can be loaded or read back (1204) by the serial interface. Alternately, when 78<1> is set, the shadow register is used to save the contents of the AGC accumulator 1004 at the deassertion of RGATE.

Typically the shadow register is loaded with a 'best guess" initial gain setting through the serial interface. Successive read cycles are performed with 78<1> set to 1, so that a new initial gain setting is saved after each sector. When the gain setting has converged and is no longer changing, the new value is saved and used as the initial gain setting for non-feedback AGC modes, when 78<1> is set to 0.

During Servo mode, a separate accumulation register and shadow register are used to control the AGC, as shown in FIG. 13. If register bit 78<0>=1 the servo AGC accumulator is updated from the shadow register when SGATE is asserted (1304). If 78<0>=0 the servo AGC accumulator is updated with the value of the read AGC accumulator that has been derived from a previous read operation (1302).

Similarly, the initialization of the register R (1104) used in the DC restore (DCR) loop (FIG. 11) is accomplished using a corresponding shadow register, as shown in FIG. 14. The DCR accumulator R (1104) is always loaded with the contents of the read AGC shadow register when RGATE is asserted (1406). The shadow register can be loaded or read-back by means of the serial interface (1408). When 78<3> is set, the read shadow register is used to save the contents of the AGC accumulator at the de-assertion of RGATE (1402). The DCR accumulator R (1104) is always loaded with the contents of the servo shadow register when SGATE is asserted (1406). However, the operation of this register is different than in read, since the DC restore loop does not adapt during servo. The DCR servo shadow register is initialized either by the serial interface, or if register 78<2> is set, then it is loaded with the results of a previous read operation.

The MR asymmetry compensation loop operates only during the user data portion of the sector in Read mode. The compensation ioop architecture is shown in FIG. 15, essentially the circuit of FIG. 5 with the input to the multiplier 506 shown as including summer 1502, accumulator register R 1504, and D/A 1506.

An asymmetry error term, en, derived from three consecutive sample values of the data, is added to the MR asymmetry accumulator R 1504 that accumulates to a value Mn. The accumulator 1504 drives a DAC 1506, producing an output, Vmr that is used to vary the value of $V^2vga$, a signal proportional to the square of the analog output of the VGA 106. The output of the MR asymmetry compensation circuit becomes ($Vvga+Vmr \times V^2vga$). The feedback loop adjusts the amplitude of ($Imr \times V^2vga$) to a value that will compensate for the 2nd harmonic distortion produced by the MR head nonlinear transfer function. The loop gain, γmr has only one setting.

The accumulation register R (1504) which is used in the MR asymmetry (MRA) correction loop, is initialized using a shadow register as shown in FIG. 16. Use and operation of the MR shadow register is identical to that of the DC restore shadow register (FIG. 14).

The FIR 114 is a 10-tap Finite Impulse Response Filter (FIR) and is used to complete the equalization of the digitized signal to the EPRML target waveform. The topology of the filter is shown in FIG. 17. The active FIR coefficients (tap weights) 1700–1709 may be loaded with the contents of the shadow coefficient registers at the start of read or servo operations. Two sets of shadow registers are used, one for Read mode and one for Servo mode, as shown in FIG. 18. The values of the Read mode and Servo mode FIR shadow registers (1802, 1804) can be modified through the serial port when NOT in Read mode or Servo mode. Only the read shadow registers 1802 can be updated with values derived from a self-adaptive read operation. The values of the Servo mode shadow registers 1802 are always assigned through the serial port. During a read operation, the FIR coefficients are transferred from the shadow registers to the F1R coefficient registers 1806 on assertion of RGATE. FIR filter self adaptation is enabled when 3D<2>=1. After completion of a read, and if 3D<3>=1, then values of the Read shadow registers 1804 are updated by the contents of the FIR coefficients derived from the previous read operation. However if the FIR__SAT signal is asserted, indicating that one or more FIR filter coefficients have saturated, then the update is aborted and inaccurate coefficients are discarded.

In self-adaptive mode, selected filter taps may be programmed to serve as cursor taps by registers 30<7:0> and 30<0>. Selected taps retain their initial coefficient settings while other taps are adapted. This technique prevents unintended phase and amplitude shifts while the filter is adapting. There are no restrictions on which taps or how many taps can be defined as cursor taps. When 3D<3>=0, the FIR shadow register is not updated when RGATE is deasserted and the FIR coefficients are set to a fixed set of values at the start of every read operation. If 3D<2>=1, the FIR filter will self-adapt during a subsequent read operation. However, if 3D<2>=0, the FIR filter operates in fixed mode with a fixed set of coefficients. In Servo mode, the FIR filter only operates with a fixed set of coefficients, which are loaded from the servo shadow registers at the assertion of SGATE.

In normal self-adaptive mode, the de-interpolated estimate of the amplitude sample error and an estimate of the sample are used to calculate an equalizer error term that is used to adjust the individual tap coefficients of the FIR filter 114. When FIR self-adaptation is required in low SNR environments, FIR tap coefficients may be found by using an enhanced algorithm. Known-data is used instead of estimated data to calculate equalizer error. To enable known-data FIR adaptation, 20<3> bit is set to 1 and the data sector is written using a known-data write. Since no user data is transferred through the NRZIO interface 122, this mode is used to only to find reliable FIR coefficients which in turn, may be used to preset the FIR equalizer during normal operation. As shown in FIG. 19, FIR tap adaptation is enabled shortly after sync byte is detected. The delay, Tadp is fixed and not adjustable.

The sync-byte detector 118 (FIG. 1) permits a synchronization mark as short as seven bits without sacrifice in the likelihood of correct byte synchronization. The sync-byte detector 118 is polarity sensitive. A programmable invert function is used to flip the polarity of the data entering the synchronization detector 118 and the Viterbi detector 120. The user must determine the correct polarity empirically. The polarity is selected by register 60<0>. Knowledge of signal polarity is also used to exploit a known start-state during Viterbi detection, thereby reducing the likelihood of initial Viterbi error events.

The sequence detector 120 is shown in FIG. 20. The sequence detector 120 is implemented using a 32-state EPRML Viterbi detector that uses a time varying trellis. The detector 120 includes a branch metric calculation unit 122, an Add Compare Select (ACS) unit 124, a time variance control 128, and a path memory 126. The Viterbi detector 120 uses a path memory of 68 bits to ensure that the burst error limiting properties of the modulation code are fully exploited. Amplitude and time normalized samples from the timing interpolator are used to calculate the branch-metrics 122 for the trellis. The 32-state Viterbi detector is implemented as radix-4 Add-Compare-Select (ACS) units. The ACS unit 124's output consists of decisions that are stored in the path memory 126. After all possible sequences have converged, detected data is sent to the NRZ formatter for decoding and descrambling.

TABLE 6

Code Properties

| Rate | Parity | Transitions/½ codeword | Max Consec 0's | Max Burst Length |
|---|---|---|---|---|
| 32/34 | Even | 7 | 17 | 4 bytes |

Write Mode

FIG. 21 illustrates the write path. As discussed above, the Write path includes the scrambler/encoder 123, serializer/precoder 124, pre-comp 126, and PECL driver 127.

Write data received from the NRZIO interface 122 (FIG. 1) is normally scrambled in scrambler/encoder 123 to ensure a low probability of repetitive equences. Next, the data is encoded in scrambler/encoder 123 so that all esulting sequences satisfy the Qmod2 code constraint of the rate 32/34 code. Finally, the data from the encoder 123 is precoded using precoder 124 before being sent to the precompensation circuit 126 and the PECL output driver 127. The PECL output driver 127 is designed to have low skew with a fast rise-time to accommodate Write mode speeds greater than 750 Mbit/s.

Data placed on the NRZIO interface (NRZ data) is scrambled before encoding and descrambled on readback. These functions are represented in FIG. 1 by blocks 121 and 123, and are illustrated in greater detail in FIG. 22. The scrambler/descrambler function may be implemented as an encoder/decoder 2200, a register 2204, a parallel/serial converter 2206, and XOR gates 2208, 2210.

Scrambling is primarily used to break up long runs of repetitive sequences. The scrambler includes a linear feedback shift register (LFSR) 2204 with suitable feedback connections. During a write operation, the output of the LFSR 2204, a pseudo-random binary sequence (PRBS), is XOR'ed with the NRZ data before encoding. During a read operation, the output from the decoder 2200 is XOR'ed with the same PRBS before being clocked out to the NRZIO pins.

The PRBS generator 2300 along with its generator polynomial is shown in FIG. 23. The PRBS generated by the LFSR 2204 (FIG. 22) is described by a generator polynomial $G(D)=1+D^4+D^9$, where D represents a delay of one NRZ bit.

Data received from the controller is encoded using a rate 32/34 code mapping. The encoder 2200 (FIG. 22) converts 32 NRZ bits to 34 channel bits. Upon readback, the decoder 2200 (FIG. 22) receives data from the Viterbi Detector and converts it back to NRZ data. The decoder synchronizes to the data upon detection of the sync-byte pattern. The encoder and scrambler 123 can be bypassed during a Write mode operation by setting register 20<0> to 1. In addition, the write precoder 124 is bypassed by setting register 20<1> to 1. When both the scrambler 123 and precoder 124 are disabled, the device enters the direct Write mode. Data from the NRZIO bus is transferred directly to the precompensation circuit 126, to the PECL interface 127 and then to the read/write preamplifier. Direct Write mode only effects the write path. If a subsequent read operation is desired, the user write data must contain the preamble and sync-byte format as well as any necessary bytes appended. Interface clocking is automatically modified.

The serializer/precoder 124 is shown in FIG. 24 and receives data from the encoder 123 that is used to generate an unprecompensated write current pattern. Byte-wide write data is first converted to serial data before being applied to the precoder 124. The precoder 124 performs a bit-by-bit mapping, where the delay blocks 2402, 2404 represent a delay of 1 bit-clock period each.

The precompensation circuit 126 is shown in FIG. 25 and shifts the time that a write data transition occurs. This attempts to compensate for the nonlinear bit shift effect of the write process. The circuit includes a plurality of phase select units 2502a–2502d, a shift register 2504, select logic 2506, and a MUX register 2508. The circuit can select from 48 equidistant phases of write clock. The programmable range is 0–37.5% of the period of the write clock, with a delay step of 0.78125%. First order precompensation is selected by setting register 21<3> to 1. Decoding logic decides how much time shift to apply to a given transition according to the rules in Table 7:

TABLE 7

Write Precomp Settings

| T(-2) | T(-1) | T(0) shift (% of bit period) | Level |
|---|---|---|---|
| 1st order precomp 21<3> = 1 | | | |
| X | Tr | 24<6:0> × .78125% | 1 |
| X | None | 0 | |
| 2nd order precomp 21<3> = 0 | | | |
| Tr | None | 22<6:0> × .78125% | 2 |
| None | Tr | 24<6:0> × .78125% | |
| Tr | Tr | 23<5:0> × .78125% | 2 |
| None | None | 0 | |

"Tr" indicates the presence of a write transition

The PECL interface 127 is illustrated in FIG. 26. The PECL interface interfaces to a preamp 2600. Fast current-switch outputs are provided to transfer write data to the read/write preamp. The logic levels are shown in FIG. 27 and Table 8.

TABLE 8

PECL Interface Specifications

| Parameter | Min. | Max. |
|---|---|---|
| PECL output high voltage | 1.8 V | VDDP |
| PECL output low voltage | 1.4 V | VDDP-0.4 V |
| Tr and Tf (10 to 90%) | | .25 ns |

Servo Function

The path for Servo Mode is illustrated in FIG. 28. When in Servo mode the analog signal path of the VGA 106, filter 110, and ADC 112, share the same circuitry that is used by the channel in Read mode. The analog filter 110 has separate and programmable cutoff and boost values that are enabled when SGATE is asserted. The digital servo 128 includes a correlator 2801 which outputs to a peak detector 2804 and ABS Value unit 2806. The output of the ABS Value unit 2806 is provided to a Burst Accumulator 2808 which outputs a burst value to the interface 122. The peak detector 2804 provides outputs to a preamble detector 2802 and to AM detect logic 2810 and Gray Code logic 2812; the outputs of these logic units 2810, 2812 are also provided to the interface 122.

The digital servo block 128 uses an asynchronous clock (i.e. no phase or frequency coherence to servo data) that is programmed to a sample rate of 8×, 10×, or 12× multiples of the servo synchronization frequency. The clock is generated by a dedicated PLL servo synthesizer, which is programmed to achieve the desired oversample rate.

The correlator circuit 2801 is shown in greater detail in FIG. 29. The correlator 2801 is a simplified matched filter that is used to detect di-bits. This circuit suppresses DC shift, low frequency noise and second harmonic distortion such as amplitude asymmetry in MR heads. The correlator 2801 is a FIR filter producing an output of $X_{k+n}-X_k$ where n can be programmed to 4, 5 or 6 using MUX 2902 to match over-sample rates of 8×, 10× or 12× respectively. The correlator transfer function is illustrated in FIG. 30.

The preamble detect block 2802 enables address mark detection when a valid Servo preamble is detected. It contains the control logic that generates the signal, sample_AGC, which is an input to the AGC block 129/131. The preamble detect block 2802 is configured in several different modes, depending on which search mode is current. The search modes are explained in greater detail below.

Register R[*]1, is programmed with the number of consecutive di-bits that must be detected to qualify as detected preamble. Register Rli*]2, contains a bit to disable the preamble detector. Either a micro or a timer enables the preamble detector to begin the search, and the circuit waits for a peak to be detected. When a peak is found the circuit will look for the another peak to occur within a given window. The size of the window is based on the over-sample ratio. When peak is detected outside of the expected window, or if the peak isn't detected within the window at all, the detector will reset and start the process over. However when a valid peak is detected, a second counter is incremented. When this second counter is equal to the value programmed in register R[*]1, the preamble_detected signal is asserted. This signal remains active until an address mark has been detected, or until the search has been terminated.

The sample_AGC signal has three different modes of operation: it can be manually controlled with a register bit, it may be configured to auto sample after each successful preamble detection, or a normal mode that is used in oriented search mode where sample_AGC will be active after the "start search" bit is set.

The AGC block 129/131 receives the sampled value of "peak sample" from the peak detector and calculates a correction that is input to the VGA. The gain DAC in the AGC block is only updated when the signal, sample_AGC, from the preamble detect block is asserted. The AGC can also be preset prior to each servo sample by initializing the AGC_preset register R[*]3. Preset occurs on the next rising edge of SGATE. During initial searches when SGATE is always active, initializing the preset Register will generate an update of the gain DAC. If the preset register is loaded when SGATE is switching, the new value will update the GDAC on the next rising edge of SGATE.

The AGC block has a linear, and non-linear mode. Four gain bits control the gain as a function of the mode selected. Register R[*]4, an eight bit signed number is used to preset the AGC correction value. Register R[*]5 is programmed with the desired target AGC peak value, which is compared to the peak samples, with the difference being the AGC error. The AGC error is scaled as a function on the gain settings, then added to the previous AGC correction. The AGC correction is then formed from numerically integrated gain errors. The AGC correction input to the VGA is an eight bit unsigned number centered around 80 H. The AGC sample signal may be forced active by register control, when used for an initial search. Register R[*]6 is used to program the number of corrections to be made in normal and auto-sample modes. Examples of how the hardware and software may be used in different search modes are discussed below.

Unoriented Search Mode

Signaling for the unoriented search mode is shown in FIG. 31.
1. Get out of the latch.
2. Force SGATE active using the "timerset' register in the controller.
3. Preset AGC gain to a high value, set AGC to non-linear mode.
4. The bit register R~7*]l 0 in the channel comes up reset so that the preamble detect logic is enabled on power-up.
5. Set Force AGC bit, register R{*]l 1, for manual mode. This allows the AGC loop to run during the entire time that the servo gate is active. Due to the use of non-linear mode AGC, the loop should acquire relatively quickly over servo data and move to only moderately higher gain over non-servo data.
6. Set uP Search bit, register R[*]12. This will start the preamble detector. When the preamble is detected, the address mark detect logic will be enabled.
7. After the address mark has been detected, clear the uP_Search bit, register R[*]12. In this mode, the search will be controlled by the microprocessor by setting and clearing this bit.
8. Complete the normal AMET/GRAY CODE qualification code algorithm that is currently in use. In this mode the search is still controlled by the controller, using the uP_Search bit in the system.

After a number of address marks found, we may switch the enable_auto_sample bit, register R[*]l 3, to the Auto-sample mode setting, which clears the force-AGC bit. This will enable the logic that will generate a sample_AGC window after the preamble is detected for the number of di-bits programmed in the AGQ.sampleval register R[*]14. After the qualification is complete, switch to oriented search mode.

Unoriented Search (Auto Sample AGC) Oriented Search Mode

1. Set en_amsync bit in the channel and in the controller to enable the timer controlled searches. These are two separate bits with the same name that have the same function. This assumes that the timers have all been programmed in the controller.
2. Clear the register R[*]20< > bit and set the register R[*]21< > bits. Setting the register R[*]register R[*]21< > bit puts the sample AGC logic in the normal AGC mode. This enables sampleAGC for the number of di-bits programmed in the register R[*]22. This register may have to be reprogrammed if the number of sample di-bits is different than the number required in the auto-sample mode. In this mode, the sampleAGC window will start after the start search (spincomm) timer goes active.

Head Switch (option 1)
1. Switch heads. This occurs between servo bursts.
2. Preset AGC to high gain in the channel, non-linear AGC with high gain. The logic will remain in normal AGC mode.
3. Increase the AGQsample_val in the channel to allowing more time to acquire. (What would be the maximum required number of di-bits?)
4. Reprogram SGATE and spincomm timers to allow the use of more preamble. (Write to read recovery area.)
5. After first address mark, reprogram timers and AGCsample_val back to normal values. Set the AGC back to linear mode and normal gain.

Head Switch (option 2: worst case scenario)
1. Switch headsE
2. Force SGATE active using the timerset register in the controller.
3. Preset AGC to high gain, non-linear AGC. Set AGC in non-linear mode, same as unoriented search.
4. Set Force_AGC bit in channel. Controller timers will still be in oriented search mode, wider window.
5. Wait for AMDET to interrupt to the uP, then clear the Force_AGC bit in the channel. Normal AGC operation will continue from this point.

The peak detector 2804 (FIG. 28) derives a signal, peak_samples, that is used for the AGC. Other peak detector outputs are; peak found and threshold crossed. The input to the peak detector is sample and sample_minusl signals from the correlator 2801. The peak detector 2804 only detects positive peaks. The incoming samples are compared to a programmable threshold, and when either a positive or negative sample crosses the threshold, the threshold_crossed output will be set. This signal remains set until the peak is found. The peak is found using the following algorithm: Wait until threshold_crossed is true. Then wait until the current sample is less than the previous sample, sample minus 1, indicating that the peak has been reached. Next, there are two sample pairing conditions to be considered. If the sample_minusl is less than the sampieminus2, then the peak occurred at sample minus 2, or if the sample is less than the sample_minus 1, then the peak occurred at sample minus 1. When the peak sample is found, the peak_found signal is asserted, and at the threshold_crossed signal is cleared. The peak found signal will remain active for one sample clock period.

There is an input to the peak detector, sample AGC, which is output from the preamble detector 2802. When this signal is asserted, the value of each detected peak will be registered on the peak sample output, one sample clock after the peakjound signal is asserted. This is the value used by the AGC block to generate a gain correction.

The Address Mark Detect circuit 2810 (FIG. 28) is designed around a programmable address mark of nine bits. The address mark is defined by programming 9 bits composed of registers R[*] and R[*]. Table 7 illustrates the address mark format. In this example a written pattern of 8 zero's, followed by a di-bit is represented.

TABLE 9

Servo Address Mark Format

| 8 | 7 | 6 | 5 | 4 | 3 | 2 | 1 | 0 |
|---|---|---|---|---|---|---|---|---|
| R[*]<0> | R[*]<7> | R[*]<6> | R[*]<5> | R[*]<4> | R[*]<3> | R[*]<2> | R[*]<1> | R[*]<0> |
| 0 | 0 | 0 | 0 | 0 | 0 | 0 | 0 | 1 |

The address mark detector 2810 also contains a voting circuit that can be enabled to allow a finite number of errors to occur within the address mark. The number of allowed errors is programmed in register bits RE*]18. After a servo event, it is possible to poll register bits R[*11 9 to determine how many errors awere made in the previous servo event, as shown in Table 10:

TABLE 10

Servo Mark Detection Settings

| R[*] | Number of Allowed Errors | R[*] | Actual Detected | Errors |
|---|---|---|---|---|
| 00 | 0 | Bit 7 | 0 | Errors |
| 01 | 1 | Bit 6 | 1 | Error |
| 10 | 2 | Bit 5 | 2 | Errors |
| 11 | N/A | | | |

FIG. 34 shows a 10 MHz servo waveform with the address mark and the correct polarity for the address mark dibit.

The Gray code detector 2812 has four functions: to detect the Gray code bits, to generate a Gray clock, to store the Gray code data in a shift register and to generate the grayendb signal. The gray decode block 2812 is clocked by a counter (graycnt) that increments on each falling edge of the sample count. This counter is held preset when AMDET is low and is reset at the end of each di-bit cell/window. The preset value can be programmed in the grayendval register Ril*], and is adjusted based on the oversample ratio. The reset value is determined based on the sample rate selected. Once the address mark is detected, the Gray code detector 2812 is enabled, and the timing of the detector is (becomes) relative to the peak of the address mark di-bit. The AMDET signal has a resolution of +1−1 half rate clock, which is 1/2 the oversample frequency.

The Gray data flip-flop is set any time that a peak is detected and is reset at the start of every di-bit window (when grayjrcnt=0). The Gray clock is generated 1/2 sample clock prior to the end of the cell. The Gray clock is used to shift the data into the Gray code shift register. It no address mark is detected, the shift register will contain the data from the last burst.

The grayendb signal determines how many Gray codes are to be shifted in. This value is programmable with the gray.endval register, which is compared to a counter that determines the number of gray clocks that have occurred.

EXAMPLE

Sample rate=12x~6 clocks per di-bit
Graypreset=2
Graycnt=0–5
Graycnt=0=reset gray data FF
Graycnt=5~gray clock The Reset AMDET timer runs off of the reference clock and the counter is reset with a synchronized AMDET signal. It can be programmed with a 12-bit value for the time the AMDET signal is reset. The rst_amb signal resets AMDET, and also resets or re-enables several other functions within the digital servo block.

Time desired in ns is R[*]30< >xTFREF Note: The resolution is +/~1 TFREF due to the synchronization of the AMDET signal, which resets the counter.

The Demod block 2808 calculates the values for the A,B,C, and C position bursts. This function accumulates the magnitude of all of the samples in the accumulation window to measure the area of a burst. The strobe signal from the controller enables a counter (not shown) clocked by the sample clock. The counter is used as a 2-edge timer that opens a window to enable the accumulator. Two 6-bit registers control the timer, called start_accum and stop accum. When the window is open, the accumulator sums the absolute value of the output samples of the correlator. There are four separate adders, 2 pairs that are interleaved, one that sums the two samples and one that accumulates the output of the first adder. When the en_accum signal goes inactive, an additional adder sums the output of the two interleaved accumulators. There is additional clock delay that will have to be considered when centering the windows around the bursts. The peakjound and en_accum signals come out on a test pin and should be useful in centering the sample windows.

From the rising edge of the strobe signal, the en_accum signal goes active after the number of clocks programmed in register R[*]40. When programming the start register, one needs to account for the preload required by the correlator of half of a di-bit. The value programmed in the stop.accum register should allow the signal en_accum, to go inactive 2–3 clocks prior to the falling edge of strobe. This will allow time for the final addition and setup of the output latch. The accumulator is cleared 2 to 3 sample clocks after the falling edge of the strobe. The clear signal to the accumulator is deasserted 2 sample clocks later. This means that the strobe is deasserted a minimum of 5 sample clocks.

The Data Transfer block 122 controls the NRZIO bus during a servo burst. The servo controller is clocked by the negative edge of RCLK. When the servo address mark is detected, the NRZIO interface receives data from the servo. In this state, data is set to all zeros. The servo controller is controlled by a synchronized version of the strobe signal (synchronized to RCLK). The servo controller waits for the first transition (rising edge) of the strobe signal A_burst. On the next falling edge of RCLK after the rising edge of the strobe the NRZIO output is a sync byte, followed by the 3 bytes of Gray code, followed by all zeros again. The sync byte out will be the same sync byte that is used by the channel. All data will be clocked out on the falling edge of RCLK. On the falling edge of the first strobe, the channel will output a sync byte, followed by the two bytes of data. This will be repeated for the B,O and C. The data transfer after the D burst will have 1 additional byte that will be a status byte from the channel. Note that the inactive time between strobe pulses must be at least 1 RCLK cycle to ensure proper operation of the data transfer. RCLK is a divided down version of the read synthesizer and is "gapped" to account for the channel code rate. So for a 1 6/17 rate channel, RCLK has three spacings of 8T, followed by one spacing of 9T. The worst case RCLK spacing is: 1/(channel rate)*9 where the channel rate is 17/16*NRZ Pate.

Common Functions

Several functional blocks are shared by the read, write, and servo sections of the channel. These are the NRZ interface 122, the R/W PLL 138, the Servo PLL 140, and the serial interface 142.

The RAW interface 122 provides a read clock RCLK, receives a write clock WCLK, and reads and writes data on a byte wide NRZIO interface. NRZI read interface timing is shown in FIG. 35. NRZI write timing is shown in FIG. 36. While the figures show byte-wide data being clocked to and from the channel on the rising edge of the clock, the polarity of the RCLK and WCLK signals may be altered by programming registers 20<4> and 20<5>, so that data may be clocked on either edge. Interface timing rules are defined in Table 11:

feedback divider 3714. The input FREF is an external reference input frequency, and N, P and M are integers. The output bit-rate frequency is programmed by loading the 91<5:0>, the 90<7:4> and the 90<2:0> registers.

The operation of the P/W PLL 138 is as follows: The VCO output frequency, Fvco, which is in the range of 800–1600 MHz, is divided by the fractional divider 3714 of factor (N−P/16), and then phase-compared to an input reference frequency FREF, by phase detector 3702. Use of the fractional divider 3714 allows the phase detector 3702 to sample the phase error at a high rate, providing faster lock-on times with lower VCO phase jitter. The PLL P/W clock output is obtained by dividing Fvco by 2(M+1) using digital divider 3812. The user sets the R/W clock frequency to be the same as the desired encoded bit-rate. When the PLL provides the Read mode clock, a 1 6/15 frequency translation circuit 3710 is automatically inserted in the clock path to increase the clock rate by 6.66% (the bit-rate is unchanged). This provides an oversampled clock for use by the interpolated timing recovery (ITR) circuitry 116 (FIG. 1).

TABLE 11

NRZIO Interface Timing.

| Parameter | Sim. | Condition | Min. | Max. | Units |
|---|---|---|---|---|---|
| RCLK, NRZIO rise/fail time | Tr & tf | 20-pF output load, 10–90% | | 3.7 | Ns |
| RCLK to NRZIO delay | Tp | Falling edge of RCLK to NRZ out | | 3.5 | ns |
| NRZIO setup time | Tsu | NRZ data valid to rising edge of WCLK | 3 | | Ns |
| NRZIO hold time | tn | Rising edge of WCLK to NRZ data invalid | 2 | | Ns |
| RCLK high | Thr | Period RCLK is high | 4 | 5 | 15/16 bit period |
| RCLK low time | Tlr | Period RCLK is low | 4 | 6 | 15/16 bit period |
| WCLK high time | Thw | Period WCLK is high | 4 | 5 | Bit period |
| WCLK low time | Tlw | Period WCLK is low | 4 | 5 | Bit period |
| RCLK and WCLK periodicity | | (8 + 9 + 8 + 9 + 8 + 9) 51 PLL clock edges | | | |
| Direct Write mode WCLK periodicity | | (8 + 8 + 8 + 8 + 8 + 8) = 48 PLL clock edges | | | |

A one-period ambiguity exists in RCLK high and low times. This constraint is reflected in the clock times listed in Table 11.

The PLL synthesizer 134 uses a single phase locked loop 138 to synthesize Read mode and Write mode (R/W) clock signals. A second PLL 140 is used to synthesize Servo mode clock signals. Both PLL designs are identical, with the exception of a 16/15 frequency translation function that is added to the R/W PLL 138. The designs have been optimized for high bandwidth, fast lock-on operation and extremely low jitter output.

A block diagram of the RAW PLL synthesizer block 138 is shown in FIG. 37, and the specifications follow in Table 14. The PLL output frequency is determined by Equation 2:

$$R/W\ FREQ = NREF \times (N-P/16)/(2 \times (M+1)) \qquad \text{Eq. 2}$$

The N and P values should be chosen such that:

$$700\ \text{MHz} <= FREF \times (N-P/8) <= 1600\ \text{MHz}$$

As shown, the synthesizer block 138 includes a phase detector 3702, a charge pump 3704, loop filter 3706, VCO 3708, frequency translation circuit 3710, divider 3712, and A block diagram of the Servo PLL synthesizer block 140 is shown in FIG. 38, and the specifications follow in Table 12. The Servo PLL 140 is similar to the R/W PLL 138 in form and operation. A separate and complete set of registers are used to program the Servo PLL 140. The PLL output frequency is determined by Equation 3:

$$Servo\ FREQ = FREF \times (Ns-Ps/16)/(Ms+1)$$

The Ns and Ps values should be chosen such that:

$$700\ \text{MHz} <= FREF \times (Ns-Ps/8) <= 1600\ \text{MHz}$$

As shown, the synthesizer block 140 includes a phase detector 3802, a charge pump 3804, loop filter 3806, VCO 3808, divider 3812, and feedback divider 3814. The Servo output frequency is programmed by loading; the 91<5:0>, 90<7:4> and 90<2:0> registers. When a non standard FREF frequency is employed then Equation 3 is used to find Ps $M_s$, and $Lp_5$ values, subject to constraints of Equation 3.

TABLE 12

Clock Synthesizer Specifications

| Parameter | Symbol | Min | Max | Register(s) | Notes |
|---|---|---|---|---|---|
| Reference Frequency | FREF | 20 MHz | 80 MHz | 98<7:4> | in steps of 5 Mhz |
| VCO Frequency | Fvco | 800 MHz | 1600 MHz | | |
| Write or servo clock | | 53.125 MHz | 800 MHz | | |
| Settling Time | | | 10 usec | | |
| Absolute jitter | | | 15 psec | | 1 sigma |
| Register settings - Read Mode/Write Mode | | | | | |
| N divide value | N | 12 | 48 | N = 91<5:0> | |
| P divide value | P | 0 | 15 | P = 90<7:4> | |
| M divide value | M | 0 | 7 | M = 90<2:0> | |
| Register settings - servo mode | | | | | |
| Ns divide value | Ns | 12 | 48 | Ns = 93<5:0> | |
| Ps divide value | PS | 0 | 15 | Ps = 92<7:4> | |
| Ms divide value | Ms | 0 | 7 | Ms = 92<2:0> | |

The serial interface 142 allows communication between the controller and the internal control registers of the device. Any given internal control register may be read-only (R), write-only (W) or both read and write (RW). The serial interface 142 communicates by three control pins, SDEN, SDATA and SCLK, by using the transfer protocol shown in FIG. 39 with port timing rules specified in Table 13.

TABLE 13

Serial Port Timing Specification

| Parameter | Min | Max |
|---|---|---|
| $t_{d1}$ | 5 ns | |
| $t_{d2}$ | 5 ns | |
| $t_{nd}$ | 10 ns | |

The interface controller arbitrates the transfer and is always responsible for setting the direction of the transfer, for generating the address bits and for generating the clock. The transfer protocol is structured as an 18-bit word. The first bit is used to indicate a write-to or read-from the device. The next eight bits function as address bits, with the LSB sent first. A dummy "turn-around" bit is added in the middle of the bit stream to allow time for a direction change on the bust Eight data bits follow either to or from the device, depending on the direction of the transfer.

During a register write operation, SDEN is asserted and serial data on the S DATA pin is clocked to the device on the positive edge of SCLK. After the 18-bit sequence is complete, byte-wide data is transferred to the selected device control register on the negative edge of SDEN.

During a register read operation, the bus direction and the address are clocked into the device on the positive edge of SCLK. After the turn-around bit, the device assumes control of the S DATA line and places the contents of the requested register, LSB first, to SDATA on the falling edge of SCLK.

System Operation

Operation of the Read, Write, and Direct Write modes follows and, in particular, on exemplary timing relationships that are in effect when transitioning from one mode to another.

Read Mode Sequence

Exemplary read mode sector architecture is shown in FIG. 40. Shown are the RGATE waveform 4002, the Read Signal 4004, the MTP wave form 4005, and the NRZIO wave form 4007.

The Read Signal 4004 includes a preamble 4006, sync byte 4008, and user data 4010. The preamble 4006 is implemented as a series of 2T-spaced transitions, with T being the encoded bit period. The preamble readback pattern input to the ADC 112 is a sine wave of frequency 1/4T. In one implementation, the system has a preamble length of 96 bits, although shorter and longer preamble lengths may be used. If the preamble field 4006 is less than 80 bits, the timing and gain synchronization may become unreliable. The preamble field 4006 is a known reference pattern that is used to set up timing, gain and DC-restore loops. Because the preamble is a single frequency, it cannot be used as a referenceto adjust the self adaptive FIR equalizer.

A sector read operation begins with the assertion of RGATE 4002. The timing loop cycle occurs in three phases, dividing the preamble 4006 into distinct regions: zero-phase restart 4012, fast-acquire 4014, and data tracking 4016. During the first phase, zero-phase restart 4012, the initial phase of the timing loop is adjusted. The second phase, fast-acquire 4014, is primarily used for frequency acquisition. After the first and second phases, the timing loop phase-frequency is close to the target phase-frequency value and within the capture range of the third and final phase, data-tracking 4016. During tracking 4016, the timing loop response is adjusted to be slow responding, requiring many averaged data samples to generate significant clock timing adjustments. Tracking mode 4016 is used for accurate and jitter-free data clock regeneration when reading user data. The AGC loop (FIG. 9) operates throughout all three timing phases. However, the loop gain of the AGC is increased during the zero-phase restart and fast-acquire phases so that channel gain is close to the correct value before entering tracking mode. The AGC tracking phase adjusts the gain very slowly throughout the user data and requires an average of many samples to significantly change the gain setting.

Programmable counters (not shown) are used to define the time intervals for each phase of the acquire sequence 4014. Acquisition timing periods may be adjusted for preamble lengths up to 500 bits by programming the counter-timers described in FIG. 41. The range of values allowed for each counter is specified in Table 14.

TABLE 14

Counter Values

| Delay | Description | Range | Register | Default |
|---|---|---|---|---|
| Tadp | FIR self adapt | Fixed | | |
| Tacq | Timing and dc fast acquire | 0–127 nibbles | 09<6:0> | |
| Tagc | AGC acquire | 0–127 nibbles | 0A<6:0> | |

A sector read operation begins with the assertion of RGATE 4002 (FIG. 40). The system cycles through the loop acquire sequence described above. After the sequence is completed, timing and gain control loops have converged and the tracking mode 4016 is entered. The device begins detecting data and searches for a unique sync-byte pattern 4008 in the bit-stream. The sync-byte 4008 is a special pattern used as a marker to indicate the start of user data. Once the sync-byte 4008 has been detected, an FFh byte is output on the NRZIO bus. Subsequent detected and decoded user data bytes continue as output for as long as RGATE 4002 is asserted.

Approximately 16 bytes of read data latency are associated with a read operation as shown in FIG. 40 and FIG. 42. As a consequence, when RGATE 4002 is de-asserted at the end of a sector 4203, 16 bytes of data are left to be transferred to the controller. This residual data can be transferred using one of two methods, as selected by register 04<0>. The first method is for the controller to assert RGATE 4002 after the physical end of sector data, until the entire sector has been transferred. This is adequate provided the end of sector gap 4206 is greater than 16 bytes.

Using the second method, RGATE 4002 is de-asserted at the end of the sector. The device internally extends RGATE 4002 to flush out the residual data that is in the data path. When reading consecutive sectors, the combined length of the sector gap, the preamble length, and the sync mark must be longer than the 15 byte read latency, and the controller must be able to accept NRZ data even after RGATE has been de-asserted.

Write Mode Sequences

Data may be transferred from the controller to the NRZIO interface 122 (FIG. 1), through the system to the write preamp by two basic methods, called Normal and Direct modes. Both methods have selectable options that modify how write data is processed.

Normal Write Mode

The timing of a Normal Write mode operation is shown in FIG. 43. Shown are a WGATE waveform 4300, an NRZIO waveform 4302, and a Write Data waveform 4304. A normal Write mode operation is initiated when WGATE 4300 is asserted. A series of 00h bytes 4303 (FIG. 43) are sent from the controller to the device on the NRZIO interface 122 (FIG. 1). The encoder 123 output is a series of 2T-spaced transitions that generate the preamble 4306. The preamble 4306 is continued for as long as 00h bytes are sent to the interface 122. When an FFh byte 4305 appears on the NRZIO interface 122, write logic output is a sync-byte 4308 in place of the FFh, followed by encoded user data 4307 lasting the duration of WGATE assertion. Write data is subsequently precompensated and transferred to the PECL output stage 127. In the implementation illustrated, the Write path latency is 9 bytes. Data may be clocked to the device on the NRZIO interface 122 on either the rising or falling edge of RCLK depending on the setting of register 20<4>1.

Direct Write Mode

The write sequence for a direct Write mode operation is shown in FIG. 44. Shown are a WGATE waveform 4400, an NRZIO waveform 4402, and a Write Data waveform 4404. In operation, in a manner analogous to the normal Write mode, WGATE 4400 is asserted; however, the encoder and scrambler 123 are bypassed by setting register 20<1>=1 and the write precoder 124 is bypassed by setting register 20<1>=1. NRZIO data is serialized, precompensated and then transferred directly to the PECL output 127 without modification. The controller sends a sequence of 00h bytes, followed by one FFh byte 4403. This is followed by the continuation of user data 4405 for as long as WGATE is asserted; the FFh byte is not transferred. If a Read mode operation is desired after a Direct Write mode, the write data placed on the NRZIO interface 122 must contain the preamble, sync-byte, encoded data and any necessary ECC bytes.

System Timing

A system timing diagram is shown in FIG. 45. Timing rules are listed in Table 15:

TABLE 15

Timing Rules

| Parameter | Min Time | Description |
| --- | --- | --- |
| $T_{s/r}$ | 24 Read mode PLL Clocks | Servo to read |
| $T_{r/s}$ | 24 Read mode PLL Clocks | Read to servo |
| $T_{s/w}$ | 24 Read mode PLL Clocks | Servo to write |
| $T_{w/s}$ | 24 Read mode PLL Clocks | Write to servo |
| $T_{w/s}$ | 24 Read mode PLL Clocks | Servo mode to write mode/servo mode |
| $T_{s/w}$ | 24 Read mode PLL Clocks | Write mode/servo mode to idel mode |
| $T_{w/w}$ | 24 Read mode PLL Clocks | Write mode to write mode |
| $T_{r/r}$ | 24 Read mode PLL Clocks | Read mode to read mode |
| $T_{s/d}$ | 500 ns | Suspend mode to doze mode |
| $T_{d/l}$ | 100 us | Doze mode to idle mode |
| $T_{i/s}$ | 24 Read mode PLL Clocks | Idle mode to servo mode |
| $T_{s/l}$ | 24 Read mode PLL Clocks | Servo mode to idle mode |
| $T_{r/i}$ | 24 Read mode PLL Clocks | Read mode to idle mode |

Write Mode to Idle Mode Recovery

The timing diagram of the recovery sequence appears in FIG. 45. In particular, shown are a WGATE waveform 4600, a HiZ waveform 4602, and a LoZ waveform 4604. When WGATE 4600 is asserted, the series switches 202, 208 (FIG. 2), which are connected between the VGA input pins and the VGA circuit, are set to an open or high impedance (HiZ) state. The high impedance state prevents write voltage transients from entering the VGA 106 (FIG. 1) and overloading the analog signal path. The HiZ condition is maintained for the duration of WGATE and is extended past the de-assertion of WGATE for a programmable length of time, Thr, set in a register. In addition, a shunt resistance 210 connected in parallel with the VGA inputs, is set to a low impedance value (LoZ) during WGATE. The LoZ period starts 50 ns before the end of HiZ and extends for a period of time, TLR, set in a register.

TABLE 16

| Parameter | Description | Time/Resistance |
| --- | --- | --- |
| Thr | Time VGA input-open is active after WGATE | 50 ns × R,[TBD] |
| Tlr | Time VGA input-LoZ active after (Thr-50 ns) | 50 ns × R,[TBD] |
| | Select 200, 400, 1K or 2K Ohms for shunt LoZ | R |

Channel Quality Monitor (CQM)

The functions shown in FIGS. 47*a* and 47*b* may be used to collect statistical data on the overall performance of the magnetic recording channel. The active measurement function is selected by the FUNSEL register, 70<2:0>, as defined by Table 17:

TABLE 17

Channel Quality FUnctions

| FUNSEL register 70<2:0> | Function |
|---|---|
| 0000 | MSE1, squared error of received sample minus estimated sample (slicer) |
| 0001 | MSE2, squared error of received samples minus known sample (known data mode) |
| 0010 | MSE3, squared error of selected parameter |
| 0011 | SAT, surface analysis testing |
| 0100 | Histogram 1, referenced to estimated samples (slicer) |
| 0101 | Histogram 2 |
| 0110 | Histogram 3 |
| 0111 | Error rate |
| 1000 | Di-bit extraction |

The parameter to be measured is selected by the MONSEL register, 70<6:3>. Taken together, the values of the FUNSEL and MONSEL registers define a CQM test. The combination of function and parameter that are supported are shown by an "X" in Table 18:

TABLE 18

Quality Monitor Test Matrix

| Test Register MONSEL 70<6:3> | MSE 1 0000 | MSE 2 0001 | MSE 3 0010 | SAT 0011 | HIST 1 0100 | HIST 2 0101 | HIST 3 0110 | Error 0111 | Di-bit 1000 |
|---|---|---|---|---|---|---|---|---|---|
| 0000 ITR Data | X | X |  | X | X | X |  |  | X |
| 0001 Gain Error |  |  | X |  |  |  | X |  |  |
| 0010 Timing Error |  |  | X |  |  |  | X |  |  |
| 0011 DC Restore |  |  | X |  |  |  | X |  |  |
| 0100 MR Asym. Error |  |  | X |  |  |  | X |  |  |
| 0101 FIR Adt. Error |  |  | X |  |  |  | X |  |  |
| 0110 Sector Errors 1 |  |  |  |  |  |  |  | X |  |
| 0111 Sector Errors 2 |  |  |  |  |  |  |  | X |  |
| 1000 VA bit error |  |  |  |  |  |  |  | X |  |
| 1001 Slicer error |  |  |  |  |  |  |  | X |  |
| 1010 ECC BER |  |  |  |  |  |  |  | X |  |

CQM measurements are controlled by a finite state machine (FSM) that manages the selected test. The FSM state diagram is described in FIG. 48, allowed state transitions are listed in Table 19 and state variables are specified in Table 18.

TABLE 19

CQM Measurement

| Event | Trigger |
|---|---|
| Trigger | Interface sets 68<5> = 1. Enables and resets the state machine. |
| Start | (on sync0byte found if (68<4> = 1)) otherwise on RGATE assertion |
| P Complete | P count is complete setting 68<3> = 1 |
| RGATE before p | RGATE ends before P setting 68<0> = 1, an error indicator |
| Span sectors | RGATE ends before Q and sector span is enabled, 68<1> = 1 |
| M Done | On (RGATE if 68<1> = 0) otherwise on (Q count complete which also sets 68<2> = 1) |

TABLE 20

CQM Variables

| REG Variable | Definition |
|---|---|
| 68<7> | Trigger and reset |
| 68<4> | Start on sync byte found enable |
| 68<3> | P and count indicator |
| 68<2> | Q end count indicator |
| 68<1> | Enable sector span |
| 68<0> | Error flag |
| 69<7:0> | P and count value-Specific WAIT time (16 bit units) |
| 6A<7:0> 6B<3:0> | 12 bit Q end count value-MEASURE sample (in multiples of 16 bits) |
| 6B<7:4> 6C<7:0> | 12 bit Q counter value-number of measurements accumulator (in multiples of 16 bits) |
| 72<7:0> 71<7:0> | Top 16 bits of CQM 20 bit measurement accumulator (measurement) |
| 6D<5:0> | $T_H$, high threshold |
| 6E<5:0> | $T_L$, low threshold |
| 6F<7:0> | $T_E$, Error squared threshold |
| 6D<7> | Sector error type |

Single sector operation is described in FIG. 49. The measurement sequence is initiated when register 68<5> is set to 1. This event resets the state indicators and the P,Q and M counters. The FSM advances to the WAIT state where it waits for an RGATE assertion or a sync-byte-found signal depending on 68<4>. When the selected condition occurs, the FSM advances to the PAUSE state where a delay timer, F, counts P bits before transitioning to the MEASURE state. As a precautionary check, if the FSM is in the PAUSE state when RGATE is de-asserted, an error flag, register 68<0>, is set to 1 and the FSM returns to Idle mode.

While in the MEASURE state, data collection is enabled and parametric test data is accumulated in a 20-bit-wide register, called the M accumulator. Only the top 16 bits of the register are accessible through the serial port. An overflow condition is indicated by all the bits in the register being set to 1. A unit counter, or C counter, is enabled to keep track of the number of measurements processed. The Q counter and the M accumulator are active until the end count, in registers 6A<7:0> and 60<7:0>, is reached or RGATE is de-asserted Normally, measurement data accumulates until the end of sector, signalled by the end of RGATE. However, if 68<1>=1, data will accumulate until the end count of the Q counter, 6A<7:0> and 60<7:0>. The FSM returns to Idle mode, and the measurement value, contained in the M accumulator, and the number of measurements made contained in the C counter, may be retrieved through the serial interface.

Multiple sector operation is described in FIG. 50. If 68<1>=1 and if the end count is not attained when RGATE is deasserted, the FSM returns to the WAIT state and will continue to collect more data on the next sector or sectors. When the Q counter end count is reached, and the required number of measurements have been made, the FSM sets indicator 68<1> to "1", and returns to the Idle mode state. With this method, the measurement may span multiple sectors.

Mean Squared Error

MSE1, MSE2 and MSE3 tests measure squared error. It is left to the user to calculate the real mean squared error by dividing the measured squared error by the number of measurements made, the value that is accumulated in the M counter.

For the MSE1 test, the error is calculated as the difference of the received sample output from the ITR and the estimated noiseless sample value. In the MSE2 test, the error is calculated as the difference in the received sample output from the ITR and a calculated sample derived from an onboard linear feedback shift register (LFSR). The MSE 3 test is used to measure the standard deviation of loop error signals.

Error Rate Tests

The M counter can be used to accumulate errors by using an number of different measures. When an error rate measurement is selected, the C counter increments on sectors read, i.e. on RGATE deassertion. After Q sectors have been tested, the state machine transitions to the Idle mode state. Assuming 512 byte sectors, 268 million bits may be tested before the counter overflows. This allows measuring error rates to 1 errors per bit.

Sector Error Rate (Zero-Pattern Method)

An all 00h byte data pattern is sent to the scrambler and encoder during Write mode. The 00h byte pattern is scrambled before being encoded and written to the disk. Upon readback, the detector, decoder and descrambler invert the process to reconstruct the 00h byte pattern. Errors are detected by the occurrence of non-O0~ bytes. The error accumulator counts sector errors using two different criteria:

A sector with 1 or more bytes in error, counted as 1 sector in error, 6D.zz7>=0.

A sector with 5 or more bytes in error, counted as 1 sector in error, 6D_7>=1.

Statistically, for channel error rates less than 10~ errors/bit, most sectors in error will contain only a single error event. However, that one error event may corrupt several bytes. When a single error event causes mis-synchronization, hundreds of bytes in error may be generated. Measure (1) will count either outcome as one error. Measure (2) will count only sectors with long bursts of errors, which are probably not EGG correctable. In order to test large numbers of bits, the OCM state machine parameter should be set to span multiple sectors.

Slicer Bit Error Rate

The output of the slicer circuit is compared to known data generated by a linear feedback shift register. For correct comparisons sector data must be written using the known-dataJ Write mode. Bit-wise miscompares are accumulated in the M counter. In order to test large numbers of bits, the CQM state machine parameter should be set to span multiple 71 sectors.

Viterbi (VA) Bit Error Rate

The output of the Viterbi detector is compared to known data generated by a linear feedback shift register. For correct comparisons sector data must be written using theknown-data Write mode. Bit-wise miscompares are accumulated in the M counter. In order to test large numbers of bits, the 0CM state machine parameter should be set to span multiple sectors.

Bit Error Rate with ECC

Sector data is written using the "zero pattern' method as outlined in the sector error rate test. Byte output from the decoder is de-interleaved into four byte interleave sequences. One of the four interleave sequences is selected to be byte-wise compared to a zero byte. Byte miscompares are accumulated in the M counter. In order to test large numbers of bits, the 0CM state machine parameter should be set to span multiple sectors.

Di-bit Measurement

The di-bit extraction test deconvolves a pseudo-random binary readback sequence that has been written previously to a sector as data. The measurement evaluates one sector to determine one value of the di-bit function. Subsequent values are obtained by shifting the phase of the pseudo-random binary sequence (PRBS) that is used to generate known-data in the deconvolution equation. Data must be written using known-data Write mode. That is, 20<3> bit set to 1. When a normal Write cycle is executed, the device output is a repeating PRES data pattern that takes the place of normal encoded write data. ~Write data input to the NRZIO interface from the controller is ignored. The synchronization field and sync-byte are output just as in a normal write, although a repeating PRBS is substituted for data.

On readback, the 127 bit PRBS is derived from a linear feedback shift register (LFSR) that performs the polynomial recursion, $x_{n+8}=(X_{ri\ 7}+X_{n+3}+1)mod2$. In this extraction algorithm, the phase of the PRBS determines the time variable of the extracted di-bit function. In order to obtain all 127 values of the extracted di-bit the phase of the PRBS is incremented by changing the starting value, the seed of the LFSR contained in 73<6:0>.

For the most accurate result, measurement data should be accumulated over multiples of 127 amplitude (ITR) samples. Since the C counter increments in multiples of 16 bits a recommended ending value for Q is 127, which is 16×127=2032 bits SNR Margining Tests Three different methods for SNR margin testing are supported in the SOA8700 device; additive white noise, off-track interference emulation and noise multiplication.

Additive White Noise Test

A white noise generator circuit can be used to add noise to the readback signal at the input of the CTF, output of the VGA. This effectively lowers channel SNR and increases bit error rate. When enough noise is added so that the error rate is between $10^{-6}$ to $10^{-7}$ (errors/bit) the error rate becomes a sensitive indicator of the effect of channel parameter settings. Pre-comp, head current, equalizer settings, etc. may then be more easily adjusted to find optimal settings. Injected noise is "white", while preamp noise may be "colored", and as a result the channel parameter settings found using this method may be only close to optimal. Because injected noise is added after the VGA, the effective SNR obtained will be relatively independent of the signal level input of the VGA, and will be repeatable to the extent that the CTF and FIR transfer functions are constant. The amplitude of the injected noise, which has a 300 MHz noise bandwidth is varied by register $R_i$[TBD]. This can produce effective SNR's of 15 dB to 25 dB. SNR herein is defined as the isolated pulse peak voltage divided by RMS noise voltage.

Off-Track Interference Emulator

The input to the Viterbi detector prefilter can be artificially corrupted by adding a scaled output from a linear feedback shift register (LFSR). The amplitude of the LFSR can be varied by register 75<7:0>. The frequency content of the LFSR signal is designed to match the spectrum of off-track interference experienced by the channel during off-track stress testing (OTO).

Noise Multiplier Test

This test assumes known data, so a known-data write must be used to set up test data sectors. The known-data pattern used, a repeating PRBS, is modified to satisfy the parity constraint of the Viterbi detector by setting register 73<7> to 1.

The error signal at the input to the Viterbi detector prefilter is measured by comparing input amplitude samples to the known-data pattern. The derived error signal is multiplied by a scaling factor and then added back to the known signal. This uniformly multiplies all noises and distortions by the scaling factor, creating a uniform degradation of the effective detector SNR. The amplitude of the noise multiplication error is adjusted by register 75<7:0>.

Arbitrary Waveform Injection

The ViewDac circuit 5100 (FIG. 52) can be used to generate arbitrary waveforms that may be used to simulate analog input signals. These waveforms can be injected at various nodes in the analog signal path as illustrated in FIG. 51. A 32-word cyclic random access memory (RAM) 5102 is first loaded with waveform sample values via the serial interface. The clocked output samples are input to the viewdac (Vdac) 5100 where they are converted to analog values. As shown in FIG. 51, the output of the viewdac can be connected to various inputs in the analog signal path as selected by register AB<2:0>. The cyclic RAM 5102 is clocked from either the P/W PLL or Servo PLL depending on the setting of AB<3>. Normally, in this mode the input signal from the preamp, VIN(P,N) is disconnected from the VGA by setting AB<4> to 1.

The analog signal injection function may be used to simulate typical sinusoidal input waveforms that can be used with the CQM, to measure and calibrate the frequency transfer function of the VGA 106 and CTF 119.

View DAC

The system according to an implementation of the present invention allows real time viewing of digital signals in the analog domain by using a high speed, 7-bit View DAC. The View DAC 5100 is shown in FIG. 52, and operating modes are specified in Table 21 and Table 22. The view DAC circuit includes an input multiplexer 5202, clock multiplexer 5204, and View DAC 5206.

Register B0<2:0> controls the selection of internal signals which are routed to the View DAC. The selected data can then be brought off-chip at reduced or full speed depending upon the setting of B0<7:3>. The actual divisor will be the value of B0.<7:3>±1. For example, if the setting in this field is 000, then the data is divided by 1, and by 8 if the setting is 111.

TABLE 20

View DAC Input Select

| B0<2:0> | Description |
|---|---|
| 000 | Selects a value of 0 into the View DAC input |
| 001 | Selects the output from the ADC |
| 010 | Selects the output from the FIR |
| 011 | Selects the output from the ITR |
| 100 | Selects the output from the Viterbi |
| 101 | Selects the output from a 128-byte RAM |
| 110 | Selects the output from a user loaded serial port register |

TABLE 22

View DAC Decimation

| B0<7:3> | Description |
|---|---|
| 000 | View DAC output is every clock period |
| 001 | View DAC output is every 2nd clock period |
| ... | ... |
| 111 | View DAC output is every 8th clock period |

Analog Test Port

A differential analog test port may be used to monitor and inject analog signals along the signal path of the front end of the system. VGA input pins VIN_P and VIN_N are multiplexed to input ports along the signal path. ASIG_P and ASIGN pins are switched to the selected output along the signal path as shown in FIG. 53. Table 23 specifies the value of register AA<7:0> needed to connect a selected signal to the ASIG output pins.

TABLE 23

Analog Test Port

| AA<7:0> | Output Selected |
|---|---|
| 00000000 | No connect to Aout normal op. |
| 00000001 | Connects pins ASIG_P/ASIG_N to output test bus |
| 00000010 | VGA output |
| 00000100 | Asymmetry correction output |
| 00001000 | 1st biquad output |
| 00010000 | CTF output |
| 00100000 | 8 dB buffer output |
| 01000000 | S/H output |

Multiplexed Test Pin (MTP)

A single MTP is used to connect to internal test signals.
The function of the MTP is controlled by register BA<2:0>.
Table 24 lists available signals

TABLE 24

Multiplexed Test Pin

| BA<2:0> | RGATE | WGATE | SERVO | MTP | Description |
|---|---|---|---|---|---|
| 000 | X | X | X | NSYNC | Not sync byte found |
| 001 | X | X | X | WRITE_ERROR | WRITE error |
| 010 | X | X | X | GRAY_DATA | Gray decode output |
| 011 | X | X | X | PLLR_LOCKED | Read PLL locked |
| 100 | X | X | X | PLLS_LOCKED | Servo PLL locked |
| 101 | X | X | X | WRP_INVALID | WRP pin valid/WRP error |
| 110 | X | X | X | FIR_SATURATION | FIR tap out of range |
| 111 | X | 0 | 0 | NSYNC | Not sync byte found |
| 111 | 0 | 1 | X | WRITE_ERROR | WRITE error |
| 111 | 0 | 0 | 1 | GRAY_DATA | GRAY decode output |

The invention described in the above detailed description is not intended to be limited to the specific form set forth herein, but is intended to cover such alternatives, modifications and equivalents as can reasonably be included within the spirit and scope of the appended claims.

APPENDIX

A copy of the provisional application specification follows as Pages A0-1 through A0-3, and A1-A122.

Confidential

| | | |
|---|---|---|
| 1 | Overview | 1 |
| 1.1 | Features | 1 |
| 2 | Channel Architecture | 4 |
| 2.1 | Modulation Code | 4 |
| 2.2 | Trellis Coded Noise Prediction Viterbi Algorithm | 4 |
| 2.3 | Performance | 5 |
| 2.4 | Block Diagram | 7 |
| 3 | Operating Mode Definition | 8 |
| 3.1 | Read Mode | 8 |
| 3.2 | Write Mode | 8 |
| 3.2.1 | Normal Write | 9 |
| 3.2.2 | Known Data Write | 9 |
| 3.3 | Write Mode During Servo Mode | 9 |
| 3.4 | Servo Mode | 9 |
| 3.5 | Idle Mode | 10 |
| 3.6 | Doze Mode | 10 |
| 3.7 | Suspend Mode | 10 |
| 3.8 | Operating Modes | 11 |
| 3.9 | Power Management | 11 |
| 4 | Read Mode | 13 |
| 4.1 | Variable Gain Amplifier (VGA) | 13 |
| 4.2 | MR Asymmetry Compensation and DC Restore | 14 |
| 4.3 | Thermal Asperity (TA) Detection and Compensation | 14 |
| 4.4 | Continuous Time Filter (CTF) | 16 |
| 4.5 | Butterworth Mode | 18 |
| 4.6 | Analog-to-Digital Converter (ADC) | 18 |
| 4.7 | Timing Acquisition Loop | 18 |
| 4.8 | Gain Acquisition, AGC Loop | 21 |
| 4.9 | DC Restore Loop | 22 |
| 4.9.1 | AGC Shadow Register | 22 |
| 4.9.2 | DC Restore Loop Shadow Register | 24 |
| 4.10 | MR Asymmetry Compensation Loop | 25 |
| 4.10.1 | MR Asymmetry Shadow Register | 25 |
| 4.11 | Self-adaptive FIR Filter Equalizer | 26 |
| 4.12 | FIR Filter Adaptation Loop | 28 |
| 4.13 | Sync-Byte Detection | 28 |
| 4.14 | Sequence Detector | 29 |
| 5 | Write Mode | 30 |
| 5.1 | Scrambler / Descrambler | 30 |
| 5.2 | Encode-Decode | 31 |
| 5.3 | Serializer/Precoder | 31 |

A0-1

Confidential

| | | |
|---|---|---|
| 5.4 | Precompensation | 32 |
| 5.5 | Write Data (PECL) Interface | 33 |
| 6 | Servo Function | 35 |
| 6.1 | Correlator | 35 |
| 6.2 | Preamble Detector or 1's Detect | 36 |
| 6.3 | AGC Block | 37 |
| 6.4 | Unoriented Search Mode | 38 |
| 6.5 | Oriented Search Mode | 39 |
| 6.6 | Head Switch (option 1) | 40 |
| 6.7 | Head Switch (option 2: worst case scenario) | 40 |
| 6.8 | Peak Detector | 40 |
| 6.9 | Address Mark Detect | 41 |
| 6.10 | Gray Code Detector | 42 |
| 6.11 | Reset AMDET Timer | 42 |
| 6.12 | Demodulator (Demod) | 42 |
| 6.13 | Data Transfer | 43 |
| 7 | Common Functions | 44 |
| 7.1 | NRZI Read-Write-Servo Interface | 44 |
| 7.2 | PLL Synthesizer - Clock Generation | 45 |
| 7.2.1 | R/W Clock | 45 |
| 7.2.2 | Servo Clock | 46 |
| 7.2.3 | Setting the PLL R/W and Servo Frequencies: | 48 |
| 7.3 | Serial Register Interface | 48 |
| 8 | System Operation | 50 |
| 8.1 | Read Mode Sequence | 50 |
| 8.1.1 | Control Loop Acquire Sequence | 51 |
| 8.1.2 | Data Read Mode | 52 |
| 8.2 | Write Mode Sequences | 53 |
| 8.2.1 | Normal Write Mode | 53 |
| 8.2.2 | Direct Write Mode | 54 |
| 8.3 | System Timing Constraints | 55 |
| 8.4 | Write Mode to Idle Mode Recovery | 56 |
| 8.5 | Channel Quality Monitor (CQM) | 57 |
| 8.5.1 | The CQM State Machine | 60 |
| 8.5.2 | Mean Squared Error | 63 |
| 8.5.3 | Error Rate Tests | 63 |
| 8.5.3.1 | Sector Error Rate (Zero-Pattern Method) | 63 |
| 8.5.3.2 | Slicer Bit Error Rate | 64 |
| 8.5.3.3 | Viterbi (VA) Bit Error Rate | 64 |
| 8.5.3.4 | Bit Error Rate with ECC | 64 |
| 8.5.4 | Di-bit Measurement | 64 |

Confidential

| | | |
|---|---|---|
| 8.6 | SNR Margining Tests | 65 |
| 8.6.1 | Additive White Noise Test | 65 |
| 8.6.2 | Off-Track Interference Emulator | 65 |
| 8.6.3 | Noise Multiplier Test | 66 |
| 8.6.4 | Arbitrary Waveform Injection | 66 |
| 8.7 | View DAC | 67 |
| 8.8 | Analog Test Port | 68 |
| 8.9 | Multiplexed Test Pin (MTP) | 70 |
| 9 | Register Map | 71 |
| 9.1 | Register Map Index | 72 |
| 9.2 | Register Assignments | |
| 10 | SCA8700 Pin Descriptions | 111 |
| 11 | Electrical Specifications | 115 |
| 11.1 | Absolute Maximum Ratings | 115 |
| 11.2 | DC Characteristics | 116 |
| 11.3 | AC Characteristics | |
| 12 | Package Outline Drawing | 122 |

A0-3

Confidential    Overview

1 Overview

The SCA8700 is a fully integrated Generalized Partial Response Maximum Likelihood (GPRML) read channel incorporating a complete set of functions required for Read, Write and Servo operation. The channel is fabricated in 0.18μm (drawn) Complementary Metal-Oxide Semiconductor (CMOS) technology and can operate at data rates in excess of 700 Mbit/s. The device is compatible for integration with the Infineon microcontroller family.

1.1 Features

- General
  - All CMOS digital preferred design strategy
  - Super-integration compatibility with Infineon controllers
  - 190-750 Mbits/sec data rate operation
  - Generalized Partial Response Maximum Likelihood (GPRML) system
  - 32/34 rate parity code and matched Viterbi detector
  - 32-State Viterbi detector optimal parity trellis processor
  - Robust frame synchronization with support for dual sync byte mode
  - Self adaptive equalization system
  - Thermal asperity detection and compensation
  - Adaptive MR head asymmetry compensation
  - Low latency, digitally interpolated timing recovery method
  - Fully programmable $2^{nd}$ order write precompensation
  - Advanced automatic power management
  - 3.3 V (I/O)(+-10%) 1.8V Core (+-5%) power supply
  - Externally supplied 1.8V or internally regulated 1.8V with external pass transistor
  - 0.18μm all CMOS process

- Data Detection
  - 32/34 rate parity code
  - 32-State Viterbi detector optimal parity trellis processor
  - Generalized targets optimized for improved SNR in high media noise environments
  - Support for four different generalized detection targets for different UBD's and noise
  - Minimal overhead Viterbi shut-down method
  - Viterbi margin stress-testing support
  - On chip stress testing using additive white noise
  - Viterbi error bursts compatible with existing ECC methods
  - The likelihood of false or missed frame synchronization $< 10^{-19}$

A 1

Confidential                                                              Overview

- Programmable time-out and programmable error tolerance on sync byte detection

- Gain Control
  - Input amplitude range of 40 to 400 mV pp differential (1:10)
  - Decision-directed digital acquisition and tracking loops
  - High speed gain acquisition
  - Separate AGC control registers for Read and Servo
  - Fixed VGA gain mode
  - Fast Write mode to Read mode recovery sequence

- Equalization / Signal Conditioning
  - 4-pole generalized anti-aliasing, bandwidth limiting filter with 4 to 1 $\omega_0$ tuning range with adjustable Q enhancement.
  - 10-tap digital FIR filter with adaptive and non-adaptive modes
  - Multiple selectable FIR adaptation methods supported, including "known-data" mode

- Timing Recovery
  - All digital, interpolated timing recovery method
  - Low latency timing control loop
  - Timing acquisition in 10 bytes in two phases
  - Zero-phase restart
  - Robust frame synchronization with support for dual sync byte operation

- Frequency Synthesizer - Clock Generation
  - Two PLL design; R/W PLL and Servo PLL
  - Very low absolute jitter, < 15 ps (standard deviation) at 750 Mhz
  - Fast settling time of 10 µs for rapid recovery when switching modes

- Thermal Asperity Detect/Correction
  - Selectable internal or external T/A detection
  - Programmable progressive T/A event squelch and recovery sequences
  - Dual sync field option for recovery from thermal asperities

- MR Asymmetry
  - MR asymmetry correction adaptive or fixed to ±30% [(a-b)/(a+b)]

- DC Baseline Control/Restore
  - Auto-zero when Idle mode
  - Active DC control to null offset during preamble and data

A 2

Confidential                                                                 Overview

- Write Mode
  - High resolution programmable 1- or 2-level Write mode precomp with .78125% increments to 37.5% of the clock window
  - Differential low-skew output driver to R/W amplifier
  - Low time base jitter with < 5 ps (standard deviation)
- Read Mode
  - Self-adaptive compensation of MR head amplitude asymmetry
  - Self-adaptive equalization
  - Self-adaptive baseline restore
  - On chip programmable stress; noise generator, Viterbi error multiplier, and off-track emulation allow easy channel setup
  - Pipelined Read mode data transfer feature
- Servo
  - Seagate Asynchronous Digital Servo
- Channel Quality Monitor
  - Mean Squared Error, Sample Window Accumulate, and Histogram profiling measurements with "known-data" mode for robust optimization and HDD self calibration
  - Selectable trigger modes with programmable data acquisition-time window
  - Surface defect scan with programmable positive and negative threshold
  - Automatic precomp echo pulse extraction (di-bit extraction)
  - Micro "self"-calibration of anti-aliasing filter bandwidth and boost
  - On-board sector error rate measurement
- Power
  - Low power dissipation < 1.5 W with 80% duty cycle @ 700 Mb/s
  - 1.8 V (Core)(+-5%), 3.3 V (I/O)(+-10%) supply
  - Externally supplied 1.8V or internally regulated 1.8V with external pass transistor
  - Extensive optimized power management
- Signal Observability
  - Analog Test Port that may be programmed to connect to analog nodes in the signal path
  - View DAC that may be programmed to connect to several signals including FIR out, timing error, gain error.
  - Multiplexed test output that can be programmed to "sync-byte found"
  - Simultaneous analog read signal and digital eye-pattern outputs are provided

Confidential            Channel Architecture

2 Channel Architecture

2.1 Modulation Code

The modulation code used in the SCA8700 is a rate 32/34 block code. All 34-bit codewords satisfy a "Charge modulo 2" (Qmod2) parity constraint. The code achieves about 1dB net coding gain by forcing the charge in each codeword to be even. As a consequence of this parity constraint, all error sequences with odd parity are eliminated. This includes: di-bit drop-in and drop-outs (0,+1,0), tri-bit related errors (+1,-1,+1), penta-bit related errors (+1,-1,+1,-1,+1), etc. The (Qmod2 constraint offers more immunity to errors than uncoded or maximum transition run (MTR) codes under normal operating environments.

The SCA8700 modulation code is also designed to achieve good worst-case timing information, maximizing the minimum timing information content in any codeword. Each 34 bit codeword has at least a minimum of 7 timing units of information.

For ECC compatibility, minimum-distance error events on the coded trellis are limited to cause errors in no more than 4 decoded user bytes. Thus, best system performance is achieved using an outer error correcting code with 8-bit symbols, GF(256), and with greater than or equal to 4-way interleave. The code properties are summarized in Table 1.

Table 1    Code Properties

| Rate | Parity | Minimum # Timing Units per Codeword | Max # Consec 0's | Max Burst Length |
|---|---|---|---|---|
| 32/34 | Even | 7 | 17 | 4 bytes |

2.2 Trellis Coded Noise Prediction Viterbi Algorithm

The sequence detector is implemented using a 32-state Viterbi detector that is the product of a 16-state Noise Predictive Inter-Symbol Interference (NP ISI) Viterbi algorithm and a 2-state time-varying charge parity trellis. The 32-state product trellis is pruned back to 16-states at every 34th bit-cycle to enforce the charge parity constraint at the block boundary. This implementation of the parity code is an optimal maximum likelihood solution, and has none of the sub-optimal characteristics of competing "post-processor" solutions, e.g., failure at block boundaries, sensitivity to changing error event structure, etc.

In order to provide good performance across a wide range of user operating conditions, the SCA8700 allows the user to choose from four different noise-predictive Viterbi algorithms.

- *Noise Predictive (3,2,1)* is best suited for applications with low to moderate user densities. It performs well in these areas even with high media noise.

- *Noise Predictive (2,2,1)* is best suited for applications with moderate media noise and moderate to high user densities.

- *Noise Predictive (3,1,1)* is best suited for applications with low to moderate user density and very high media noise.

- *EPR4* is included as a legacy mode, and performs close to Noise Predictive (3,2,1) in most environments.

2.3 Performance

The performance of the SCA8700 code and four noise predictive detector choices are illustrated for two realistic operating scenarios in Figure 1 and Figure 2. An uncoded EPR4 code and detector are included for historical comparison purposes. All measurements use the Error Event Rate (EER) rather than the Bit Error Rate (BER), because EER directly impacts the sector error rate after ECC, while the BER doesn't always correlate well with the sector error rate.

Figure 1 shows a realistic operating environment for a future drive with very high Tracks Per Inch (TPI), as is expected to occur with the introduction of two stage radial positioning systems. The user density is low to moderate, Du=2.5, and the media noise is high, 50% of the total noise. The SNR is defined as the ratio of signal to total noise powers at the preamp output, measured with random uncoded data. All signal and noise powers are measured in the Nyquist bandwidth of the coded-channel rate. The results show a 1 dB coding gain from the Cmod2 code, and an additional 0.5 dB improvement with NP(3,2,1).

Figure 2 demonstrates a possible operating environment where the TPI is not as high as shown in Figure 1, e.g., due to cost or manufacturing problems with two-stage actuator and high TPI systems. In this scenario, on track SNR is high and supports high user density, Du=3.1, with 25% media noise power. In this example the read gap is two times the channel bit cell length. The results show a 3 dB gain for NP(1,2,1) and 2.5 dB gain for NP(2,2,1).

This figure also illustrates that EPR4 and NP(3,2,1) are not appropriate detectors for this high UBD application.

Confidential    Channel Architecture
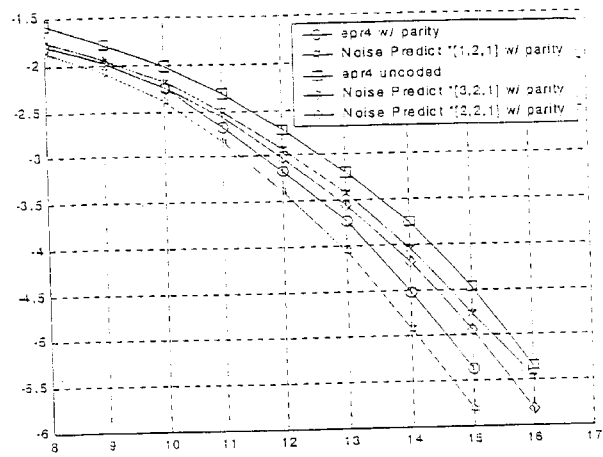
Figure 1    QMod2 Trellis Detectors At 2.5 Ubd in 50% Media Noise
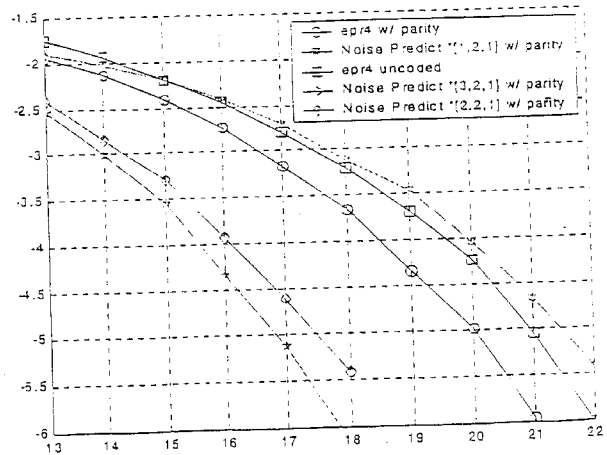
Figure 2    Qmod2 Trellis Detectors At 3.0 Ubd in 25% Media Noise

2.4 Block Diagram
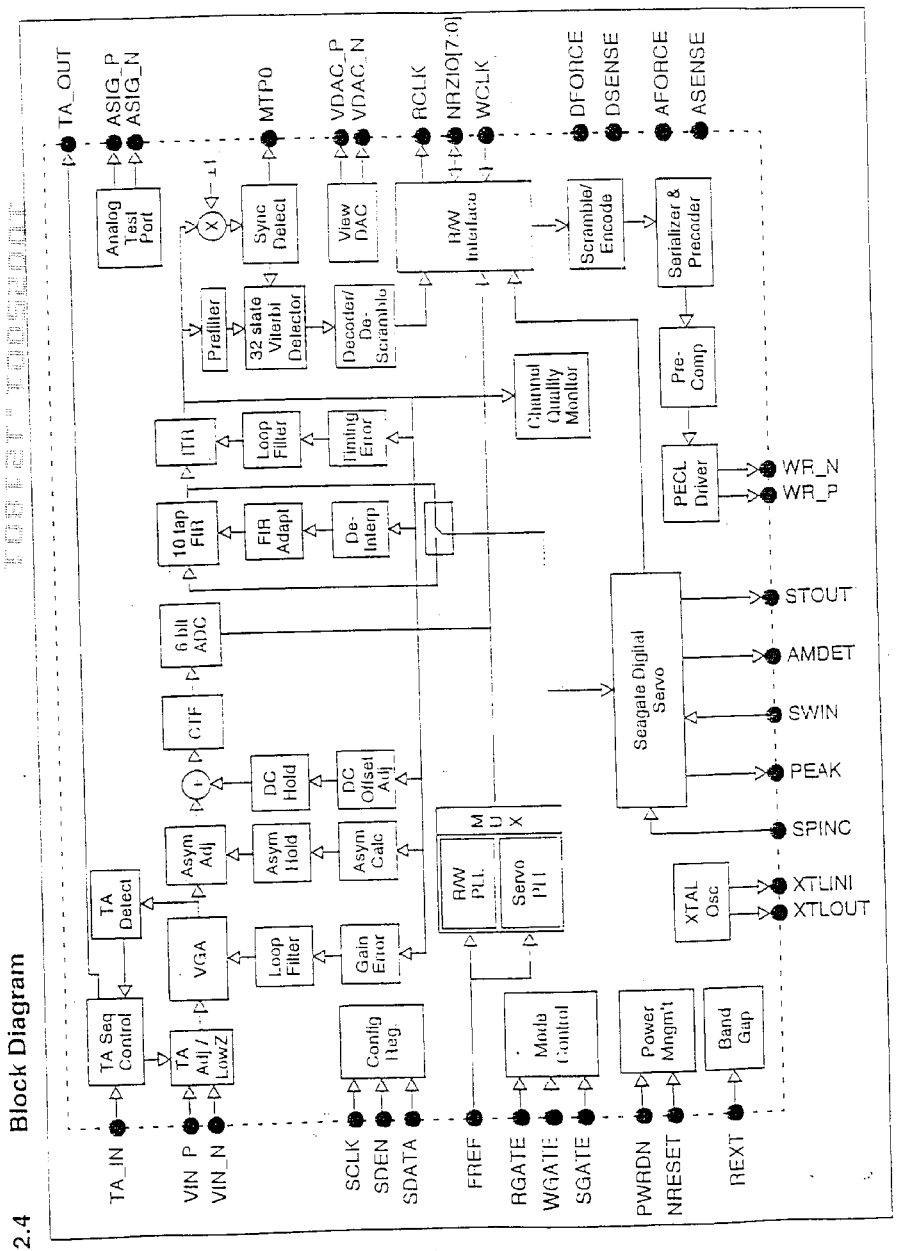

Confidential                                            Operating Mode Definition

3 Operating Mode Definition

The operating modes of the SCA8700 are determined by the state of five pins: RGATE (Read Gate), WGATE (Write Gate), SGATE (Servo Gate), PWRDN (Power Down), NRESET (Not Reset), as well as the two registers, 04<2>, and 04<1>. The operating modes are shown in Table 2, and the state diagram is described by Figure 3.

Table 2   Mode Control

| MODE | Pins | | | | | Reg Bits | |
|---|---|---|---|---|---|---|---|
| | RGATE | WGATE | SGATE | PWRDN | NRESET | 04<1> | 04<2> |
| Read mode | 1 | X | 0 | 0 | 1 | X | 0 |
| Write mode | 0 | 1 | 0 | 0 | 1 | X | 0 |
| Servo mode | X | X | 1 | 0 | 1 | 0 | 0 |
| Write/Servo mode | 0 | 1 | 1 | 0 | 1 | 1 | 0 |
| Idle mode | 0 | 0 | 0 | 0 | 1 | X | 0 |
| Doze mode | 0 | 0 | 0 | 1 | 1 | X | 0 |
| Suspend | X | X | X | X | 1 | X | 1 |
| | X | X | X | X | 0 | X | X |

3.1 Read Mode

When RGATE is asserted, the timing synchronization and gain acquisition operations start. Timing acquisition occurs in a series of phases. The process begins with zero-phase restart, followed by fast acquire and data-tracking phases. Concurrent with timing acquisition, an automatic gain loop adjusts the readback signal amplitude to a target value. Gain acquisition is also comprised of fast and slow acquire phases. While reading data, additional control loops compensate for MR head asymmetry and DC offset.

After the timing and gain acquisition phases are complete, the SCA8700 searches the readback data for a unique sync-byte that marks the beginning of valid user data. When the sync-byte is detected, user readback data is processed and detected data is placed on the R/W (NRZIO) interface.

3.2 Write Mode

In Write mode, all circuitry in the write path is enabled and write data is clocked from the controller to the channel NRZIO interface. Write data is synchronized, encoded, serialized, precoded and precompensated before being sent to the write preamp via a PECL interface.

Confidential | Operating Mode Definition

3.2.1 Normal Write

A normal Write operation begins when WGATE is asserted and the controller clocks a 00h (hex) byte to the NRZIO interface. The device output is a 2T preamble pattern until the data marker, a FFh byte, is received from the controller. At this point, the device inserts a unique sync-byte into the output data stream, which replaces the received FFh byte. Subsequent data transferred from the controller is scrambled, encoded and then transferred to the PECL interface as encoded user data.

3.2.2 Known Data Write

A variation of a normal Write operation is known-data Write. When 20<3> is set to 1, the device write output is a sector of internally generated data. The operation begins when WGATE is asserted and the controller clocks a 00h (hex) byte to the NRZIO interface. The device writes a 2T preamble pattern until the data marker, a FFh byte, is received from the controller. At this point, the device inserts a unique sync-byte into the output data stream, which replaces the received FFh byte, followed by write data consisting of an internally generated repeating pseudo-random binary sequence (PRBS), the output of a linear feedback shift register (LFSR) circuit. Subsequent user data transferred from the controller to the NRZIO interface is ignored for the duration of the write cycle.

3.3 Write Mode During Servo Mode

The activation of Read mode, Write mode, and Servo modes are governed by a set of precedence rules as outlined in Table 2. Write mode usually has the lowest precedence and can be overridden by Read mode or Servo modes. However, when register 04<1>= 1, Write mode may also occur during Servo mode. Both Servo and Write mode may take place simultaneously. Servo mode must be active before the device will enter Write/Servo mode.

3.4 Servo Mode

During Servo mode, the VGA and AGC loops, as well as the CTF, ADC, and FIR filter sections of the read path, are active and are programmed to a unique set of servo register values. The equalized and conditioned sample values are sent to a servo synchronizer that functions to determine time intervals needed for digital based asynchronous peak detection. Asynchronous peak detection is used to determine the peak position required to demodulate the Gray code. A and B servo bursts are digitally integrated to produce burst area estimates that are transferred to the disk controller via the NRZIO interface.

Confidential          Operating Mode Definition

3.5 Idle Mode

Idle mode is defined as the absence of Read mode, Write mode and Servo mode activity. All analog circuitry and frequency synthesizers are enabled, and the analog to digital converter (ADC) and DC Restore are active.

3.6 Doze Mode

In Doze mode all nonessential circuitry is disabled. Register bits 98<1:0> and 98<1:0> determine if the synthesizers are enabled. Upon transition from Doze mode to Idle mode, a start-up time is required to allow the frequency synthesizers and analog circuitry to stabilize. The timing rules are defined in Table 3.

3.7 Suspend Mode

Suspend mode turns off all channel read/write activity. The configuration registers retain their settings and determine the initial state after NRESET = 0.

Confidential                                      Operating Mode Definition

3.8 Operating Modes

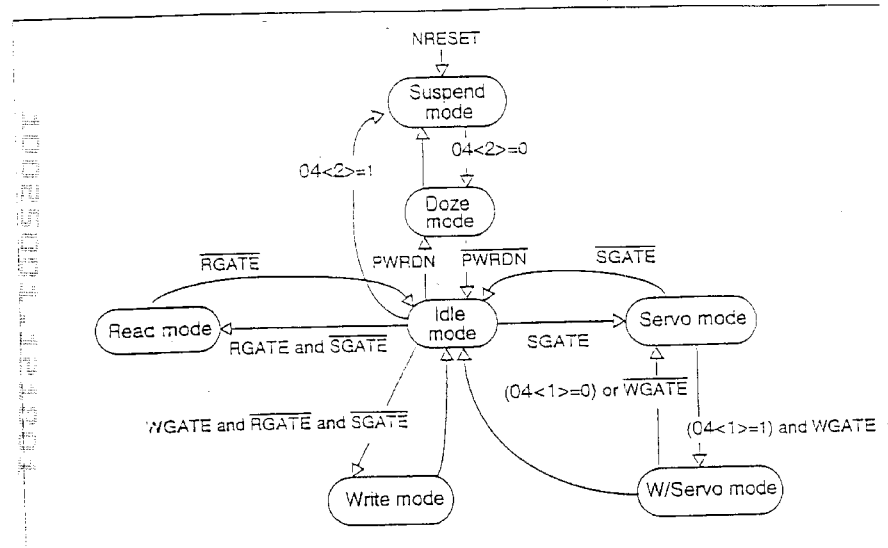

Figure 3    Operating modes

Table 3    Mode Timing Rules

| Parameter | Time | Description |
|---|---|---|
| Tr/r | 24 PLL Clocks | Contiguous Read mode to Read mode |
| Ts/d | 500 ms | Suspend to Doze mode |
| Td/i | 100 μs | Doze mode to Idle mode |
| Ti/s | 24 PLL Clocks | Idle mode to Servo mode |
| Ts/i | 24 PLL Clocks | Servo mode to Idle mode |
| Tr/i | 24 PLL Clocks | Read mode to Idle mode |

3.9 Power Management

The device is divided into functional partitions that may be powered-on or powered-off based on which operating mode is active. Refer to Table 4 where 1 is Powered-on, and 0 is Powered-off:

Confidential　　　　　　　　　　　　　　　　　　　　Operating Mode Definition
Table 4　Power Modes
| MODES | Band gap | Synth | Analog FE | Servo | ADC | FiR | ITR/ Viterbi | Read I/F | Write I/F |
|---|---|---|---|---|---|---|---|---|---|
| Read mode | 1 | 1 | 1 | 0 | 1 | - | 1 | 1 | 0 |
| Write mode | 1 | 1 | 0 | 0 | 0 | 0 | 0 | 0 | 1 |
| Servo mode | 1 | 1 | 1 | 1 | 1 | - | 0 | 0 | 0 |
| Idle mode | 1 | 1 | 1 | 0 | 1 | 0 | 0 | 0 | 0 |
| Doze mode | 1 | 0 | 0 | 0 | 0 | 0 | 0 | 0 | 0 |
| Suspend mode | 0 | 0 | 0 | 0 | 0 | 0 | 0 | 0 | 0 |
A 12

Confidential Read Mode

4  Read Mode

The following sections are arranged in the order of the signal flow from the VGA through to the NRZIO interface. According to this rule, the descriptions of VGA, MR asymmetry and DC restore compensation circuits precede the descriptions of their respective control loop structures.

4.1  Variable Gain Amplifier (VGA)

The differential signal from the preamplifier is transferred to the SCA8700 VGA through the VIN_P and VIN_N pins. External capacitors are required to couple the preamplifier signal to the VGA. The VGA inputs are internally biased so that external DC biasing components are not required. The normal operating signal input level at pins VIN_P and VIN_N is 40-400 mV peak-to-peak differential.

An internal 8-bit DAC, that is adjusted by the Automatic Gain Control (AGC) loop controls the gain of the VGA. The initial gain for read and servo operations are programmed as 2s-complement numbers in registers 7A<7:0> and 7B<7:0>, respectively. The VGA control range is from 0 dB to 20 dB.

Impedance switches, in series and in parallel with the inputs of the VGA, are shown in Figure 4. These switches allow reduced recovery time from transients that occur during write sequences and thermal asperity events. During a normal Read mode operation, the series switches are closed and the shunt switch is opened, setting the input impedance to 250-2000 Ohms.

When the impedance switches are used to compensate a thermal asperity event, the AC coupling pole frequency is increased by adjusting ZADJ to reduce the input impedance. The input impedance is varied dynamically over time as shown in Figure 7.

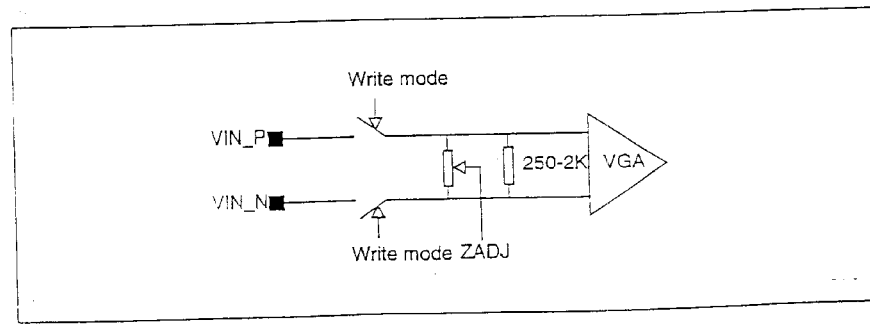

Figure 4  Input Impedance Switches

During Write mode, the switches in series with the VGA inputs are opened, providing a high input impedance. Simultaneously, the shunt input resistance is reduced. A more

Confidential                                                     Read Mode detailed explanation of the use of impedance switching used for Write mode to idle mode recovery can be found in Section 8.4.

4.2 MR Asymmetry Compensation and DC Restore

The MR head asymmetry compensation system is shown in Figure 5:

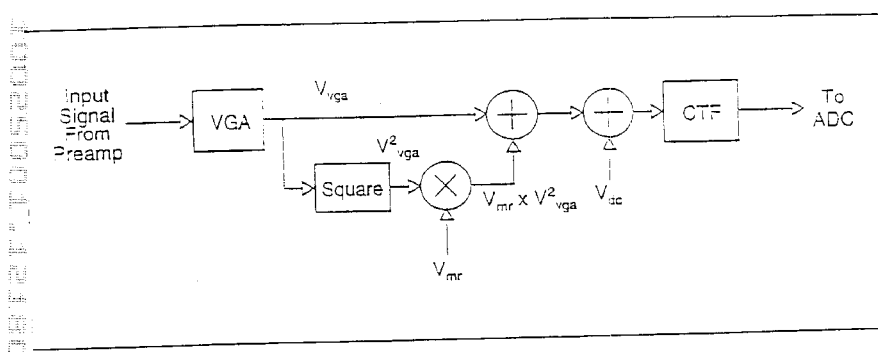

Figure 5    MR Asymmetry Compensation

The output of the VGA is squared and multiplied by the scaling factor $V_{mr}$ and then added to itself. This combination provides a nonlinear transfer function from the VGA to the input of the CTF in a form that may be adjusted to compensate for second harmonic distortion created by the MR head. $V_{mr}$ adjusts the magnitude of compensation. The value of $V_{mr}$ is automatically determined by an MR asymmetry compensation loop as described in Section 4.9.

An adder function following the compensation circuit is used to nullify the accumulated DC offset in the analog signal path. A voltage, $V_{dc}$, derived from a DC restore control loop, is added to the signal to cancel the DC value of the signal into the CTF and ADC. The control loop is implemented in the digital domain and is described in Section 4.8.

4.3 Thermal Asperity (TA) Detection and Compensation

The overall objective of the TA compensation circuit is to reduce overload and decrease recovery time during a TA event. Ideally, the bit length of the compensated error burst will be reduced so that ECC correction is possible.

The SCA8700 incorporates TA detection and correction circuitry to reduce the effects of distortion caused when the MR head encounters a TA on the disk. The block diagram of the TA detect circuitry appears in Figure 6. The TA detect block is comprised of a low-pass filter coupled to a threshold detector. The amplitude-normalized signal from the output of the VGA is sent through the TA detect low-pass filter and then applied to the threshold detector. The threshold level is independently programmable for Read mode

A 14

Confidential                                                    Read Mode and Servo modes by using registers 89<3:0> and 89<7:4> respectively. A TA event is defined to have occurred when the low-pass filter output exceeds the threshold value for the time set by register 88<5:4>.

When a TA event is detected, the TA_OUT pin is asserted. In addition, an internal compensation sequence is initiated that changes the input high-pass pole frequency at the VGA input as described in Figure 7. The input time-constant decays exponentially over a time period, set by $T_T$, to the initial nominal value. The gain of the DC restore loop is also increased to allow for faster baseline recovery. Timing, gain and FIR adaptation loops are put in hold mode for the duration of the TA event. In addition, the MR asymmetry loop is put in hold mode until the end of the RGATE. External or internal TA detection may be selected by register 88<7>. Relevant user programmable parameters are shown in Table 5, and details of the operation of the TA compensation circuit are shown in Figure 6 and Figure 7.

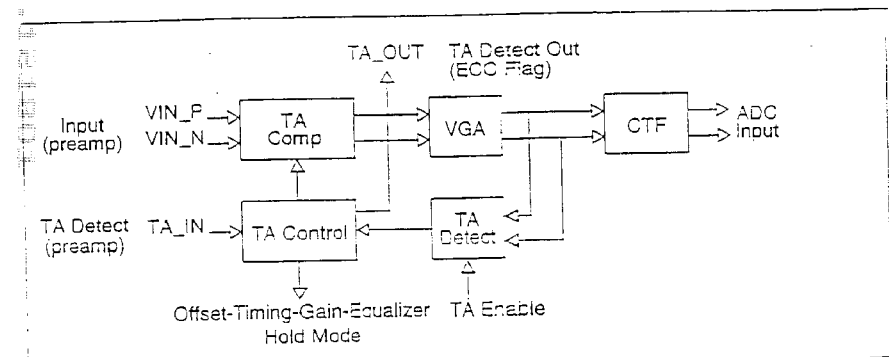

Figure 6    Thermal Asperity Detection And Correction

Table 5    TA Compensation Registers

| Parameter | Range | Default | Register |
|---|---|---|---|
| Detection enable | N/A | Disabled=1 | 88<1> |
| TA detection threshold (Read mode) | 0 - 15 | 0 | 89<3:0> |
| TA detection threshold (Servo mode) | 0 -15 | 0 | 89<7:4> |
| TA low-pass bandwidth | 5.5-10 MHz | 10 MHz | 88<3:2> |
| Duration of timing and gain loop hold | 6 bytes | | Fixed |
| $R_o$ values | 12, 5 | 12 | 8A<2> |
| $T_L$ | 1-4 bytes | | 8A<4:3> |
| $T_T$ | 100-1600 ns | 400 ns | 8A<6:5> |

A 15

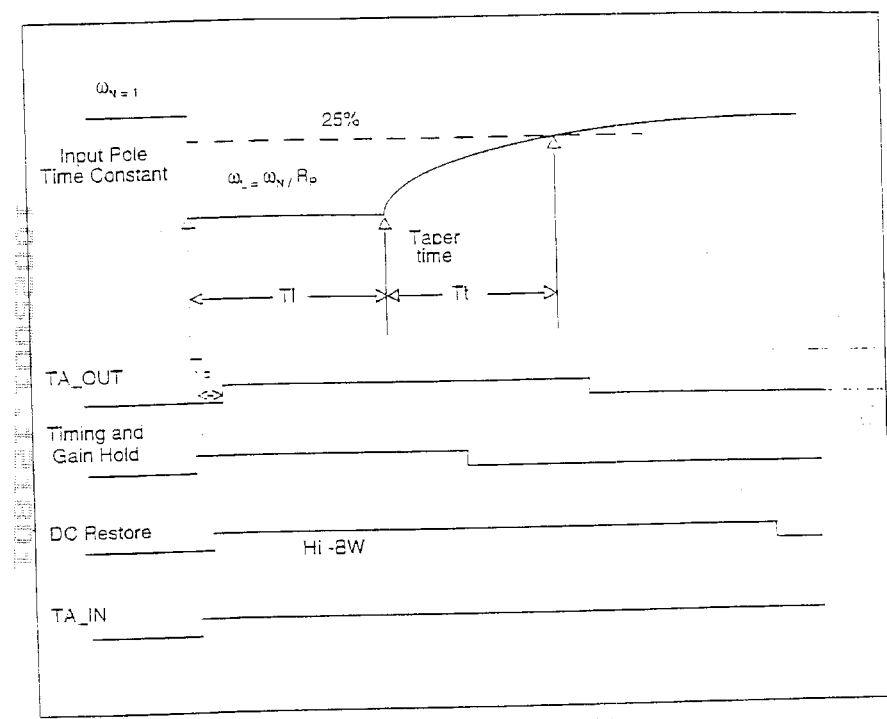

Figure 7    Thermal Asperity Compensation Algorithm

4.4    Continuous Time Filter (CTF)

San Miguel uses a 4-pole continuous time low pass analog filter to truncate the noise bandwidth input to the analog to digital converter (ADC). The low pass characteristic also prevents aliased frequency components beyond the Nyquist frequency from falling in the pass band.

The frequency response of the filter does not correspond to a standard polynomial. The filter itself consists of a cascade of two second order s-domain transfer functions, given below:

$$H(s) = \frac{1}{(s^2 + (\omega_{01}/Q1)s + 1)(s^2 + (\omega_{02}/Q2)s + 1)} \qquad (1)$$

The $\omega_0$ (pole-pair frequency) and Q (pole-pair quality factor) of each biquad are independently adjustable. $\omega_0$ is programmable from $2\pi \times 87.5$ Mrad/s to $2\pi \times$

Confidential                                                                 Read Mode 350Mrad/s (4:1 ratio). The Q for each Biquad is independently programmable in the range 0.6 to 1.6. Figure 8 and Figure 9 below are the frequency response and the phase response for the cases where Q1 is set to 1 and Q2 is set 1.6; $\omega_o$ for both is set 1 rad/s. The standard 4 pole Butterworth response is also shown for comparison. As can be seen, up to 10dB boost can obtained in the pass band of the filter, when both Q's are set to 1.6.

The highest pole frequency is equal to 43% of 750Mb/s data rate (32/34 coding is assumed). $\omega_o$ for each biquad is programmable in 2% steps (0.18dB) within the allowed range of 87.5 to 350 Mhz. The step size variation is in the range of 1.75Mhz to 7Mhz (2% of lowest and highest settings). Q has 7 linear steps in the range 1 to 1.6

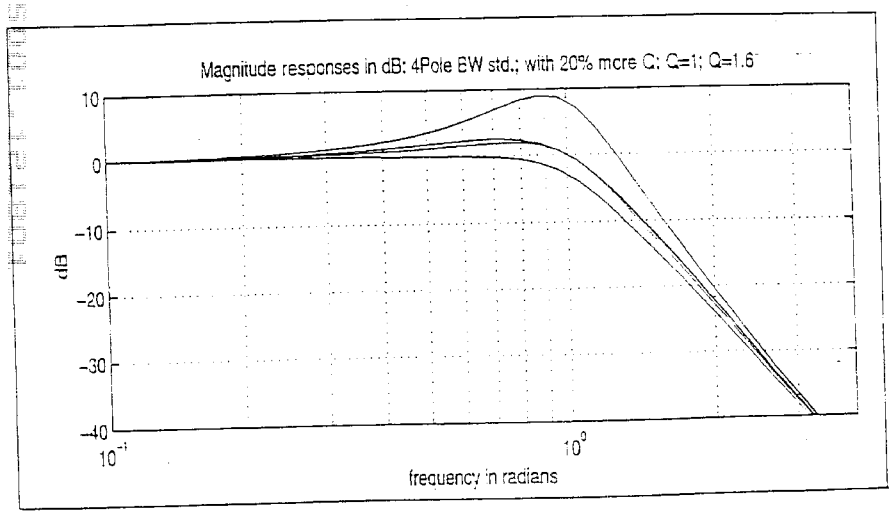

Figure 8    CTF Frequency Response

Confidential    Read Mode

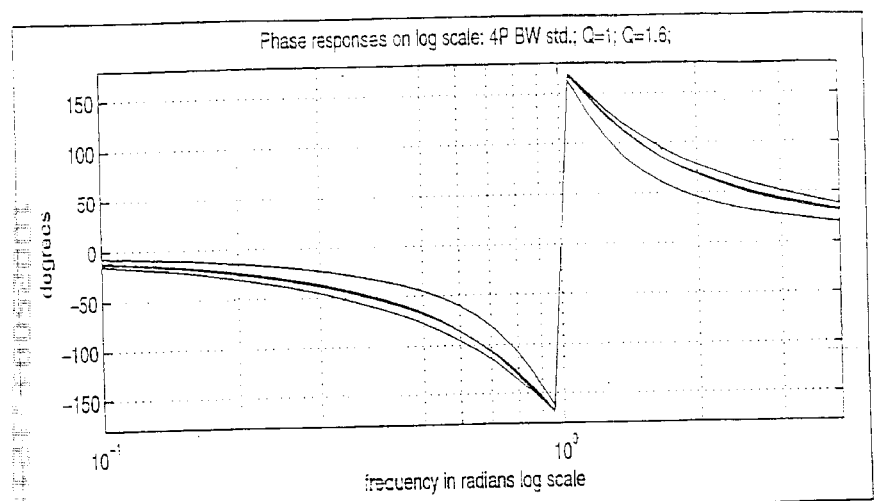

Figure 9    CTF Phase Response

4.5    Analog-to-Digital Converter (ADC)

The SCA8700 uses a 6-bit, background calibrated, flash ADC. The use of an interpolated timing recovery architecture allows more channel latency. The latency may be exploited to optimize speed, power and performance in the design of the ADC.

4.6    Timing Acquisition Loop

The SCA8700 uses a digital interpolated timing recovery (ITR) method to resample readback waveform samples at the proper time instances required for sequence detection. Figure 10 shows the phase-locked loop structure that is used to synchronize to the phase and frequency of the incoming readback bit stream. The equalized and oversampled data values from the ADC are interpolated using a 8-tap digital FIR interpolation filter. With this technique, the sample phase is represented as a binary

Confidential             Read Mode number, $\mu_k$, $m_k$, which is the input to the interpolation filter.

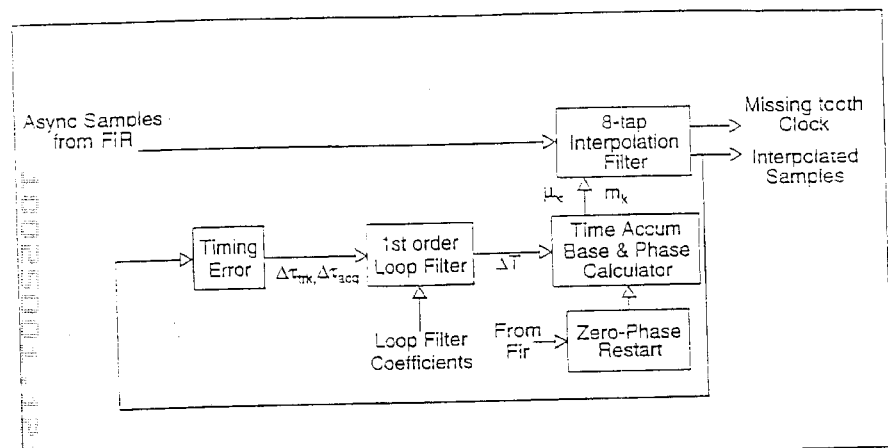

Figure 10    Timing Control Subsystem

The "Timing Error" block processes interpolated samples to produce the timing corrections, $\Delta\tau_{trk}$, and $\Delta\tau_{acq}$, that are used for tracking and acquisition modes respectively. The errors are filtered by a digital pole-zero filter combination to produce the estimated error in interpolation sample time, $\Delta T$. The "Time Accum" block translates $\Delta T$ into two signals: $\mu_k$, the resample phase within a clock cycle, and $m_k$, which acts as a not-strobe to indicate when a clock period does not contain a resample. When $m_k$ is asserted, the ITR output for the corresponding clock cycle is ignored for all downstream processing. The 8-tap filter estimates the sample value between the asynchronous samples to produce time-normalized interpolated sample values. Since the device uses a 6.67% oversampling ratio, approximately every 16th clock cycle is not used.

The timing loop filter is synthesized in the digital domain. A block diagram of the 1st order digital loop filter is described in Figure 11:

Confidential                                              Read Mode

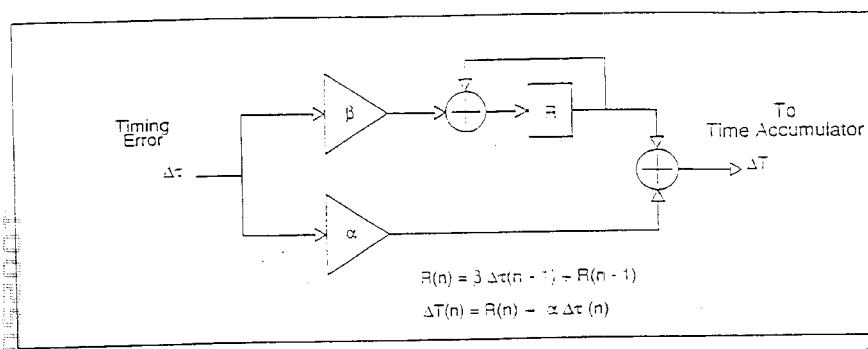

Figure 11    Timing Loop Filter

The timing loop filter output consists of the sum of a digital integrator, representing a pole, and a proportional term, representing a zero. The contributions of the pole and zero are dynamically changed during the lock-on sequence by varying $\alpha$ and $\beta$ to minimize phase and frequency capture time. The upper path, containing integrating register R, stores the resampled frequency setting while the lower path causes phase adjustments that are required for loop stability and for reduction of peak phase errors.

The timing algorithm proceeds through three distinct modes: a "zero-phase" mode, where the resampling phase is set to a predetermined value with respect to the average phase of the preamble, a second "fast-acquire" mode, where the frequency of the loop is adjusted, and a third and final "data-tracking" mode, where the timing loop is phase and frequency locked and the timing corrections are derived by averaging over many bits. This is sometimes called the three gear system.

The three timing mode intervals are shown pictorially in Figure 12:

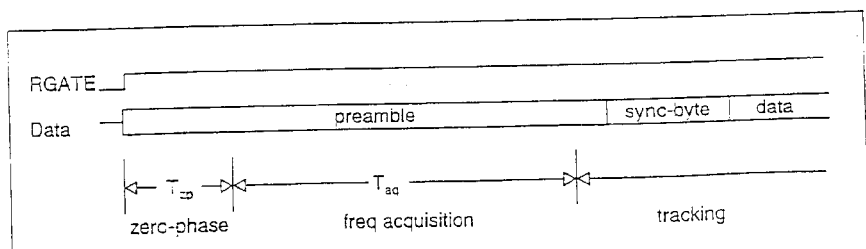

Figure 12    Timing Acquisition

Confidential                                                    Read Mode

4.7 Gain Acquisition, AGC Loop

The AGC loop sets the overall voltage gain of the read path so that the output amplitude of the ADC is independent of channel input voltage variations. The function of the AGC loop is to provide a normalized signal amplitude input for the Viterbi detector. The AGC also functions to constrain the signal voltage to be within the dynamic range of the ADC.

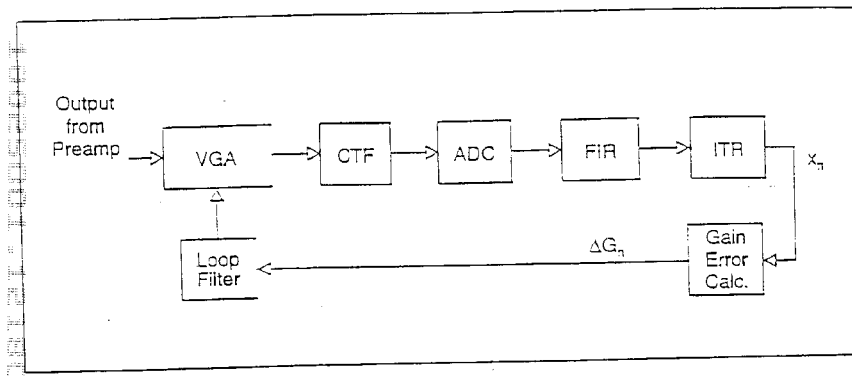

Figure 13   AGC Loop

Gain corrections, $\Delta G_n$, are derived from interpolator output samples, $x_n$, as shown in Figure 13. During fast-acquire mode, the AGC loop gain is increased, and only non-zero sample estimates are used.

Gain errors are integrated using the digital loop filter as shown in Figure 14. The gain register, R, accumulates gain error terms until the control voltage to the VGA stage $V_{AGC}$, is set to the value that makes the amplitude input to the Viterbi detector equal to the target number.

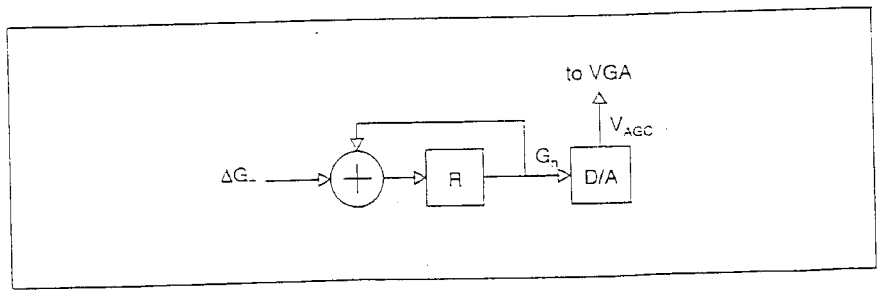

Figure 14   AGC Loop Filter

Confidential  Read Mode

4.8 DC Restore Loop

Accumulated DC offset in the analog signal path is cancelled by means of a DC restore control loop. The method is described in Figure 15. DC offset is measured only during the data field.

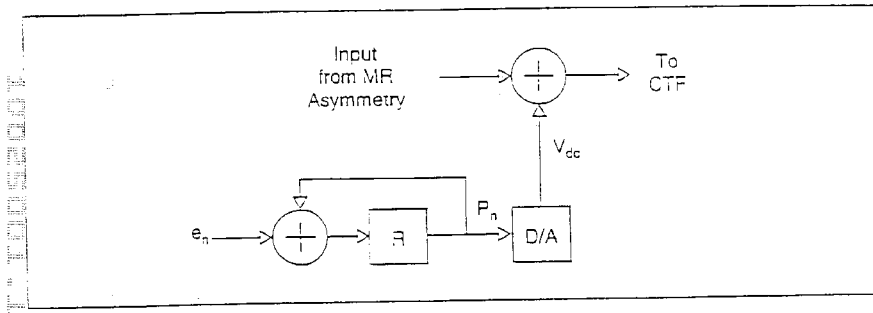

Figure 15  DC Restore Loop

At each bit clock cycle, an error term, $e_n$, is calculated and added to an accumulator which is coupled to a DAC. In turn, the DAC output adds a correcting voltage to the analog signal path before the CTF. In this manner, the control loop functions to nullify DC offset as measured at the ITR output.

4.8.1 AGC Shadow Register

The initialization of the register R used in the AGC is accomplished by means a corresponding shadow register. This concept is illustrated in Figure 16.

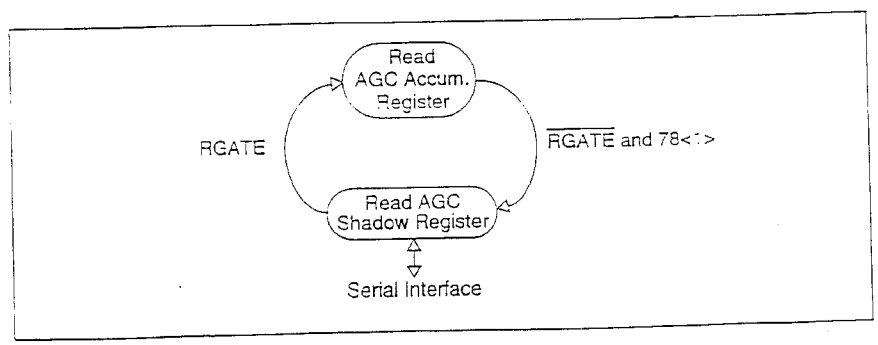

Figure 16  AGC Shadow Register - Read Mode

Shadow register operation is as follows: The AGC accumulator, R is always loaded with the contents of the AGC shadow register when RGATE is asserted. The shadow register

Confidential                                                              Read Mode can be loaded or read back by means of the serial interface. Alternately, when 78<1> is set, the shadow register is used to save the contents of the AGC accumulator at the de-assertion of RGATE. Refer to Figure 45.

Typically the shadow register is loaded with a "best guess" initial gain setting through the serial interface. Successive read cycles are performed with 78<1> set to 1, so that a new initial gain setting is saved after each sector. When the gain setting has converged and is no longer changing, the new value is saved and used as the initial gain setting for non-feedback AGC modes, when 78<1> is set to 0.

During Servo mode, a separate accumulation register and shadow register are used to control the AGC. If register bit 78<0>=1 the servo AGC accumulator is updated from the shadow register when SGATE is asserted. If 78<0>=0 the servo AGC accumulator is updated with the value of the read AGC accumulator that has been derived from a previous read operation. The concept is illustrated in Figure 17.

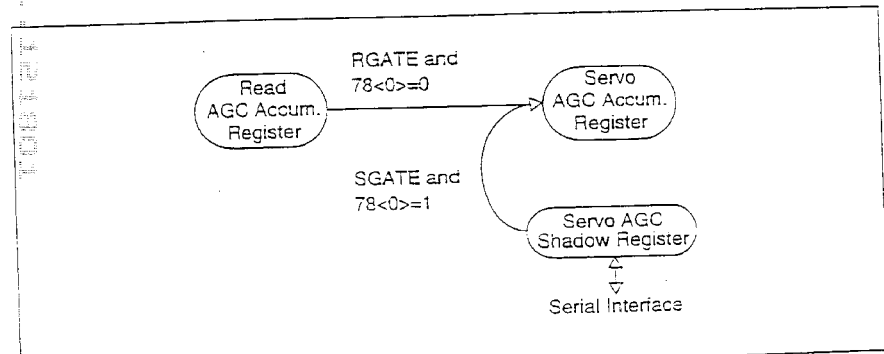

Figure 17   AGC Shadow Register - Servo Mode

Confidential                                                     Read Mode

4.8.2 DC Restore Loop Shadow Register

The initialization of the register R used in the DC restore (DCR) loop is accomplished by means of a corresponding shadow register. This concept is illustrated in Figure 18.

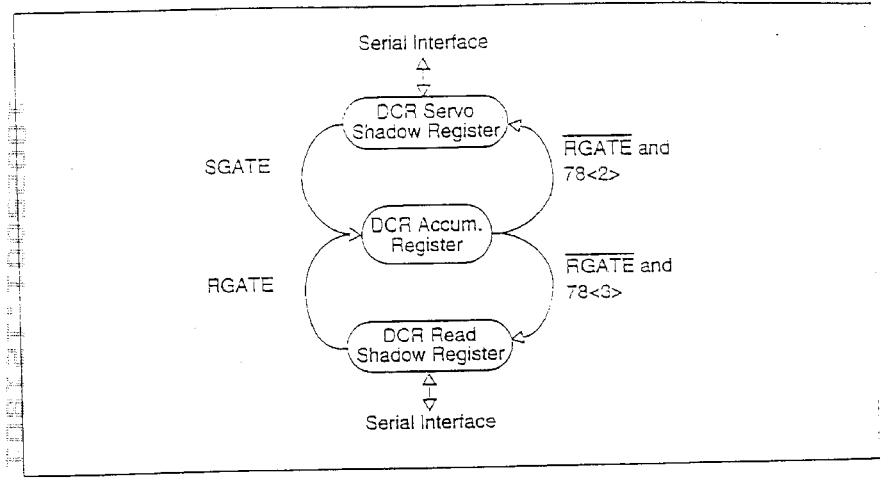

Figure 18    DC Restore Shadow Register

The DCR accumulator, R, is always loaded with the contents of the read AGC shadow register when RGATE is asserted. The shadow register can be loaded or read-back by means of the serial interface. When 78<3> is set, the read shadow register is used to save the contents of the AGC accumulator at the de-assertion of RGATE.

The DCR accumulator, R, is always loaded with the contents of the servo shadow register when SGATE is asserted. However, the operation of this register is different than in read, since the DC restore loop does not adapt during servo. The DCR servo shadow register is initialized either by the serial interface, or if register 78<2> is set, then it is loaded with the results of a previous read operation.

Confidential                                              Read Mode

4.9 MR Asymmetry Compensation Loop

The MR asymmetry compensation loop operates only during the user data portion of the sector in Read mode. The compensation loop architecture is shown in Figure 19:

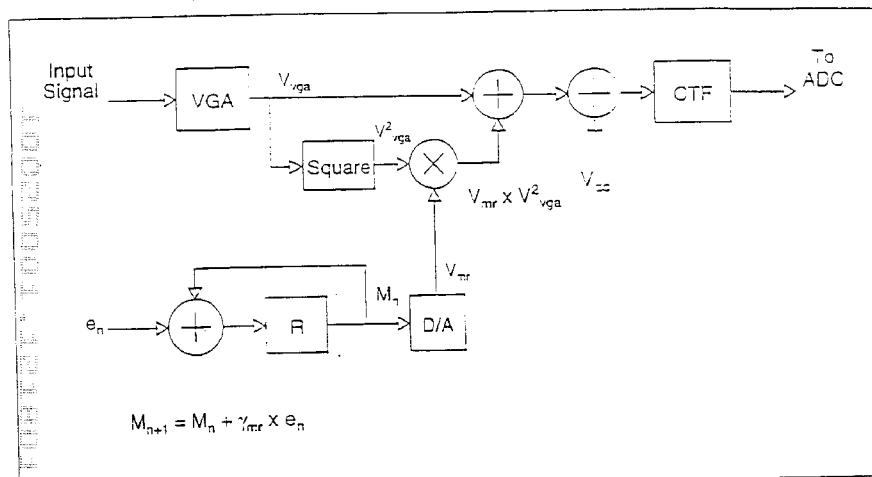

Figure 19    MR Asymmetry Compensation Loop

An asymmetry error term, $e_n$, derived from three consecutive sample values of the data, is added to the MR asymmetry accumulator R that accumulates to a value $M_n$. The accumulator drives a DAC, producing an output, $V_{mr}$, that is used to vary the value of $V^2_{vga}$, a signal proportional to the square of the analog output of the VGA. The output of the MR asymmetry compensation circuit becomes $(V_{vga} + V_{mr} \times V^2_{vga})$. The feedback loop adjusts the amplitude of $(V_{mr} \times V^2_{vga})$ to a value that will compensate for the 2nd harmonic distortion produced by the MR head nonlinear transfer function. The loop gain, $\gamma_{mr}$, has only one setting.

4.9.1 MR Asymmetry Shadow Register

The accumulation register R, which is used in the MR asymmetry (MRA) correction loop, is initialized by means of a shadow register as shown in Figure 20. Use and operation of the MR shadow register is identical to that of the DC restore shadow register. Use of the Confidential                                           Read Mode MRA shadow register is illustrated in Figure 20.

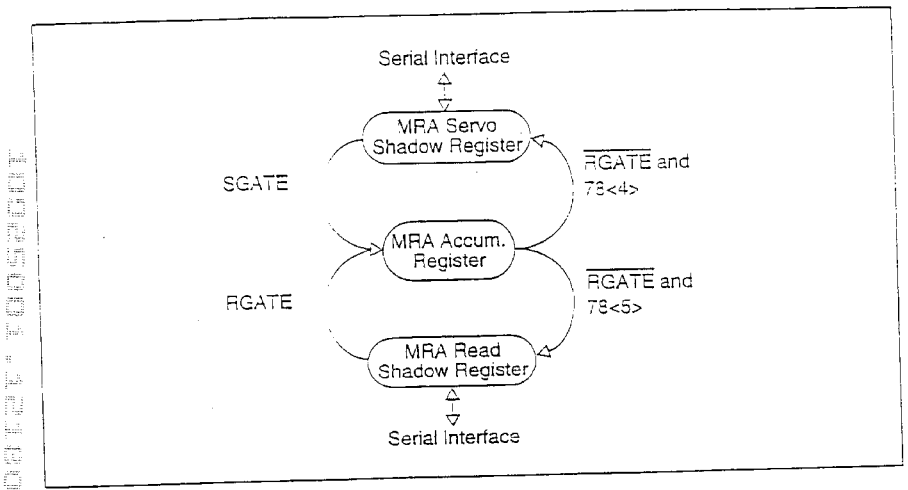

Figure 20    MR Asymmetry Shadow Register

4.10   Self-adaptive FIR Filter Equalizer

A 10-tap Finite Impulse Response Filter (FIR) is used to complete the equalization of the digitized signal to the EPRML target waveform. The topology of the filter is shown in Figure 21.

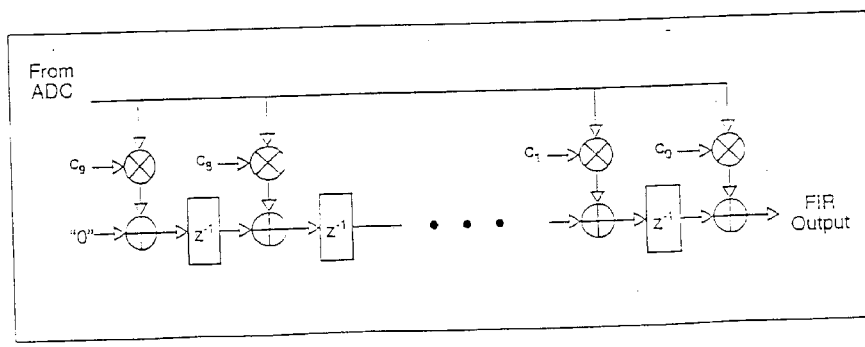

Figure 21    FIR Filter Structure

The active FIR coefficients (tap weights) may be loaded with the contents of the shadow coefficient registers at the start of read or servo operations. Two sets of shadow registers are used, one for Read mode and one for Servo mode. The concept is depicted in Figure

Confidential                                                    Read Mode

22. The values of the Read mode and Servo mode FIR shadow registers can be modified through the serial port when NOT in Read mode or Servo mode. Only the read shadow registers can be updated with values derived from a self-adaptive read operation. The values of the Servo mode shadow registers are always assigned through the serial port.

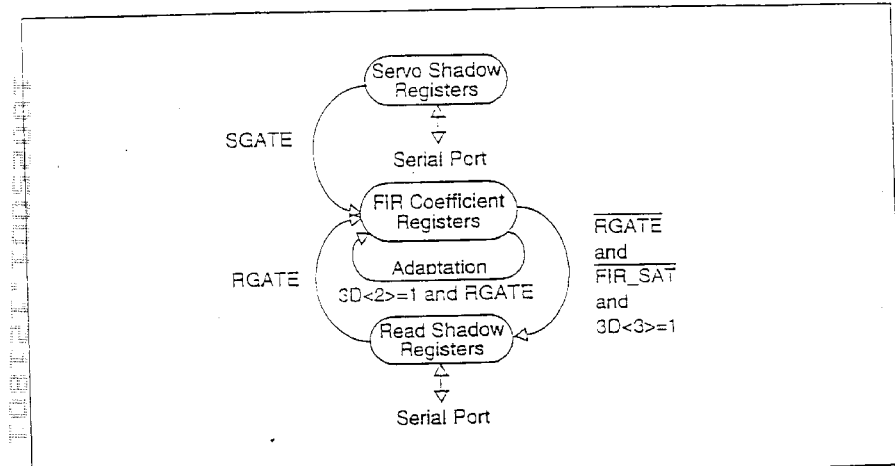

Figure 22     FIR Adaptation

During a read operation, the FIR coefficients are transferred from the shadow registers to the FIR coefficient registers on assertion of RGATE. FIR filter self adaptation is enabled when 3D<2>=1. After completion of a read, and if 3D<3>=1, then values of the Read shadow registers are updated by the contents of the FIR coefficients derived from the previous read operation. However if the FIR_SAT signal is asserted, indicating that one or more FIR filter coefficients have saturated, then the update is aborted and inaccurate coefficients are discarded.

In self-adaptive mode, selected filter taps may be programmed to serve as cursor taps by registers 3C<7:0>and 3D<0>. Selected taps retain their initial coefficient settings while other taps are adapted. This technique prevents unintended phase and amplitude shifts while the filter is adapting. There are no restrictions on which taps or how many taps can be defined as cursor taps.

When 3D<3>=0, the FIR shadow register is not updated when RGATE is deasserted and the FIR coefficients are set to a fixed set of values at the start of every read operation. If 3D<2>=1, the FIR filter will self-adapt during a subsequent read operation. However, if 3D<2>=0, the FIR filter operates in fixed mode with a fixed set of coefficients In Servo mode, the FIR filter only operates with a fixed set of coefficients. which are loaded from the servo shadow registers at the assertion of SGATE.

A 27

Confidential                                                                 Read Mode

4.11 FIR Filter Adaptation Loop

In normal self-adaptive mode, the de-interpolated estimate of the amplitude sample error and an estimate of the sample are used to calculate an equalizer error term that is used to adjust the individual tap coefficients of the FIR filter.

When FIR self-adaptation is required in low SNR environments, FIR tap coefficients may be found by using an enhanced algorithm. Known-data is used instead of estimated data to calculate equalizer error. To enable known-data FIR adaptation, 20<3>bit is set to 1 and the data sector is written using a known-data write. Since no user data is transferred through the NRZIO interface, this mode is used to only to find reliable FIR coefficients which in turn, may be used to preset the FIR equalizer during normal operation.

As shown in Figure 23, FIR tap adaptation is enabled shortly after sync byte is detected. The delay, $T_{adp}$ is fixed and not adjustable.

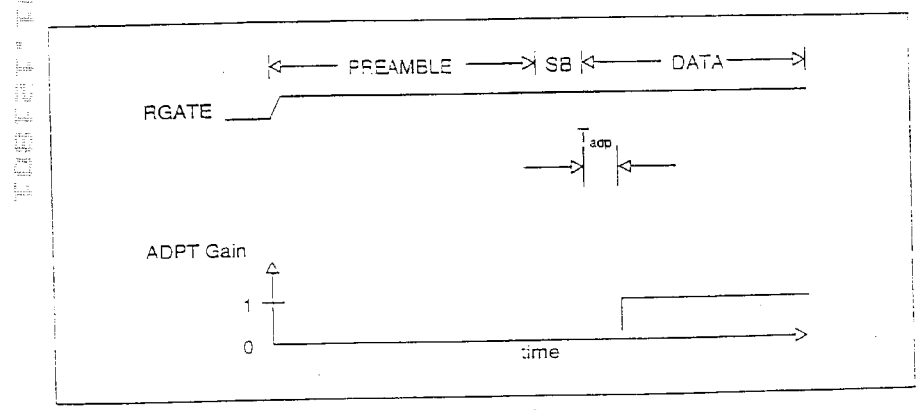

Figure 23    FIR Adaptation Read Mode Timing

A more complete definition of the adaptation time intervals is contained in Section 8.1.1.

When RGATE is asserted, the gain of the adaptation loop is at first set to zero to keep the initial coefficient values unchanged until the end of preamble. At the beginning of the data area of the sector, loop gain is turned-on for the duration of RGATE.

4.12 Sync-Byte Detection

The sync-byte detector exploits a novel algorithm that permits a synchronization mark as short as seven bits without sacrifice in the likelihood of correct byte synchronization.

The sync-byte detector is polarity sensitive. A programmable invert function is used to flip the polarity of the data entering the synchronization detector and the Viterbi detector. The user must determine the correct polarity empirically. The polarity is selected by

Confidential                                                        Read Mode register 60<0>. Knowledge of signal polarity is also used to exploit a known start-state during Viterbi detection, thereby reducing the likelihood of initial Viterbi error events.

4.13 Sequence Detector

The sequence detector is implemented using a 32-state EPRML Viterbi detector that uses a time varying trellis. The Viterbi detector uses a path memory of 68 bits to ensure that the burst error limiting properties of the modulation code are fully exploited. A block diagram describing the functional partition of the Viterbi detector is shown in Figure 24.

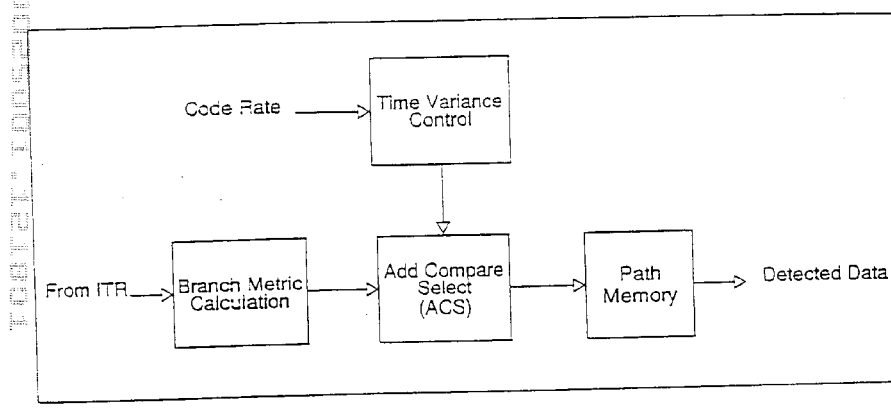

Figure 24    Viterbi Detector

Amplitude and time normalized samples from the timing interpolator are used to calculate the branch-metrics for the trellis. The 32-state Viterbi detector is implemented as radix-4 Add-Compare-Select (ACS) units. The ACS unit's output consists of decisions that are stored in the path memory. After all possible sequences have converged, detected data is sent to the NRZ formatter for decoding and descrambling.

Table 6 outlines the rate 32/34 code properties.

Table 6    Code Properties

| Rate | Parity | Transitions/ 1/2 Codeword | Max # Consec 0's | Max Burst Length |
|---|---|---|---|---|
| 32/34 | Even | 7 | 17 | 4 bytes |

Confidential                                                        Write Mode

5  Write Mode

The Write mode path data flow is shown in Figure 25:

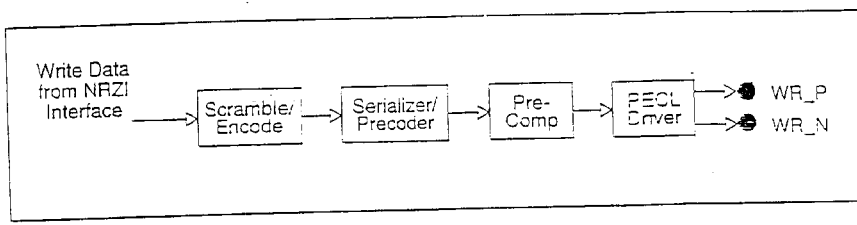

Figure 25   Write Path Block Diagram

Write data received from the NRZIO interface is normally scrambled to ensure a low probability of repetitive sequences. Next, the data is encoded so that all resulting sequences satisfy the Qmcc2 code constraint of the rate 32/34 code. Finally, the data from the encoder is precoded before being sent to the precompensation circuit and the PECL output driver. The PECL output driver is designed to have low skew with a fast rise-time to accommodate Write mode speeds greater than 750 Mbit/s.

5.1  Scrambler / Descrambler

Data placed on the NRZIO interface (NRZ data) is scrambled before encoding and descrambled on readback. Scrambling is primarily used to break up long runs of repetitive sequences. The scrambler is composed of a linear feedback shift register (LFSR) with suitable feedback connections. During a write operation, the output of the LFSR, a pseudo-random binary sequence (PRBS), is XOR'ed with the NRZ data before encoding. During a read operation, the output from the decoder is XOR'ed with the same PRBS before being clocked out to the NRZIO pins. Figure 26 shows the scrambling and descrambling path of the data.

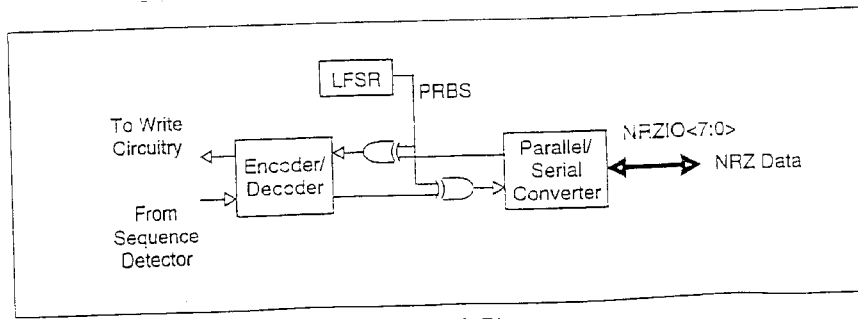

Figure 26   Scrambler/Descrambler Block Diagram

A-30

Confidential                                                                 Write Mode The PRBS generator used in the SCA8700, along with its generator polynomial, is shown in Figure 27. The PRBS generated by the LFSR is described by a generator polynomial G(D), where D represents a delay of one NRZ bit.

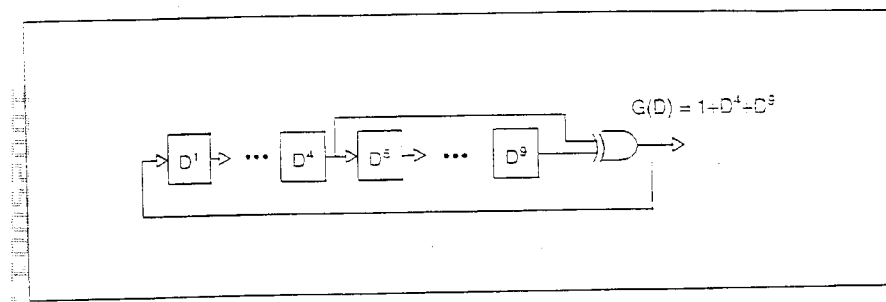

Figure 27     PRBS Generator

5.2     Encode-Decode

Data received from the controller is encoded using a rate 32/34 code mapping. The encoder converts 32 NRZ bits to 34 channel bits. Upon readback, the decoder receives data from the Viterbi Detector and converts it back to NRZ data. The decoder synchronizes to the data upon detection of the sync-byte pattern.

The encoder and scrambler can be bypassed during a Write mode operation by setting register 20<0> to 1. In addition, the write precoder is bypassed by setting register 20<1> to 1. When both the scrambler and precoder are disabled, the device enters the direct Write mode. Data from the NRZIO bus is transferred directly to the precompensation circuit, to the PECL interface and then to the read/write preamplifier. Direct Write mode only effects the write path. If a subsequent read operation is desired, the user write data must contain the preamble and sync-byte format as well as any necessary bytes appended. Interface clocking is automatically modified.

5.3     Serializer/Precoder

The serializer/precoder receives data from the encoder that is used to generate an unprecompensated write current pattern. Byte-wide write data is first converted to serial data before being applied to the precoder. The precoder, as shown in Figure 28, performs a bit-by-bit mapping, where the delay blocks represent a delay of 1 bit-clock period each.

Confidential                                                    Write Mode

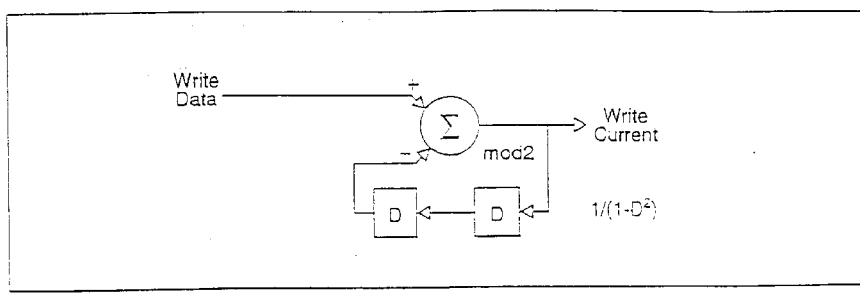

Figure 28    Precoder Block Diagram

5.4 Precompensation

The precompensation circuit shifts the time that a write data transition occurs. This attempts to compensate for the nonlinear bit shift effect of the write process.

The write precomp circuit block diagram is shown in Figure 29. The circuit can select from 48 equidistant phases of write clock. The programmable range is 0-37.5% of the period of the write clock, with a delay step of .78125%. First order precompensation is selected by setting register 21<3> to 1. Decoding logic decides how much time shift to apply to a given transition according to the rules in Table 7.

Table 7    Write Precomp Settings

| T(-2) | T(-1) | T(0) shift (% of bit period) | Level |
|---|---|---|---|
| 1st order precomp 21<3> = 1 | | | |
| X | Tr | 24<6:0> x .78125% | 1 |
| X | none | 0 | |
| 2nd order precomp 21<3> = 0 | | | |
| Tr | none | 22<6:0> x .78125% | 2 |
| none | Tr | 24<6:0> x .78125% | |
| Tr | Tr | 23<6:0> x .78125% | 2 |
| none | none | 0 | |
| "Tr" indicates the presence of a write transition | | | |

Confidential                                                               Write Mode
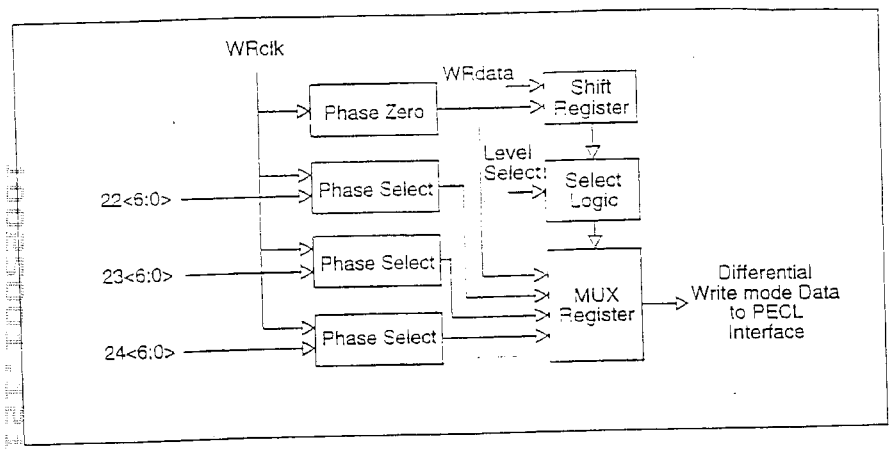
Figure 29    Write Precomp
5.5    Write Data (PECL) Interface
Fast current-switch outputs are provided to transfer write data to the read/write preamp. The interface is shown in Figure 30 and the logic levels are shown in Figure 31 and Table 8.
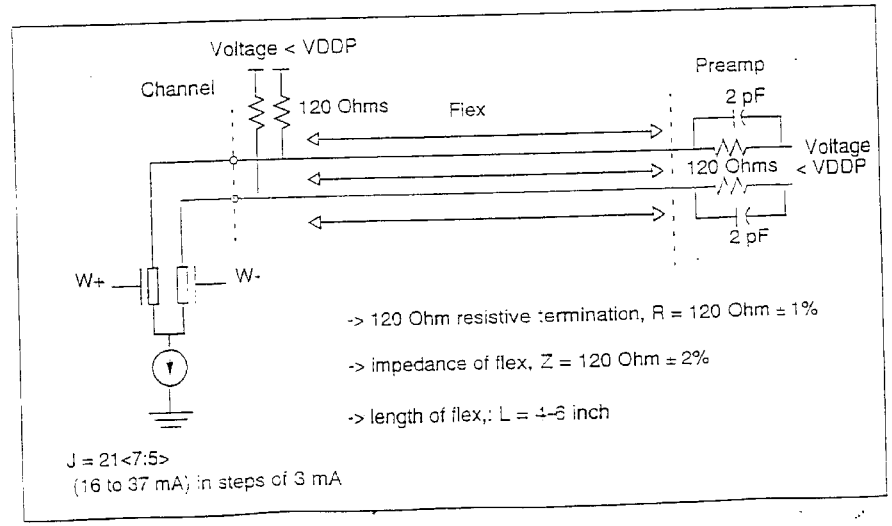
Figure 30    Write PECL Interface

Confidential                                           Write Mode
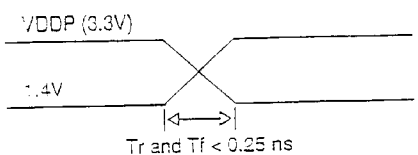
Figure 31    PECL Logic Levels
Table 8    PECL Interface Specifications
| Parameter | min. | max. |
|---|---|---|
| PECL output high voltage | 1.8 V | VDDP |
| PECL output low voltage | 1.4 V | VDDP - 0.4V |
| Tr and Tf (10 to 90%) |  | .25 ns |

Confidential                                    Servo Function

6  Servo Function

When in Servo mode the analog signal path of the VGA, filter and ADC, as shown in Figure 32, share the same circuitry that is used by the channel in Read mode. The analog filter has separate and programmable cutoff and boost values that are enabled when SGATE is asserted. The digital servo block uses an asynchronous clock (i.e. no phase or frequency coherence to servo data) that is programed to a sample rate of 8X, 10X or 12X multiples of the servo synchronization frequency. The clock is generated by a dedicated PLL servo synthesizer, which is programmed to achieve the desired oversample rate.

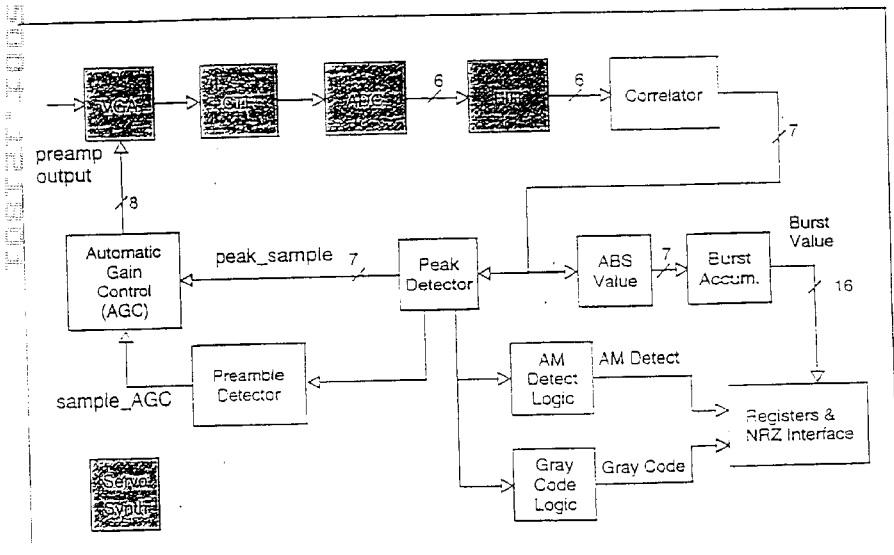

Figure 32   Digital Servo Block Diagram

6.1  Correlator

The correlator circuit, shown in Figure 33, is a simplified matched filter that is used to detect di-bits. This circuit suppresses DC shift, low frequency noise and second harmonic distortion such as amplitude asymmetry in MR heads. The correlator is a FIR filter producing an output of $x_{k+n} - x_k$, where n can be programmed to 4,5 or 6 to match over-sample rates of 8X, 10X or 12X respectively.

Confidential                                                    Servo Function

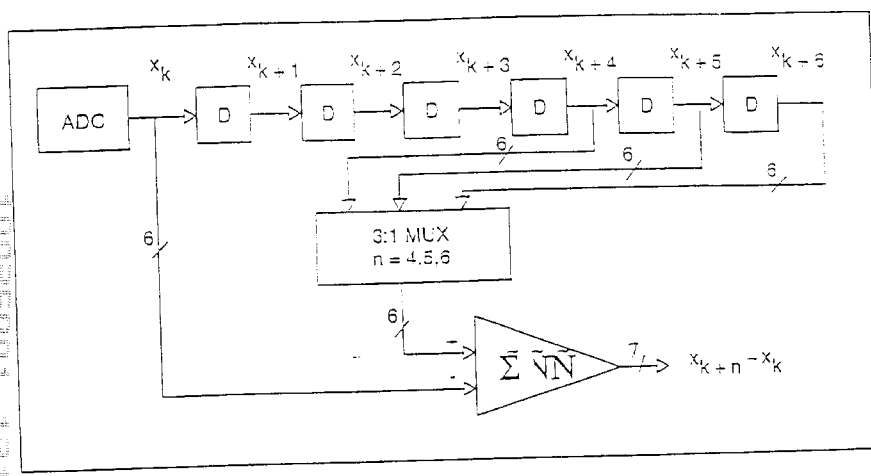

Figure 33    Correlator Block Diagram

Figure 34 shows the correlator transfer function in the frequency domain.

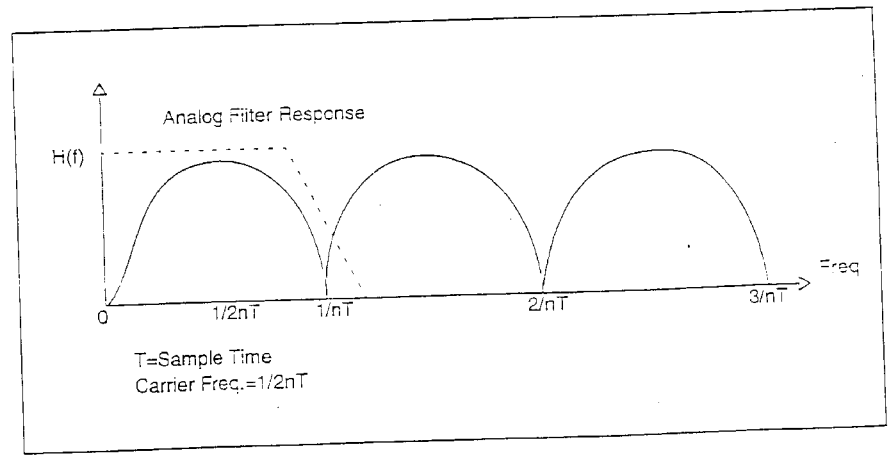

Figure 34    Correlator Frequency Response

6.2    Preamble Detector or 1's Detect

This block enables address mark detection when a valid Servo preamble is detected. It contains the control logic that generates the signal, sample_AGC, which is an input to

Confidential                                       Servo Function the AGC block. The preamble detect block is configured in several different modes, depending on which search mode is current. For further explanation of the search modes see Section 6.4, Section 6.5, Section 6.6 and Section 6.7.

Register R[*]1, is programmed with the number of consecutive di-bits that must be detected to qualify as detected preamble. Register R[*]2, contains a bit to disable the preamble detector. Either a micro or a timer enables the preamble detector to begin the search, and the circuit waits for a peak to be detected. When a peak is found the circuit will look for the another peak to occur within a given window. The size of the window is based on the over-sample ratio. When peak is detected outside of the expected window, or if the peak isn't detected within the window at all, the detector will reset and start the process over. However when a valid peak is detected, a second counter is incremented. When this second counter is equal to the value programmed in register R[*]1, the preamble_detected signal is asserted. This signal remains active until an address mark has been detected, or until the search has been terminated.

The sample_AGC signal has three different modes of operation; it can be manually controlled with a register bit, it may be configured to auto sample after each successful preamble detection, or a normal mode that is used in oriented search mode where sample_AGC will be active after the "start search" bit is set. See the examples below.

6.3     AGC Block

The AGC block receives the sampled value of "peak_sample" from the peak detector and calculates a correction that is input to the VGA. The gain DAC in the AGC block is only updated when the signal, sample_AGC, from the preamble detect block is asserted. The AGC can also be preset prior to each servo sample by initializing the AGC_preset register R[*]3. Preset occurs on the next rising edge of SGATE. During initial searches when SGATE is always active, initializing the preset Register will generate an update of the gain DAC. If the preset register is loaded when SGATE is switching, the new value will update the GDAC on the next rising edge of SGATE.

The AGC block has a linear, and non-linear mode. Four gain bits control the gain as a function of the mode selected. Register R[*]4, an eight bit signed number is used to preset the AGC correction value. Register R[*]5 is programmed with the desired target AGC peak value, which is compared to the peak samples, with the difference being the AGC error. The AGC error is scaled as a function on the gain settings, then added to the previous AGC correction. The AGC correction is then formed from numerically integrated gain errors. The AGC correction input to the VGA is an eight bit unsigned number centered around 80H. The AGC_sample signal may be forced active by register control, when used for an initial search. Register R[*]6 is used to program the number of corrections to be made in normal and auto-sample modes. Examples of how the hardware and software may be used in different search modes is shown in Section 6.4, Section 6.5, Section 6.6 and Section 6.7.

A 37

Confidential                                                              Servo Function

6.4 Unoriented Search Mode

1. Get out of the latch.
2. Force SGATE active using the "timerset" register in the controller.
3. Preset AGC gain to a high value, set AGC to non-linear mode.
4. The bit register R[*]10 in the channel comes up reset so that the preamble detect logic is enabled on power-up.
5. Set Force AGC bit, register R[*]11, for manual mode. This allows the AGC loop to run during the entire time that the servo gate is active. Due to the use of non-linear mode AGC, the loop should acquire relatively quickly over servo data and move to only moderately higher gain over non-servo data.
6. Set uP Search bit, register R[*]12. This will start the preamble detector. When the preamble is detected, the address mark detect logic will be enabled.
7. After the address mark has been detected, clear the uP_Search bit, register R[*]12. In this mode, the search will be controlled by the microprocessor by setting and clearing this bit.
8. Complete the normal AMET/GRAY CODE qualification code algorithm that is currently in use. In this mode the search is still controlled by the controller, using the uP_Search bit in the SCA8700. After a number of address marks found, we may switch the enable_auto_sample bit, register R[*]13, to the Auto-sample mode setting, which clears the force-AGC bit. This will enable the logic that will generate a sample_AGC window after the preamble is detected for the number of di-bits programmed in the AGC_sample_val register R[*]14. After the qualification is complete, switch to oriented search mode.

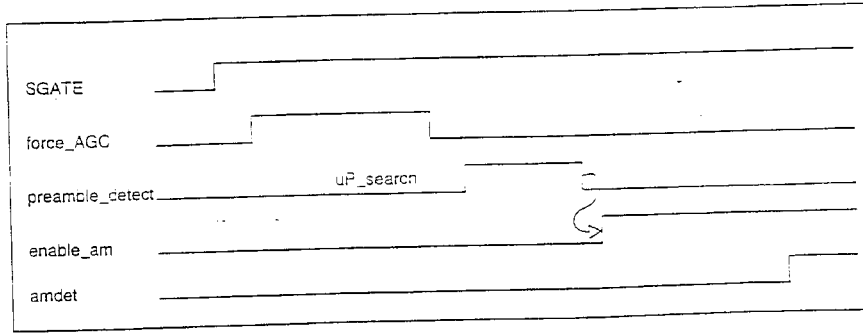

Figure 35    Unoriented Search (Manual AGC)

A 38

2. Clear the register R[*]20<> bit and set the register R[*]2
   R[*]register R[*]21<> bit puts the sample AGC logic in
   enables sample_AGC f   e number of di-bits progra
   This register may have to be reprogrammed if the numbe
   than the number required in the auto-sample mode. In
   window will start after the start search (spin_comm) time

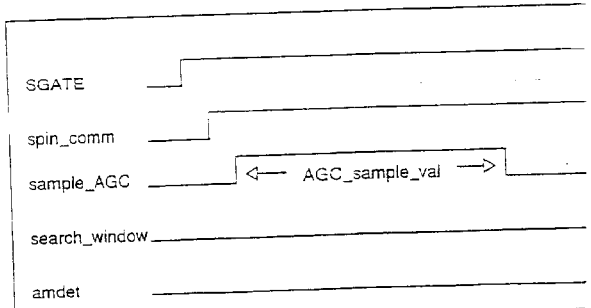

Figure 37   Oriented Search (Normal AGC)

A 39

Servo Function

Confidential

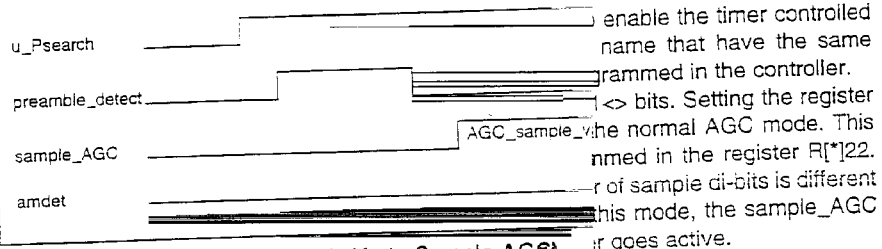

enable the timer controlled
name that have the same
rammed in the controller.
<> bits. Setting the register
he normal AGC mode. This
nmed in the register R[*]22.
r of sample di-bits is different
his mode, the sample_AGC
goes active.

Figure 36   Unoriented Search (Auto Sample AGC)

6.5   Oriented Search Mode

1. Set en_amsync bit in the channel and in the controller
   searches. These are two separate bits with the same
   function. This assumes that the timers have all been pro

Confidential                                                          Servo Function

6.6 Head Switch (option 1)

1. Switch heads. This occurs between servo bursts.
2. Preset AGC to high gain in the channel, non-linear AGC with high gain. The logic will remain in normal AGC mode.
3. Increase the AGC_sample_val in the channel to allowing more time to acquire. (What would be the maximum required number of di-bits?)
4. Reprogram SGATE and spin_comm timers to allow the use of more preamble. (Write to read recovery area.)
5. After first address mark, reprogram timers and AGC_sample_val back to normal values. Set the AGC back to linear mode and normal gain.

6.7 Head Switch (option 2: worst case scenario)

1. Switch heads.
2. Force SGATE active using the timerset register in the controller.
3. Preset AGC to high gain, non-linear AGC. Set AGC in non-linear mode, same as unoriented search.
4. Set Force_AGC bit in channel. Controller timers will still be in oriented search mode, wider window.
5. Wait for AMDET to interrupt to the uP, then clear the Force_AGC bit in the channel. Normal AGC operation will continue from this point.

6.8 Peak Detector

The function of the peak detector is to derive a signal, peak_samples, that is used for the AGC. Other peak detector outputs are; peak found and threshold crossed. The input to the peak detector is sample and sample_minus1 signals from the correlator. The peak detector only detects positive peaks. The incoming samples are compared to a programmable threshold, and when either a positive or negative sample crosses the threshold, the threshold_crossed output will be set. This signal remains set until the peak is found. The peak is found using the following algorithm: Wait until threshold_crossed is true. Then wait until the current sample is less than the previous sample, sample_minus1, indicating that the peak has been reached. Next, there are two sample pairing conditions to be considered. If the sample_minus1 is less than the sample_minus2, then the peak occurred at sample_minus2, or if the sample is less than the sample_minus1, then the peak occurred at sample_minus1. When the peak sample is found, the peak_found signal is asserted, and at the threshold_crossed signal is cleared. The peak_found signal will remain active for one sample clock period.

There is an input to the peak detector, sample AGC, which is output from the preamble detector. When this signal is asserted, the value of each detected peak will be registered on the peak_sample output, one sample clock after the peak_found signal is asserted. This is the value used by the AGC block to generate a gain correction.

A 40

Confidential                                                    Servo Function

6.9 Address Mark Detect

This circuit is designed around a programmable address mark of nine bits. The address mark is defined by programming 9 bits composed of registers R[*] and R[*]. Table 9 illustrates the address mark format. In this example a written pattern of 8 zero's, followed by a di-bit is represented.

Table 9   Servo Address Mark Format

| 8 | 7 | 6 | 5 | 4 | 3 | 2 | 1 | 0 |
|---|---|---|---|---|---|---|---|---|
| R[*]<0> | R[*]<7> | R[*]<6> | R[*]<5> | R[*]<4> | R[*]<3> | R[*]<2> | R[*]<1> | R[*]<0> |
| 0 | 0 | 0 | 0 | 0 | 0 | 0 | 0 | 1 |

The address mark detector also contains a voting circuit that can be enabled to allow a finite number of errors to occur within the address mark. The number of allowed errors is programmed in register bits R[*]18. After a servo event, it is possible to poll register bits R[*]19 to determine how many errors were made in the previous servo event. Refer to Table 10 for details.

Table 10   Servo Mark Detection Settings

| R[*] | Number of Allowed Errors |
|------|--------------------------|
| 00   | 0                        |
| 01   | 1                        |
| 10   | 2                        |
| 11   | N/A                      |

| R[*] | Actual Errors Detected |
|------|------------------------|
| Bit 7 | 0 Errors Detected     |
| Bit 6 | 1 Error Detected      |
| Bit 5 | 2 Errors Detected     |

Figure 38 shows a 10 MHz servo waveform with the address mark and the correct polarity for the address mark di-bit.

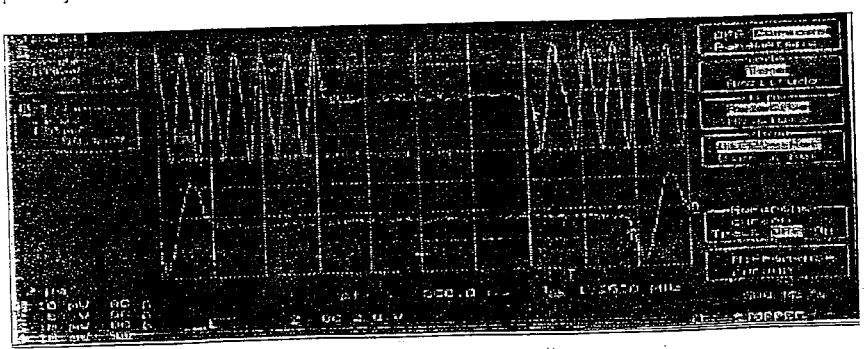

Figure 38   Servo Address Mark Polarity

A 41

Confidential                                              Servo Function

6.10 Gray Code Detector

The Gray code detector has four functions: to detect the Gray code bits, to generate a Gray clock, to store the Gray code data in a shift register and to generate the gray_endb signal. The gray_decode block is clocked by a counter (gray_cnt) that increments on each falling edge of the sample count. This counter is held preset when AMDET is low and is reset at the end of each di-bit cell/window. The preset value can be programmed in the gray_end_val register R,[*], and is adjusted based on the oversample ratio. The reset value is determined based on the sample rate selected. Once the address mark is detected, the Gray code detector is enabled, and the timing of the detector is (becomes) relative to the peak of the address mark di-bit. Keep in mind that the AMDET signal has a resolution of +/-1 half rate clock, which is 1/2 the oversample frequency.

The Gray data flip-flop is set any time that a peak is detected and is reset at the start of every di-bit window (when gray_cnt=0). The Gray clock is generated 1/2 sample clock prior to the end of the cell. The Gray clock is used to shift the data into the Gray code shift register. If no address mark is detected, the shift register will contain the data from the last burst.

The gray_endb signal determines how many Gray codes are to be shifted in. This value is programmable with the gray_end_val register, which is compared to a counter that determines the number of gray clocks that have occurred.

Example:

Sample rate=12x=6 clocks per di-bit
Gray_preset=2
Gray_cnt=0-5
Gray_cnt=0=reset gray data FF
Gray_cnt=5=gray clock

6.11 Reset AMDET Timer

This timer runs off of the reference clock and the counter is reset with a synchronized AMDET signal. It can be programmed with a 12-bit value for the time the AMDET signal is reset. The rst_amb signal resets AMDET, and also resets or re-enables several other functions within the digital servo block.

Time desired in ns is R[*]30<> x $T_{FREF}$. Note: The resolution is +/-1 $T_{FREF}$ due to the synchronization of the AMDET signal, which resets the counter.

6.12 Demodulator (Demod)

The Demod block calculates the values for the A,B,C, and D position bursts. This function accumulates the magnitude of all of the samples in the accumulation window to

A 42

Confidential                                                                 Servo Function measure the area of a burst. The strobe signal from the controller enables a counter clocked by the sample clock. The counter is used as a 2-edge timer that opens a window to enable the accumulator. Two 6-bit registers control the timer, called start_accum and stop_accum. When the window is open, the accumulator sums the absolute value of the output samples of the correlator. There are four separate adders, 2 pairs that are interleaved, one that sums the two samples and one that accumulates the output of the first adder. When the en_accum signal goes inactive, an additional adder sums the output of the two interleaved accumulators. There is additional clock delay that will have to be considered when centering the windows around the bursts. The peak_found and en_accum signals come out on a test pin and should be useful in centering the sample windows.

From the rising edge of the strobe signal, the en_accum signal goes active after the number of clocks programmed in register R[*]40. When programming the start register, one needs to account for the preload required by the correlator of half of a di-bit. The value programmed in the stop_accum register should allow the signal, en_accum, to go inactive 2-3 clocks prior to the falling edge of strobe. This will allow time for the final addition and setup of the output latch. The accumulator is cleared 2 to 3 sample clocks after the falling edge of the strobe. The clear signal to the accumulator is deasserted 2 sample clocks later. This means that the strobe is deasserted a minimum of 5 sample clocks.

6.13 Data Transfer

The Data Transfer block controls the NRZIO bus during a servo burst. The state machine is clocked by the negative edge of RCLK. When the servo address mark is detected, the NRZIO interface receives data from the servo. In this state, data is set to all zeros. The state machine is controlled by a synchronized version of the strobe signal (synchronized to RCLK). The state machine waits for the first transition (rising edge) of the strobe signal, A_burst. On the next falling edge of RCLK after the rising edge of the strobe the NRZIO output is a sync byte, followed by the 3 bytes of Gray code, followed by all zeros again. The sync byte out will be the same sync byte that is used by the channel. All data will be clocked out on the falling edge of RCLK. On the falling edge of the first strobe, the channel will output a sync byte, followed by the two bytes of data. This will be repeated for the B,C and D. The data transfer after the D burst will have 1 additional byte that will be a status byte from the channel.

Note that the inactive time between strobe pulses must be at least 1 RCLK cycle to ensure proper operation of the data transfer. RCLK is a divided down version of the read synthesizer and is "gapped" to account for the channel code rate. So for a 16/17 rate channel, RCLK has three spacings of 8T, followed by one spacing of 9T. The worst case RCLK spacing is: 1/(channel rate) *9, where the channel rate is 17/16 * NRZ Rate.

Confidential                                                    Common Functions

7 Common Functions

Common functions are functions that are shared by the read, write, and servo sections of the channel. They consist of the NRZ data interface, R/W, and servo clock phase-locked loops (PLL) and the serial data interface.

7.1 NRZI Read-Write-Servo Interface

Read or write data is transferred to or from the controller by means of a byte-wide NRZIO bus. Read mode transfer and Write mode transfer timings are shown in Figure 39 and Figure 40.

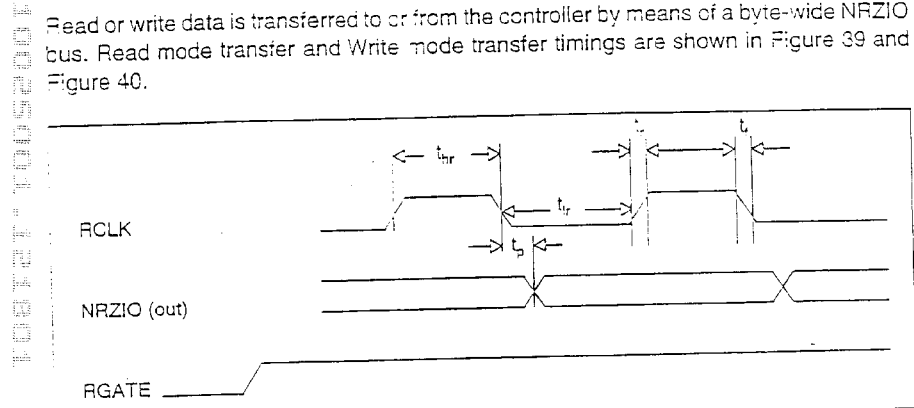

Figure 39   NRZI Read Interface Timing

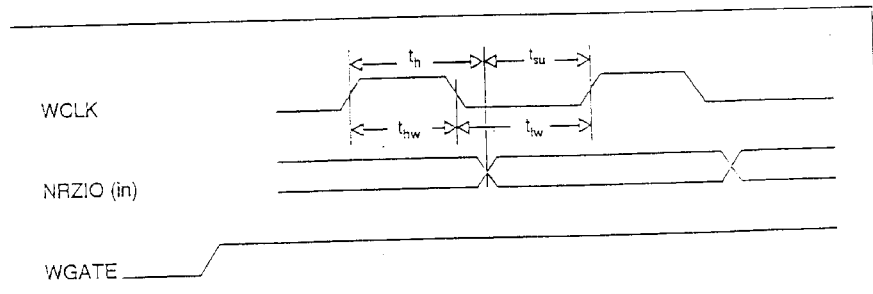

Figure 40   NRZI Write Interface Timing

While Figure 39 and Figure 40 show byte-wide data being clocked to and from the channel on the rising edge of the clock, the polarity of the RCLK and WCLK signals may

A 44

Confidential | Common Functions be altered by programming registers 20<4> and 20<5>, so that data may be clocked on either edge. Interface timing rules are defined in Table 11.

Table 11 NRZIO Interface Timing

| Parameter | Sym | Condition | min. | max. | Units |
|---|---|---|---|---|---|
| RCLK, NRZIO rise/fall time | $t_r \& t_f$ | 20-pF output load, 10-90% | | 3.7 | ns |
| RCLK to NRZIO delay | $t_D$ | Falling edge of RCLK to NRZ out | | 3.5 | ns |
| NRZIO setup time | $t_{su}$ | NRZ data valid to rising edge of WCLK | 3 | | ns |
| NRZIO hold time | $t_h$ | Rising edge of WCLK to NRZ data invalid | 2 | | ns |
| RCLK high time | $t_{hr}$ | Period RCLK is high | 4 | 5 | 15/16 bit period |
| RCLK low time | $t_{lr}$ | Period RCLK is low | 4 | 6 | 15/16 bit period |
| WCLK high time | $t_{hw}$ | Period WCLK is high | 4 | 5 | bit period |
| WCLK low time | $t_{lw}$ | Period WCLK is low | 4 | 5 | bit period |
| RCLK and WCLK periodicity | | (8+9+8+9+8+9) = 51 PLL clock edges | | | |
| Direct Write mode WCLK periodicity | | (8+8+8+8+8+8) = 48 PLL clock edges | | | |

A one-period ambiguity exists in RCLK high and low times. This constraint is reflected in the clock times listed in Table 11.

7.2 PLL Synthesizer - Clock Generation

The SCA8700 channel utilizes a single phase-locked loop (PLL) to synthesize Read mode and Write mode, (R/W) clock signals. A second PLL is used to synthesize Servo mode clock signals. Both PLL designs are identical, with the exception of a 16/15 frequency translation function that is added to the R/W PLL. The designs have been optimized for high bandwidth, fast lock-on operation and extremely low jitter output.

7.2.1 R/W Clock

The R/W synthesizer block diagram is shown in Figure 41, and the specifications follow in Table 12. The PLL output frequency is determined by Equation 2, which is also shown in Figure 41.

Referring to Figure 41, FREF is an external reference input frequency, and N, P and M are integers. The output bit-rate frequency is programmed by loading the 91<5:0>, the 90<7:4> and the 90<2:0> registers.

Confidential Common Functions

FREF should be between 20-80MHz in increments of 5Mhz.

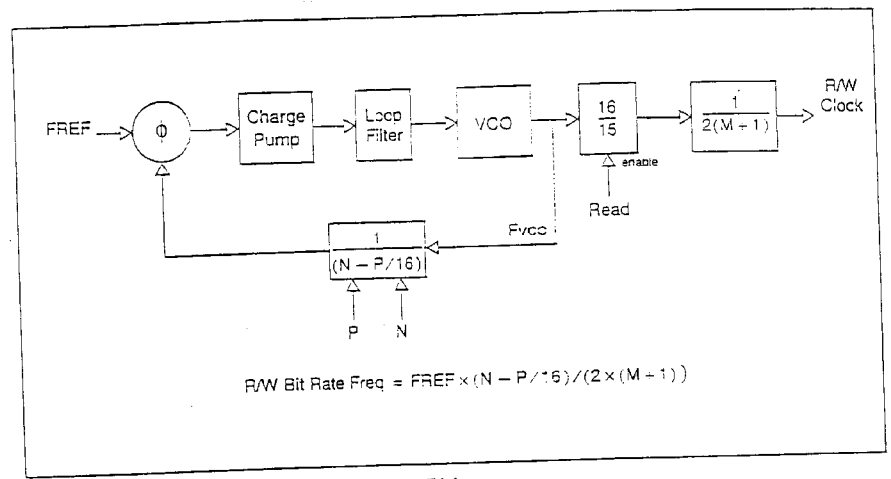

Figure 41  Read Mode/Write Mode PLL

The operation of the R/W PLL is as follows: The VCO output frequency, Fvco, which is in the range of 800-1600 MHz is divided by a fractional divider of factor (N - P/16), and then phase-compared to an input reference frequency FREF, by means of a phase detector. Use of the fractional divider allows the phase detector to sample the phase error at a high rate, providing faster lock-on times with lower VCO phase jitter. The PLL R/W clock output is obtained by dividing Fvco by 2(M-1) using a digital divider. The user must set the R/W clock frequency to be the same as the desired encoded bit-rate. When the PLL provides the Read mode clock, a 16/15 frequency translation circuit is automatically inserted in the clock path to increase the clock rate by 6.66% (the bit-rate is unchanged). This provides an oversampled clock for use by the interpolated timing recovery (ITR) circuitry.

7.2.2 Servo Clock

The Servo PLL block diagram is shown in Figure 42, and the specifications follow in Table 12. The Servo PLL is similar to the R/W PLL in form and operation. A separate and complete set of registers are used to program the Servo PLL.

The PLL output frequency is determined by Equation 3. The Servo output frequency is programmed by loading; the 91<5:0>, 90<7:4> and 90<2:0> registers.

When a non standard FREF frequency is employed then Equation 3 is used to find $P_s$, $M_s$, and $Lp_s$ values, subject to constraints of Equation 3.

p 46

Confidential                                                    Common Functions

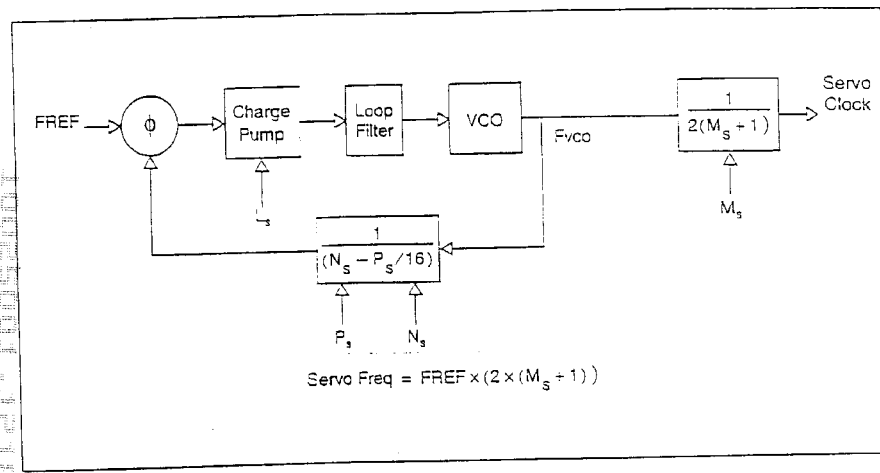

Figure 42    Servo Mode PLL

Table 12    Clock Synthesizer Specifications

| Parameter | Symbol | Min | Max | Register(s) | Notes |
|---|---|---|---|---|---|
| Reference Frequency | FREF | 20MHz | 80 MHz | 98<7:4> | in steps of 5Mhz |
| VCO Frequency | Fvco | 800 MHz | 1600 MHz | | Fvco = FREF x (N-P/16) |
| Write or Servo Clock | | 53.125 MHz | 800 Mhz | | - |
| Settling Time | | | 10 usec | | |
| Absolute Jitter | | | 15 psec | | 1 sigma |
| Register Settings - Read Mode/Write Mode: | | | | | |
| N Divide Value | N | 12 | 48 | N= 91<5:0> | |
| P Divide Value | P | 0 | 15 | P= 90<7:4> | |
| M Divide Value | M | 0 | 7 | M= 90<2:0> | |
| Register Settings - Servo Mode: | | | | | |
| $N_S$ Divide Value | $N_S$ | 12 | 48 | $N_S$= 93<5:0> | |
| $P_S$ Divide Value | $P_S$ | 0 | 15 | $P_S$= 92<7:4> | |
| $M_S$ Divide Value | $M_S$ | 0 | 7 | $M_S$= 92<2:0> | |

A 47

Confidential                                    Common Functions

7.2.3 Setting the PLL R/W and Servo Frequencies:

The PLL R/W output frequency follows the relation:

$$R/W\ FREQ = NREF \times (N - P/16)/(2 \times (M + 1)) \qquad (2)$$

The PLL Servo output frequency follows the relation:

$$Servo\ Freq = FREF \times (N_S - P_S/16)/(M_S + 1) \qquad (3)$$

The N ($N_s$) and P($P_s$) values should be chosen so that:

$$700\ MHz \le FREF \times (N - P/8) \le 1600\ MHz \qquad (4)$$

7.3 Serial Register Interface

The serial interface allows communication between the controller and the internal control registers of the device. Any given internal control register may be read-only (R), write-only (W) or both read and write (RW).

The serial interface communicates by means of three control pins, SDEN, SDATA and SCLK, by using the transfer protocol shown in Figure 43 with port timing rules specified in Table 13. The interface controller arbitrates the transfer and is always responsible for setting the direction of the transfer, for generating the address bits and for generating the clock. The transfer protocol is structured as an 18-bit word. The first bit is used to indicate a write-to or read-from the device. The next eight bits function as address bits, with the LSB sent first. A dummy "turn-around" bit is added in the middle of the bit stream to allow time for a direction change on the bus. Eight data bits follow either to or from the device, depending on the direction of the transfer.

During a register write operation, SDEN is asserted and serial data on the SDATA pin is clocked to the device on the positive edge of SCLK. After the 18-bit sequence is complete, byte-wide data is transferred to the selected device control register on the negative edge of SDEN.

During a register read operation, the bus direction and the address are clocked into the device on the positive edge of SCLK. After the turn-around bit, the device assumes control of the SDATA line and places the contents of the requested register, LSB first, to SDATA on the falling edge of SCLK.

A 48

Confidential | Common Functions
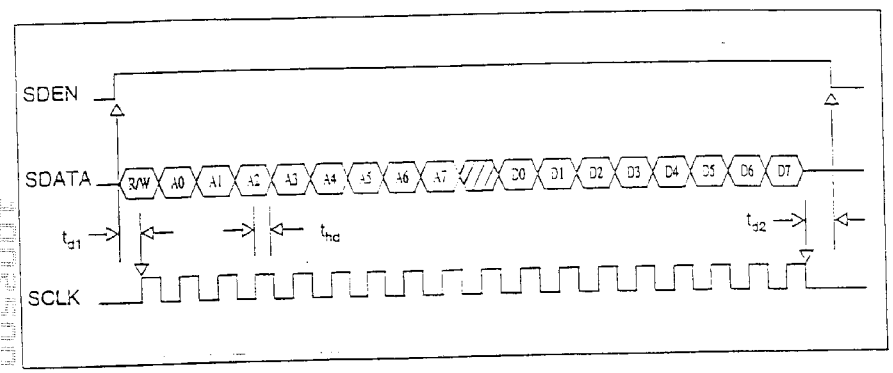
Figure 43 Serial Port Timing
Table 13 Serial Port Timing Specification
| Parameter | min. | max. |
|---|---|---|
| $t_{d1}$ | 5 ns | |
| $t_{d2}$ | 5 ns | |
| $t_{hd}$ | 10 ns | |
A more complete specification of the serial interface timing rules is found in Table 27.

8 System Operation

This section details the system operation of the SCA8700. Descriptions of the events that comprise the Read mode, Write mode and Direct Write modes are provided. Emphasis is placed on the timing rules that are in effect when transitioning from one mode to another.

8.1 Read Mode Sequence

An overview of a typical track architecture is shown in Figure 44. The first field, the preamble, consists of a series of 2T-spaced transitions, with T being the encoded bit period. The preamble readback pattern input to the ADC is a sine wave of frequency 1/4T. The SCA8700 is designed for a preamble length of 96 bits, although shorter and longer preamble lengths may be used. If the preamble field is less than 80 bits, the timing and gain synchronization may become unreliable. The preamble field is a known reference pattern that is used to set up timing, gain and DC-restore loops. Because the preamble is a single frequency, it cannot be used as a reference to adjust the self-adaptive FIR equalizer.

A sector read operation begins with the assertion of RGATE. The timing loop cycle consists of three phases, dividing the preamble into distinct regions: zero-phase restart, fast-acquire and data tracking. During the first phase, zero-phase restart, the initial phase of the timing loop is adjusted. The second phase, fast-acquire, is primarily used for frequency acquisition. After the first and second phases, the timing loop phase-frequency is close to the target phase-frequency value and within the capture range of the third and final phase, data-tracking. During tracking, the timing loop response is adjusted to be slow responding, requiring many averaged data samples to generate significant clock timing adjustments. Tracking mode is used for accurate and jitter-free data clock regeneration when reading user data.

The AGC loop operates throughout all three timing phases. However, the loop gain of the AGC is increased during the zero-phase restart and fast-acquire phases so that channel gain is close to the correct value before entering tracking mode. The AGC tracking phase adjusts the gain very slowly throughout the user data and requires an average of many samples to significantly change the gain setting.

Confidential                                                                 System Operation

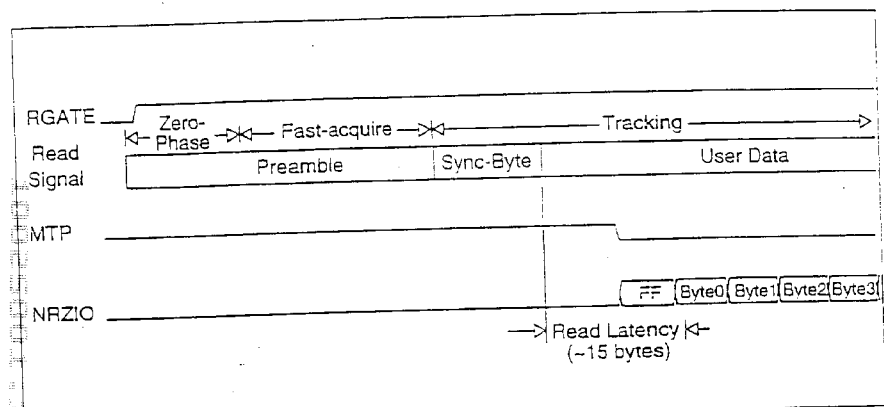

Figure 44    Read Mode Sector Architecture

8.1.1  Control Loop Acquire Sequence

Programmable counters within the SCA8700 are used to define the time intervals for each phase of the acquire sequence. Acquisition timing periods may be adjusted for preamble lengths up to 500 bits by programming the counter-timers described in Figure 45. The range of values allowed for each counter is specified in Table 14.

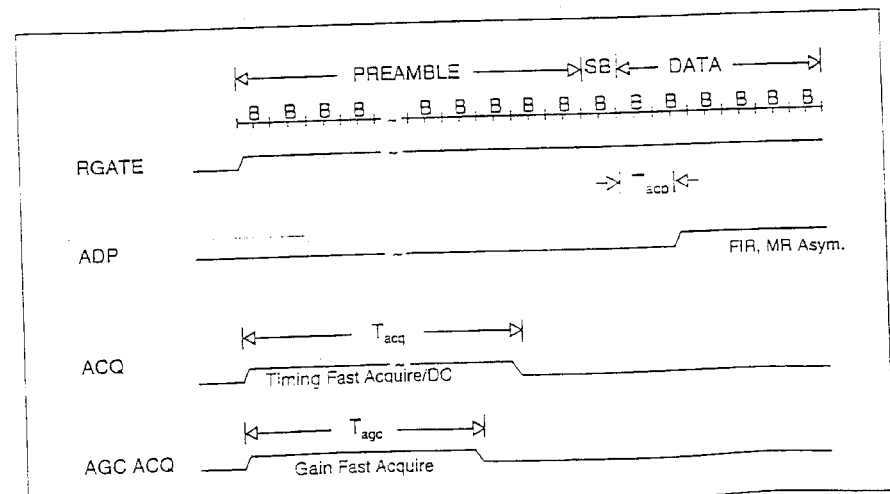

Figure 45    Read Mode Operation Acquire Timing

Confidential                               System Operation

Table 14    Counter Values

| Delay | Description | Range | Register | Default |
|---|---|---|---|---|
| $T_{adp}$ | FIR self-adapt | fixed | | |
| $T_{acq}$ | Timing and DC Fast Acquire | 0-127 nibbles | 09<6:0> | |
| $T_{agc}$ | AGC Acquire | 0-127 nibbles | 0A<6:0> | |

8.1.2  Data Read Mode

A sector read operation begins with the assertion of RGATE. The SCA8700 cycles through the loop acquire sequence described in Section 8.1. After the sequence is completed, timing and gain control loops have converged and the tracking mode is entered. The device begins detecting data and searches for a unique sync-byte pattern in the bit-stream. The sync-byte is a special pattern used as a marker to indicate the start of user data. Once the sync-byte has been detected, an $FF_h$ byte is output on the NRZIO bus. Subsequent detected and decoded user data bytes continue as output for as long as RGATE is asserted.

Approximately 16 bytes of read data latency are associated with a read operation as shown in Figure 46. As a consequence, when RGATE is de-asserted at the end of a sector, 16 bytes of data are left to be transferred to the controller. This residual data can be transferred using one of two methods, as selected by register 04<0>. The first method is for the controller to assert RGATE after the physical end of sector data, until the entire sector has been transferred. This is adequate provided the end of sector gap is greater than 16 bytes.

Using the second method, RGATE is de-asserted at the end of the sector. The device internally extends RGATE to flush out the residual data that is in the data path. When reading consecutive sectors, the combined length of the sector gap, the preamble length and the sync mark must be longer than the 15 byte read latency, and the controller must be able to accept NRZ data even after RGATE has been de-asserted.

A 52

Confidential                                                System Operation

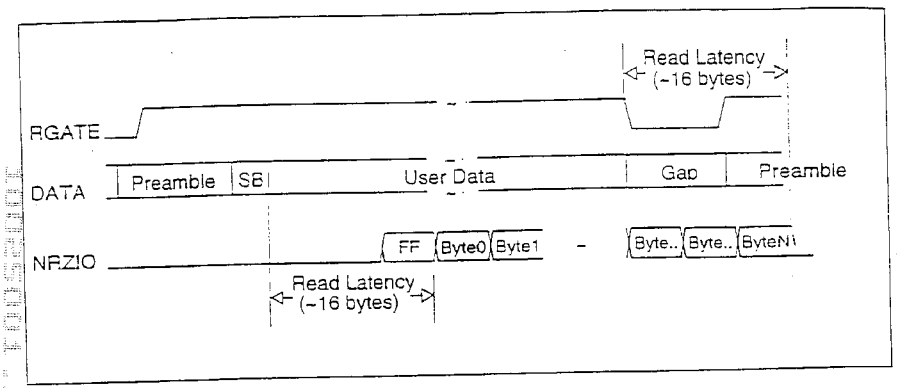

Figure 46    Read Mode Gate Extension

8.2    Write Mode Sequences

Data may be transferred from the controller to the NRZIO interface, through the SCA8700 to the write preamp by two basic methods, called Normal and Direct modes. Both methods have selectable options that modify how write data is processed.

8.2.1    Normal Write Mode

A normal Write mode operation is initiated when WGATE is asserted. A series of $00_h$ bytes are sent from the controller to the device on the NRZIO interface. The encoder output is a series of 2T-spaced transitions that generate the preamble. The preamble is continued for as long as $00_h$ bytes are sent to the interface. When an $FF_h$ byte appears on the NRZIO interface, write logic output is a sync-byte in place of the $FF_h$, followed by encoded user data lasting the duration of WGATE assertion. Write data is subsequently precompensated and transferred to the PECL output stage. The Write path latency is 9 bytes. Data may be clocked to the device on the NRZIO interface on either the rising or falling edge of RCLK depending on the setting of register 20<4> = 1. Figure 47 defines the timing of a normal Write mode operation.

Confidential — System Operation

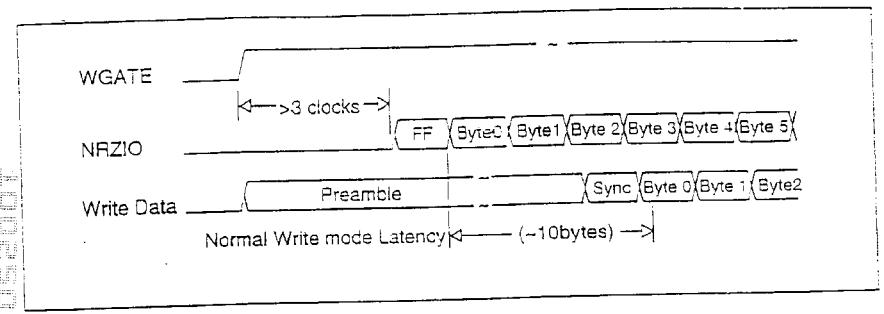

Figure 47   Normal Write

8.2.2   Direct Write Mode

In a manner analogous to the normal Write mode, WGATE is asserted; however, the encoder and scrambler are bypassed by setting register 20<1>=1 and the write precoder is bypassed by setting register 20<1>=1. NRZIO data is serialized, precompensated and then transferred directly to the PECL output without modification.

The controller sends a sequence of $00_h$ bytes, followed by one $FF_h$ byte. This is followed by the continuation of user data for as long as WGATE is asserted, the $FF_h$ byte is not transferred. Figure 48 shows the write sequence for a Direct Write mode operation.

If a Read mode operation is desired after a Direct Write mode, the write data placed on the NRZIO interface must contain the preamble, sync-byte, encoded data and any necessary ECC bytes.

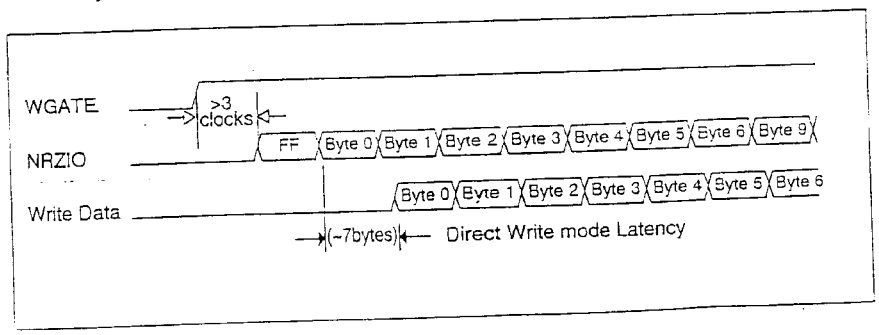

Figure 48   Direct Write

8.3 System Timing Constraints

A system timing diagram is shown in Figure 49 and timing rules are listed in Table 15.

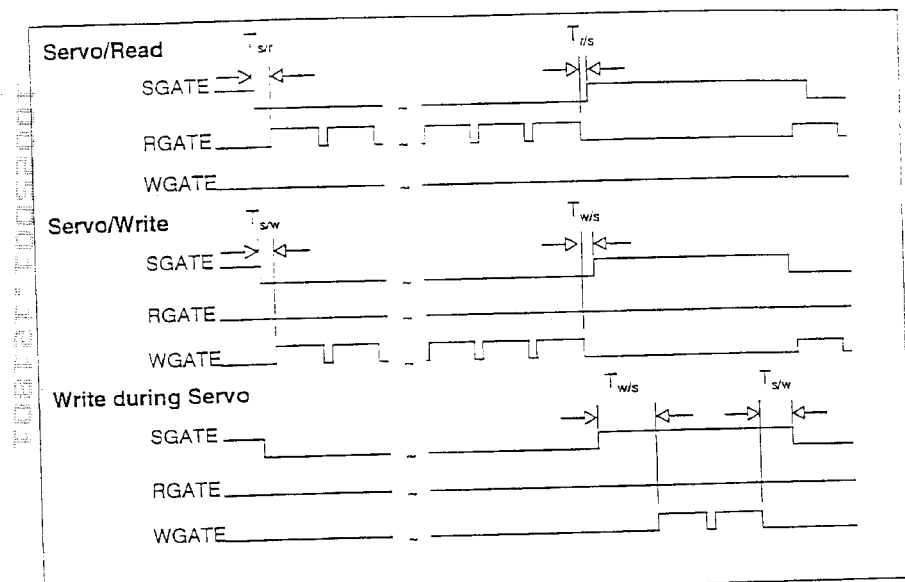

Figure 49    System Operation

Table 15    Timing Rules

| Parameter | Min time | Description |
|---|---|---|
| $T_{s/r}$ | 24 Read mode PLL Clocks | Servo to Read |
| $T_{r/s}$ | 24 Read mode PLL Clocks | Read to Servo |
| $T_{s/w}$ | 24 Read mode PLL Clocks | Servo to Write |
| $T_{w/s}$ | 24 Read mode PLL Clocks | Write to Servo |
| $T_{w/s}$ | 24 Read mode PLL Clocks | Servo mode to Write mode/Servo mode |
| $T_{s/w}$ | 24 Read mode PLL Clocks | Write mode/Servo mode to Idle mode |
| $T_{w/w}$ | 24 Read mode PLL Clocks | Write mode to Write mode |
| $T_{r/r}$ | 24 Read mode PLL Clocks | Read mode to Read mode |
| $T_{s/d}$ | 500 ms | Suspend mode to Doze mode |

A 55

Confidential | System Operation

Table 15 Timing Rules (cont'd)

| Parameter | Min time | Description |
|---|---|---|
| Td/i | 100 us | Doze mode to Idle mode |
| Ti/s | 24 Read mode PLL Clocks | Idle mode to Servo mode |
| Ts/i | 24 Read mode PLL Clocks | Servo mode to Idle mode |
| Tr/i | 24 Read mode PLL Clocks | Read mode to Idle mode |

8.4 Write Mode to Idle Mode Recovery

When WGATE is asserted, the series switches shown in Figure 4, that are connected between the VGA input pins and the VGA circuit are set to an open or high impedance (HiZ) state. The timing diagram of the recovery sequence appears in Figure 50. The high impedance state prevents write voltage transients from entering the VGA and overloading the analog signal path. The HiZ condition is maintained for the duration of WGATE and is extended past the de-assertion of WGATE for a programmable length of time, $T_{HR}$, set in register R,[TBD].

In addition, a shunt resistance connected in parallel with the VGA inputs, is set to a low impedance value (LoZ) during WGATE. The LoZ period starts 50 ns before the end of HiZ and extends for a period of time, $T_{LR}$, set in register R,[TBD].

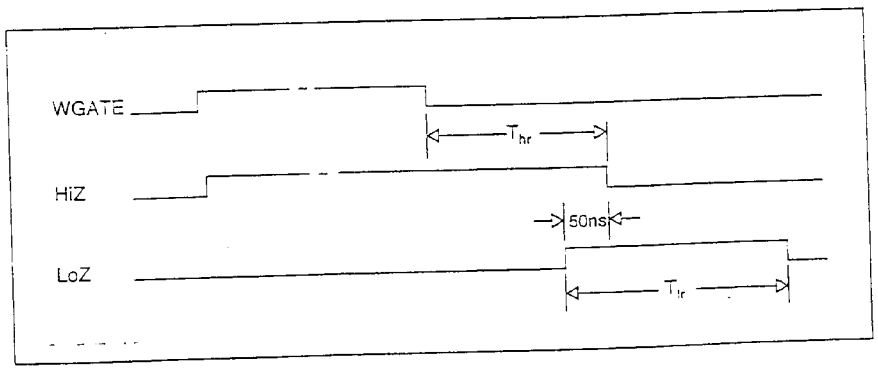

Figure 50   Write Mode to Idle Mode Recovery

Table 16   Write Mode Recovery Squelch Timings

| Parameter | Description | Time / Resistance |
|---|---|---|
| $T_{hr}$ | Time VGA input-open is active after WGATE | 50 ns x R,[TBD] |
| $T_{lr}$ | Time VGA input-LoZ active after (Thr -50 ns) | 50 ns x R,[TBD] |
| | Select 200, 400, 1K or 2K Ohms for shunt LoZ | R,[TBD] |

A 56

8.5 Channel Quality Monitor (CQM)

The functions shown in Figure 51 may be used to collect statistical data on the overall performance of the magnetic recording channel.

(000) $\hat{e}^2 = \sum_n [y_n - \hat{x}_n]^2$  MSE1 referenced to estimated sample value (001) $e^2 = \sum_n [y_n - x_n]^2$  MSE2 referenced to known sample value (010) $e_0^2 = \sum_n [y_n]^2$  MSE3 - error signals (011) $N(T_L, T_H) = \sum_n I(T_L < y_n < T_H)$  Surface analysis (100) $N(\hat{e}^2) = \sum_n I\{[y_n - \hat{x}_n]^2 > T_{\hat{e}^2}\}$  Histogram 1 referenced to estimate (100) $N(e^2) = \sum_n I\{[y_n - x_n]^2 > T_{\hat{e}^2}\}$  Histogram 2 referenced to known sample value Where:

$y_n$ is the parameter being measured $\hat{x}_n$ is the estimated noise free sample value $x_n$ is the known noise free sample value $a_n$ is the known data $I(\cdot)$ is the index function, = 1 if I is true else 0

$T_n$ are programmable thresholds $z_n$ = 1 if decoder output byte $n$ in error, else 0

Confidential                                                System Operation $$(101) \quad N(e^2) = \sum_n I\left(y_n^2 > T_{\hat{e}2}\right) \qquad \text{Histogram 3}$$

$$(110) \quad N(E) = \sum_n I(z_n > 0) \qquad \text{Error Rate}$$

$$(111) \quad D(y) = \sum_{n=1} (y_n \times a_n) + (y_n \times (a_n - 1)) \qquad \text{DiBit Extraction}$$

Where:

$y_n$ is the parameter being measured $\hat{x}_n$ is the estimated noise free sample value $x_n$ is the known noise free sample value $a_n$ is the known data $I(l)$ is the index function, = 1 if l is true else 0

$T_n$ are programmable thresholds $z_n$ = 1 if byte/bit n in error, else 0

Figure 51   Channel Quality Measurements

The active measurement function is selected by the FUNSEL register, 70<2:0>, as defined by Table 17.

Table 17   Channel Quality Functions

| FUNSEL register 70<2:0> | Function |
|---|---|
| 0000 | MSE1, Squared error of received sample minus estimated sample (slicer) |
| 0001 | MSE2, Squared error of received sample minus known sample (known data mode) |
| 0010 | MSE3, Squared error of selected parameter |
| 0011 | SAT, Surface analysis testing |
| 0100 | Histogram 1, referenced to estimated samples (slicer) |

A 58

Confidential                                                        System Operation Table 17    Channel Quality Functions (cont'd)

| FUNSEL register 70<2:0> | Function |
|---|---|
| 0101 | Histogram 2 |
| 0110 | Histogram 3 |
| 0111 | Error rate |
| 1000 | Di-bit Extraction |

The parameter to be measured is selected by the MONSEL register, 70<6:3>. Taken together, the values of the FUNSEL and MONSEL registers define a CQM test. The combination of function and parameter that are supported are shown by an "X" in Table 18.

Table 18    Quality Monitor Test Matrix

| Test Register MONSEL 70<6:3> | FUNSEL register 70<2:0> | | | | | | | | |
|---|---|---|---|---|---|---|---|---|---|
| | MSE 1 0000 | MSE 2 0001 | MSE 3 0010 | SAT 0011 | HIST 1 0100 | HIST 2 0101 | HIST 3 0110 | Error 0111 | Di-bit 1000 |
| 0000  ITR Data | X | X | | X | X | X | | | X |
| 0001  Gain Error | | | X | | | | X | | |
| 0010  Timing Error | | | X | | | | X | | |
| 0011  DC Restore Error | | | X | | | | X | | |
| 0100  MR Asym. Error | | | X | | | | X | | |
| 0101  FIR Adpt. Error | | | X | | | | X | | |
| 0110  Sector Errors 1 | | | | | | | | X | |
| 0111  Sector Errors 2 | | | | | | | | X | |
| 1000  VA Bit Error | | | | | | | | X | |
| 1001  Slicer Bit Error | | | | | | | | X | |
| 1010  ECC BER | | | | | | | | X | |

Confidential                                                    System Operation

8.5.1  The CQM State Machine

CQM measurements are controlled by a finite state machine (FSM) that manages the selected test. The FSM state diagram is described in Figure 52, allowed state transitions are listed in Table 19 and state variables are specified in Table 20.

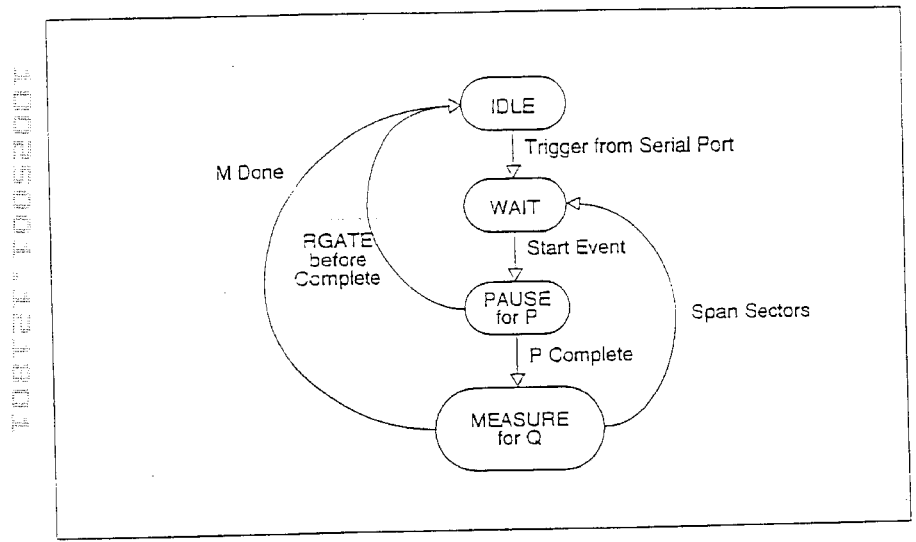

Figure 52   Measurement Interval Timer State Machine

Single sector operation is described in Figure 53. The measurement sequence is initiated when register 68<5> is set to 1. This event resets the state indicators and the P, Q and M counters. The FSM advances to the WAIT state where it waits for an RGATE assertion or a sync-byte-found signal depending on 68<4>. When the selected condition occurs, the FSM advances to the PAUSE state where a delay timer, P, counts P bits before transitioning to the MEASURE state. As a precautionary check, if the FSM is in the PAUSE state when RGATE is de-asserted, an error flag, register 68<0>, is set to 1 and the FSM returns to idle mode.

While in the MEASURE state, data collection is enabled and parametric test data is accumulated in a 20-bit-wide register, called the M accumulator. Only the top 16 bits of the register are accessible through the serial port. An overflow condition is indicated by the register being set to 1. A unit counter, or Q counter, is enabled to keep all the bits in the register being set to 1. A unit counter, or Q counter, is enabled to keep track of the number of measurements processed. The Q counter and the M accumulator are active until the end count, in registers 6A <7:0> and 6C<7:0>, is reached or RGATE is de-asserted.

Confidential                                          System Operation

Normally, measurement data accumulates until the end of sector, signalled by the end of RGATE. However, if 68<1> = 1, data will accumulate until the end count of the Q counter, 6A<7:0> and 6C<7:0>. The FSM returns to Idle mode, and the measurement value, contained in the M accumulator, and the number of measurements made, contained in the Q counter, may be retrieved through the serial interface.

Multiple sector operation is described in Figure 54. If 68<1> = 1 and if the end count is not attained when RGATE is deasserted, the FSM returns to the WAIT state and will continue to collect more data on the next sector or sectors. When the Q counter end count is reached, and the required number of measurements have been made, the FSM sets indicator 68<1> to "1", and returns to the Idle mode state. With this method, the measurement may span multiple sectors.

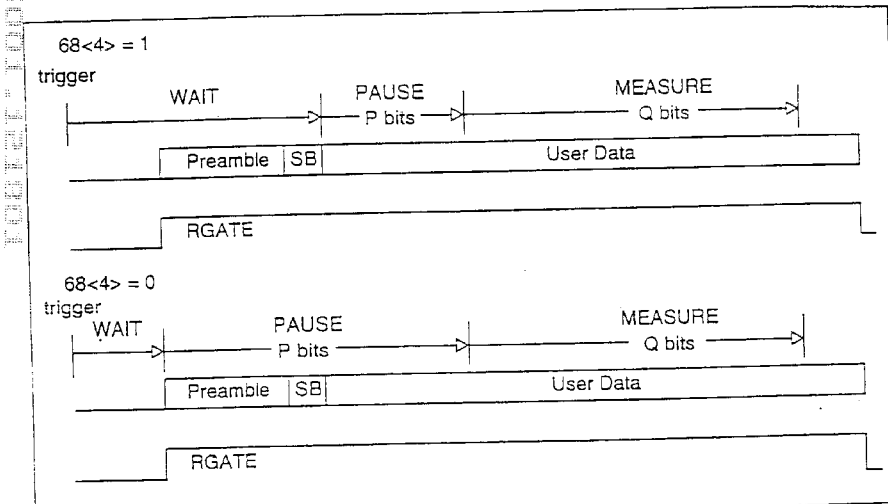

Figure 53    CQM Data Collection Sequence - single sector

Confidential　　　　　　　　　　　　　　　　　　　　　　　　　　System Operation

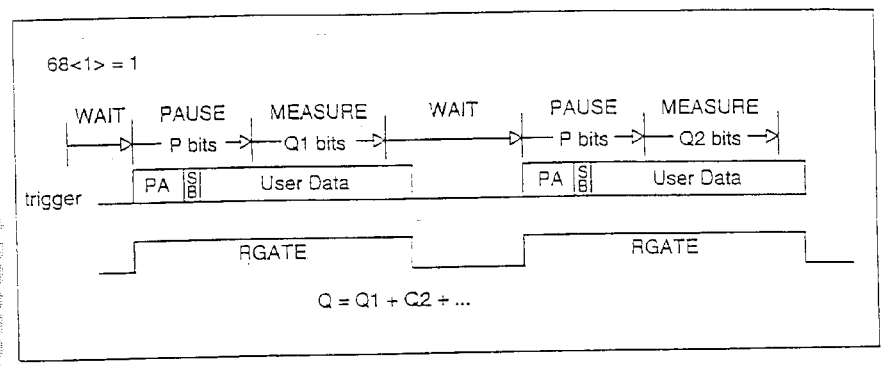

Figure 54　CQM Data Collection Sequence - multiple sectors

Table 19　CQM Measurement

| Event | Definition |
|---|---|
| Trigger | Interface sets 68<5>=1. Enables and resets the state machine |
| Start | {on Sync-Byte found if (68<4>=1)} otherwise on RGATE assertion |
| P Complete | P count is complete setting 68<3> = 1 |
| RGATE before P | RGATE ends before P setting 68<0>=1, an error indicator |
| Span Sectors | RGATE ends before Q and sector span is enabled. 68<1>=1 |
| M Done | on {RGATE if 68<1> = 0} otherwise on {Q count complete which also sets 68<2> =1} |

Table 20　CQM Variables

| REG Variable | Definition |
|---|---|
| 68<7> | trigger and reset |
| 68<4> | start on sync-byte found enable |
| 68<3> | P end count indicator |
| 68<2> | Q end count indicator |
| 68<1> | enable sector span |
| 68<0> | error flag |
| 69<7:0> | P end count value - Specified WAIT time (16 bit units) |
| 6A<7:0> 6B<3:0> | 12 bit Q end count value - MEASURE Sample (in multiples of 16 bits) |

Confidential                                        System Operation

Table 20   CQM Variables (cont'd)

| REG Variable | Definition |
|---|---|
| 6B<7:4> 6C<7:0> | 12 bit Q counter value - Number of Measurements accumulator (in multiples of 16 bits) |
| 72<7:0> 71<7:0> | Top 16 bits of CQM 20 bit measurement accumulator (measurement) |
| 6D<5:0> | $T_H$, High Threshold |
| 6E<5:0> | $T_L$, Low Threshold |
| 6F<7:0> | $T_E$, Error Squared Threshold |
| 6D<7> | Sector error type |

8.5.2   Mean Squared Error

MSE1, MSE2 and MSE3 tests measure squared error. It is left to the user to calculate the real mean squared error by dividing the measured squared error by the number of measurements made, the value that is accumulated in the M counter.

For the MSE1 test, the error is calculated as the difference of the received sample output from the ITR and the estimated noiseless sample value. In the MSE2 test, the error is calculated as the difference in the received sample output from the ITR and a calculated sample derived from an onboard linear feedback shift register (LFSR). The MSE 3 test is used to measure the standard deviation of loop error signals.

8.5.3   Error Rate Tests

The M counter can be used to accumulate errors by using an number of different measures. When an error rate measurement is selected, the Q counter increments on sectors read, i.e. on RGATE deassertion. After Q sectors have been tested, the state machine transitions to the Idle mode state. Assuming 512 byte sectors, 268 million bits may be tested before the counter overflows. This allows measuring error rates to $10^{-7}$ errors per bit.

8.5.3.1   Sector Error Rate (Zero-Pattern Method)

An all $00_h$ byte data pattern is sent to the scrambler and encoder during Write mode. The $00_h$ byte pattern is scrambled before being encoded and written to the disk. Upon readback, the detector, decoder and descrambler invert the process to reconstruct the $00_h$ byte pattern. Errors are detected by the occurrence of non-$00_h$ bytes.

The error accumulator counts sector errors using two different criteria:
- A sector with 1 or more bytes in error, counted as 1 sector in error, 6D<7> = 0.
- A sector with 5 or more bytes in error, counted as 1 sector in error, 6D<7> = 1.

Confidential                                                    System Operation Statistically, for channel error rates less than $10^{-6}$ errors/bit, most sectors in error will contain only a single error event. However, that one error event may corrupt several bytes. When a single error event causes mis-synchronization, hundreds of bytes in error may be generated. Measure (1) will count either outcome as one error. Measure (2) will count only sectors with long bursts of errors, which are probably not ECC correctable.

In order to test large numbers of bits, the CQM state machine parameter should be set to span multiple sectors.

8.5.3.2  Slicer Bit Error Rate

The output of the slicer circuit is compared to known data generated by a linear feedback shift register. For correct comparisons sector data must be written using the known-data Write mode. Bit-wise miscompares are accumulated in the M counter. In order to test large numbers of bits, the CQM state machine parameter should be set to span multiple sectors.

8.5.3.3  Viterbi (VA) Bit Error Rate

The output of the Viterbi detector is compared to known data generated by a linear feedback shift register. For correct comparisons sector data must be written using the known-data Write mode. Bit-wise miscompares are accumulated in the M counter. In order to test large numbers of bits, the CQM state machine parameter should be set to span multiple sectors.

8.5.3.4  Bit Error Rate with ECC

Sector data is written using the "zero pattern" method as outlined in the sector error rate test. Byte output from the decoder is de-interleaved into four byte interleave sequences. One of the four interleave sequences is selected to be byte-wise compared to a zero byte. Byte miscompares are accumulated in the M counter. In order to test large numbers of bits, the CQM state machine parameter should be set to span multiple sectors.

8.5.4  Di-bit Measurement

The di-bit extraction test deconvolves a pseudo-random binary readback sequence that has been written previously to a sector as data. The measurement evaluates one sector to determine one value of the di-bit function. Subsequent values are obtained by shifting the phase of the pseudo-random binary sequence (PRBS) that is used to generate known-data in the deconvolution equation.

Data must be written using known-data Write mode. That is, 20<3> bit set to 1. When a normal Write cycle is executed, the device output is a repeating PRBS data pattern that takes the place of normal encoded write data. Write data input to the NRZIO interface

from the controller is ignored. The synchronization field and sync-byte are output just as in a normal write, although a repeating PRBS is substituted for data.

On readback, the 127 bit PRBS is derived from a linear feedback shift register (LFSR) that performs the polynomial recursion, $x_{n+8} = (x_{n-7} + x_{n+3} + 1)_{mod2}$. In this extraction algorithm, the phase of the PRBS determines the time variable of the extracted di-bit function. In order to obtain all 127 values of the extracted di-bit the phase of the PRBS is incremented by changing the starting value, the seed of the LFSR contained in 73<6:0>.

For the most accurate result, measurement data should be accumulated over multiples of 127 amplitude (ITR) samples. Since the Q counter increments in multiples of 16 bits, a recommended ending value for Q is 127, which is 16 x 127 = 2032 bits

8.6 SNR Margining Tests

Three different methods for SNR margin testing are supported in the SCA8700 device; additive white noise, off-track interference emulation and noise multiplication.

8.6.1 Additive White Noise Test

A white noise generator circuit can be used to add noise to the readback signal at the input of the CTF, output of the VGA. This effectively lowers channel SNR and increases bit error rate. When enough noise is added so that the error rate is between $10^{-6}$ to $10^{-7}$ (errors/bit) the error rate becomes a sensitive indicator of the effect of channel parameter settings. Pre-comp, head current, equalizer settings, etc. may then be more easily adjusted to find optimal settings.

Injected noise is "white", while preamp noise may be "colored", and as a result the channel parameter settings found using this method may be only close to optimal. Because injected noise is added after the VGA, the effective SNR obtained will be relatively independent of the signal level input of the VGA, and will be repeatable to the extent that the CTF and FIR transfer functions are constant. The amplitude of the injected noise, which has a 300 MHz noise bandwidth is varied by register R,[TBD]. This can produce effective SNR's of 15dB to 25dB. SNR herein is defined as the isolated pulse peak voltage divided by RMS noise voltage.

8.6.2 Off-Track Interference Emulator

The input to the Viterbi detector prefilter can be artificially corrupted by adding a scaled output from a linear feedback shift register (LFSR). The amplitude of the LFSR can be varied by register 75<7:0>. The frequency content of the LFSR signal is designed to match the spectrum of off-track interference experienced by the channel during off-track stress testing (OTC).

Confidential — System Operation

8.6.3 Noise Multiplier Test

This test assumes known data, so a known-data write must be used to set up test data sectors. The known-data pattern used, a repeating PRBS, is modified to satisfy the parity constraint of the Viterbi detector by setting register 73<7> to 1.

The error signal at the input to the Viterbi detector prefilter is measured by comparing input amplitude samples to the known-data pattern. The derived error signal is multiplied by a scaling factor and then added back to the known signal. This uniformly multiplies all noises and distortions by the scaling factor, creating a uniform degradation of the effective detector SNR. The amplitude of the noise multiplication error is adjusted by register 75<7:0>.

8.6.4 Arbitrary Waveform Injection

The ViewDac circuit of the SCA8700 can be used to generate arbitrary waveforms that may be used to simulate analog input signals. These waveforms can be injected at various nodes in the analog signal path as illustrated in Figure 55.

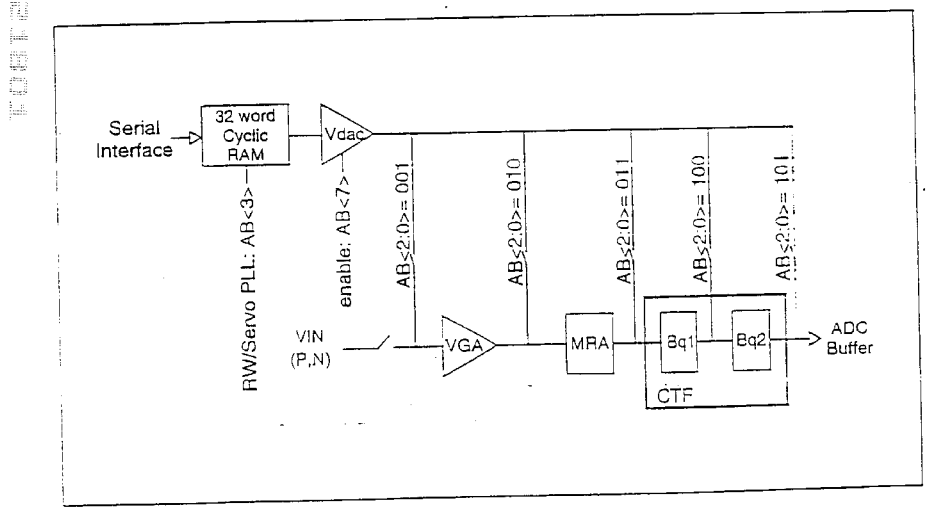

Figure 55    Analog Signal Injection

A 32-word cyclic random access memory (RAM) is first loaded with waveform sample values via the serial interface. The clocked output samples are input to the viewdac (Vdac) where they are converted to analog values. As shown in Figure 55, the output of the viewdac can be connected to various inputs in the analog signal path as selected by register AB<2:0>. The cyclic RAM is clocked from either the R/W PLL or Servo PLL

Confidential                                        System Operation depending on the setting of AB<3>. Normally, in this mode the input signal from the preamp, VIN(P,N) is disconnected from the VGA by setting AB<4> to 1.

The analog signal injection function may be used to simulate typical sinusoidal input waveforms that can be used with the CQM, to measure and calibrate the frequency transfer function of the VGA and CTF.

8.7  View DAC

The SCA8700 allows real time viewing of digital signals in the analog domain by using a high speed, 7-bit View DAC. The functional description of the View DAC is shown in Figure 56, and operating modes are specified in Table 21 and Table 22.

Register B0<2:0> controls the selection of internal signals which are routed to the View DAC. The selected data can then be brought off-chip at reduced or full speed depending upon the setting of B0<7:3>. The actual divisor will be the value of B0<7:3>+1. For example, if the setting in this field is 000, then the data is divided by 1, and by 8 if the setting is 111.

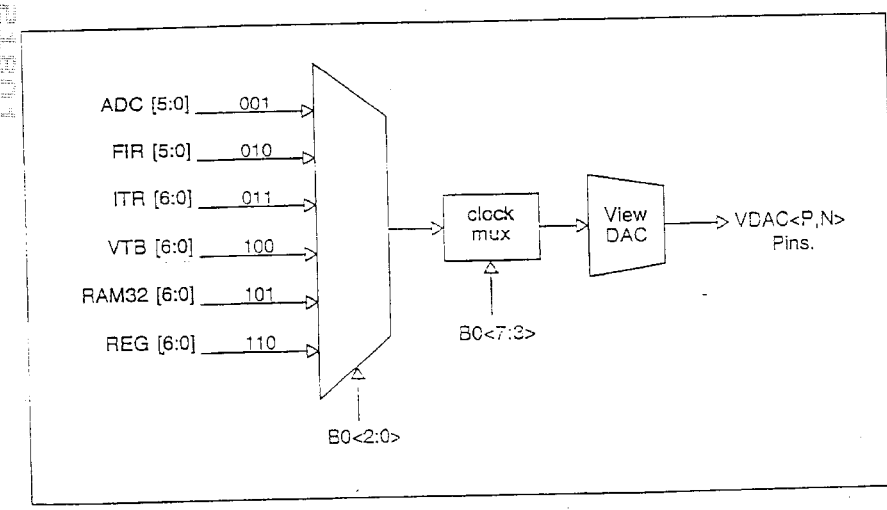

Figure 56   View DAC

Confidential                                          System Operation

Table 21    View DAC Input Select

| B0<2:0> | Description |
|---|---|
| 000 | Selects a value of 0 into the View DAC input |
| 001 | Selects the output from the ADC |
| 010 | Selects the output from the FIR |
| 011 | Selects the output from the ITR |
| 100 | Selects the output from the Viterbi |
| 101 | Selects the output from a 128-byte RAM |
| 110 | Selects the output from a user loaded serial port register |

Table 22    View DAC Decimation

| B0<7:3> | Description |
|---|---|
| 000 | View DAC output is every clock period |
| 001 | View DAC output is every 2nd clock period |
| ... | ... |
| 111 | View DAC output is every 8th clock period |

8.8    Analog Test Port

A differential analog test port may be used to monitor and inject analog signals along the signal path of the front end of the SCA6700. VGA input pins VIN_P and VIN_N are multiplexed to input ports along the signal path. ASIG_P and ASIG_N pins are switched to the selected output along the signal path as shown in Figure 57.

A 68

Confidential                                          System Operation

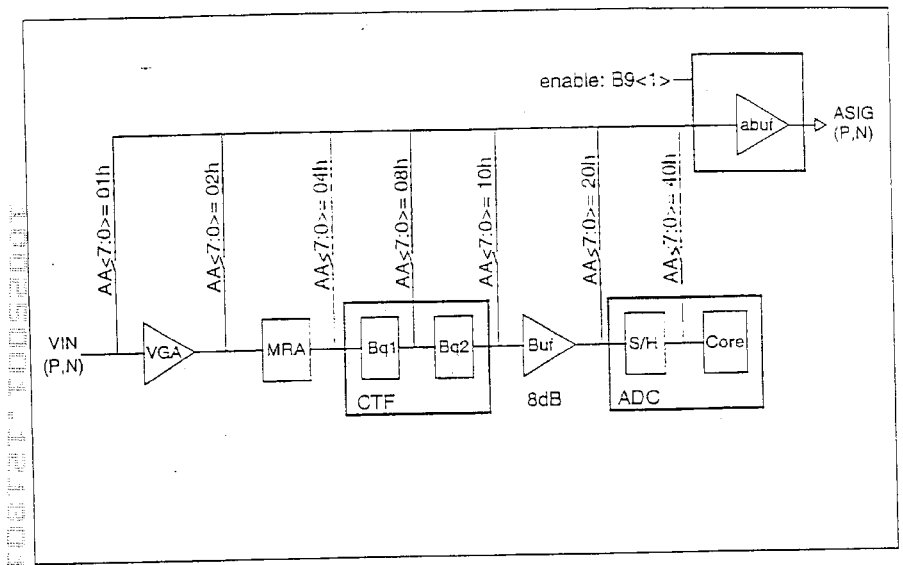

Figure 57    Analog Test Port

Table 23 specifies the value of register AA<7:0> needed to connect a selected signal to the ASIG output pins.

Table 23    Analog Test Port

| AA<7:0> | Output Selected |
| --- | --- |
| 00000000 | No connect to Aout normal op. |
| 00000001 | Connects pins ASIG_P/ASIG_N to output testbus |
| 00000010 | VGA output |
| 00000100 | Asymmetry correction output |
| 00001000 | Ist biquad output |
| 00010000 | CTF output |
| 00100000 | 8 dB buffer output |
| 01000000 | S/H output |

A 69

Confidential                                    System Operation

8.9 Multiplexed Test Pin (MTP)

A single MTP is used to connect to internal test signals. The function of the MTP is controlled by register BA<2:0>. Figure 24 lists available signals.

Table 24    Multiplexed Test Pin

| BA<2:0> | RGATE | WGATE | SERVO | MTP | Description |
|---|---|---|---|---|---|
| 000 | X | X | X | NSYNC | Not sync-byte found |
| 001 | X | X | X | WRITE_ERROR | WRITE error. |
| 010 | X | X | X | GRAY_DATA | Gray decode output |
| 011 | X | X | X | PLLR_LOCKED | Read PLL locked |
| 100 | X | X | X | PLLS_LOCKED | Servo PLL locked |
| 101 | X | X | X | WRP_INVALID | WRP Invalid/WRP Error |
| 110 | X | X | X | FIR_SATURATION | FIR tap out of range |
| 111 | X | 0 | 0 | NSYNC | Not sync-byte found |
| 111 | 0 | 1 | X | WRITE_ERROR | WRITE error |
| 111 | 0 | 0 | 1 | GRAY_DATA | GRAY decode output |

Confidential                                    Register Map

9  Register Map

9.1  Register Map Index

Table 25   Register Map Group Assignments

| Group | Address Range | Description |
|-------|---------------|-------------|
| 00000 | 00 - 07 | Power and Mode Control |
| 00001 | 08 - 0F | Counter Timers |
| 00010 | 10 - 17 | ITR |
| 00011 | 18 - 1F | ITR |
| 00100 | 20 - 27 | NRZIO and Write |
| 00101 | 28 - 2F | FIR |
| 00110 | 30 - 37 | FIR |
| 00111 | 38 - 3F | FIR |
| 01000 | 40 - 47 | Servo |
| 01001 | 48 - 4F | Servo |
| 01010 | 50 - 57 | Servo |
| 01011 | 58 - 5F | Servo |
| 01100 | 60 - 67 | Viterbi and Sync Detector |
| 01101 | 68 - 6F | CQM |
| 01110 | 70 - 77 | CQM |
| 01111 | 78 - 7F | AGC |
| 10000 | 80 - 87 | AGC |
| 10001 | 88 - 8F | Thermal Asperity |
| 10010 | 90 - 97 | PLL |
| 10011 | 98 - 9F | PLL |
| 10100 | A0 - A7 | CTF |
| 10101 | A8 - AF | Test |
| 10110 | B0 - B7 | Test |
| 10111 | B8 - BF | Test |
| 11000 | C0 - C7 | Test |
| 11001 | C8 - CF | unused |
| 11010 | D0 - D7 | unused |
| 11011 | C8 - DF | unused |

Confidential | Register Map

Table 25  Register Map Group Assignments

| Group | Address Range | Description |
|---|---|---|
| 11100 | E0 - E7 | unused |
| 11101 | E8 - EF | unused |
| 11110 | F0 - F7 | unused |
| 11111 | F8 - FF | unused |

9.2  Register Assignments

*Note: 1) Bit fields marked with '0' are reserved.*

00 CHIP ID (Reset value: $00_H$)

| R | 7 | 6 | 5 | 4 | 3 | 2 | 1 | 0 |
|---|---|---|---|---|---|---|---|---|
| 00 | 0 | 0 | 0 | 0 | CF3 | CF2 | CF1 | CF0 |

| Bits | Name | Description |
|---|---|---|
| <3:0> | CF | |

01 POWER CONTROL (Reset value: $00_H$)

| RW | 7 | 6 | 5 | 4 | 3 | 2 | 1 | 0 |
|---|---|---|---|---|---|---|---|---|
| 01 | 0 | 0 | 0 | 0 | APCS1 | APCS0 | DPCS1 | DPCS0 |

| Bits | Name | Description |
|---|---|---|
| <3:2> | APCS | *Analog Power Control*<br>x0 Power controlled according to mode, as referenced in Table 4<br>01 Power up circuits selected by 1 bits of register 02<br>11 Power up circuits selected by 0 bits of register 02 |
| <1:0> | DPCS | *Digital Power Control*<br>x0 Power controlled according to mode, as referenced in Table 4<br>01 Power up circuits selected by 1 bits of register 03<br>11 Power up circuits selected by 0 bits of register 03 |

A 72

Confidential  Register Map

02 POWER CONTROL ANALOG  (Reset value: $00_H$)

| RW | 7 | 6 | 5 | 4 | 3 | 2 | 1 | 0 |
|---|---|---|---|---|---|---|---|---|
| 02 | 0 | 0 | AFE | ADC | WPR | BGP | PLLS | PLLR |

| Bits | Name | Description |
|---|---|---|
| | | If 01<3:2>=01 circuits with the respective bit set to 1 are powered up |
| | | If 01<3:2>=11 circuits with the respective bit set to 0 are powered up |
| <5> | AFE | Analog Front End |
| <4> | ADC | Analog to Digital Convertor |
| <3> | WPR | Write Precomp |
| <2> | BGP | Band Gap Power Regulator |
| <1> | PLLS | Servo PLL |
| <0> | PLLR | Read PLL |

03 POWER CONTROL DIGITAL  (Reset value: $00_H$)

| RW | 7 | 6 | 5 | 4 | 3 | 2 | 1 | 0 |
|---|---|---|---|---|---|---|---|---|
| 03 | 0 | NRZIO | RDP | WRP | AGC | VIT | ITR | FIR |

| Bits | Name | Description |
|---|---|---|
| | | If 01<1:0>=01 circuits with the respective bit set to 1 are powered up |
| | | If 01<1:0>=11 circuits with the respective bit set to 0 are powered up |
| <6> | NRZIO | NRZIO Interface Output |
| <5> | RDP | Digital Read Path |
| <4> | WRP | Digital Write Path |
| <3> | AGC | Analog Gain Control |
| <2> | VIT | Viterbi Detector |
| <1> | ITR | Digital Timing Recovery |
| <0> | FIR | FIR Filter |

Confidential                          Register Map

04 MODE CONFIG 0        (Reset value: $04_H$)

| RW | 7 | 6 | 5 | 4 | 3 | 2 | 1 | 0 |
|---|---|---|---|---|---|---|---|---|
| 04 | 0 | 0 | 0 | 0 | 0 | SUSP | WDS | RGEXT |

| Bits | Name | Description |
|---|---|---|
| <2> | SUSP | *Suspend Mode* <br> 0 Go to Doze mode, refer to Figure 3 <br> 1 Go to Suspend mode, refer to Figure 3 |
| <1> | WDS | *Write During Servo* <br> 0 Disable <br> 1 Enable. Allows the user to "erase" bad servo burst areas. The Write mode DURING Servo mode can only be entered from Servo mode |
| <0> | RGEXT | *Read Gate Extension Enable* <br> 0 Disabled <br> 1 Enabled. Read gate extension extends internal RGATE to flush data stored in the Viterbi path memory |

08 SYNC MARK INSERT TIME        (Reset value: $00_H$)

| RW | 7 | 6 | 5 | 4 | 3 | 2 | 1 | 0 |
|---|---|---|---|---|---|---|---|---|
| 08 | SMIT7 | SMIT6 | SMIT5 | SMIT4 | SMIT3 | SMIT2 | SMIT1 | SMIT0 |

| Bits | Name | Description |
|---|---|---|
| <7:0> | SMIT | *Sync Mark Insert Time* <br> The value of time in VCO clocks from RGATE when a "sync mark found" will be inserted. This register will be used in the event that a sync mark cannot be found during a normal read operation. No sync mark is inserted if register value is 00h |

09 ACQUISITION TIME        (Reset value: $00_H$)

| R | 7 | 6 | 5 | 4 | 3 | 2 | 1 | 0 |
|---|---|---|---|---|---|---|---|---|
| 09 | 0 | AQT6 | AQT5 | AQT4 | AQT3 | AQT2 | AQT1 | AQT0 |

| Bits | Name | Description |
|---|---|---|
| <6:0> | AQT | *Acquisition Time* <br> AQT<6:0> is a programmable 7-bit delay that determines ITR acquisition time. Time is 09<6:0> x 4T <br> Typically set to $18_h$ |

A74

Confidential            Register Map

0A GAIN ACQUISITION TIME      (Reset value: $00_H$)

| R | 7 | 6 | 5 | 4 | 3 | 2 | 1 | 0 |
|---|---|---|---|---|---|---|---|---|
| 0A | 0 | GAQT6 | GAQT5 | GAQT4 | GAQT3 | GAQT2 | GAQT1 | GAQT0 |

| Bits | Name | Description |
|------|------|-------------|
| <6:0> | GAQT | Gain Acquisition Time<br>GAQT<6:0> is a programmable 7-bit delay that determines AGC acquisition time. Time is 0A<6:0> x 4T<br>Typically set to 18. |

11 ITR ALPHA AQUISITION      (Reset value: $29_H$)

| RW | 7 | 6 | 5 | 4 | 3 | 2 | 1 | 0 |
|----|---|---|---|---|---|---|---|---|
| 11 | ALAQ7 | ALAQ6 | ALAQ5 | ALAQ4 | ALAQ3 | ALAQ2 | ALAQ1 | ALAQ0 |

| Bits | Name | Description |
|------|------|-------------|
| <7:0> | ALAQ | ITR Loop Filter Alpha |

12 ITR BETA AQUISITION      (Reset value: $31_H$)

| RW | 7 | 6 | 5 | 4 | 3 | 2 | 1 | 0 |
|----|---|---|---|---|---|---|---|---|
| 12 | BETAQ7 | BETAQ6 | BETAQ5 | BETAQ4 | BETAQ3 | BETAQ2 | BETAQ1 | BETAQ0 |

| Bits | Name | Description |
|------|------|-------------|
| <7:0> | BETAQ | ITR Loop Filter Beta |

13 ITR ALPHA TRACKING      (Reset value: $1B_H$)

| RW | 7 | 6 | 5 | 4 | 3 | 2 | 1 | 0 |
|----|---|---|---|---|---|---|---|---|
| 13 | ATRAC7 | ATRAC6 | ATRAC5 | ATRAC4 | ATRAC3 | ATRAC2 | ATRAC1 | ATRAC0 |

| Bits | Name | Description |
|------|------|-------------|
| <7:0> | ATRAC | ITR Loop Filter Tracking Alpha |

Confidential                                            Register Map

14 ITR BETA TRACKING

| RW | 7 | 6 | 5 | 4 | 3 | 2 | 1 | 0 |
|---|---|---|---|---|---|---|---|---|
| 14 | BTRAC7 | BTRAC6 | BTRAC5 | BTRAC4 | BTRAC3 | BTRAC2 | BTRAC1 | BTRAC0 |

| Bits | Name | Description |
|---|---|---|
| <7:0> | BTRAC | ITR Loop Filter Tracking Beta |

20 NRZIO/WRITE CONFIG                (Reset value: $20_H$)

| RW | 7 | 6 | 5 | 4 | 3 | 2 | 1 | 0 |
|---|---|---|---|---|---|---|---|---|
| 20 | 0 | PP | WCLKP | RCLKP | WRKD | DIRW | WPD | SCRD |

| Bits | Name | Description |
|---|---|---|
| <6> | PP | Push Pull<br>0 Open drain<br>1 Push - pull (default) |
| <5> | WCLKP | Write Clock Polarity<br>0 NRZ data clocks in on rising edge of WCLK<br>1 NRZ data clocks in on falling edge of WCLK |
| <4> | RCLKP | Read Clock Polarity<br>0 NRZ data switches after falling edge of RCLK<br>1 NRZ data switches after rising edge of RCLK |
| <3> | WRKD | Known Data Write<br>0 normal<br>1 enable Known Data Write mode |
| <2> | DIRW | Direct Write<br>0 Normal mode<br>1 enable Direct Write mode |
| <1> | WPD | Write mode Precoder Disable<br>1 = disable |
| <0> | SCRD | Scrambler Disable<br>1 = disable |

A 76

Confidential — Register Map

22 WRITE MODE PRECOMP PHASE SELECT 1 (Reset value: $00_H$)

| RW | 7 | 6 | 5 | 4 | 3 | 2 | 1 | 0 |
|---|---|---|---|---|---|---|---|---|
| 22 | 0 | WPC16 | WPC15 | WPC14 | WPC13 | WPC12 | WPC11 | WPC10 |

| Bits | Name | Description |
|---|---|---|
| <6:0> | WPC1 | Write mode Precompensation Phase 1 |

23 WRITE MODE PRECOMP PHASE SELECT 2 (Reset value: $00_H$)

| RW | 7 | 6 | 5 | 4 | 3 | 2 | 1 | 0 |
|---|---|---|---|---|---|---|---|---|
| 23 | 0 | WPC26 | WPC25 | WPC24 | WPC23 | WPC22 | WPC21 | WPC20 |

| Bits | Name | Description |
|---|---|---|
| <6:0> | WPC2 | Write mode Precompensation Phase 2 |

24 WRITE MODE PRECOMP PHASE SELECT 3 (Reset value: $00_H$)

| RW | 7 | 6 | 5 | 4 | 3 | 2 | 1 | 0 |
|---|---|---|---|---|---|---|---|---|
| 24 | 0 | WPC35 | WPC35 | WPC34 | WPC33 | WPC32 | WPC31 | WPC30 |

| Bits | Name | Description |
|---|---|---|
| <6:0> | WPC3 | Write mode Precompensation Phase 3 |

Confidential | Register Map

28-31 FIR READ MODE COEFFICIENTS 0 - 9 (Reset value: $00_H$)

| RW | 7 | 6 | 5 | 4 | 3 | 2 | 1 | 0 |
|---|---|---|---|---|---|---|---|---|
| 28 - 31 | RFC7 | RFC6 | RFC5 | RFC4 | RFC3 | RFC2 | RFC1 | RFC0 |

| Bits | Name | Description |
|---|---|---|
| <7:0> | RFC | FIR 8-bit coefficient of tap 0 for Read mode |
| <7:0> | RFC | FIR 8-bit coefficient of tap 1 for Read mode |
| <7:0> | RFC | FIR 8-bit coefficient of tap 2 for Read mode |
| <7:0> | RFC | FIR 8-bit coefficient of tap 3 for Read mode |
| <7:0> | RFC | FIR 8-bit coefficient of tap 4 for Read mode |
| <7:0> | RFC | FIR 8-bit coefficient of tap 5 for Read mode |
| <7:0> | RFC | FIR 8-bit coefficient of tap 6 for Read mode |
| <7:0> | RFC | FIR 8-bit coefficient of tap 7 for Read mode |
| <7:0> | RFC | FIR 8-bit coefficient of tap 8 for Read mode |
| <7:0> | RFC | FIR 8-bit coefficient of tap 9 for Read mode |

32-3B FIR SERVO MODE COEFFICIENTS 0 - 9 (Reset value: $00_H$)

| RW | 7 | 6 | 5 | 4 | 3 | 2 | 1 | 0 |
|---|---|---|---|---|---|---|---|---|
| 32 - 3B | SRF7 | SRF6 | SRF5 | SRF4 | SRF3 | SRF2 | SRF1 | SRF0 |

| Bits | Name | Description |
|---|---|---|
| <7:0> | SRF | FIR 8-bit coefficient of tap 0 for Servo mode |
| <7:0> | SRF | FIR 8-bit coefficient of tap 1 for Servo mode |
| <7:0> | SRF | FIR 8-bit coefficient of tap 2 for Servo mode |
| <7:0> | SRF | FIR 8-bit coefficient of tap 3 for Servo mode |
| <7:0> | SRF | FIR 8-bit coefficient of tap 4 for Servo mode |
| <7:0> | SRF | FIR 8-bit coefficient of tap 5 for Servo mode |
| <7:0> | SRF | FIR 8-bit coefficient of tap 6 for Servo mode |
| <7:0> | SRF | FIR 8-bit coefficient of tap 7 for Servo mode |
| <7:0> | SRF | FIR 8-bit coefficient of tap 8 for Servo mode |
| <7:0> | SRF | FIR 8-bit coefficient of tap 9 for Servo mode |

A 78

Confidential .                                                                      Register Map

3C FIR CONFIG 0                                           (Reset value: 00$_H$)

| RW | 7 | 6 | 5 | 4 | 3 | 2 | 1 | 0 |
|---|---|---|---|---|---|---|---|---|
| 3C | CS7 | CS6 | CS5 | CS4 | CS3 | CS2 | CS1 | CS0 |

| Bits | Name | Description |
|---|---|---|
| <7:0> | CS | *Cursor Tap Mask, bits 0 - 7*<br>If CSn = 1, then the coefficient value of tap n is not adapted. Recommend taps <4> and <5> be set to 1 |

3D FIR CONFIG 1                                           (Reset value: 00$_H$)

| RW | 7 | 6 | 5 | 4 | 3 | 2 | 1 | 0 |
|---|---|---|---|---|---|---|---|---|
| 3D | 0 | 0 | 0 | 0 | IFP | SA | CS9 | CS8 |

| Bits | Name | Description |
|---|---|---|
| <3> | IFP | *Initialize From Previous Read mode*<br>FIR coefficients are always loaded from the Read mode shadow registers to the FIR coefficient registers on the assertion of RGATE at the beginning of a Read mode<br>1 The shadow registers are updated at the end of a Read if FIR coefficient saturation does not occur<br>0 The shadow registers are not updated during a Read mode. They contain fixed coefficients either from a previous Read mode or values that have been loaded via the serial interface |
| <2> | SA | *Self-Adaptive Mode Enable*<br>If SA = 1, self-adaptive mode is enabled during Read mode |
| <1> | CS9 | *Cursor Tap Mask, bit 9*<br>If CS9 = 1, then the coefficient value of tap 9 is not adapted |
| <0> | CS8 | *Cursor Tap Mask, bit 8*<br>If CS8 = 1, then the coefficient value of tap 8 is not adapted |

3E FIR ADAPTATION GAIN                                    (Reset value: 00$_H$)

| RW | 7 | 6 | 5 | 4 | 3 | 2 | 1 | 0 |
|---|---|---|---|---|---|---|---|---|
| 3E | 0 | 0 | 0 | 0 | AG3 | AG2 | AG1 | AG0 |

| Bits | Name | Description |
|---|---|---|
| <3:0> | AG | *Adaptation Gain*<br>Set the adaptation loop gain during regular tracking in Read mode |

A 79

Confidential            Register Map

60 VITERBI CONFIG        (Reset value: $00_H$)

| RW | 7 | 6 | 5 | 4 | 3 | 2 | 1 | 0 |
|---|---|---|---|---|---|---|---|---|
| 60 | 0 | 0 | 0 | 0 | 0 | 0 | 0 | HDPOL |

| Bits | Name | Description |
|---|---|---|
| <0> | HDPOL | *Viterbi Head Polarity Select*<br>0 Positive<br>1 Negative |

61 SYNC DETECTOR THRESHOLD        (Reset value: $00_H$)

| RW | 7 | 6 | 5 | 4 | 3 | 2 | 1 | 0 |
|---|---|---|---|---|---|---|---|---|
| 61 | 0 | 0 | 0 | 0 | STH3 | STH2 | STH1 | STH0 |

| Bits | Name | Description |
|---|---|---|
| <4:0> | STH | *Sync Qualification Threshold*<br>Synchronization is asserted when $\sum (X_i - \overline{X_i})^2$ is $\leq$ the threshold where $X_i$ is the SLICER output and $\overline{X_i}$ is the expected sync sequence.<br>Recommend 8 |

A 80

Confidential  Register Map

68 CQM CONFIG 0 (Reset value: 00$_H$)

| R | 7 | 6 | 5 | 4 | 3 | 2 | 1 | 0 |
|---|---|---|---|---|---|---|---|---|
| 68 | A | 0 | EN | SB | EP | EQ | L | ER |

| Bits | Name | Description |
|---|---|---|
| <7> | A | ARM When set to 1 triggers CQM by moving to HOLD state and resets all state variables |
| <5> | EN | Enable When set to 1, enables the entire CQM block |
| <4> | SB | Sync-byte If set to 1 HOLD state is entered on sync-byte found, else on RGATE assertion |
| <3> | EP | End P When P Counter Terminal Count Complete value is set to 1 else 0 (read only bit) |
| <2> | EQ | End Q When Q Counter Terminal Count Complete value is set to 1 else 0 (read only bit) |
| <1> | L | Loop Enable When set to 1 the CQM will return to idle mode if Q count not complete on end of RGATE |
| <0> | ER | Error Flag An error flag that is set if still in WAIT state at end of RGATE |

69 CQM HOLD TIME (Reset value: 00$_H$)

| RW | 7 | 6 | 5 | 4 | 3 | 2 | 1 | 0 |
|---|---|---|---|---|---|---|---|---|
| 69 | PT7 | PT6 | PT5 | PT4 | PT3 | PT2 | PT1 | PT0 |

| Bits | Name | Description |
|---|---|---|
| <7:0> | PT | Hold off counter end count. Sets value to delay sampling of data by CQM |

Confidential            Register Map

6A CQM Q END COUNT MSB    (Reset value: 00_H)

| RW | 7 | 6 | 5 | 4 | 3 | 2 | 1 | 0 |
|---|---|---|---|---|---|---|---|---|
| 6A | QT11 | QT10 | QT9 | QT8 | QT7 | Q6 | Q5 | Q4 |

| Bits | Name | Description |
|---|---|---|
| <7:0> | QT | Q sample counter end count. Sets the number desired samples |

6B CQM Q END COUNT    (Reset value: 00_H)

| RW | 7 | 6 | 5 | 4 | 3 | 2 | 1 | 0 |
|---|---|---|---|---|---|---|---|---|
| 6B | Q11 | Q10 | Q9 | Q8 | QT3 | QT2 | QT1 | QT0 |

| Bits | Name | Description |
|---|---|---|
| <7:4> | Q | Q sample counter value. Sets the number desired samples. Upper 4 bits |
| <3:0> | QT | Q sample counter end count. Contains the current sample count. Upper 4 bits |

6C CQM Q COUNT LSB    (Reset value: 00_H)

| R | 7 | 6 | 5 | 4 | 3 | 2 | 1 | 0 |
|---|---|---|---|---|---|---|---|---|
| 6C | Q7 | Q6 | Q5 | Q4 | Q3 | Q2 | Q1 | Q0 |

| Bits | Name | Description |
|---|---|---|
| <7:0> | QT | Q sample counter value. Contains the current sample count. Lower 8 Bits |

6D CQM HIGH THRESHOLD    (Reset value: 00_H)

| RW | 7 | 6 | 5 | 4 | 3 | 2 | 1 | 0 |
|---|---|---|---|---|---|---|---|---|
| 6D | SEL | 0 | TH5 | TH4 | TH3 | TH2 | TH1 | TH0 |

| Bits | Name | Description |
|---|---|---|
| <7> | SEL | "Sector in Error" Measure<br>0 A sector in error has 1 or more bytes in error<br>1 A sector in error has 5 or more bytes in error |
| <5:0> | TH | *High Threshold ($T_H$)*<br>This is a two's complement value from −32 to +32. See Figure 51 |

Confidential — Register Map
6E CQM LOW THRESHOLD (Reset value: $00_H$)
| RW | 7 | 6 | 5 | 4 | 3 | 2 | 1 | 0 |
|---|---|---|---|---|---|---|---|---|
| 6E | 0 | 0 | 0 | TL4 | TL3 | TL2 | TL1 | TL0 |
| Bits | Name | Description |
|---|---|---|
| <5:0> | TL | Low Threshold ($T_L$) This is a two's complement value from −32 to +32. See Figure 51 |
6F CQM HISTOGRAM THRESHOLD (Reset value: $00_H$)
| RW | 7 | 6 | 5 | 4 | 3 | 2 | 1 | 0 |
|---|---|---|---|---|---|---|---|---|
| 6F | TE7 | TE6 | TE5 | TE4 | TE3 | TE2 | TE1 | TE0 |
| Bits | Name | Description |
|---|---|---|
| <7:0> | TE | Low Threshold ($T_L$) This is a two's complement value from −32 to +32. See Figure 51 |

Confidential                                                    Register Map

70 CQM TEST CONFIG 1                              (Reset value: 00$_H$)

| RW | 7 | 6 | 5 | 4 | 3 | 2 | 1 | 0 |
|---|---|---|---|---|---|---|---|---|
| 70 | 0 | MS3 | MS2 | MS1 | MS0 | FS2 | FS1 | FS0 |

| Bits | Name | Description |
|---|---|---|
| <6:3> | MS | MONSEL<br>0000 ITR sample value output<br>0001 Gain errors<br>0010 Timing errors<br>0011 DC restore errors<br>0100 MR asym errors<br>0101 FIR adaptation errors<br>0110 Sector errors - type 1<br>0111 Sector errors - type 2<br>1000 VA output bit errors<br>1001 Slicer output bit errors<br>1010 ECC interleave bit errors |
| <2:0> | FS | FUNSEL<br>0000 MSE1 - referenced to slicer<br>0001 MSE2 - referenced to known data<br>0010 MSE3 - no reference<br>0011 SAT, surface analysis test<br>0100 Histogram 1 - referenced to slicer<br>0101 Histogram 2 - referenced to known data<br>0110 Histogram 3 - no reference<br>0111 Error rate function<br>1000 Di-bit extraction function |

71 CQM M ACCUMULATOR LSB                         (Reset value: 00$_H$)

| R | 7 | 6 | 5 | 4 | 3 | 2 | 1 | 0 |
|---|---|---|---|---|---|---|---|---|
| 71 | ML7 | ML6 | ML5 | ML4 | ML3 | ML2 | ML1 | ML0 |

| Bits | Name | Description |
|---|---|---|
| <7:0> | ML | CQM Measurement Accumulator Lower 8 Bits |

A 84

Confidential  Register Map

72 CQM M ACCUMULATOR MSB (Reset value: 00$_H$)

| R | 7 | 6 | 5 | 4 | 3 | 2 | 1 | 0 |
|---|---|---|---|---|---|---|---|---|
| 72 | MM7 | MM6 | MM5 | MM4 | MM3 | MM2 | MM1 | MM0 |

| Bits | Name | Description |
|------|------|-------------|
| <7:0> | ML | CQM Measurement Accumulator Upper 8 Bits |

73 KNOWN DATA READ PRBS SEED (Reset value: 00$_H$)

| RW | 7 | 6 | 5 | 4 | 3 | 2 | 1 | 0 |
|----|---|---|---|---|---|---|---|---|
| 73 | GMOD | KDS6 | KDS5 | KDS4 | KDS3 | KDS2 | KDS1 | KDS0 |

| Bits | Name | Description |
|------|------|-------------|
| <7> | GMOD | Generate Modified PRBS |
| <6:0> | KDS | Known Data RRBS Seed for Read mode |

NOISE INJECTION CONFIG (Reset value: 00$_H$)

| RW | 7 | 6 | 5 | 4 | 3 | 2 | 1 | 0 |
|----|---|---|---|---|---|---|---|---|
|    |   |   |   |   |   |   |   |   |

| Bits | Name | Description |
|------|------|-------------|
| <7:0> | | see Balboa specification |

75 OFF-TRACK INTERFERENCE EMULATOR (Reset value: 00$_H$)

| RW | 7 | 6 | 5 | 4 | 3 | 2 | 1 | 0 |
|----|---|---|---|---|---|---|---|---|
| 75 | OTE7 | OTE6 | OTE5 | OTE4 | OTE3 | OTE2 | OTE1 | OTE0 |

| Bits | Name | Description |
|------|------|-------------|
| <7:0> | OTE | Off-track Interference Amplitude |

Confidential                                                Register Map

76 NOISE MULTIPLIER                          (Reset value: 00$_H$)

| RW | 7 | 6 | 5 | 4 | 3 | 2 | 1 | 0 |
|---|---|---|---|---|---|---|---|---|
| 76 | NMA7 | NMA6 | NMA5 | NMA4 | NMA3 | NMA2 | NMA1 | NMA0 |

| Bits | Name | Description |
|---|---|---|
| <7:0> | NMA | Noise Multiplier Amplitude |

78 AGC/DC OFFSET/MRA CONFIG                  (Reset value: 20$_H$)

| RW | 7 | 6 | 5 | 4 | 3 | 2 | 1 | 0 |
|---|---|---|---|---|---|---|---|---|
| 78 | 0 | 0 | MRAUR | MRAUS | VOSUR | VOSUS | GURE0 | GUSE0 |

| Bits | Name | Description |
|---|---|---|
| <5> | MRAUR | *MRA Update Method Read*<br>0 disable - A fixed initial MRA loop setting is contained in register 7F<br>1 update - The initial MRA setting in 7F is updated at the end of a read |
| <4> | MRAUS | *MRA Update Method Servo*<br>0 disable - A fixed initial MRA loop setting is contained in register 80<br>1 update - The initial MRA setting in 80 is updated at the end of a read |
| <3> | VOSUR | *DC Offset Update Method Read*<br>0 disable - A fixed initial DC offset loop setting is contained in register 7D<br>1 update - The initial DC offset setting in 7D is updated at the end of a read |
| <2> | VOSUS | *DC Offset Update Method Servo*<br>0 disable - A fixed initial DC offset loop setting is contained in register 7E<br>1 update - The initial MRA setting in 7E is updated at the end of a read |
| <1> | GURE | *Gain Update Method Read*<br>0 disable - The initial AGC gain is set in register 7A and is not updated<br>1 update - The initial AGC gain in register 7A is updated at the end of a read |
| <0> | GUSE | *Gain Update Method Servo*<br>0 disable - The initial AGC gain is set in register 7B and is not updated<br>1 update - The initial AGC gain in register 7B is updated at the end of read |

Confidential  Register Map

79 AGC LOOP GAIN (Reset value: $20_H$)

| RW | 7 | 6 | 5 | 4 | 3 | 2 | 1 | 0 |
|---|---|---|---|---|---|---|---|---|
| 79 | GTHLD | GTLG2 | GTLG1 | GTLG0 | GAHLD | GALG2 | GALG1 | GALG0 |

| Bits | Name | Description |
|---|---|---|
| <7> | GTHLD | Track Mode Gain Hold<br>0 normal adaptation<br>1 disable - the accumulator will not adapt during tracking in Read mode |
| <6:4> | GTLG | AGC Track Mode Loop Gain<br>Track Mode Loop Gain = $2^{GTLG}$ |
| <3> | GAHLD | Acquisition Mode Gain Hold<br>0 normal adaptation<br>1 disable - the accumulator will not adapt during acquisition in Read mode |
| <2:0> | GALG | AGC Acquisition Mode Loop Gain<br>Acquisition Mode Loop Gain = $2^{GALG}$ |

7A AGC Read Mode PRESET (Reset value: $00_H$)

| RW | 7 | 6 | 5 | 4 | 3 | 2 | 1 | 0 |
|---|---|---|---|---|---|---|---|---|
| 7A | RPS7 | RPS6 | RPS5 | RPS4 | RPS3 | RPS2 | RPS1 | RPS0 |

| Bits | Name | Description |
|---|---|---|
| <7:0> | RPS | AGC Read mode Preset<br>This two's complement shadow register holds the initial gain setting for the next Read mode sector |

7B AGC Servo Mode PRESET (Reset value: $00_H$)

| RW | 7 | 6 | 5 | 4 | 3 | 2 | 1 | 0 |
|---|---|---|---|---|---|---|---|---|
| 7B | SPS7 | SPS6 | SPS5 | SPS4 | SPS3 | SPS2 | SPS1 | SPS0 |

| Bits | Name | Description |
|---|---|---|
| <7:0> | SPS | AGC Servo mode Preset<br>This two's complement shadow register holds the initial gain setting for the next Servo mode sector |

Confidential                                              Register Map

7C DC OFFSET LOOP GAIN  (Reset value: 20$_H$)

| RW | 7 | 6 | 5 | 4 | 3 | 2 | 1 | 0 |
|---|---|---|---|---|---|---|---|---|
| 7C | GTHLD | GTLG2 | GTLG1 | GTLG0 | GAHLD | GALG2 | GALG1 | GALG0 |

| Bits | Name | Description |
|---|---|---|
| <7> | GTHLD | *Track Mode Gain Hold*<br>0 Normal mode<br>1 Bypass; the accumulator will not adapt during Read Track mode |
| <6:4> | GTLG | *AGC Track Mode Loop Gain*<br>Track Mode Loop Gain = $2^{GTLG}$ where GTLG =< 5 |
| <3> | GAHLD | *Acquisition Mode Gain Hold*<br>0 Normal mode<br>1 Bypass; the accumulator will not adapt during Read mode |
| <2:0> | GALG | *AGC Acquisition Mode Loop Gain*<br>Acquisition Mode Loop Gain = $2^{GALG}$ where GTLG =< 5 |

7D DC OFFSET Read Mode PRESET  (Reset value: 00$_H$)

| RW | 7 | 6 | 5 | 4 | 3 | 2 | 1 | 0 |
|---|---|---|---|---|---|---|---|---|
| 7D | ROS7 | ROS6 | ROS5 | ROS4 | ROS3 | ROS2 | ROS1 | ROS0 |

| Bits | Name | Description |
|---|---|---|
| <7:0> | ROS | *DC Offset Read Mode Preset*<br>This two's complement shadow register holds the initial offset setting for Read mode |

7E DC OFFSET Servo Mode PRESET  (Reset value: 00$_H$)

| RW | 7 | 6 | 5 | 4 | 3 | 2 | 1 | 0 |
|---|---|---|---|---|---|---|---|---|
| 7E | SOS7 | SOS6 | SOS5 | SOS4 | SOS3 | SOS2 | SOS1 | SOS0 |

| Bits | Name | Description |
|---|---|---|
| <7:0> | SOS | *DC Offset Servo Mode Preset*<br>This two's complement shadow register holds the initial offset setting for Servo mode |

A 88

Confidential   Register Map

7F MR ASYMMETRY Read Mode PRESET  (Reset value: 00ₕ)

| RW | 7 | 6 | 5 | 4 | 3 | 2 | 1 | 0 |
|---|---|---|---|---|---|---|---|---|
| 7E | MRARP7 | MRARP6 | MRARP5 | MRARP4 | MRARP3 | MRARP2 | MRARP1 | MRARP0 |

| Bits | Name | Description |
|---|---|---|
| <7:0> | MRARP | *MR Asymmetry Read Mode Preset* <br> This two's complement shadow register holds the initial asymmetry compensation setting for Read mode |

80 MR ASYMMETRY Servo Mode PRESET  (Reset value: 00ₕ)

| RW | 7 | 6 | 5 | 4 | 3 | 2 | 1 | 0 |
|---|---|---|---|---|---|---|---|---|
| 7F | MRASP7 | MRASP6 | MRASP5 | MRASP4 | MRASP3 | MRASP2 | MRASP1 | MRASP0 |

| Bits | Name | Description |
|---|---|---|
| <7:0> | MRASP | *MR Asymmetry Servo Mode Preset* <br> This two's complement shadow register holds the initial asymmetry compensation setting for Servo mode |

82 MR ASYMMETRY CONFIG  (Reset value: 00ₕ)

| RW | 7 | 6 | 5 | 4 | 3 | 2 | 1 | 0 |
|---|---|---|---|---|---|---|---|---|
| 82 | 0 | 0 | 0 | 0 | 0 | MRAR | MRALG1 | MRALG0 |

| Bits | Name | Description |
|---|---|---|
| <2> | MRAR | *MRA Range* <br> 0 Normal range <br> 1 Input range extended by 20% |
| <1:0> | MRALG | *Linear Gain of MRA* <br> Selects linear gain of MRA amplitude. Increased gain causes the AGC loop to reduce input signal and asymmetry range. Default = 00 <br> 00 0dB <br> 01 0.5dB <br> 10 1dB <br> 11 1.5 dB |

A 89

Confidential                                                                 Register Map

84 Write Mode RECOVERY CONFIG                (Reset value: $00_H$)

| RW | 7 | 6 | 5 | 4 | 3 | 2 | 1 | 0 |
|----|---|---|---|---|---|---|---|---|
| 84 |   |   |   |   |   |   |   |   |

| Bits  | Name | Description             |
|-------|------|-------------------------|
| <7:4> |      | See Balboa specification |

90 R/W PLL CONFIG1                           (Reset value: $00_H$)

| RW | 7  | 6  | 5  | 4  | 3    | 2  | 1  | 0  |
|----|----|----|----|----|------|----|----|----|
| 90 | P3 | P2 | P1 | P0 | ENOS | M2 | M1 | M0 |

| Bits  | Name | Description                         |
|-------|------|-------------------------------------|
| <7:4> | P    | P Counter (Fractional Feedback Divider) |
| <3>   | ENOS | Enable Oversampling                 |
| <2:0> | M    | M Divider (Output Divider)          |

91 R/W PLL CONFIG2                           (Reset value: $00_H$)

| RW | 7  | 6    | 5  | 4  | 3  | 2  | 1  | 0  |
|----|----|------|----|----|----|----|----|----|
| 91 | EN | LOCK | N5 | N4 | N3 | N2 | N1 | N0 |

| Bits  | Name | Description                |
|-------|------|----------------------------|
| <7>   | EN   | Enable PLL                 |
| <6>   | LOCK | PLL Locked                 |
| <5:0> | N    | N Divider (Feedback Divider) |

92 SERVO PLL CONFIG1                         (Reset value: $00_H$)

| RW | 7   | 6   | 5   | 4   | 3 | 2   | 1   | 0   |
|----|-----|-----|-----|-----|---|-----|-----|-----|
| 92 | PS3 | PS2 | PS1 | PS0 | 0 | MS2 | MS1 | MS0 |

| Bits  | Name | Description                                |
|-------|------|--------------------------------------------|
| <7:4> | PS   | $P_s$ Counter (Fractional Feedback Divider) |
| <2:0> | MS   | $M_s$ Divider (Output Divider)             |

Confidential            Register Map

93 SERVO PLL CONFIG2 (Reset value: $00_H$)

| RW | 7 | 6 | 5 | 4 | 3 | 2 | 1 | 0 |
|---|---|---|---|---|---|---|---|---|
| 93 | ENS | LOCKS | NS5 | NS4 | NS3 | NS2 | NS1 | NS0 |

| Bits | Name | Description |
|---|---|---|
| <7> | ENS | Enable PLL |
| <6> | LOCKS | PLL Locked |
| <5:0> | NS | $N_s$ Divider (Feedback Divider) |

98 CLOCK CONFIG (Reset value: $00_H$)

| RW | 7 | 6 | 5 | 4 | 3 | 2 | 1 | 0 |
|---|---|---|---|---|---|---|---|---|
| 98 | FR3 | FR2 | FR1 | FR0 | 0 | CO | COS1 | COS0 |

| Bits | Name | Description |
|---|---|---|
| <7:4> | FR | *Reference Input Frequency Select* <br> FREF = 98<7:4> x 5MHz |
| <2> | CO | *Clock Override* <br> If set to 1 overrides mode control to clock digital with selection in 98<1:0> |
| <1:0> | COS | *Clock Override Select* <br> 00 FREF <br> 01 READ <br> 10 SERVO <br> 11 WRITE |

A0 BIQUAD1 COMPLEX PAIR POLE FREQUENCY Read Mode (Reset value: $00_H$)

| RW | 7 | 6 | 5 | 4 | 3 | 2 | 1 | 0 |
|---|---|---|---|---|---|---|---|---|
| A0 | FCR17 | FCR16 | FCR15 | FCR14 | FCR13 | FCR12 | FCR11 | FCR10 |

| Bits | Name | Description |
|---|---|---|
| <7:0> | FCR1 | Continuous Time Filter Biquad 1 Read mode Complex Pair Pole Frequency |

Confidential                                    Register Map

A1 BIQUAD2 COMPLEX PAIR POLE FREQUENCY Read Mode  (Reset value: $00_H$)

| RW | 7 | 6 | 5 | 4 | 3 | 2 | 1 | 0 |
|---|---|---|---|---|---|---|---|---|
| A1 | FCR27 | FCR26 | FCR25 | FCR24 | FCR23 | FCR22 | FCR21 | FCR20 |

| Bits | Name | Description |
|---|---|---|
| <7:0> | FCR2 | Continuous Time Filter Biquad 2 Read mode Complex Pair Pole Frequency |

A2 BIQUAD1 COMPLEX PAIR POLE FREQUENCY Servo Mode  (Reset value: $00_H$)

| RW | 7 | 6 | 5 | 4 | 3 | 2 | 1 | 0 |
|---|---|---|---|---|---|---|---|---|
| A2 | FCS17 | FCS16 | FCS15 | FCS14 | FCS13 | FCS12 | FCS11 | FCS10 |

| Bits | Name | Description |
|---|---|---|
| <7:0> | FCS1 | Continuous Time Filter Biquad 1 Servo mode Complex Pair Pole Frequency |

A3 BIQUAD2 COMPLEX PAIR POLE FREQUENCY Servo Mode  (Reset value: $00_H$)

| RW | 7 | 6 | 5 | 4 | 3 | 2 | 1 | 0 |
|---|---|---|---|---|---|---|---|---|
| A3 | FCS27 | FCS26 | FCS25 | FCS24 | FCS23 | FCS22 | FCS21 | FCS20 |

| Bits | Name | Description |
|---|---|---|
| <7:0> | FCS2 | Continuous Time Filter Biquad 2 Servo mode Complex Pair Pole Frequency |

A4 BIQUAD1 QUALITY FACTOR                    (Reset value: $00_H$)

| RW | 7 | 6 | 5 | 4 | 3 | 2 | 1 | 0 |
|---|---|---|---|---|---|---|---|---|
| A4 | QS3 | QS2 | QS1 | QS0 | QR3 | QR2 | QR1 | QR0 |

| Bits | Name | Description |
|---|---|---|
| <7:4> | QS | Continuous Time Filter Biquad 1 Servo mode quality factor |
| <3:0> | QR | Continuous Time Filter Biquad 1 Read mode quality factor |

A 92

Confidential | Register Map

A5 BIQUAD2 QUALITY FACTOR (Reset value: 00$_H$)

| RW | 7 | 6 | 5 | 4 | 3 | 2 | 1 | 0 |
|---|---|---|---|---|---|---|---|---|
| A5 | QS3 | QS2 | QS1 | QS0 | QR3 | QR2 | QR1 | QR0 |

| Bits | Name | Description |
|---|---|---|
| <7:4> | QS | Continuous Time Filter Biquad 2 Servo mode quality factor |
| <3:0> | QR | Continuous Time Filter Biquad 2 Read mode quality factor |

A8 ANALOG TEST INPUT PORT (Reset value: 00$_H$)

| RW | 7 | 6 | 5 | 4 | 3 | 2 | 1 | 0 |
|---|---|---|---|---|---|---|---|---|
| A8 | AI7 | AI6 | AI5 | AI4 | AI3 | AI2 | AI1 | AI0 |

| Bits | Name | Description |
|---|---|---|
| <7:0> | AI | *Analog Input Select*<br>00000000 Normal operation<br>00000001 Not used<br>00000010 Shorts across VGA with bypass<br>00000100 Asymmetry correction input<br>00001000 CTF input<br>00010000 CTF II biquad input<br>00100000 ADC buffer input<br>01000000 ADC S/H input<br>10000000 Connect VIN_P/VIN_N pins to in/out testbus |

AA ANALOG TEST OUTPUT PORT (Reset value: 00$_H$)

| RW | 7 | 6 | 5 | 4 | 3 | 2 | 1 | 0 |
|---|---|---|---|---|---|---|---|---|
| AA | AO7 | AO6 | AO5 | AO4 | AO3 | AO2 | AO1 | AO0 |

| Bits | Name | Description |
|---|---|---|
| <7:0> | AO | *Analog Output Select*<br>00000000 Normal operation<br>00000001 Connects pins VIN_P/VIN_N to output testbus<br>00000010 VGA output<br>00000100 Asymmetry correction output<br>00001000 I Biquad output<br>00010000 CTF output<br>00100000 8 dB buffer output<br>01000000 S/H output |

Confidential                                                    Register Map

AC TEST BAND GAP          (Reset value: $00_H$)

| RW | 7 | 6 | 5 | 4 | 3 | 2 | 1 | 0 |
|---|---|---|---|---|---|---|---|---|
| AC | 0 | 0 | 0 | 0 | 0 | 0 | 0 | 0 |

| Bits | Name | Description |
|---|---|---|
| <7:0> | | Band Gap<br>00000000 Normal Mode |

AD TEST VGA          (Reset value: $00_H$)

| RW | 7 | 6 | 5 | 4 | 3 | 2 | 1 | 0 |
|---|---|---|---|---|---|---|---|---|
| AD | 0 | 0 | 0 | 0 | 0 | 0 | 0 | 0 |

| Bits | Name | Description |
|---|---|---|
| <7:0> | | VGA Test<br>00000000 Normal operation |

AE TEST CTF          (Reset value: $00_H$)

| RW | 7 | 6 | 5 | 4 | 3 | 2 | 1 | 0 |
|---|---|---|---|---|---|---|---|---|
| AE | REF7 | REF6 | REF5 | REF4 | REF3 | REF2 | REF1 | REF0 |

| Bits | Name | Description |
|---|---|---|
| <7:0> | REF | CTF Test<br>00000000 Normal operation |

AF TEST ADC          (Reset value: $00_H$)

| RW | 7 | 6 | 5 | 4 | 3 | 2 | 1 | 0 |
|---|---|---|---|---|---|---|---|---|
| AF | 0 | AT6 | AT5 | AT4 | AT3 | AT2 | AT1 | AT0 |

| Bits | Name | Description |
|---|---|---|
| <6:0> | REF | ADC Test<br>00000000 Normal Operation |

A 94

Confidential             Register Map

B0 VIEW DAC      (Reset value: $00_H$)

| RW | 7 | 6 | 5 | 4 | 3 | 2 | 1 | 0 |
|---|---|---|---|---|---|---|---|---|
| B0 | DIV4 | DIV3 | DIV2 | DIV1 | DIV0 | SEL2 | SEL1 | SEL0 |

| Bits | Name | Description |
|---|---|---|
| <7:3> | DIV | Undersampling clock source divider<br>00000 No division,<br>else division factor equal to DIV+1 |
| <2:0> | SEL | View DAC Selected Input<br>000 Selects a value of 0 into the View DAC input<br>001 Selects the ADC output<br>010 Selects the FIR output<br>011 Selects the ITR output<br>100 Selects the Viterbi output<br>101 Selects the 32 byte RAM<br>110 Selects the Register bypass |

B1 TEST MODE      (Reset value: $00_H$)

| RW | 7 | 6 | 5 | 4 | 3 | 2 | 1 | 0 |
|---|---|---|---|---|---|---|---|---|
| B1 | 0 | 0 | 0 | DP1 | DP0 | TM2 | TM1 | TM0 |

| Bits | Name | Description |
|---|---|---|
| <4:3> | DP | Digital Path Input Test Bus Select<br>00 Allows ADC output to FIR input. This is the default condition upon system reset<br>01 Selects testbus inputs from multi-purpose input pins This feature should be selected while in Test Mode<br>10 Selects testbus inputs from multi-purpose pins for Servo mode<br>11 Selects output of LFSR to be applied to the FIR input |
| <2:0> | TM | Test Modes (active only when TM=1)<br>000 Normal Operating mode (default condition)<br>001 Read mode test<br>010 Write mode test<br>011 Servo mode test<br>100 SCAN<br>101 unused<br>110 unused<br>111 unused |

A-95

Confidential                                                    Register Map

B8 DIGITAL TEST PORT          (Reset value: $00_H$)

| RW | 7 | 6 | 5 | 4 | 3 | 2 | 1 | 0 |
|---|---|---|---|---|---|---|---|---|
| B8 | 0 | 0 | 0 | 0 | DPS3 | DPS2 | DPS1 | DPS0 |

| Bits | Name | Description |
|---|---|---|
| <3:0> | DPS | *Digital Test Port Selection*<br>0000 VDAC input<br>0001 Select the status pins from the PLL<br>0010 Select the FIR timing signals, COC FSM Mode bits<br>0011 Enables: ADC, AGC, AFE, BG, FIR, ITR<br>0101 Enables: NRZ, PECL, PM, RSYNTH, SSYNTH, Servo mode<br>0110 Enables: VITERBI, VGA, WPC, VGA_HIZ<br>0111 coc_fix_gain, coc_high_gain, mod4acc, track, dc_asymm<br>1000 misr_rbacken, misr_clk, misr_out<br>1111 Ring oscillator |

B9 TEST PORTS ENABLE          (Reset value: $00_H$)

| RW | 7 | 6 | 5 | 4 | 3 | 2 | 1 | 0 |
|---|---|---|---|---|---|---|---|---|
| B9 | 0 | 0 | TAPT | NRZB | 0 | PECL | DCBE | WPTE |

| Bits | Name | Description |
|---|---|---|
| <5> | TAPT | Digital Test Port Enable |
| <4> | NRZB | View DAC Enable |
| <2> | PECL | PECL Enable |
| <1> | DCBE | Analog Buffer Enable |
| <0> | WPTE | Write Precomp Test Enable |

A 96

Confidential                                                             Register Map

BA TEST MUX PIN                                          (Reset value: 00_H)

| RW | 7 | 6 | 5 | 4 | 3 | 2 | 1 | 0 |
|----|---|---|---|---|---|---|---|---|
| BA | 0 | 0 | 0 | 0 | 0 | MPT2 | MPT1 | MTP0 |

| Bits | Name | Description |
|------|------|-------------|
| <2:0> | MPT | *Test Port Select*<br>000 not sync-byte found<br>001 Write mode error<br>010 Gray decode output<br>011 read PLL locked<br>100 servo PLL locked<br>101 WRP Invalid/WRP Error<br>110 FIR tap out of range<br>111 not sync byte found, selected by mode<br>111 Write mode error, selected by mode<br>111 Gray decode output, selected by mode |

BC TEST ARB                                              (Reset value: 00_H)

| RW | 7 | 6 | 5 | 4 | 3 | 2 | 1 | 0 |
|----|---|---|---|---|---|---|---|---|
| BC | 0 | 0 | 0 | 0 | 0 | 0 | 0 | 0 |

| Bits | Name | Description |
|------|------|-------------|
| <0> |  | Arbitrary waveform generator value. Writing to this register will fill a register bank (34 deep) with sample values. When enabled, these values will circulate to the View DAC input to produce an arbitrary waveform |

A 97

Confidential                                         Register Map

BD TEST PLL MUX                              (Reset value: 00$_H$)

| RW | 7 | 6 | 5 | 4 | 3 | 2 | 1 | 0 |
|---|---|---|---|---|---|---|---|---|
| BD | 0 | 0 | PTMX2 | PTMX1 | PTMX0 | TPCL2 | TPCL1 | TPCL0 |

| Bits | Name | Description |
|---|---|---|
| <5:3> | PTMX | *PLL Test Mux*<br>000 no clock<br>001 Read mode clock/8<br>010 Read mode PLL clock<br>011 Read mode PLL clock/N<br>100 Read mode PLL clock/8<br>101 Servo mode PLL clock<br>110 Servo mode PLL clock/N<br>111 Servo mode PLL clock/8 |
| <2:0> | TPCL | *PECL Current Project*<br>001 16mA<br>010 19mA<br>011 22mA<br>100 28mA<br>101 28mA<br>110 31mA<br>111 37 mA |

A 98

Confidential | Register Map

BE TEST MRA (Reset value: $00_H$)

| RW | 7 | 6 | 5 | 4 | 3 | 2 | 1 | 0 |
|---|---|---|---|---|---|---|---|---|
| BE | 0 | 0 | 0 | 0 | 0 | 0 | 0 | 0 |

| Bits | Name | Description |
|---|---|---|
| <0> | | *MRA Test*<br>00000000 Normal operation. DCOUT_P: free DCOUT_N: free<br>00000001 DC look at MRA outputs. DCOUT_P: mra_vp. DCOUT_N: mra_vn<br>00000010 Test offset DAC current output. DCOUT_P: vosp DCOUT_N: vosn<br>00000100 View asymmetry sum node (nonfunctional) DCOUT_P: s1p DCOUT_N: s1n<br>00001000 Force autozero (nonfunctional) DCOUT_P: free DCOUT_N: free<br>00010000 Test hzp and hzn high Z outputs of nonlinear amplifier. DCOUT_P: hzp DCOUT_N: hzn<br>00100000 View VREG with both pins (Kelvin) DCOUT_P: vreg DCOUT_N: vreg<br>01000000 View input igp and ign points for gain control (unity) DCOUT_P: mra_igp DCOUT_N: mra_ign<br>10000000 Normal operation (reserved test mode) DCOUT_P: free DCOUT_N: free |

BF TEST MISR (Reset value: $00_H$)

| RW | 7 | 6 | 5 | 4 | 3 | 2 | 1 | 0 |
|---|---|---|---|---|---|---|---|---|
| BF | 0 | 0 | 0 | LFSR | WP | RP | ITR | FIR |

| Bits | Name | Description |
|---|---|---|
| <4> | LFSR | Selects LFSR for all tests |
| <3> | WP | Selects NRZ formatter Write mode path MISR observation |
| <2> | RP | Selects NRZ formatter Read mode path MISR observation |
| <1> | ITR | Selects ITR MISR observation |
| <0> | FIR | Selects FIR MISR observation |

Confidential                                             Register Map

C0 TEST VIEWDAC INPUT 1                              (Reset value: 00$_H$)

| R  | 7 | 6  | 5  | 4  | 3  | 2  | 1  | 0  |
|----|---|----|----|----|----|----|----|----|
| C0 | 0 | M6 | M5 | M4 | M3 | M2 | M1 | M0 |

| Bits  | Name | Description |
|-------|------|-------------|
| <6:0> | M    | Register-based input to the View DAC. Be sure to program B0<2:0> |

C1 TEST VIEWDAC INPUT 2                              (Reset value: 00$_H$)

| R  | 7 | 6  | 5  | 4  | 3  | 2  | 1  | 0  |
|----|---|----|----|----|----|----|----|----|
| C1 | 0 | M6 | M5 | M4 | M3 | M2 | M1 | M0 |

| Bits  | Name | Description |
|-------|------|-------------|
| <6:0> | M    | Reads back value of View DAC input |

C2 TEST ABUFFER                                      (Reset value: 00$_H$)

| RW | 7 | 6 | 5 | 4 | 3   | 2   | 1   | 0   |
|----|---|---|---|---|-----|-----|-----|-----|
| C2 | 0 | 0 | 0 | 0 | BT3 | BT2 | BT1 | BT0 |

| Bits  | Name | Description |
|-------|------|-------------|
| <3:0> | BT   | 0000 Normal operation<br>0001 Bypass buffer of analog output testbus |

C3 TEST NS                                           (Reset value: 00$_H$)

| RW | 7 | 6 | 5 | 4 | 3 | 2 | 1 | 0 |
|----|---|---|---|---|---|---|---|---|
| C3 | 0 | 0 | 0 | 0 | 0 | 0 | 0 | 0 |

| Bits  | Name | Description |
|-------|------|-------------|
| <7:0> |      |             |

A 100

Confidential       Register Map

C4 TEST VIEW DAC  (Reset value: 00_H)

| RW | 7 | 6 | 5 | 4 | 3 | 2 | 1 | 0 |
|---|---|---|---|---|---|---|---|---|
| C4 | 0 | 0 | 0 | 0 | VDT3 | VDT2 | VDT1 | VDT0 |

| Bits | Name | Description |
|---|---|---|
| <3:0> | VDT | *View DAC test*<br>0000 Normal operation<br>0001 Bypass output buffer<br>0010 Connect DAC current outputs to DC testbus<br>0100 Low DAC amplitude |

C8 TEST MISR LSB  (Reset value: 00_H)

| R | 7 | 6 | 5 | 4 | 3 | 2 | 1 | 0 |
|---|---|---|---|---|---|---|---|---|
| C8 | M7 | M6 | M5 | M4 | M3 | M2 | M1 | M0 |

| Bits | Name | Description |
|---|---|---|
| <7:0> | M | Reads back lsb of MISR.<br>See test_MISR_sel for MISR selection |

C9 TEST MISR  (Reset value: 00_H)

| R | 7 | 6 | 5 | 4 | 3 | 2 | 1 | 0 |
|---|---|---|---|---|---|---|---|---|
| C9 | M7 | M6 | M5 | M4 | M3 | M2 | M1 | M0 |

| Bits | Name | Description |
|---|---|---|
| <7:0> | M | Reads back middle of byte of selected MISR |

CA TEST MISR MSB  (Reset value: 00_H)

| R | 7 | 6 | 5 | 4 | 3 | 2 | 1 | 0 |
|---|---|---|---|---|---|---|---|---|
| CA | M7 | M6 | M5 | M4 | M3 | M2 | M1 | M0 |

| Bits | Name | Description |
|---|---|---|
| <7:0> | M | Reads back MSB of byte of selected MISR |

Confidential     Register Map

05 VOLTAGE REGULATOR                    (Reset value: 00$_H$)

| RW | 7 | 6 | 5 | 4 | 3 | 2 | 1 | 0 |
|---|---|---|---|---|---|---|---|---|
| 05 | P18A | A18V2 | A18V1 | A18V0 | P18D | D18V2 | D18V1 | D18V0 |

| Bits | Name | Description |
|---|---|---|
| <7> | P18A | 1= power-off on-chip 1.8V regulator for the analog circuits (ADC, FSYN, SFYN)<br>0= power-on (normal) |
| <6:4> | A18 | Analog 1.8V regulator voltage fine tuning (all nominal in the following table)<br>000: 1.65V<br>001: 1.70V<br>010: 1.75V<br>011: 1.80V<br>100: 1.85V<br>101: 1.90V<br>110: 1.95V<br>111: 2.00V |
| <3> | P18D | 1= power off on-chip 1.8V regulator for the digital backend<br>0= power on (normal) |
| <2:0> | D18 | Digital 1.8V regulator voltage fine tuning (all nominal in the following table)<br>000: 1.65V<br>001: 1.70V<br>010: 1.75V<br>011: 1.80V<br>100: 1.85V<br>101: 1.90V<br>110: 1.95V<br>111: 2.00V |

Confidential | Register Map

21 PECL WRITE DRIVER (Reset value: 00$_H$)

| RW | 7 | 6 | 5 | 4 | 3 | 2 | 1 | 0 |
|---|---|---|---|---|---|---|---|---|
| 21 | WD2 | WD1 | WD0 | 0 | C | BYPWP | TEPH | STEPH |

| Bits | Name | Description |
|---|---|---|
| <7:5> | WD | Write driver current control<br>000: off<br>001: 2mA<br>010: 10mA<br>011: 20mA<br>100: 30mA<br>101: 40mA<br>110: 50mA<br>111: N/A |
| <3> | C | Write mode Precompensation Level<br>0 1-level precompensation<br>1 2-level precompensation |
| <2> | BYPWP | 1= Bypass write precomp delayed clock path (use non-delayed clock instead)<br>0= Normal operation |
| <1> | TEPH | 1= FSYN Phase interpolator test mode enable<br>0= Normal mode |
| <0> | STEPH | 1= SFYN Phase interpolator test mode enable<br>0= Normal mode |

74 Noise Generator (Reset value: 00$_H$)

| RW | 7 | 6 | 5 | 4 | 3 | 2 | 1 | 0 |
|---|---|---|---|---|---|---|---|---|
| 74 | NSENS | NSENR | NSG5 | NSG4 | NSG3 | NSG2 | NSG1 | NSG0 |

| Bits | Name | Description |
|---|---|---|
| <7> | NSENS | 1= Enable noise generator in Servo mode |
| <6> | NSENR | 1= Enable noise generator in Read mode<br>Set both NSENS and NSENR to 0 for normal operation |
| <5:0> | NSG | Noise magnitude DAC control register.<br>This register sets the magnitude of the noise generator output |
| | | xx graph appears here xx |

Confidential                                Register Map

84 TA CONFIG 1                              (Reset value: 00$_H$)

| RW | 7 | 6 | 5 | 4 | 3 | 2 | 1 | 0 |
|---|---|---|---|---|---|---|---|---|
| 84 | TA TRIG1 | TA TRIG2 | TA MODE | TACEN | TAD2 | TAD2 | TAD1 | TAD0 |

| Bits | Name | Description |
|---|---|---|
| <7:6> | TATRIG | *TA sequencer re-trigger control*<br>10= TA sequencer non-retriggerable, and release compensation after event times out<br>00= TA sequencer retriggerable (and compensation is released) after the previous event times out<br>x1= TA sequencer non-retriggerable, and hold compensation until end of RG. In this mode all selected compensations (Low-Z Gain comp, HPF, Loop Hold are enabled until the end of RG |
| <5> | TAMODE | 1= TA enabled beginning of RG<br>0= TA enabled during TRK mode only |
| <4> | TACEN | 1= Enable the internal TA comparator<br>0= Disable the internal TA comparator<br>This is meant for TA control from the external (FREEZEB) pin. |
| <3:0> | TAD | *TAD pin function selection*<br>0000 to 1001: TAD delayed by TADSEL*2 bytes (0 to 18 bytes of delay)<br>1011: TA comparator output<br>1100: sr0 (low Z switch control, for testing)<br>1101: sr1 (low Z switch control, for testing)<br>1110: sr2 (low Z switch control, for testing)<br>1111: sr3 (low Z switch control, for testing) |

A 104

Confidential

Register Map

85 TA CONFIG 2

(Reset value: $00_H$)

| RW | 7 | 6 | 5 | 4 | 3 | 2 | 1 | 0 |
|---|---|---|---|---|---|---|---|---|
| 85 | LZRS2 | LZRS1 | LZRS0 | LOOP H | LZD3 | LZD2 | LZD1 | LZD0 |

| Bits | Name | Description |
|---|---|---|
| <7:5> | LZRS | *TA low Z recovery time step size*<br>TA low Z recovers in 3 intermediate steps:<br>25%, 50% and 75% between the low Z and the normal Z. The time step is the per step duration.<br>Step duration= (1+LZREC[2:0]) byte, allows for 1 to 8 bytes per step |
| <4> | LOOP H | 1= Enable the FREEZE pin to control the TA sequencer<br>0= Disable FREEZE pin |
| <3:0> | LZD | *TA low Z length (duration) control*<br>When a TA compensation starts, the VGA input resistance first switches to low Z for a programmable amount of time, which is controlled by TALEN.<br>Low Z time= (TALEN*2+1) bytes, for 0,=TALEN<=14 (decimal)<br>1111: TA low Z time is controlled by the internal comparator (if enabled) or by the FREEZEB pin (if enabled). If both are enabled, then they are logic OR'd to control the TA sequencer |

Confidential | Register Map

86 TA CONFIG 3       (Reset value: $00_H$)

| RW | 7 | 6 | 5 | 4 | 3 | 2 | 1 | 0 |
|---|---|---|---|---|---|---|---|---|
| 86 | LZO1 | LZO0 | LZWS1 | LZWS0 | NRMZ1 | NRMZ0 | FREFSEL | DBW |

| Bits | Name | Description |
|---|---|---|
| <7:6> | LZO | *TA low Z option select*<br>00: Normal impedance 2K ohm (no low Z on TA events)<br>01: 1K ohm low Z<br>10: 400 ohm low Z<br>11: 200 ohm low Z |
| <5:4> | LZWS | *Write/extended write squelch (low Z) resistance select*<br>00: Normal impedance 2K (no low Z)<br>01: 1K ohm low Z<br>10: 400 ohm low Z<br>11: 200 ohm low Z |
| <3:2> | NRMZ | *Normal read input resistance select*<br>00: Normal impedance 1.3K<br>01: 1.65K ohm low Z<br>10: 2K ohm low Z<br>11: 4K ohm low Z<br>Note: All low Z values in TA or write squelch modes are referred to when normal input resistance set to 2K ohms. |
| <1> | FREF SEL | *Selects the clock source (FREF1) for WGDLY (write squelch) and SGTMR timer in Servo)*<br>0: Clock source FREF1= FREF<br>1: Clock source FREF1= FREF/2 |
| <0> | DBW | *TA detector bandwidth selection*<br>0: High BW (20 MHz 3dB corner)<br>1: Low BW (10MHz 3dB corner) |

Confidential | Register Map

87 TA CONFIG 4 (Reset value: $00_H$)

| RW | 7 | 6 | 5 | 4 | 3 | 2 | 1 | 0 |
|---|---|---|---|---|---|---|---|---|
| 87 | GCMP2 | GCMP1 | GCMP0 | HPFM1 | HPFM0 | CS | WGTST | HPFOST |

| Bits | Name | Description |
|---|---|---|
| <7:6> | GCMP | *Gain compensation setting during TA squelch time*<br>Gain is increased during the TA low Z time by GCMP [2:0]*0.38 dB |
| <4:3> | HPFM | *HPF mode control during a TA event*<br>00: No feedback from TA sequencer to the HPF<br>01: HPF goes into high bandwidth for the duration (programmable by TALEN and LZREC bits) of TA<br>10: HPF stays in high bandwidth until the end of read |
| <2> | CS | *TA sequencer clock source select*<br>0: RCLK; this is normal mode<br>1: FREF; this is meant for testing |
| <1> | WGTST | *Write squelch one-shot test enable*<br>1: Enable WG_timer to the multiplexed MTPC0 pin<br>0: Allow the daisy-chain input (from another module) to the test pin |
| <0> | HPFOST | *HPF one-shot (SGOS in HPFCTRL register diagram) test output enable*<br>1: Enable HPF one_shot to the multiplexed MTPC0 pin<br>0: Allow the daisy-chain input (from another module) to the test pin |

A 107

Confidential | Register Map

88 TA CONFIG 5 (Reset value: $00_H$)

| RW | 7 | 6 | 5 | 4 | 3 | 2 | 1 | 0 |
|---|---|---|---|---|---|---|---|---|
| 88 | 0 | DWE | SGQL | ENPOS | ENNEG | TDACTA | HIZEN | DSEN |

| Bits | Name | Description |
|---|---|---|
| <6> | DWE | *External direct write enable*<br>1= External direct write mode enabled when pin DWEN is high. At this time, write data outputs (WDO/WDOB) is controlled directly by DW/DWB pins (see table below)<br>0= External direct write mode disabled |
| <5> | SGQL | Servo Gate Qualify for external direct write mode |
| <2> | TDACTA | TATH DAC test enable. When this bit is set high, the TATH DAC output is connected to the ITO pin. |
| <4> | ENPOS | Enable TA detector for positive TA's |
| <3> | ENNEG | Enable TA detector for negative TA's |
| <1> | HIZEN | Enable HiZ mode during the beginning of servo high bandwidth offset cancellation period (SM1 in spec) |
| <0> | DSEN | 1= Enable TA detection during servo mode<br>Note: TA compensation is not activated during servo mode |

89 TA DETECTOR THRESHOLD (Reset value: $00_H$)

| RW | 7 | 6 | 5 | 4 | 3 | 2 | 1 | 0 |
|---|---|---|---|---|---|---|---|---|
| 89 | THS3 | THS2 | THS1 | THS0 | THR3 | THR2 | THR1 | THR0 |

| Bits | Name | Description |
|---|---|---|
| <7:4> | THS | TA detect threshold control in Servo |
| <3:0> | THR | TA detect threshold control in Read |
| | | |
| | | |

Confidential

Register Map

8A TA HPF CONTROL (Reset value: $00_H$)

| RW | 7 | 6 | 5 | 4 | 3 | 2 | 1 | 0 |
|---|---|---|---|---|---|---|---|---|
| 8A | HPFM2 | HPFM1 | HPFM0 | BWS | BWR | LHM2 | LHM1 | LHM0 |

| Bits | Name | Description |
|---|---|---|
| <7:5> | HPFM | Select the modes defined above. There are 6 legal modes. |
| <4> | BWS | *Servo mode BW select*<br>1= BW1<br>0= BW2 |
| <3> | BWR | *Non-servo mode BW select*<br>1= BW1<br>0= BW2 |
| <7:5> | HPF | *-3dB corner:*<br>HIBW1: 3MHz<br>LOBW1: 600kHz<br>HIBW2: 1.5MHz<br>LOBW2: 300kHz |
| <2:0> | LHM | *Read mode Loop Hold Mode control*<br>000: Normal. Timing and Gain*2 loops are not affected by the TAD_int*1 status<br>*1: TAD_int is the internal thermal asperity signal. Both the internal detector and the FREEZE pin can trigger a TA event. Please see TA section for more information.<br>*2: Gain and all other loops (MR, Boost, ADC Offset, FIR), except timing loop.<br>1xx: Gain hold always on<br>001: Gain hold when TAD_int is high<br>010: Timing TRK mode loop held when TAD_int is high<br>011: Both timing TRK and Gain loops held when TAD_int is high |

Confidential                                                                 Register Map 44 SERVO GATE TIMER                                          (Reset value: $00_H$)

| RW | 7 | 6 | 5 | 4 | 3 | 2 | 1 | 0 |
|---|---|---|---|---|---|---|---|---|
| 44 | WGDLY3 | WGDLY2 | WGDLY1 | WGDLY0 | SGTMR3 | SGTMR2 | SGTMR1 | SGTMR0 |

| Bits | Name | Description |
|---|---|---|
| <3:0> | WGDLY | *Extended squelch after WG transitions from active to inactive*<br>Delay= WGDLY*TFREF1, for 0<=WGDLY<=15<br>TFREF1= FREF1 period (50ns or 100ns depending on FREFSEL)<br>The delay is 0 to 750ns in 50ns step for a 20MHz FREF and FREFSEL= 0<br>The delay is 0 to 1.5us in 100ns step for a 20MHz FREF and FREFSEL= 1 |
| <3:0> | SGTMR | *HPF timer time select. Delay TOS= SGTMR*TFREF1, for 0<=SGTMR<=15*<br>000: Timer off. Please refer to diagram in HPFCTRL section<br>TOS is 0 to 750ns in 50ns step for a 20MHz FREF and FREFSEL= 0<br>TOS is 0 to 1.5us in 100ns step for a 20MHz FREF and FREFSEL= 1<br>TFREF1= FREF1 period (50ns or 100ns for a 20 MHz FREF, depending on FREFSEL bit) |

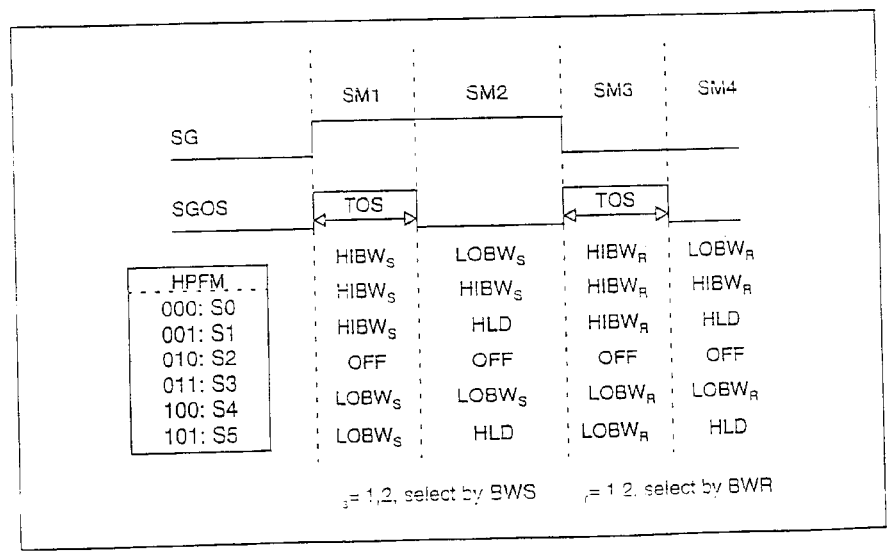

10 SCA8700 Pin Description
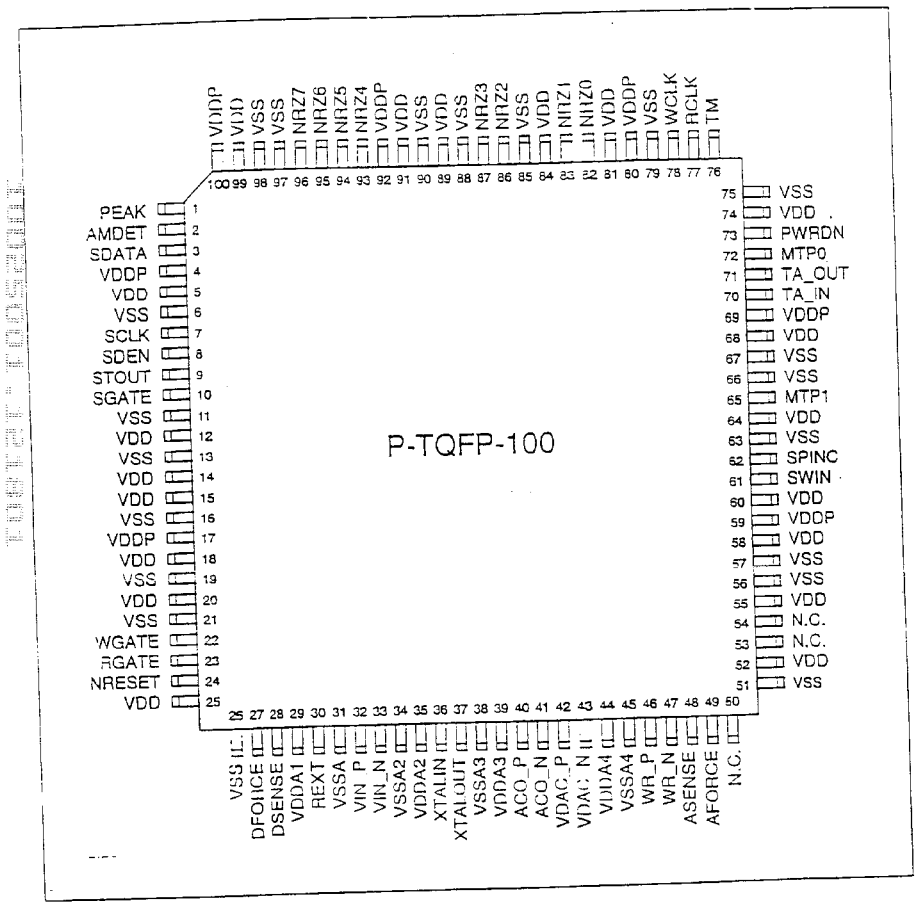
Figure 58   100 Pin P-TQFP-100

Confidential     SCA8700 Pin Description

Table 26  SCA8700 Pin Descriptions

| Pin Name | 100-pin TQFP | Type | Description |
|---|---|---|---|
| Analog Pins | | | |
| ACO_P | 40 | O | AC test bus output signal |
| ACO_N | 41 | O | AC test bus output signal |
| AFORCE | 49 | O | Analog domain power regulator external driver transistor control |
| ASENSE | 48 | I | Sense line for analog domain power regulator |
| DFORCE | 27 | O | Digital domain power regulator external driver transistor control |
| DSENSE | 28 | I | Sense line for digital domain power regulator |
| REXT | 30 | IO | External reference resistor and technology monitor |
| VDAC_P | 42 | O | View DAC output signal and test port 1 |
| VDAC_N | 43 | O | View DAC output signal and test port 2 |
| VIN_P | 32 | I | Analog read signal from preamp and AC test bus input |
| VIN_N | 33 | I | Analog read signal from preamp and AC test bus input |
| WR_P | 46 | O | Write data output to preamp (PECL) and digital test output |
| WR_N | 47 | O | Write data output to preamp (PECL) and digital test output |
| XTALIN | 36 | I | Crystal oscillator input |
| XTALOUT | 37 | O | Crystal oscillator output |
| Digital Pins | | | |
| AMDET | 2 | O | Servo address mark detect signal |
| NRZ [7:0] | 96, 95, 94, 93, 87, 86, 83, 82 | IO(F) | NRZ read/write data port |
| GRAYD/ MTP1 | 65 | O | Servo Gray data output/ Multi-purpose test port 1 |
| NRESET | 24 | I | Active-low asynchronous reset |
| NSYNC/ MTP0 | 72 | O | Active-low sync-found indication/ Multi-purpose test port 0 |
| PEAK | 1 | O | Servo peak detect output |

Confidential        SCA8700 Pin Description

Table 26    SCA8700 Pin Descriptions (cont'd)

| Pin Name | 100-pin TQFP | Type | Description |
|---|---|---|---|
| PWRDN | 73 | I | Active-high power-down signal |
| RCLK | 77 | O(F) | NRZ read data clock (Fast) |
| RGATE | 23 | I | Read gate |
| SCLK | 7 | I | Serial interface clock |
| SDATA | 3 | I/O(F) | Serial interface data (Fast) |
| SDEN | 8 | I | Active-high serial interface enable |
| STOUT | 9 | O | Servo burst strobe output |
| SGATE | 10 | I | Servo gate |
| TA_OUT | 71 | O | Thermal asperity detect input |
| TA_IN | 70 | I | Thermal asperity detect output |
| TM | 76 | I | Test mode enable |
| WCLK | 78 | I | NRZ write data clock |
| WGATE | 22 | I | Write gate |
| SWIN | 61 | I | Servo sync byte search window enable |
| SPINC | 62 | I | Servo normal AGC mode timer signal |
| Power and Ground Pins | | | |
| VDD | 5,12,14,15, 18,20,25,52, 55,58,60,64, 68,74,81,84, 89,91,99 | - | Digital core positive supply (+1.8V +/- 5%); 6 double pads/6 pins |
| VDDP | 4, 17, 59, 69, 80, 92,100 | - | Digital I/O positive supply (+3.3V +/- 10%); 7 pads/7 pins |
| VSS | 6, 11, 13, 16, 19, 21,26, 51, 56, 57, 63,66,67,75, 79, 85, 88, 90, 97,98 | - | Digital GND; 6 double pads/6 pins |
| VDDA1 | 29 | - | Analog positive supply for power regulators, reference generator, VGA, MRA, NG, TS, CTF (1.8V +/- 5%); 1 double pad/1 pin |
| VSSA1 | 31 | - | Analog ground corresponding to VDDA1; 1 double pad/1 pin |

Confidential SCA8700 Pin Description

Table 26 SCA8700 Pin Descriptions (cont'd)

| Pin Name | 100-pin TQFP | Type | Description |
|---|---|---|---|
| VDDA2 | 35 | - | Analog positive supply for sample & hold and ADC (1.8V +/- 5%); 1 double pad/1 pin |
| VSSA2 | 34 | - | Analog ground corresponding to VDDA2; 1 double pad/1 pin |
| VDDA3 | 39 | - | Analog positive supply for crystal oscillator and R/W-PLL (1.8V +/- 5%); 1 double pad/1 pin |
| VSSA3 | 38 | - | Analog ground corresponding to VDDA3; 1 double pad/1 pin |
| VDDA4 | 44 | - | Analog positive supply for write precompensation, Servo-PLL, View DAC and AC test buffer (1.8V +/- 5%); 1 double pad/1 pin |
| VSSA4 | 45 | - | Analog ground corresponding to VDDA4; 1 double pad/1 pin |

Confidential                                                    Electrical Specifications

11 Electrical Specifications

11.1 Absolute Maximum Ratings

| Parameter | Symbol | Limit Values | Unit |
|---|---|---|---|
| Ambient temperature under bias | $T_A$ | −20 to 85 | °C |
| Storage temperature | $T_{STG}$ | −65 to 125 | °C |
| Supply voltage | $V_{DD}$ | −0.5 to 4.2 | V |
| Supply voltage | $V_{DDA}$ | −0.5 to 4.2 | V |
| Supply voltage | $V_{DDP}$ | −0.5 to 6.0 | V |
| Voltage on any pin with respect to ground | $V_S$ | If VDDP < 3 V: −0.4 to VDD + 0.5  If VDDP > 3 V: −0.4 to VDDP + 0.5 | V |

11.2 DC Characteristics $V_{DDP} = 3.3\ V \pm 10\%$; $V_{DD} = 1.8\ V \pm 5\%$; $V_{SS} = 0\ V$; $T_A = 0$ to $70\ °C$

| Parameter | Symbol | Limit Values | | | Unit | Test Condition |
|---|---|---|---|---|---|---|
| | | min. | typ. | max. | | |
| Input leakage current | $I_{IL}$ | −10 | | 10 | mA | $V_{IN} = V_{SS}$ to $V_{ddp}$ |
| Digital input high level | $V_{IH}$ | 2.0 | | VDDP + 0.3 | V | |
| Digital input low level | $V_{IL}$ | 0 | | 0.80 | V | |
| Digital output high level (Fast) pins RCLK,NRZ,SDATA | $V_{OH}$ | VDD − 0.45 | | | V | IO = 2 mA |
| Digital output low level (Fast) pins RCLK,NRZ,SDATA | $V_{OL}$ | | | 0.45 | V | IO = 5 mA |
| Digital output high level (Default) | $V_{OH}$ | VDD − 0.45 | | | V | IO = 2 mA |
| Digital output low level (Default) | $V_{OL}$ | | | 0.45 | V | IO = 5 mA |
| VDD supply current (Suspend mode) | $I_{DDS1}$ | | | 50 | mA | |
| VDD supply current (Idle mode) | $I_{DDS2}$ | | | 200 | mA | |

Confidential                                    Electrical Specifications $V_{DDP} = 3.3\text{ V} \pm 10\%$; $V_{DD} = 1.8\text{ V} \pm 5\%$; $V_{SS} = 0\text{ V}$; $T_A = 0$ to $70\,°\text{C}$

| Parameter (cont'd) | Symbol | Limit Values | | | Unit | Test Condition |
|---|---|---|---|---|---|---|
| | | min. | typ. | max. | | |
| VDD supply current (Read mode) | $I_{DDS3}$ | | | 500 | mA | 80 Percent Read / 500 MHz |
| VDD supply current (Write mode) | $I_{DDO}$ | | | 200 | mA | 500 MHz |

11.3 AC Characteristics

Digital inputs are driven to 2.4 V for a logical "1" and to 0.45 V for a logical "0". Timing measurements are made at 2.0 V for a logical "1" and 0.8 V for a logical "0". The AC-testing input/output waveforms are shown below.

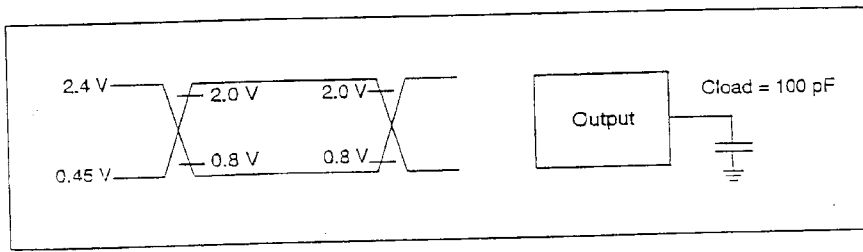

Figure 59   Input/Output Waveforms for AC-Tests

Table 27   Serial Interface

| Parameter | Symbol | Limit Values | | | Unit | Test Condition |
|---|---|---|---|---|---|---|
| | | min. | typ. | max. | | |
| SCLK period | $t_{PER}$ | 20 | | | ns | |
| SCLK high time | $t_{CKH}$ | 8 | 10 | 12 | ns | |
| SCLK low time | $t_{CKL}$ | 8 | 10 | 12 | ns | |
| SDEN setup time | $t_{SU1}$ | 20 | | | ns | |
| SDEN hold time | $t_{HD1}$ | 20 | | | ns | |
| SDATA setup time | $t_{SU}$ | 5 | | | ns | |
| SDATA hold time | $t_{HD}$ | 2 | | | ns | |

Confidential                                                    Electrical Specifications

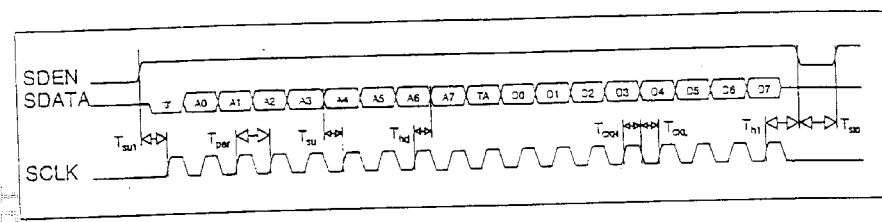

Figure 60   Serial Port Write Timing

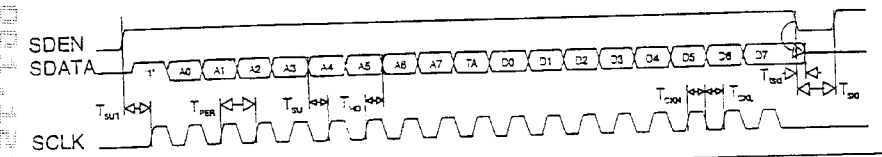

Figure 61   Serial Port Read Timing

Table 28   NRZIO Interface

| Parameter | Symbol | Limit Values | | | Unit | Test Condition |
|---|---|---|---|---|---|---|
| | | min. | typ. | max. | | |
| NRZIO delay time rising clk | $t_{PRC}$ | | | 3.7 | ns | 15 pF load, 10-90% |
| NRZIO delay time falling clk | $t_{PFC}$ | | | 3.7 | ns | 15 pF load, 10-90% |
| RCLK rise/fall time | $t_R / t_F$ | | | 3.7 | ns | 10 pF load, 10-90% |
| NRZIO setup time | $t_{SU}$ | 5 | | | ns | |
| NRZIO hold time | $t_{HD}$ | 2 | | | ns | |

Table 29   VGA Amplifier

| Parameter | Symbol | Limit Values | | | Unit | Test Condition |
|---|---|---|---|---|---|---|
| | | min. | typ. | max. | | |
| Input resistance differential | | 3.4 | | 4.6 | k Ohms | Not squelch Modes (Rin normal = 4K) |
| Input resistance differential | | 3.4 | | 4.6 | k Ohms | Nonsquelch mode |

A 117

Confidential                                    Electrical Specifications

Table 29  VGA Amplifier (cont'd)

| Parameter | Symbol | Limit Values | | | Unit | Test Condition |
|---|---|---|---|---|---|---|
| | | min. | typ. | max. | | |
| Input capacitance differential | | 3 | | 6 | pF | No bandwidth Spec |
| Input signal range | | 40 | 100 | 400 | mVpp dif | No harmonic distortion |
| Gain variation | | -2 | | +2 | dB | |
| Gain switch time | | 0 | 20 | 32 | ns | Read mode to Servo mode / Servo mode to Read mode |
| Output offset voltage | | -5 | 0 | +5 | mV | |
| CMRR | | 40 | | | dB | Gain = 0 dB / Fvcm DC to 30 MHz |
| Input referred noise | | | 7.5 | 15 | nV/√Hz | |

Table 30  Thermal Asperity Detect and Correct

| Parameter | Symbol | Limit Values | | | Unit | Test Condition |
|---|---|---|---|---|---|---|
| | | min. | typ. | max. | | |
| TA_OUT output pulse width | | | | 8 | Bytes | |
| TA_Threshold step | | 26 | 28 | 30 | mV | |
| TA low-Z value | | 255 / 680 | 300 / 800 | 345 / 920 | Ohms | 300 Ohms setting / 800 Ohms setting |
| TA threshold DAC - DNL / TA threshold DAC - INL | | | | 1/4 | LSB | |

Table 31  Noise Generator

| Parameter | Symbol | Limit Values | | | Unit | Test Condition |
|---|---|---|---|---|---|---|
| | | min. | typ. | max. | | |
| Noise voltage range | | 1 | | 20 | $mV_{rms}$ | 400 MHz bandwidth |
| Noise bandwidth (high) | | | | 400 | MHz | |
| Noise bandwidth (low) | | 1.5 | | | MHz | |

A 118

Confidential  Electrical Specifications

Table 32  Specifications for a Single Biquad

| SPEC | CONDITIONS VDDA=1.8+/3% T=0 TO 70C Ambient | Min | Nom | Max |
|---|---|---|---|---|
| Complex-pole pair frequency range | This is NOT the same as traditional -3dB Frequency, as the filter transfer function. $\omega_0=0.43*750*17/16$ | 87.5 MHz | | 350 MHz |
| Pole Frequency Programming step size | 256 monotonic steps over the entire frequency range. | | | 2% |
| Quality Factor (Q) range | | 0.6 | | 1.6 |
| Q programming step size | 16 monotonic steps. | | | 0.2 |
| Absolute Pole frequency accuracy ($f_{complex\ pair}$>130MHz) | From nominal programmed value; Includes ALL sources of error. Environmental variation from nominal. | -50% -5% | | 50% +5% |
| Absolute Q accuracy ($f_{complex\ pair}$>130MHz) | From nominal programmed value; Includes All sources of Q error. Environmental variation from nominal. | -50% -5% | | +50% +5% |
| Absolute Pole frequency accuracy ($f_{complex\ pair}$<130MHz) | From nominal programmed value; Includes ALL sources of error. Environmental variation from nominal. | -15% -5% | | +15% +5% |
| Absolute Q accuracy ($f_{complex\ pair}$<130MHz) | From nominal programmed value; Includes All sources of Q error. Environmental variation from nominal. | -15% -5% | | +15% +5% |
| Total Harmonic Distortion | Corner frequency programmed at 350MHz. Full-scale input set at a third of 116MHz; Q=1; input adjusted to give full-scale output swing. Q=1.6 LAB CHARACTERIZATION ONLY. | | | -34 Db |

Confidential                                                Electrical Specifications Table 33    Analog to Digital Converter - ADC

| Parameter | Symbol | Limit Values | | | Unit | Test Condition |
|---|---|---|---|---|---|---|
| | | min. | ty300 MHz sinep | max. | | |
| Maximum conversion rate | | 50 | | 850 | MS/s | |
| Resolution | | | 6 | | bits | |
| AC integral nonlinearity | | -0.8 | | +0.8 | lsb | (1) 200 MHz, full scale sine wave input |
| AC differential nonlinearity | | -0.8 | | +0.8 | lsb | same as (1) |
| Offset error | | -4 | 0 | 4 | lsb | |
| Gain error | | -5 | | +5 | % | |
| Analog input bandwidth | | 400 | | | MHz | -1 dB |
| Input - full scale range (FSR) | | | 1000 | | mVpp dif | |
| THD | | | | -36 | dB | (2) 200 MHz sine wave input at 75% of full scale |
| SNR | | 32 | | | dB | same as (2) |

Table 34    Frequency Synthesizers - Read Mode or Servo Mode PLL

| Parameter | Symbol | Limit Values | | | Unit | Test Condition |
|---|---|---|---|---|---|---|
| | | min. | typ. | max. | | |
| VCO frequency Read mode | | 800 | | 1600 | MHz | |
| absolute jitter | | | | 15 | ps | 1s |
| settling time | | | | 10 | us | 0.1% frequency error |
| FREF, reference frequency | | 20 | | 80 | MHz | |

A-120

Confidential      Electrical Specifications
Table 35    Buffer used for View DAC and Analog Test Port
| Parameter | Symbol | Limit Values | | | Unit | Test Condition |
|---|---|---|---|---|---|---|
| | | min. | typ. | max. | | |
| DC gain | | | TDB | | dB | |
| Frequency bandwidth | | 1000 | | | MHz | -3dB |
| THD | | -42 | | | dB | 200MHz sine wave at 75% of full scale and 850 MHz update rate |

Confidential — Package Outline Drawing
12 Package Outline Drawing
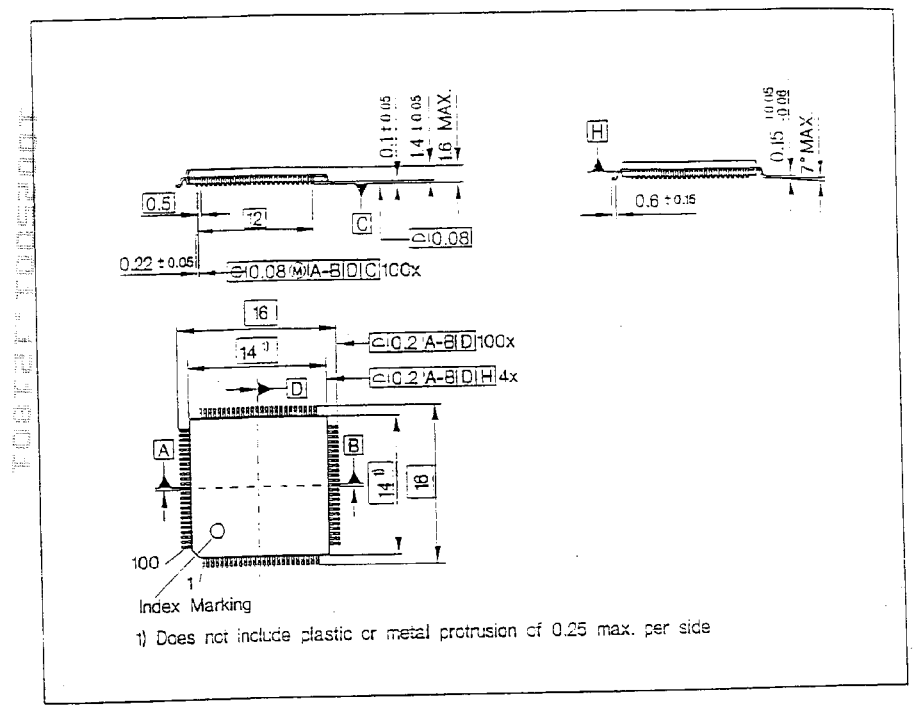
P-TQFP-100-1

We claim:

1. A read/write channel circuit to communicate with a magnetic head, the read/write channel circuit comprising:
  a mode controller to select one of a plurality of operating modes for the read/write channel circuit, the plurality of operating modes including a read mode, a write mode, and a servo mode;
  a read path through which a read signal from the magnetic head passes when the mode controller is in the read mode in order to read data in the read signal, the read path including:
    a thermal asperity compensation unit to reduce distortions in the read signal caused by thermal asperity;
    a variable gain amplifier to adjust an amplitude of the read signal;
    an asymmetry control unit to compensate for the distortions in the read signal caused by a non-linear transfer function of the magnetic head;
    a continuous time filter to attenuate high frequency noise in the read signal;
    a programmable finite impulse response filter configured to equalize the read signal for data sequence detection when the mode controller is in the read mode;
    an interpolated timing recovery unit to synchronize the read signal by resampling the read signal for data sequence detection;
    a sync byte detector to detect sync marks in the read signal;
    a Viterbi detector to detect data sequences in the read signal using the detected sync marks; and
    a decoder to decode the detected data sequences;
  a write path through which a signal carrying write data to the magnetic head passes when the mode controller is in the write mode in order to record the write data, the write path including:
    an encoder to encode the write data; and
    an output driver to provide a write current pattern for the magnetic head from the encoded write data; and
  a servo path through which a servo signal from the magnetic head passes when the mode controller is in the servo mode in order to find address marks in the servo signal, the servo path including:
    said variable gain amplifier to adjust an amplitude of the servo signal;
    said continuous time filter to attenuate high frequency noise in the servo signal;
    said programmable finite impulse response filter configured to equalize the servo signal for address mark detection when the mode controller is in the servo mode; and
    a servo block to detect address marks in the equalized servo signal.

2. A read/write channel in accordance with claim 1, said read path being controlled by:
  an automatic gain control loop to normnalize the amplitude of the read signal for data sequence detection by varying gain of the variable gain amplifier, and
  a DC restore loop to nullify DC offset of the read signal before data sequence detection.

3. A read/write channel in accordance with claim 1, said encoder in the write path including a scrambler to break up repetitive sequences in the write data.

4. A read/write channel in accordance with claim 1, said output driver in the write path including a serializer to convert the write data from parallel to serial format, and a precoder to convert the serialized write data to a write current pattern.

5. A read/write channel in accordance with claim 4, said output driver in the write path including a precompensation unit to compensate for non-linear effects of a writing process in the magnetic head.

6. A read/write channel in accordance with claim 1, said servo block in the servo path including a correlator to detect di-bits in the equalized servo signal, and a servo preamble detector to enable address mark detection by detecting servo preambles in the equalized servo signal.

7. A read/write channel in accordance with claim 6, wherein the servo block in the servo path includes a peak detector to detect peaks in the servo signal, the detected peaks being used by the servo preamble detector to detect the servo preambles.

8. A read/write channel in accordance with claim 1, wherein the programmable finite impulse filter is configured to equalize the read signal to an extended partial response maximum likelihood waveform when the mode controller is in the read mode.

9. A read/write channel in accordance with claim 1, wherein the decoder in the read path includes a de-scrambler to unscramble scrambled data in the detected data sequences.

10. A read/write channel in accordance with claim 1, wherein the read path includes a read/write interface to transmit the decoded detected data sequence.

11. A read/write channel in accordance with claim 10, wherein the write path includes the read/write interface to receive the write data.

12. A read/write channel in accordance with claim 1, wherein the mode controller is configured to bypass the encoder in the write path when the mode controller is in a direct write mode.

13. A read/write channel in accordance with claim 1, wherein the write path includes a positive emitter coupled logic interface to transmit the write current pattern.

14. A read/write channel circuit to communicate with a magnetic head, the read/write channel circuit comprising:
  a mode controller to select one of a plurality of operating modes for the read/write channel circuit, the plurality of operating modes including a read mode, a write mode, and a servo mode;
  a read path through which a read signal from the magnetic head passes when the mode controller is in the read mode in order to read data in the read signal, the read path including:
    a programmable compensation filter configured to filter the read signal for data sequence detection when the mode controller is in the read mode;
    a detector to detect data sequences in the filtered read signal; and
    a decoder to decode the detected data sequences;
  a write path through which a signal carrying write data to the magnetic head passes when the mode controller is in the write mode in order to record the write data, the write path including:
    an encoder to encode the write data; and
    an output driver to provide write current pattern for the magnetic head from the encoded write data; and
  a servo path through which a servo signal from the magnetic head passes when the mode controller is in the servo mode in order to detect address marks in the servo signal, the servo path including:

the programmable compensation filter configured to filter the servo signal for address mark detection when the mode controller is in the servo mode; and a servo block to detect address marks in the filtered read signal.

15. A read/write channel in accordance with claim 14, wherein the programmable compensation filter includes:

a compensation unit to compensate for distortions in a signal from the magnetic head; and a programmable filter unit to equalize the signal from the magnetic head to a target waveform.

16. A read/write channel in accordance with claim 15, wherein the compensation unit is configured to compensate for distortions caused by thermal asperity, non-linear transfer function of the magnetic head, and high frequency noise.

17. A read/write channel in accordance with claim 15, wherein the programmable filter unit includes:

an analog-to-digital converter to digitize the signal from the magnetic head;

a programmable finite impulse filter to alter the waveform of the signal from the magnetic head; and a timing recovery unit to synchronize the signal from the magnetic head.

\* \* \* \* \*

UNITED STATES PATENT AND TRADEMARK OFFICE
CERTIFICATE OF CORRECTION

PATENT NO. : 6,594,094 B2
DATED : July 15, 2003
INVENTOR(S) : James Wilson Rae et al.

It is certified that error appears in the above-identified patent and that said Letters Patent is hereby corrected as shown below:

<u>Column 287,</u>
Line 4, replace:
"a servo block to detect addresss marks in the filtered read" with
-- a servo block to detect address marks in the filtered servo --

Signed and Sealed this

First Day of June, 2004

JON W. DUDAS
*Acting Director of the United States Patent and Trademark Office*